(12) United States Patent
Pomerantz et al.

(10) Patent No.: US 10,110,805 B2
(45) Date of Patent: *Oct. 23, 2018

(54) HEAD MOUNTABLE CAMERA SYSTEM

(71) Applicant: SANDISK TECHNOLOGIES LLC, Plano, TX (US)

(72) Inventors: Itzhak Pomerantz, Kfar Saba (IL); Yaron Bar, Tzofit (IL); Rahav Yairi, Oranit (IL); Menahem Lasser, Kohav-Yair (IL)

(73) Assignee: SANDISK TECHNOLOGIES LLC, Addison, TX (US)

( * ) Notice: Subject to any disclaimer, the term of this patent is extended or adjusted under 35 U.S.C. 154(b) by 677 days.

This patent is subject to a terminal disclaimer.

(21) Appl. No.: 14/051,091

(22) Filed: Oct. 10, 2013

(65) Prior Publication Data

US 2014/0160250 A1     Jun. 12, 2014

Related U.S. Application Data

(63) Continuation-in-part of application No. 13/794,336, filed on Mar. 11, 2013.

(60) Provisional application No. 61/734,157, filed on Dec. 6, 2012.

(51) Int. Cl.
*H04N 5/232* (2006.01)
*H04N 5/225* (2006.01)
*G06K 9/00* (2006.01)

(52) U.S. Cl.
CPC ....... *H04N 5/23229* (2013.01); *H04N 5/2252* (2013.01); *H04N 5/23206* (2013.01); *H04N 5/23219* (2013.01); *G06K 9/00671* (2013.01)

(58) Field of Classification Search
None
See application file for complete search history.

(56) References Cited

U.S. PATENT DOCUMENTS

| | | | |
|---|---|---|---|
| 3,563,151 A | | 2/1971 | Koeber |
| 3,870,034 A | | 3/1975 | James |
| 4,760,269 A | | 7/1988 | McKenna |
| 4,797,736 A | | 1/1989 | Kloots et al. |
| 5,265,628 A | | 11/1993 | Sage et al. |
| 5,347,910 A | | 9/1994 | Avila et al. |
| 5,369,802 A | | 11/1994 | Murray |
| 5,394,517 A | | 2/1995 | Kalawsky |
| 5,457,751 A | * | 10/1995 | Such ................. H04M 1/05 348/115 |
| 5,579,054 A | | 11/1996 | Sezan et al. |
| 5,583,571 A | | 12/1996 | Friedland |
| 5,714,997 A | | 2/1998 | Anderson |

(Continued)

FOREIGN PATENT DOCUMENTS

| | | |
|---|---|---|
| EP | 2509006 A1 | 10/2012 |
| JP | 2003046926 A * | 2/2003 |

OTHER PUBLICATIONS

Final Office Action dated Oct. 15, 2015 in U.S. Appl. No. 13/794,336, 16 pages.

(Continued)

*Primary Examiner* — Jay Patel
*Assistant Examiner* — Shadan E Haghani
(74) *Attorney, Agent, or Firm* — Vierra Magen Marcus LLP

(57) ABSTRACT

Head mountable camera devices, systems, and methods are disclosed.

16 Claims, 45 Drawing Sheets

(56) References Cited

U.S. PATENT DOCUMENTS

| | | | |
|---|---|---|---|
| 5,835,609 A | 11/1998 | Legette et al. | |
| 5,993,001 A | 11/1999 | Bursell et al. | |
| 6,091,832 A * | 7/2000 | Shurman | G02C 11/06 2/422 |
| 6,104,824 A | 8/2000 | Ito | |
| 6,130,705 A | 10/2000 | Lareau et al. | |
| 6,195,441 B1 * | 2/2001 | Ito | H04R 5/0335 381/370 |
| 6,252,970 B1 * | 6/2001 | Poon | H04R 1/105 181/128 |
| 6,301,367 B1 * | 10/2001 | Boyden | A42B 1/245 2/209 |
| 6,307,526 B1 | 10/2001 | Mann | |
| 6,425,862 B1 | 7/2002 | Brown | |
| 6,449,374 B1 * | 9/2002 | Skulley | H04R 1/083 381/330 |
| 6,499,146 B2 * | 12/2002 | Bavetta | A41D 13/05 2/209 |
| 6,507,358 B1 | 1/2003 | Mori et al. | |
| 6,560,029 B1 | 5/2003 | Dobbie et al. | |
| 6,668,076 B2 | 12/2003 | Penkethman | |
| 6,674,430 B1 * | 1/2004 | Kaufman | G06T 15/005 345/419 |
| 6,798,443 B1 | 9/2004 | Maguire, Jr. | |
| 6,888,950 B2 * | 5/2005 | Siskin | A61F 11/14 181/129 |
| 7,076,077 B2 * | 7/2006 | Atsumi | H04R 1/1066 381/151 |
| 7,155,025 B1 | 12/2006 | Weffer | |
| D538,269 S * | 3/2007 | Tragatschnig | D14/223 |
| 7,450,024 B2 | 11/2008 | Wildman et al. | |
| D593,067 S * | 5/2009 | Millora | D14/205 |
| 7,810,750 B2 | 10/2010 | Abreu | |
| 8,025,398 B2 | 9/2011 | Jannard | |
| 8,078,263 B2 | 12/2011 | Zeman et al. | |
| 8,228,024 B1 | 7/2012 | Zander | |
| 8,368,544 B2 | 2/2013 | Wildman et al. | |
| 8,858,430 B2 | 10/2014 | Oyadiran et al. | |
| 8,979,295 B2 * | 3/2015 | Waters | G02C 11/04 351/158 |
| 9,606,375 B2 * | 3/2017 | Abreu | |
| 9,686,603 B2 * | 6/2017 | Zheng | H04R 1/1008 |
| D793,357 S * | 8/2017 | Afshar | D14/205 |
| 9,740,239 B2 * | 8/2017 | Pombo | G06F 1/163 |
| 2002/0122014 A1 | 9/2002 | Rajasingham | |
| 2004/0010803 A1 | 1/2004 | Berstis | |
| 2004/0041904 A1 | 3/2004 | Lapalme et al. | |
| 2005/0162380 A1 | 7/2005 | Paikattu et al. | |
| 2006/0209013 A1 * | 9/2006 | Fengels | G06F 3/0325 345/156 |
| 2007/0071269 A1 * | 3/2007 | Milde | H04R 5/0335 381/378 |
| 2007/0152630 A1 | 7/2007 | Winkler et al. | |
| 2007/0195987 A1 | 8/2007 | Rhoads | |
| 2007/0229761 A1 | 10/2007 | Gimenez Carol et al. | |
| 2007/0248238 A1 * | 10/2007 | Abreu | G02C 3/003 381/381 |
| 2008/0131106 A1 | 6/2008 | Bruce | |
| 2008/0143954 A1 * | 6/2008 | Abreu | G02C 3/003 351/158 |
| 2008/0144854 A1 * | 6/2008 | Abreu | G02C 3/003 381/74 |
| 2008/0300055 A1 | 12/2008 | Lutnick et al. | |
| 2009/0009475 A1 | 1/2009 | Schuette | |
| 2009/0046146 A1 | 2/2009 | Hoyt | |
| 2009/0122161 A1 * | 5/2009 | Bolkhovitinov | A61H 3/061 348/234 |
| 2009/0164032 A1 | 6/2009 | Kedem | |
| 2009/0180649 A1 | 7/2009 | Hsu et al. | |
| 2009/0268032 A1 | 10/2009 | Jones et al. | |
| 2010/0095977 A1 | 4/2010 | Schmitz et al. | |
| 2010/0172522 A1 * | 7/2010 | Mooring | H04R 1/1041 381/311 |
| 2010/0216522 A1 | 8/2010 | Bennis et al. | |
| 2010/0238693 A1 * | 9/2010 | Jeddeloh | G06F 13/4234 365/51 |
| 2010/0245585 A1 * | 9/2010 | Fisher | H04M 1/6066 348/164 |
| 2010/0328471 A1 * | 12/2010 | Boland | G02B 13/004 348/207.99 |
| 2011/0090135 A1 * | 4/2011 | Tricoukes | G02B 27/0176 345/8 |
| 2011/0170702 A1 * | 7/2011 | Bays | H04R 5/0335 381/74 |
| 2011/0193963 A1 * | 8/2011 | Hess | H04N 5/2252 348/157 |
| 2011/0288445 A1 * | 11/2011 | Lillydahl | A61B 5/4557 600/590 |
| 2012/0050198 A1 | 3/2012 | Cannon | |
| 2012/0149467 A1 | 6/2012 | Heck | |
| 2012/0155064 A1 * | 6/2012 | Waters | A42B 1/242 362/103 |
| 2012/0190404 A1 | 7/2012 | Rhoads | |
| 2012/0229248 A1 | 9/2012 | Parshionikar et al. | |
| 2012/0281961 A1 * | 11/2012 | Forbes | H04N 5/77 386/224 |
| 2012/0307561 A1 | 12/2012 | Joo et al. | |
| 2013/0063550 A1 | 3/2013 | Ritchey et al. | |
| 2013/0122672 A1 * | 5/2013 | Or-Bach | H01L 21/8221 438/199 |
| 2013/0177166 A1 * | 7/2013 | Agevik | H04S 1/005 381/74 |
| 2013/0188021 A1 * | 7/2013 | Sim | G06T 15/00 348/46 |
| 2013/0285886 A1 * | 10/2013 | Pombo | G02B 27/0149 345/8 |
| 2013/0307856 A1 | 11/2013 | Keane et al. | |
| 2013/0310676 A1 | 11/2013 | Jung | |
| 2013/0345842 A1 * | 12/2013 | Karakaya | H04R 5/04 700/94 |
| 2014/0018779 A1 | 1/2014 | Worrell et al. | |
| 2014/0050346 A1 * | 2/2014 | Chen | H04M 1/0272 381/333 |
| 2014/0055353 A1 * | 2/2014 | Takahama | G06F 3/012 345/156 |
| 2014/0079257 A1 | 3/2014 | Ruwe et al. | |
| 2014/0161412 A1 * | 6/2014 | Chase | H04N 21/2743 386/224 |
| 2014/0261509 A1 * | 9/2014 | Adam | A45D 8/36 132/200 |
| 2014/0352033 A1 | 12/2014 | Bryan et al. | |
| 2016/0100676 A1 * | 4/2016 | Sandanger | A45F 5/00 224/181 |

OTHER PUBLICATIONS

Non-Final Office Action dated Jun. 22, 2015 in U.S. Appl. No. 13/794,336, 12 pages.

Restriction Requirement dated Mar. 31, 2015 in U.S. Appl. No. 13/794,336, 6 pages.

Ay, Sakire Arslan et al. "GRVS: A Georeferenced Video Search Engine," ACM Multimedia Conference, Oct. 19-24, 2009, Beijing, China, pp. 977-978.

Model, Dmitri et al. "User-Calibration-Free Remote Eye-Gaze Tracking System With Extended Tracking Range," 24th Canadian Conference on Electrical and Computer Engineering (CCECE), May 8-11, 2011, pp. 1268-1271.

LED Flashlight & Morse Code—Android, http://www.appszoom.com/android_applications/tools/led-flashlight-morse-code_bvvkp.html, printed Oct. 5, 2012, 2 pages.

Swann Freestyle HD Wearable Camera, http://www.whatdigitalcamera.com/equipment/reviews/compactcameras/129258/1/swann-freestyle-hd-wearable-camera.html, Feb. 23, 2012, 6 pages.

Android—Would it be possible for a mobile app to detect a flashing light with its camera, i.e., Visual Morse Code, http://stackoverflow.com/questions/4888251/would-it-be-possible-for-a-mobile-app-to-detect-a-flashing-light-with-its-camera, Feb. 3, 2011, 2 pages.

(56) References Cited

OTHER PUBLICATIONS

Murphy, Samantha. "Why Google Glass Could Be Bad for Your Eyes," http://mashable.com/2013/02/22/google-glass-bad/, Feb. 22, 2013, 15 pages.

Eye Alignment for Hard Plastic Doll Eyes, http://thisolddoll.info/hosp/eyealign/eyealign.htm, printed Oct. 5, 2012, 10 pages.

"A Day Made of Glass 2," Corning, YouTube, http://www.youtube.com/watch_popup?v=6Cf7IL_eZ38&vq=medium, printed Mar. 11, 2013, 1 page.

"Google Glasses Project," YouTube, http://www.youtube.com/watch?feature=endscreen&NR=1&v=JSnB06um5r4, published May 7, 2012, 1 page.

"Skydiving at Sibson Using Immortal Video Eye Gear," YouTube, http://www.youtube.com/watch?v=3ML6Hm-jwt4, uploaded Jul. 15, 2012, 1 page.

"Windows Project Glass: One Day Too . . . ," YouTube, http://www.youtube.com/watch?v=ZwModZmOzDs, published Apr. 5, 2012, 1 page.

Wilhem, Frank H. et al. "Emotions Beyond the Laboratory: Theoretical Fundamentals, Study Design, and Analytic Strategies for Advanced Ambulatory Assessment," Biological Psychology, 2010, vol. 84, pp. 552-569.

Lewan, Mats. "Aqua Pulse Measures Heart Rate in the Pool," http://news.cnet.com/8301-17938_105-10225171-1.html, Apr. 22, 2009, 2 pages.

"Arteries and Nerves," http://www.healthline.com/human-body-maps/head/male#5/6, printed Oct. 7, 2013, 2 pages.

PLX XWave Sonic—Brain Wave Headset, http://www.plxdevices.com/product_info.php?id=XWAVESONIC, printed Oct. 7, 2013, 3 pages.

VoiLa Voiced Label Reader for the Blind—English, MaxiAids, http://www.maxiaids.com/products/1573/VoiLa-Voiced-Label-Reader-for-the-Blind-English.html, printed Oct. 7, 2013, 3 pages.

"Super-Resolution Technology to Convert Video of Various Resolutions to High-Definition," News Release Digest, Central Research Laboratory, Hitachi, Ltd., 2007, http://www.hitachi.com/rd/portal/pdf/news/crl0809241nrde.pdf, 1 page.

Whatmough, Robert. "Techniques for Extracting High-Resolution Still Images from Video Sequences," DSTO-TR-1247, Department of Defense, Defense Science & Technology Organisation, Dec. 2001, 55 pages.

XSightWare, https://gust.com/c/xsightware, printed Oct. 7, 2013, 4 pages.

Yao, Ning et al. "A Video-based Algorithm for Food Intake Estimation in the Study of Obesity," IEEE 33rd Annual Northeast Bioengineering Conference, Mar. 10-11, 2007, Long Island, NY, Abstract, 1 page.

Lipsett, P.A. et al. "Handwashing Compliance Depends on Professional Status," PubMed, http://www.ncbi.nlm.nih.gov/pubmed/12593714, Fall 2001, 2 pages.

Bischoff, MD, Werner E. et al. "Handwashing Compliance by Health Care Workers: The Impact of Introducing an Accessible, Alcohol-Based Hand Antiseptic," American Medical Association, http://archinte.jamanetwork.com/article.aspx?articleid=485276, Arch Intern Med, vol. 160, Apr. 10, 2000, pp. 1017-1021.

Weissig, Christian et al. "The Ultimate Immersive Experience: Panoramic 3D Video Acquisition," Proceedings of the 18th International Conference on Advances in Multimedia Modeling (MMM'12), Springer-Verlag Berlin, Heidelberg, 2012, pp. 671-681.

Stevens, Tim "NAVI Hack Uses a Kinect to Let the Blind See, Wear Awesome Headgear (video)," http://www.engadget.com/2011/03/17/navi-hack-uses-a-kinect-to-let-the blind-see-wear-a . . . , Mar. 17, 2011, 3 pages.

Meschtscherjakov, Alexander et al. "Utilizing Emoticons on Mobile Devices within ESM studies to Measure Emotions in the Field," MobileHCI '09, Sep. 15-18, 2009, Bonn, Germany, 4 pages.

Poppendieck, Wigand et al. "Measurement Station for Recording of Different Biosignals to Detect Emotions Under Mobile Conditions," MobileHCI '09, Sep. 15-18, 2009, Bonn, Germany, 3 pages.

Acosta, Jamie C. "Persuasion, Dialog, Emotion and Prosody," MobileHCI '09, Sep. 15-18, 2009, Bonn, Germany, 3 pages.

Hussain, Syed S. et al. "Emotion Recognition on the Go: Providing Personalized Services Based on Emotional States," MobileHCI '09, Sep. 15-18, 2009, Bonn, Germany, 4 pages.

Janssen, Joris H. et al. "Guidelines for Mobile Emotion Measurement," MobileHCI '09, Sep. 15-18, 2009, Bonn, Germany, 4 pages.

Ganglbauer, Eva et al. "Possibilities of Psychophysiological Methods for Measuring Emotional Aspects in Mobile Contexts," MobileHCI '09, Sep. 15-18, 2009, Bonn, Germany, 4 pages.

Yamamoto, Jumpei et al. "MOLMOD: Analysis of Feelings based on Vital Information for Mood Acquisition," MobileHCI '09, Sep. 15, 2009, Bonn, Germany, 4 pages.

Bengs, Anette et al. "A Multimethod Approach for Measuring Mobile UX," MobileHCI '09, Sep. 15-18, 2009, Bonn, Germany, 3 pages.

Setz, Cornelia et al. "Combining Worthless Sensor Data," MobileHCI '09, Sep. 15-18, 2009, Bonn, Germany, 4 pages.

Non-Final Office Action dated May 18, 2016 in U.S. Appl. No. 13/794,336, 16 pages.

Corrected Notice of Allowability dated Apr. 18, 2018, in U.S. Appl. No. 13/794,336, 8 pages.

* cited by examiner

| Component | Power (mw) |
|---|---|
| Cameras | 20+20 |
| Embedded NAND (Link) | 100 |
| CPU | 50 |
| Random Access Memory (RAM) | 50 |
| GPS | 20 |
| Beacon | 50 (400 --Street television (TV) LED for broadcast) |
| Bluetooth communication | 5 |
| Misc. | 40 |
| Total | 355 mw |
| Total (at 3.3 Volt) | 107 ma |

| Condition | Factor | Total | Units |
|---|---|---|---|
| HD video megabytes per minute | | 100 | MB |
| HD video megabytes per hour | 60 | 6000 | MB |
| in two channels | 1.3 | 7800 | MB |
| Per day | 8 | 62400 | MB |
| For a week of full retention | 6 | 374400 | MB |

| Function | Purpose | Methods | Output |
|---|---|---|---|
| Segmentation | Split the continuous log into discrete segments | On-off switch<br>Change in background visuals<br>Change in background noise<br>Manual user bookmarks | A folder of segments with partial metadata |
| Attribution | Creating hooks for the search engine from the audiovisual content | Identifiable objects<br>Identifiable places<br>Identifiable faces<br>Identifiable signs<br>Identifiable keywords<br>Indoors/outdoors<br>Daylight/dark<br>Stationary/walking/driving/unattended<br>Presence of other NANDeyes | Enrichment of metadata in segment entries |
| Extraction | Filtering segments for manual attention of user | Payments done<br>Billable time spent<br>Bookmarked segments for inspection<br>Bookmarked segments for forwarding<br>Bookmarked segments for deletion<br>Adding contacts to the database | According to filter type |

FIG. 10

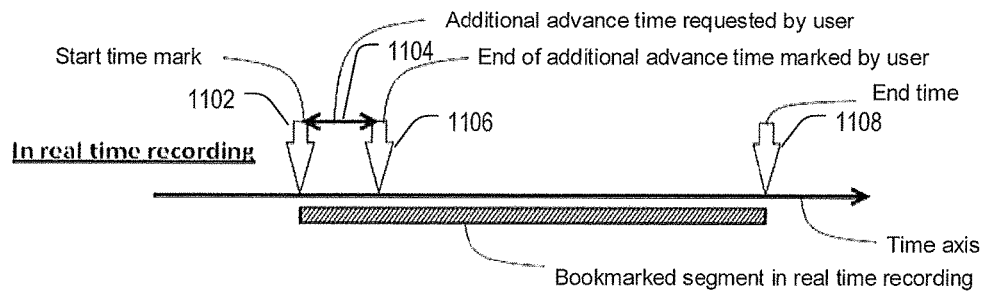

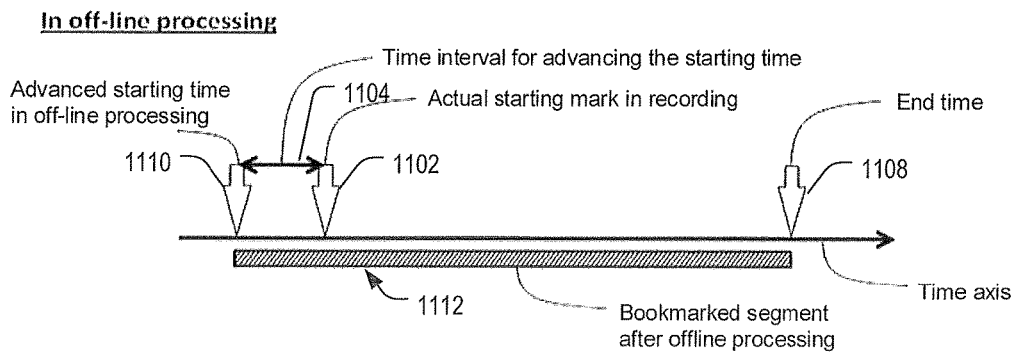

FIG. 11

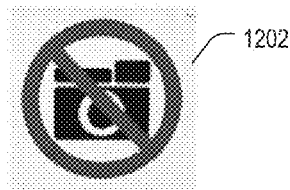

FIG. 12

| Parameter | Manual adjustment | Automatic adjustment |
|---|---|---|
| Calibration between user and NANDeye center Field of View | "Balanced Corner" technique | The manual method is a "one click" operation and makes an automatic mode redundant |
| Adjusting Field of view | Twist mechanism on cockpit of headgear | When the system notices that the user tilts his head up and down repeatedly |
| Focus distance | User adjustable separate focal lengths | When the system sees a scene with near and far objects |
| Frame rate | User adjustable separate frame rates | When the system sees very significant frame-to-frame changes |
| Zoom and resolution | User adjustable separate zoom amounts | When the system sees a relatively small object kept for a relatively long period at the center of the FOV - this mode can be optional, in case the user may not want the camera to zoom |
| Spectral coverage | User selectable filtering, such as for beacon communication | When user is actively communicating using the beacon |

FIG. 13

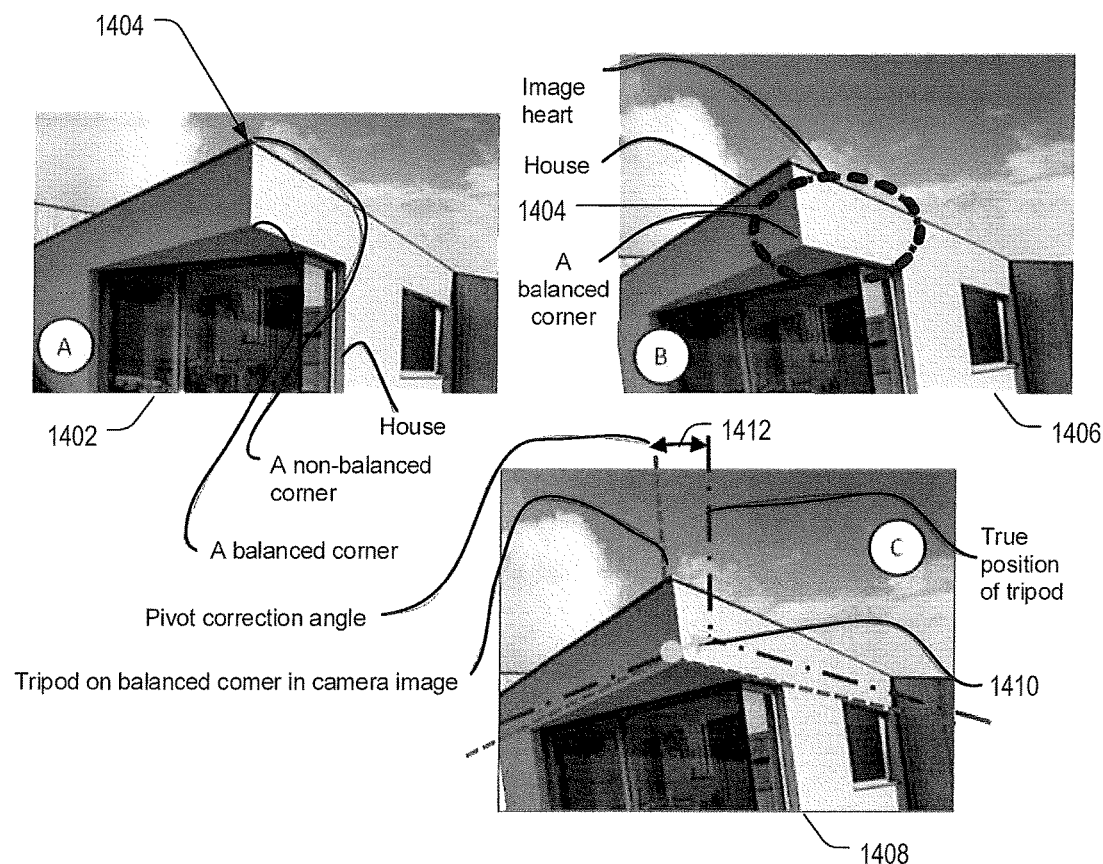
FIG. 14
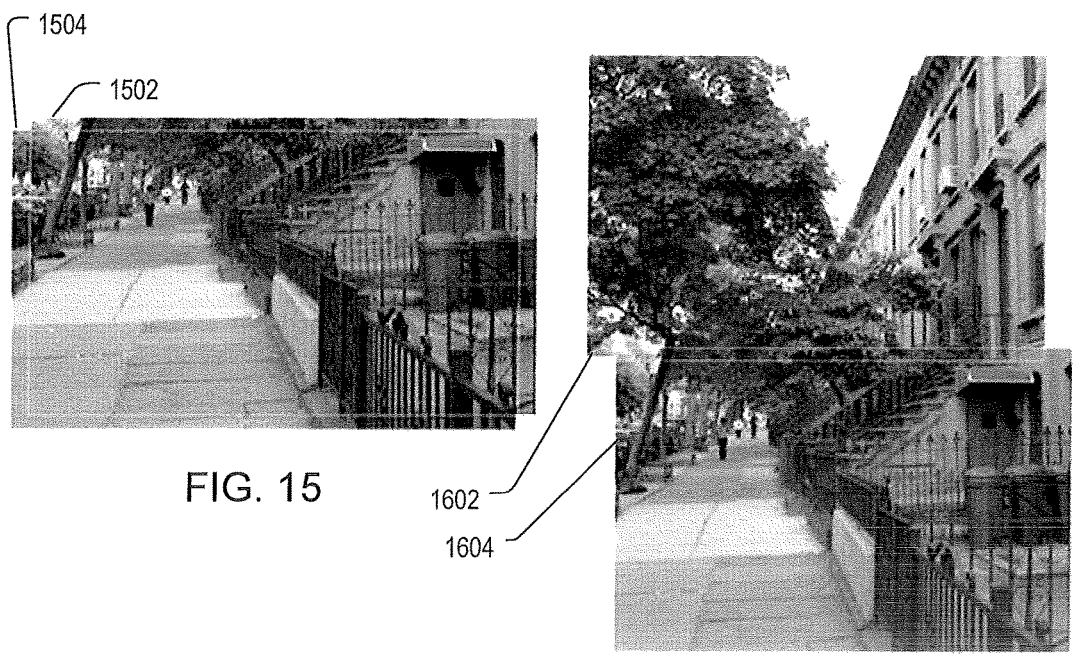
FIG. 15
FIG. 16

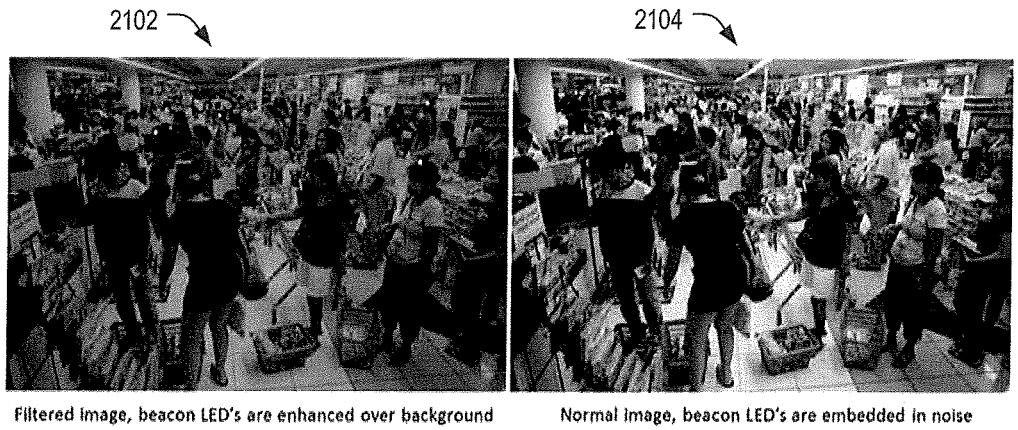

Filtered image, beacon LED's are enhanced over background | Normal image, beacon LED's are embedded in noise

FIG. 21

| Channel | Main advantages | Typical use |
|---|---|---|
| Hardware controls on Headgear | Instant interaction<br>No errors | Power on/off<br>Still image snap shot |
| Voice commands | Hands free<br>No footprint on headgear | Info "for the record" ("advance bookmark by 7 secs.") |
| Visual gestures | Rich vocabulary and easy interpretation | Start-stop-zoom-calibrate etc. |
| Phone interface | Fully audio-visual<br>Easily programmable<br>Remotely controllable | Short visual messaging |

FIG. 22

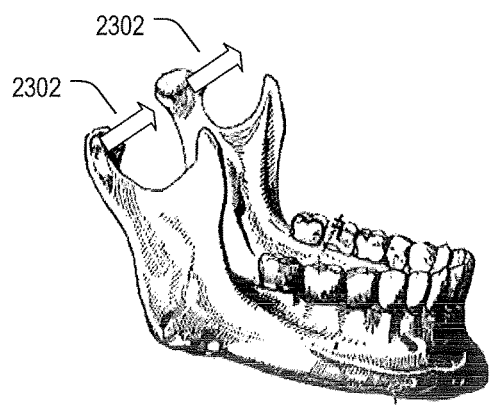

FIG. 23

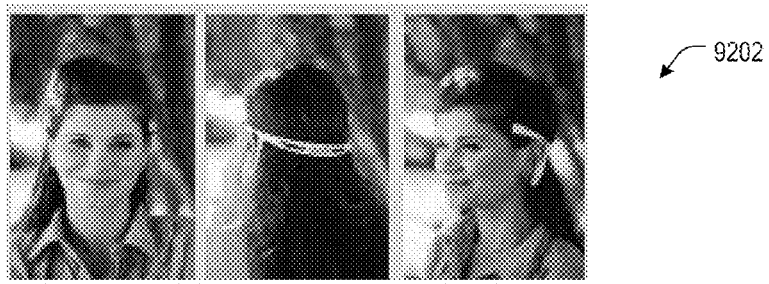
FIG. 92

HEAD MOUNTABLE CAMERA SYSTEM

CROSS-REFERENCE TO RELATED APPLICATIONS

The present application claims priority to U.S. Provisional Application No. 61/734,157, filed Dec. 6, 2012, and is a continuation in part of and claims priority to U.S. patent application Ser. No. 13/794,336, filed Mar. 11, 2013. Each of the above referenced applications is incorporated by reference in its entirety herein.

FIELD OF THE DISCLOSURE

The present disclosure is generally related to camera devices.

BACKGROUND

Advances in digital camera technology have resulted in compact, high-resolution cameras that can capture still images and/or video in portable electronic devices. Although many devices such as mobile phones and tablet computers include cameras, still image and video recording are typically secondary features of the devices. Navigating a user interface to start a camera session may be time-consuming and can result in lost opportunities as a device user may be unable to initiate a camera session in response to an unanticipated event. Aiming the camera may require moving the entire device, which may be awkward when the device is large or when a user's hands are otherwise occupied.

BRIEF DESCRIPTION OF THE FIGURES

FIG. 10 is an illustration of a particular embodiment of operations that may be supported by a system to process data that may be generated by a head-mountable camera apparatus.

FIG. 11 is an illustration of a particular embodiment of bookmarking data that may be generated by a head-mountable camera apparatus.

FIG. 12 is an illustration of a particular embodiment of a graphical feature that may be detectable by a head-mountable camera apparatus as indicating that photography is unallowed.

FIG. 13 is an illustration of a particular embodiment of adjustable camera parameters of head-mountable camera apparatus.

FIG. 14 is an illustration of a particular embodiment of calibration of a head-mountable camera apparatus.

FIG. 15 is an illustration of a particular embodiment of a multi-camera stereo mode of a head-mountable camera apparatus.

FIG. 16 is an illustration of a particular embodiment of a multi-camera extended field of view mode of a head-mountable camera apparatus.

FIG. 21 is an illustration of a particular embodiment of spectral filtering of a head-mountable camera apparatus.

FIG. 22 is an illustration of a particular embodiment of interface channels that may be supported by a head-mountable camera apparatus.

FIG. 23 is an illustration of a particular embodiment of jaw motion that may be detectable by a head-mountable camera apparatus.

FIG. 92 is an illustration of particular embodiments of head-mountable camera apparatuses.

DETAILED DESCRIPTION

A technical description of multiple components of a consumer product named "NANDeye" is disclosed. The consumer product named "NANDeye" may also be referred to as the name "SPoT" or another name of a system that comports with one or more characteristics of a system described herein. Each component may be used individually or may be used in combination with one or more other components. Although the term "NANDeye" is sometimes applied herein to a system of interoperating components, the term "NANDeye" may also be applied to one or more of the components independent of whether the component operates as part of a larger system, and therefore the term "NANDeye" is not limited to a multi-component system. Each component may include new and useful features independent of whether the component is used as part of a larger system or separate from a larger system. Although the name "NANDeye" is used, it should be understood that while various implementations of various components may include NAND flash memory, other implementations of one or more components may include memory other than NAND flash memory, or alternatively, may include no memory. It should be understood that while various implementations of various components may include one or more cameras, image sensors, lenses, and/or other video elements, other implementations may not include such video elements.

NANDeye may be described as a video recording and processing system that may enable generating and providing users with a raw video log and a processed video log of what the users see. NANDeye may be a consumer product that creates a visual log of everything the user sees unless video logging is disabled or interrupted, such as paused by the user or responsive to an indication of prohibition by local regulations. A large variety of hardware and software modules, serving a large number of applications, may be used individually or in combination.

Figure 1:
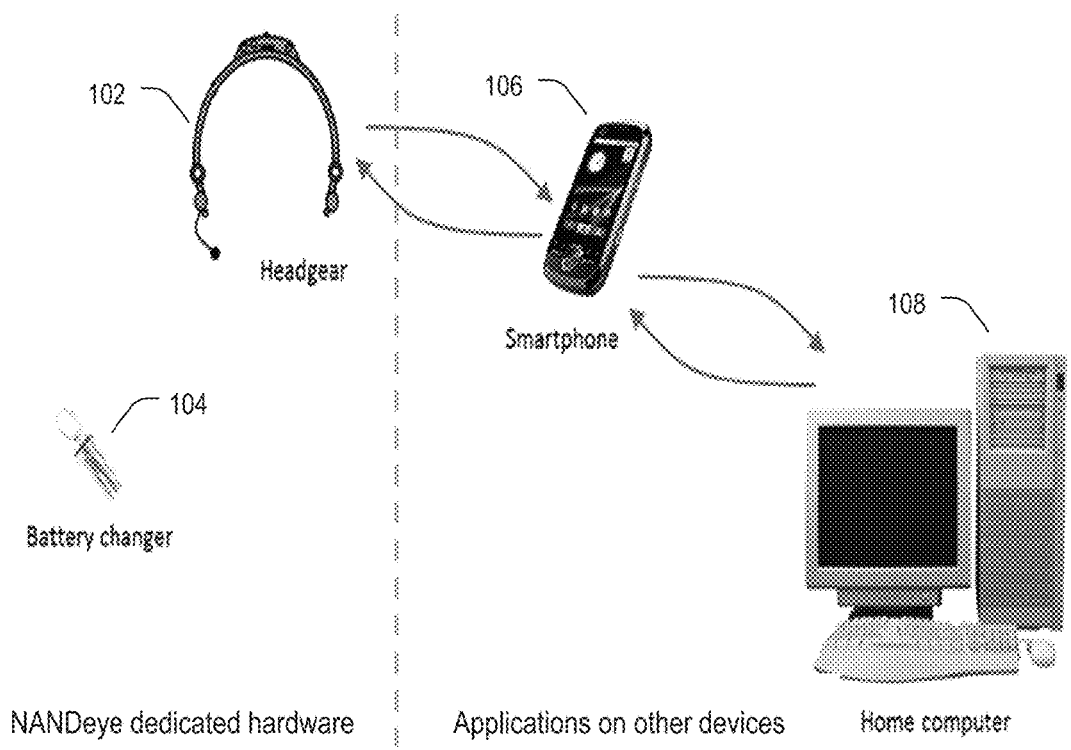
FIG. 1 is an illustration of a particular embodiment of components that may be used in a head mountable camera system.
Figure 2:
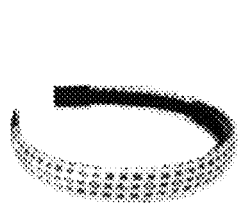
FIG. 2 is an illustration of a particular embodiment a hairband form factor that may be used as a form factor of headgear that may support one or more cameras.
Figure 3:
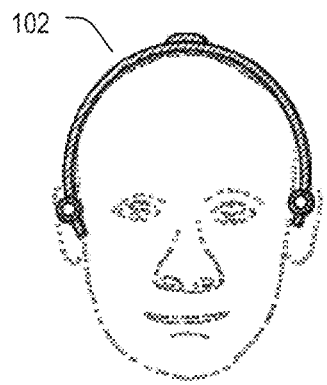
FIG. 3 is an illustration of a particular embodiment of a head-mountable camera apparatus.

A NANDeye system may be made of four separate hardware units, such as illustrated in FIG. 1. For example, two of the hardware units of may include dedicated hardware (e.g., headgear 102 and a battery changer 104) and two of the hardware units may be implemented using hardware computing platforms running NANDeye software applications, such as smart phones (e.g., smart phone 106) and home computers (e.g., home computer 108) as illustrative examples. The headgear 102 may be an electronic device having the form factor of a hairband, such as an example of a hairband form factor illustrated in FIG. 2, and an example of the headgear 102 is illustrated in FIG. 3. The headgear 102 may be the front end of the system and may contain three groups of components:

Sensors: Cameras, satellite-based location sensors, such as global positioning system (GPS), accelerometer, compass, inclinometer, photodiode, one or more other sensors, or any combination thereof.

Human interfaces: Microphone, earphones, cheek sensors, one or more other interface devices, or any combination thereof.

Utilities: batteries, processor unit, such as a central processing unit (CPU), mass storage, beacon light emitting diode (LED), communication, such as ad-hoc peer-to-peer network communication (e.g., Bluetooth), laser pointer, one or more other utility components, or any combination thereof.

The headgear 102 may be configured to capture video, compress the resulting video data corresponding to the captured video, perform basic image processing, and send resulting data to a remote control held by the user, such as the user's phone via a wireless interface, such as via a Bluetooth network.

Figure 4:
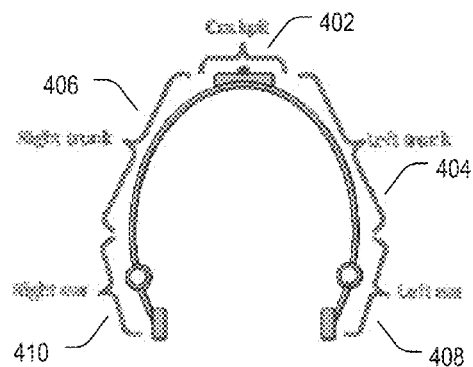
FIG. 4 is an illustration of a particular embodiment of a head-mountable camera apparatus.

The headgear 102 may be a fashion item. As a visible item on the user's head, it can be aesthetic and convenient to wear. An illustrative form factor of a headgear 102 with two cameras is shown in FIG. 4 and may be provided with replaceable components or coverings to enable user customization of an appearance of the headgear 102 (e.g., "skins"). The headgear 102 body illustrated in FIG. 4 can be divided into 5 functional regions:

Cockpit 402—including, e.g., controller/processor, batteries, beacon(s), switches, laser pointer(s);

Left trunk 404—including, e.g., flexible printed circuit board (PCB), storage cards;

Right trunk 406—including, e.g., flexible PCB, and storage such as memorycards or embedded memory;

Left ear 408—including, e.g., earphone, camera, cheek switch, concave rest for allowing passage of the eyeglasses temples, or for leaning and stabilizing the system on the typically accurately located eyeglass temples; and Right ear 410—Typically same as left ear.

A smartphone may serve as the keypad, additional processor, and/or display 522 for the headgear 102. Although described herein as a 'phone' or 'smartphone' for convenience, any portable electronic device may be used, such as a tablet computer or other portable electronic device. The phone may receive instructions using a text or voice input, show selected video frames from the cameras, and run simple video processing tasks in near real-time.

A home computer, to which the video captured by NANDeye can be sent on-line or off-line may execute processing intensive off-line video processing applications that may be a burden to execute by the phone, such as indexing and segmentation, and/or off-line video searches. The home computer may also serve as an archive and database of the system.

A battery changer for instantly replacing empty batteries in the NANDeye with charged batteries may be a small mechanical device that replaces batteries in the headgear 102 without interrupting the operation of the system, without moving the headgear 102 from its position on the head and without requiring an eye contact between the user and the NANDeye headgear 102.

Figure 5:
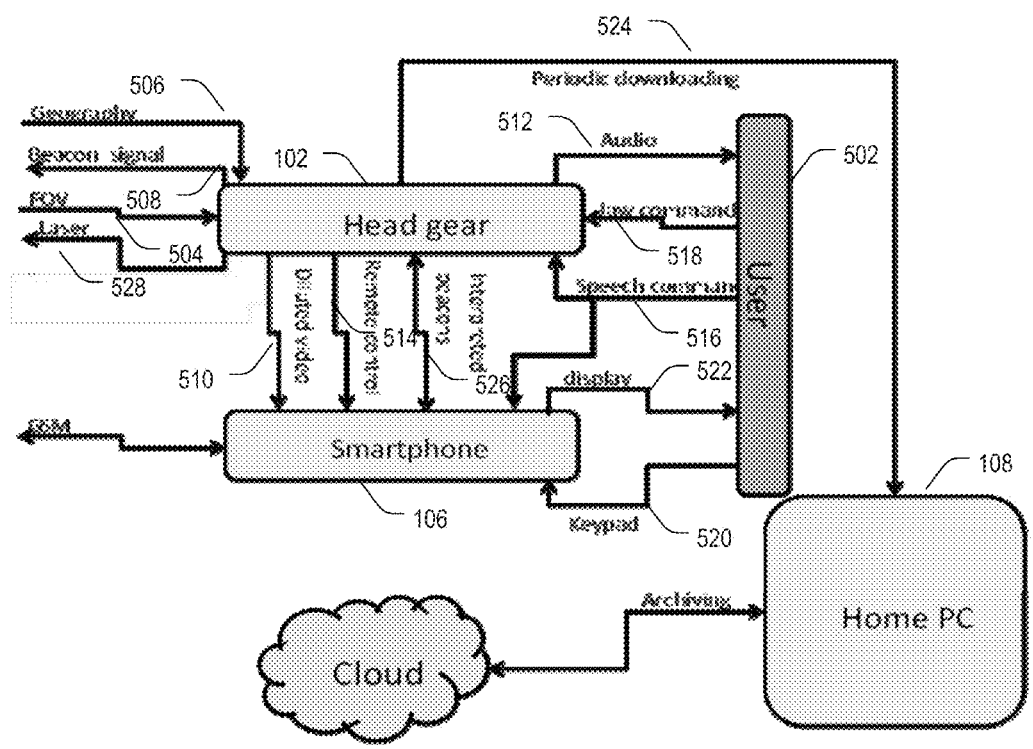
FIG. 5 is an illustration of a particular embodiment of components of system including a head mountable camera.

Subsystems may be functionally interconnected as illustrated in FIG. 5.

A user 502 wears the headgear 102 and the headgear 102 may be connected via Bluetooth to the user's phone 106. The headgear 102 cameras and microphones may cover an image and audio of a field of view 504. Geographical sensors (GPS, compass, inclinometer) may add a geo-data channel 506 to the audio and video. The user can adjust a pair of the cameras to cover scene strereoscopically for a 3D video, or to alternatively stagger two fields of view thus approximately doubling the field of view in elevation or in azimuth. Beacon light emitting diodes (LEDs) 508 on the headgear 102 may light or blink when the cameras are on, such as to disclose to the environment that the user is recording. The user can calibrate the center of the field of view (FOV) 504 of the camera to be aligned with the user's own center of the field of view, so that the center of the user's FOV coincides with the center of FOV 504 of the system. While the stored video can be in high resolution and frame rate, the system may download in real time only a diluted video channel 510 (such as lowered resolution, or lowered frame rate, or video reduced to occasional still images) to the phone 106, where video processing applications may be applied to process the video and to search the video content for items in demand, such as familiar faces or pre-defined label text. The diluted video and/or images may also be used as context for adjusting parameters of the camera.

If the scene is changing very fast, the user or the system software can instruct the headgear to increase the frame rate—either via the phone 106 or by a direct command to the headgear.

If the content (or the inclinometer) indicates that the user 502 is repeatedly nodding the headgear 102 up and down, such as to raise and lower the field of view 504 and look at objects that cannot enter the vertical field of view simultaneously, the phone 106 can instruct the headgear 102 to stagger the two cameras vertically and increase the field of view.

It should be noted that one or more parameters of the camera, such as focal length, shutter speed or frame rate can also be controlled, during operation, by the output of the headgear 102 sensors.

When one or more applications at the phone 106 have information to convey in real time to the user 502, the phone 106 may upload the information to the headgear 102 via the Bluetooth channel, where local earphones may play the information by artificial speech or by predefined sound effects into the user's ears (audio 512). When the user 502 has information to convey to his headgear 102, such as commands and/or parameters, the user may use phone 106 input channels (e.g., keypad 520, voice command) to input the information into the phone 106, and the phone 106 may interpret the commands and convey the user's command to the headgear 102 via the Bluetooth channel (e.g., a remote control 514). The user 502 can also give simple speech commands 516 to the headgear 102 directly, and the headgear 102 may receive the speech commands 516 via a microphone, and may provide feedback to the user 502 via earphones. When the headgear 102 has information to convey in real time to the user 502, the headgear 102 can convert the information to artificial speech or to predetermined tones and play them to the user via the earphones, or it can pass the information to the phone 106 and the NANDeye application on the phone will display it on the phone screen.

Another command channel between the user and the headgear 102, that does not require the user 502 to use hands or to spell out audible tones, may include a jaw motion channel 518, where sensors on the headgear 102 can detect mandible motion and teeth clacking and may interpret the motion and/or clacking as mouse clicks according to a pre-defined symbolic language.

An alternative way of using audio energy produced by the teeth for controlling a computer is using one or more small mechanical clickers in the user's mouth that make loud mechanical noise, easily detectable through the cheeks. If clickers have different audio sound, the distinction between right and left click may be even further simplified.

Any or all of the recorded logs, including video, audio and metadata, may be stored in local flash memory on the headgear 102, and may be downloaded 524 to the user's home computer 108 when the headgear 102 is at home, such as overnight. Off-line software on the home computer 108 may perform deep analysis of the recorded logs, segments, one or more of the recorded logs to individual episodes, and extracts useful information from the episodes.

The NANDeye system may include one or more families of software applications:

On-the fly processing firmware on the headgear 102.

Calibration—NANDeye's cameras on the headgear 102 can be adjusted to be aligned with the user's field of view 504. As a casual placement of the headgear 102 on the user's head may not ensure proper alignment, calibration software may align the two FOV's in a manner that accommodates the condition that the user may not have a real time screen to compare what the camera sees to what the user sees. Using such calibration means each time the user moves the headgear (such as when the user combs his hair, wears a hat or moves the headgear to a more comfortable position) ensures that the NANDeye is always calibrated and can be used as a pointing device to the direction intended by the user.

Beaconing—NANDeye may have a clear visual indication to indicate that the headgear 102 is active in recording, in order to give the environment "a disclosure," such as to satisfy a legal or ethical obligation. A visual indication may be provided using a strong LED beacon 508 located on the headgear 102.

Emitted light may be modulated to optically transmit information that the wearer wishes to share with other NANDeye users. For example, the emitted light may include visible light or infrared light. This optical signal can convey information to NANDeyes within line of sight, and the information can be decoded by dedicated application on the Smartphone of the recipient and a readable message can be displayed on the phone screen. Such a beacon-modulated message 526 may be referred to as a visual short message service (VSMS) or Visual Texting (Vtext) message.

Beacons that are not relevant or not desired to users may be screened out by their location in the field of view of the recipient and the incoming signals around the relevant beacon may be filtered out.

VSMS can be indirect: beacons may transmit a short uniform resource locator (URL), which can be made of a very small amount of textual data (short URL). A user whose headgear 102 receives and decodes a short URL may access the URL via the user's phone 106 and see a message, such as including graphics, and/or including photo of the sender and any/or including other information that the sender wished to convey. If the users want to continue communication, the users may move to communicate via conventional channels such as texting or phone.

VSMS can also be direct: upon detecting a VSMS from a beacon, a user may raise his head and seek another headgear 102 (with a blinking beacon) in the FOV. If there is another headgear 102, and the other headgear 102 appears to the user to be interesting, the user may look at it, bringing the headgear 102 with the blinking beacon to the center of the user's FOV, and this centering may enable the user's headgear 102 to zoom on the specific beacon and get an enhanced quality signal while filtering out other beacons transmitting in the field of view. The user's headgear 102 may decode the message and may display the message on the phone 106. The user can then react to the message.

The detection and decoding of beacon signals can be done via an optical sensor, such as a video camera or a photodiode. For example, the detection and the decoding may be performed by video processing of the captured video image, or by a photodiode that is directly responsive to the light energy of the beacon. When the optical sensor includes the photodiode, filtering and amplification of the desired beacon signal can be achieved by amplitude modulating the beacon signal on a high frequency light carrier signal at a precise and predetermined frequency (such as a 600 kilo hertz (kHz) square wave signal), and by feeding the photodiode output as radio frequency energy to an amplitude modulation (AM) receiver tuned to the carrier frequency.

A mobile phone framework may provide an infrastructure that enables interfacing between a phone 106 and headgear 102 using Bluetooth or other wireless networking technology. This infrastructure may enable product manufacturers and other developers to develop a large variety of useful applications for personal assistance, entertainment, socializing, work efficiency, education, one or more other subjects, or any combination thereof. A rich variety of third party applications may be developed by users and developers all over the world using the infrastructure.

NANDeye may include:

Two small video cameras, of a type and a size used in mobile phones and optionally with additional external lenses as the depth of the NANDeye camera is not limited to (e.g., is not constrained to) the small thickness of a phone, and can accommodate a longer optical path.

A strong beacon LED, possibly with a omnidirectional radiation pattern, to send a majority of emitted light to directions where other NANDeyes may detect the emitted light. The LED used for Vtext can be in visible light or in near infrared light, so as to not disturb the human eye of people around the device.

One or more simple or patterned laser pointers 528, directed to a center of the field of view, marking a distinguishable pattern, such as a cross or a circle or the double-point trace of two simple laser pointers (e.g., each laser pointer projects its own beam having a round cross-section, such as a circular cross-section, an elliptical cross-section, etc.), that can be captured by the video cameras and can be detected during off-line video processing software so that marked objects can be detected automatically during off-line processing.

A battery based power supply may be integrated into or carried on the headgear 102. Other solutions—such as wired belt-borne battery may be alternately used.

Figures 6, 7:
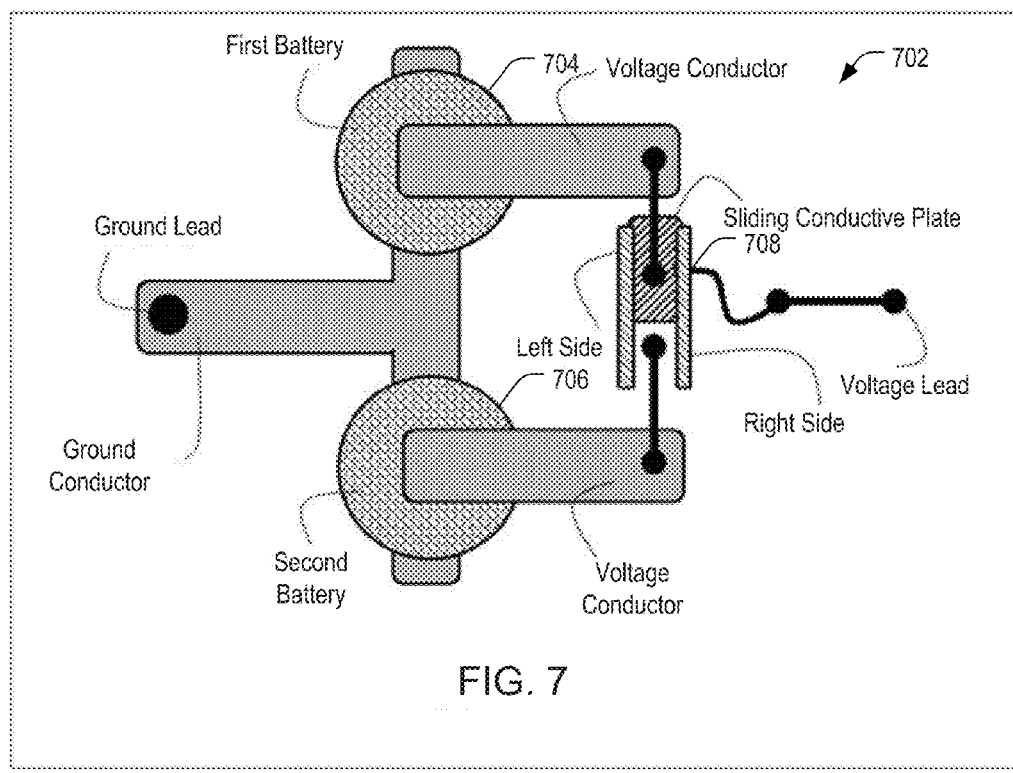
FIG. 6 is an illustration of a particular embodiment of power usage of various components of a head-mountable camera apparatus.
FIG. 7 is an illustration of a particular embodiment of a multi-battery power supply that may be included in a head-mountable camera apparatus.

FIG. 6 shows an example of values of illustrative steady power consumers in a NANDeye example. A typical rechargeable battery may have 110 milliamp-hours (MAH), and can provide sufficient power to operate NANDeye implementation (with dual-camera video recording, processing, and storing, etc.) for about one hour.

Powering the NANDeye without tethering it to a belt or a pocket of the user may enable enhanced mobility, comfort, and ease of use. Powering two cameras for many hours a day and powering a strong beacon LED and various sensors on NANDeye without tethering the headgear 102 to an external battery is illustrated in FIG. 7, that illustrates an example of a dual battery compartment or housing 702 that can hold two rechargeable batteries (704, 706). In the embodiment of FIG. 7, only one of the two batteries (704, 706) feeds NANDeye at one time (except in the short transient of switching between batteries). Switching between the two batteries (704, 706) connects the new battery to the circuit before the old battery is disconnected ("make before break"). The switching from one battery to the other can be done electronically and initiated automatically by the system.

The switching between the batteries can also be done manually. When the NANDeye detects that the current battery is low and alerts the user of low battery (e.g., once an hour) the user may activate a tiny switch 708 (see e.g., FIGS. 7-8) on the headgear 102, that switches the NANDeye to consume power from the second battery, providing the user another period of uninterrupted operation. Any time within that period, the user should physically replace the empty battery with a full battery. The batteries can be held into place by a compartment mechanism as illustrated in FIG. 8 or by a magnetic attraction as illustrated in FIG. 9O.

Figures 8, 9:
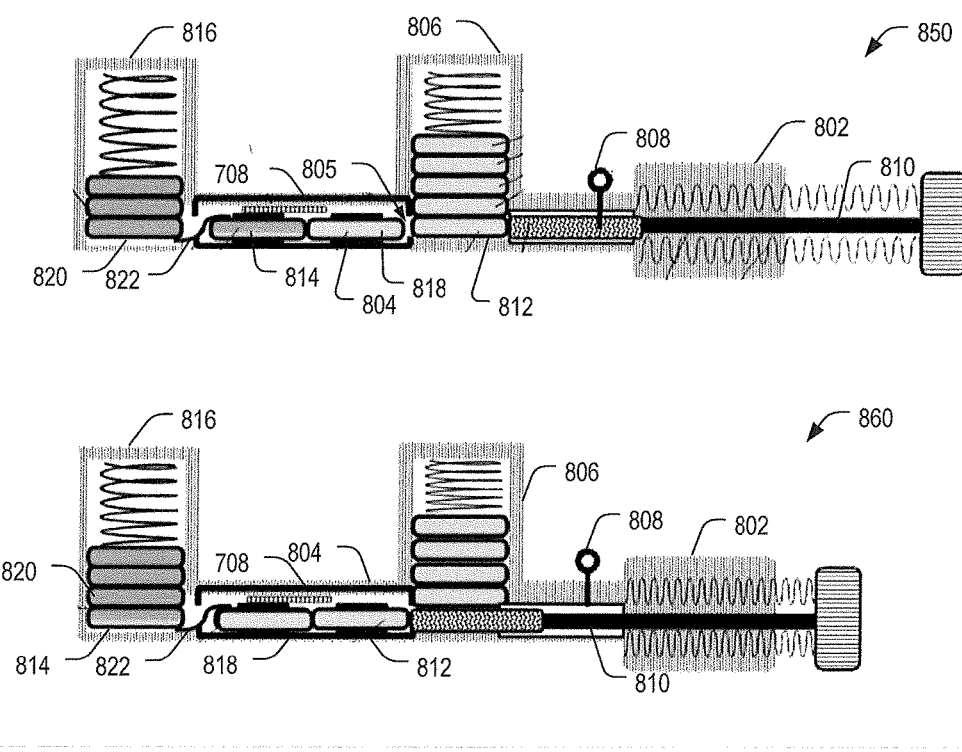
FIG. 8 is an illustration of a particular embodiment of a multi-battery power supply and a battery changer that may be used in conjunction with a head-mountable camera apparatus.
FIG. 9 is an illustration of a particular embodiment of memory usage of a head-mountable camera apparatus.

Replacement of batteries may be done manually, and can also be done using a separate mechanical device as a battery changer 802, as illustrated in FIG. 8, containing a magazine 806 of full batteries. The user may mechanically cock (e.g., make ready) the changer 802 (in his hand or inside his pocket) before bringing it to the vicinity of the NANDeye system, and then position the changer 802 on a special socket on the headgear 102, and pull a trigger 808. This operation can be designed to be done "blindly"—without an eye contact between the user and the socket. Upon actuating a mechanical trigger 808 on the battery changer 802, the cocked spring is released and instantly causes a pushing arm 810 to push one full battery 812 from the full battery magazine 806 into the NANDeye battery housing 804 having a chamber dimensioned to hold multiple batteries, pushing the empty battery 814 from the NANDeye out of the device, and collect the empty battery 814 that is ejected from the NANDeye, and add it to the "empty battery" magazine 816 that is designed to accommodate multiple batteries.

A mechanical battery-change process is illustrated in FIG. 8. The top illustration 850 is a cocked state, before pulling the trigger 808, and the bottom illustration 860 is a state after pulling the trigger 808.

The changer 802 may have two magazines to hold rechargeable coin batteries. One magazine 816 may be configured to hold emptied batteries, and one magazine 806 may be configured to hold full batteries. The magazines may be spaced to be positioned on the battery pair so that a (lowest positioned) full battery 812 of the changer, the full battery 818 of the headgear 102 in a first battery location in the housing 804, the empty battery 814 of the headgear 102 in a second battery location in the housing 804 and a (lowest positioned) empty battery 820 of the changer are in a row, almost touching each other. The changer 802 may include a piston 810 that can move along the line of that row and push the first battery in the row (a full battery 812 from the changer) into the housing 804 via an opening 805 to replace the full battery 818 of the headgear 102. The latter will then push the empty battery 814 of the headgear 102 to replace the empty battery 814 of the headgear 102 by the full battery 818 of the headgear 102. The latter will then attempt to push the last battery 820 in the row, but as there is a flexible strip 822 of low-friction material above it, the ejected battery 814 pushes the lowest battery 820 in the empty battery magazine up into the magazine 816 against a spring, and takes its place as a lowest-positioned battery in the empty battery magazine 816.

After replacement of batteries, the user may remove the changer 802 that now has one battery less in the full battery magazine 806 and one battery more in the empty battery magazine 816. The user may perform this replacement operation whenever the user gets an indication that the headgear 102 has switched itself from an emptying battery to a full battery. After the battery replacement (e.g., at the end of the day, or over-night), the user may put the changer 802 on a charger to re-charge the emptied batteries. A mechanical mechanism may enable rotation of the magazines so that the full, re-charged magazine will become the full charged magazine, and the emptied magazine that has delivered the full batteries during the day, will become the empty magazine for emptied batteries.

In order to reduce or minimize the mechanical operations that the user performs to the headgear 102 while wearing the headgear 102, a spring operated cocking mechanism may allow the user to cock the changer 802 before the user does the replacement, so that the replacement is instantly and automatically performed by pressing or pulling a trigger 808.

Following the physical replacement of batteries in the headgear 102, the system may electronically switch between the batteries, so that consumption (that has been earlier switched to the full battery) is switched back to the same battery in its new position, leaving the newly fed battery full and waiting for its turn.

The operations of switching to the full battery and mechanically changing a battery need not happen at the same instant and may depend on the context and circumstances. Note that if the user has an opportunity to perform the mechanical exchange while the current battery is still enduring, NANDeye may be configured to not electronically move to the new battery and may instead exhaust the old battery first.

The battery changer 802 can be configured to transport batteries from the full-battery magazine to the empty-battery magazine directly, so that if the day ends with some full batteries left in the full-battery magazine, they can be moved to the empty-battery magazine so that after the charging, there will be one full magazine with full-batteries, and one empty magazine. Alternatively, the charger may be normally used over the NANDeye to keep replacing batteries until the full-battery magazine is empty.

Mechanical and electromechanical components of NANDeye may be embedded in the headgear 102. The battery changer 802 and the battery changer charger may be external to the headgear 102.

The headgear 102 may include microphones. NANDeye microphones can be implemented using state of the art technologies for enhanced voice filtering and pick up speech of the user in addition to voices from the environment. Alternatively, there can be multiple microphones, such as two microphones, symmetrically positioned on both headgear 102 arms, one configured to pick up only very close speech, and the other configured to pick up voices from any distance. This allows the NANDeye to serve both cases where the environmental sounds are a part of the interesting scene (recording a conference room) and cases where the environmental sounds are noise (recording a narration by the user of the field of view). Using two microphones can also enable the filtering of near sounds (from the user) to far sounds (from other sources) by referring to the phase difference of the audio signal received in both microphones. An additional microphone may be installed facing frontwards, in order to pick the voice of the other party during conversations and lectures.

The headgear 102 may include a cheek motion sensor. For example, the NANDeye may provide two cheek motion sensors, resting on the user's cheek below the user's ear, slightly behind the user's temples. The cheek motion sensors may be configured to pick up simple jaw-gestures—commands given by a user opening and closing the user's mouth, due to the motion of the lower jaw forward and/or backwards. Such gesture can be interpreted as a "mouse click" and allow the user to give simple commands to the system without using hands and without using audible voices—such as in a concert or in a small meeting, where voice is not politically correct. Such sensors can also provide physiological information that the user may want to log such as an amount and rate of chewing that the user performs during different parts of the day, as another example, and possibly medical conditions such as "dropped jaw" as another example.

The headgear 102 may include two earphones that may be similar in design and packaging to cap-less music earphones.

The headgear 102 may include a solid state accelerometer, a solid state compass, a solid state inclinometer, a photodiode, one or additional sensors, or any combination thereof.

The headgear 102 may include a stress sensor to monitor the bending-moment on the arc of the headgear 102. This may be a sensor embedded at the center of the hairband. A central stress sensor can be an alternative to the cheek sensors, as a central stress sensor may detect stress of the hair band under widening (e.g., stress due to the hairband expanding) due to a lower jaw motion. Some embodiments may include cheek sensors or a central stress sensor without including both types of sensors.

The NANDeye may include the following electronic modules—a power regulation and distribution module, a processor for some real time on board calculations, random access memory (RAM), and flash storage. Very large flash memory of hundreds of Gigabytes can be used for logging full video activity, using high definition and dual cameras. An example of a memory budget estimate is illustrated in FIG. 9.

Mass storage can be implemented by embedded storage or by memory cards. NANDeye can be configured to work with both embedded memory and memory cards.

The NANDeye may be configured to be water resistant and protected from dirt and dust. For example a user may accidently wear a NANDeye into a shower, a pool, or in very dusty areas. Embedded memory enables a sealed package to enhance water and dust protection.

NANDeye video logging using multiple cameras at high resolution may cause wearing of a memory, such as a flash memory, and with heavy use a flash memory may be replaced during a lifecycle of the device. Memory cards simplify memory replacement by the user.

In terms of commercial contracts, delivery of flash memory as stand-alone card products may provide enhanced simplicity as compared to delivering flash memory as an internal component.

A sample implementation can include a well-designed waterproof compartment for several memory cards, spread along the legs of the headgear 102.

A Bluetooth communication module may be included to connect the headgear 102 with the mobile phone 106 of the user.

A LED driver and encoder may be included for providing encoded current to a beacon LED, that can be a white LED or a color LED.

As NANDeye may be not visually accessible to the user during operation (the headgear 102 outside the user's field of view), in an embodiment the headgear 102 may preferably not have its own display and keyboard. A user's phone 106 may instead serve as a main human interface for the system. As used herein, a "field of vision" or "field of view" of a user may correspond to a portion of the user's environment that is within (or can be seen by) the user's eyesight without changing an orientation of the user's head. For example, a field of vision for each of the user's eyes may extend from approximately 60 degrees inward (toward the user's nose) from the vertical meridian of the eye to approximately 100 degrees outward (away from the nose) from the vertical meridian, and approximately 60 degrees above and 75 below the horizontal meridian. As another example, a field of vision for each of the user's eyes may correspond to 60 degrees inwards and outwards from the vertical meridian and 20 degrees above and below horizontal. A field of vision for both eyes can correspond to the combined field of vision of each eye (e.g., extending from approximately 100 degrees from the left of straight ahead (e.g., eyes forward toward a point on the horizon) to approximately 100 degrees to the right of straight ahead, and from approximately 60 degrees above the horizon to approximately 75 degrees below the horizon).

One application of the NANDeye is "life blogging"—with enhanced convenience of automatic indexing, while maintaining richness and reliability.

The NANDeye may provide a significant added value to life blogging, as compared to digital audio and video recorders that may be used for documenting meetings but that are typically passive in handling the raw recorded material off-line. NANDeye may include an off-line video analysis PC software configured to receive (e.g., on a daily or weekly basis) an upload of a video log of a user, and process the uploaded video log, (e.g., overnight processing). FIG. 10 illustrates a list of functions that may be performed automatically.

The user may "bookmark" points and moments of interest while recording. The bookmark can be useful to the off-line processing software and can indicate a point in time and may also indicate a direction. One example is a time-only mark, where a user may mark (e.g., bookmarks) the start and the end of a selected segment in time.

Another example is a time and passive direction mark, wherein a user may gaze in a direction of a selected object, and mark a time and a direction. Direction may be logged through geodata, such as via a GPS, compass, an inclinometer, one or more other sensors, or a combination thereof. The user may identify a relevant item in the video image, or off-line software may be configured, using pattern recognition methods, to identify an object that meets some search criteria at the center of the field of view (FOV). For example, the user may see an interesting piece of clothing in a shopping window and may want to find out about the clothing when the user is at home.

Another example is pin-point marking, where a user may turn on a laser pointer of the headgear 102, direct the laser pointer to a selected item and provide an input command to mark this video segment as a "pin-point". An identifiable light pattern of the laser pointer will appear on the object(s) in the field of view. The user may tilt and pan the user's head to position the pattern on the object of interest or to draw a frame around it. If the object of interest is an area (such as part of the text of a large sign), the user can loosely loop the pattern around the area. Upon off-line processing, pattern recognition software may automatically detect the unique light pattern and use the detected light pattern to recognize the item pointed-at by the user. NANDeye may use a pair of laser pointers configured to emit a (substantially) parallel pair of patterned images. The distance between two parallel patterns is not dependent upon distance from the user. An angular distance between the two patterns, that does linearly depend on the distance to the object, can serve as a measure of the distance between the user and the object.

Bookmarking in NANDeye enables off-line software find the interesting and important items in the video log, as designated by the user.

A bookmarking feature may be applicable where the user misses the real starting moment of an event, but can estimate how long ago (before the user started the bookmarking) the starting point of the event happened. A typical example is this: the user sees an episode that turns out to be worth logging. By the time the user marked this moment to be a bookmark, the user missed about 10 seconds of the interesting event. The user wants to indicate to the system, that the real starting time of the bookmark should be 10 seconds before the bookmark. The user has to wait approximately 10 seconds after starting the recording, and then and give the "Start recording" command again. And then, when the episode is over, the user has to click the bookmark indication for the third time. The system may take the time between the first "Start recording" command and the second "Start recording" command and advance the starting of the bookmark by that amount. If the times of the three indications are $T1$, $T2$ and $T3$—the book mark may be set to last from $T1-(T2-T1)=2*T1-T2$, to $T3$. An example is illustrated in FIG. 11. The user can decide that the user wants to bookmark a time window and may give the NANDeye system a command 1102 to start bookmarking, and then to stop bookmarking. If the user is somewhat late to catch the moment so that when the user gives the instruction to bookmark and event, the event is already in progress, the user may instruct the system to extend the bookmark to before the real starting point.

In other words, a way is to estimate how many seconds ($t_{advance}$ 1104) the user wants to add, then wait until the user estimates that $t_{advance}$ 1104 seconds have passed since the first bookmark instruction 1102, and then give a second signal 1106 to the system, then wait until the event is over and give a third signal 1108 to the system to terminate the bookmark. The off-line software, in response to finding the three marks on the time line, may start the bookmark $t_{advance}$ seconds prior to the designated starting point, to "back up" the starting mark to the actual start 1110 of the bookmarked event 1112 in the video log.

An alternative method to give a controlled advance to a bookmark includes telling the system, while the bookmark is on, that the user wishes to add X seconds to the current bookmark, where X is a number.

NANDeye may include a mechanism to help users respect the privacy of subjects that prefer not to be video-recorded. For example, in a private place where a proprietor of the private place does not allow video logging, one or more methods may be used to convey a "no photography please" request to NANDeye users. For example, a sign may be posted with an icon 1202 such as in FIG. 12, which may be standardized. NANDeye processing software may be configured to recognize the icon 1202 in the raw video and to automatically locate and automatically delete relevant segments or delete an entire video segment. A "no photography please" sign can include a barcode part that is more easily machine detectable. The limits of the segment to be removed can be derived from a discontinuity in the video cut, or from the physical distance of the NANDeye from the area where the icon was recognized.

Another example includes installing beacons (stationary or mobile) that blink to transmit a code indicating "no photography please". Such beacons can be detectable and decodable by the NANDeye and may cause the NANDeye to respond in a manner similar to as described with respect to the icon 1202 of FIG. 12. The beacon on another user NANDeye can serve as a "no photography please" to indicate that the bearer of the other NANDeye asks not to be recorded on video.

Private places that do not allow NANDeye recording may be able to transmit a weak, safe radio signal that can be picked by the NANDeye headgear 102 or by the user's phone 106, indicating that the user is in a range of "no photography". The NANDeye may be configured to indicate to a user of a NANDeye detecting the signal that the area is designated as "no photography". The NANDeye may be configured to automatically avoid logging or to ask for the user's instruction whether to continue video logging or to refrain from video logging. The user may decide that the designation is not acceptable and to proceed with logging what the user sees.

People who do not want their image taken may be able to announce to their environment that they do not want their image taken by encoding their own beacon to send out a code (e.g., a standardized message) indicating "please do not record my photo". A NANDeye user may not be obligated to comply with the request. For example, the NANDeye user may decline to comply with a request while in public places. However, if the NANDeye user wants to comply, the user can set the user's NANDeye to automatically blur the immediate proximity, in the video image, of people who broadcast their wish not to be photographed. The blurring can leave the beacon signal itself clear and visible, while blurring the area under it which is typically the face of the bearer. If the user configures the user's NANDeye to operate in such a "complying" mode, the user's video generated by the complying NANDeye may be accordingly watermarked. Video publishers such as YouTube can be configured to condition their acceptance of material on the presence of such a watermark or indication, so that video that was not recorded in the compliant mode will not be published.

The NANDeye may be configured to record only things that the user sees (or is capable of seeing) with the user's own eyes to protect the user from concerns of illegal eavesdropping. The NANDeye system may have an optional mode in which the NANDeye system does not record video unless sensors of the NANDeye indicate that the headgear 102 is worn by a user.

The NANDeye cameras may have several user-adjustable parameters. These parameters may be controllable while shooting (i.e., capturing video data and/or still image data via one or more cameras), and different parameters may be provided to each of multiple cameras of the NANDeye headgear 102 while shooting. NANDeye may be configured to automatically control these parameters based on preliminary processing of received video data or still image data from one or more cameras. FIG. 13 illustrates an example of a table that includes some examples of adjustable parameters and sources of information for adjusting the parameters automatically.

The field of view may be calibrated to provide co-linearity between the direction to the center of field of view (CFOV) of the user and the direction to the CFOV of the NANDeye. However, NANDeye cameras are configured to work without a screen (i.e., a user may not have access to view video in real-time). Some applications of the NANDeye may include communicating precise pointers to an object between the user and the NANDeye. In some embodiments, NANDeye is not anchored or bolted to the user's skull and may therefore be misaligned or shifted during the day—accidently or deliberately, creating a miss-match of between the NANDeye and the users CFOV.

Calibration between the two CFOV's, without using a screen, can be performed using an object that is easily detectable by both the user's brain and the NANDeye's real time software, such as a "balanced corner". FIG. 14 illustrates an example of performing calibration using a balanced corner.

Image A 1402 in FIG. 14 shows an arbitrary structure that has several corners. Some of the corners can be called "balanced corners" and are corners between three (substantially) orthogonal planes, typically two walls and a ceiling or a floor. Rectangular rooms have 8 "balanced corners"—4 at the floor and 4 at the ceiling. The user can move to a position from where the three edges that define the corner are seen as three rays coming out of a common vertex: one goes straight up or down, and the other two seem in the image to make approximately a 120 degree angle to the vertical ray. In the center of image A 1402 there is a balanced corner 1404 (made of the roof of the patio and the two walls above it). A balanced corner may be easy to detect by image processing, and in typical urban scenery, a user may easily bring a balanced corner into the center of the user's field of view. The user may focus his CFOV on such a balanced corner and activate the calibration function. When activated, the NANDeye takes a snapshot of its FOV, and seeks a balanced corner in the "heart" of the image. See image B 1406 of FIG. 14. As the NANDeye may be off-calibration, the NANDeye may not find a precisely aligned balanced corner at the precise center of the image, but the NANDeye will find an almost balanced corner (one ray almost vertical and two other rays almost 120 degrees away) almost at the center. If the NANDeye software finds a single candidate, the NANDeye software may automatically calculate a correction vector, correcting the roll, pitch and yaw angles of the NANDeye to match the user's point of view. In image C 1408 of FIG. 14, the NANDeye and the user are aligned via a pivot correction offset vector 1410 and a pivot correction angle 1412, and the user can point objects to the NANDeye by just looking at them. Note that upon calibration the user does not need to move the NANDeye physically to align the CFOV's—the NANDeye software can note direction of the user's CFOV on the system's FOV and refer to that direction as CFOV.

In conventional three-dimensional (3D) imaging, there are two cameras sharing the same field of view, giving an additional dimension of depth. NANDeye may be configurable to operate in a 3D mode to enable 3D recording or to operate in one or more other modes where diversity of two functional cameras can be used for other purposes, giving NANDeye features not available in conventional cameras. FIG. 15 illustrates coverage of a field of view in a 3D recording mode. When a user does not desire 3D recording, the overlap between the two fields of view 1502, 1504 may be an inefficient use of pixels and energy. The NANDeye may be configured to tilt one of the cameras a little upwards, and one of the cameras a little downwards, and produce the field of view shown on FIG. 16. The combined field of view of the two fields of view 1602, 1604 in FIG. 16 almost doubles the vertical coverage of the cameras as compared to FIG. 15. Alternatively, the horizontal field of view, rather than the vertical, may be increased. In this case, orientations of two cameras may be panned out to produce a panoramic field of view.

Figure 17:
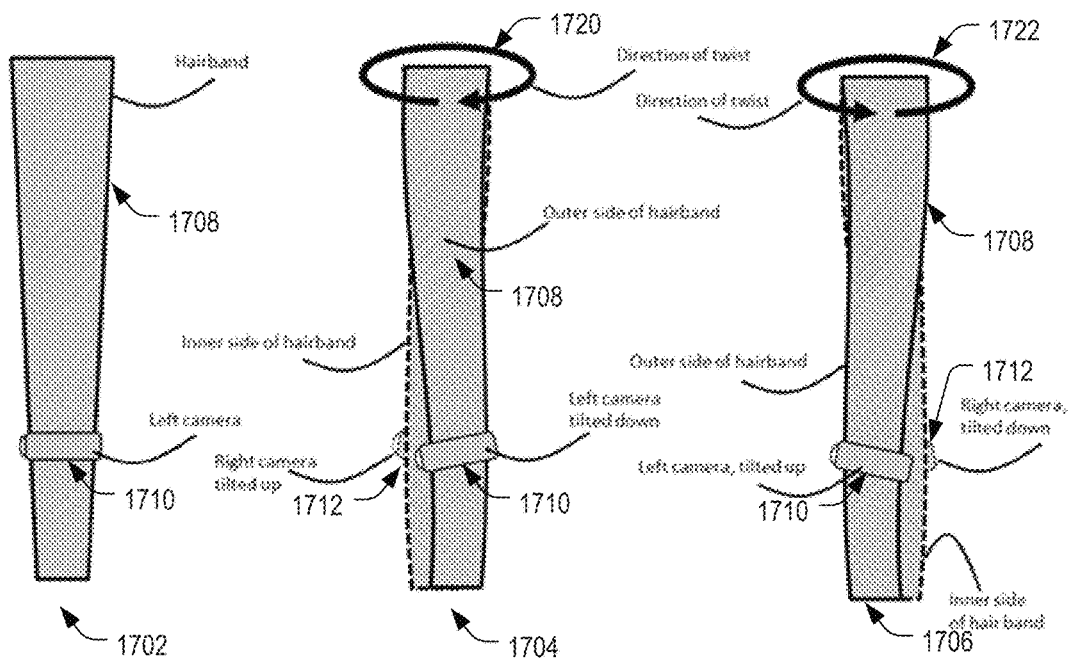
FIG. 17 is an illustration of a particular embodiment of a head-mountable camera apparatus in a stereo mode and in multiple vertically extended field of view modes.
Figure 33:
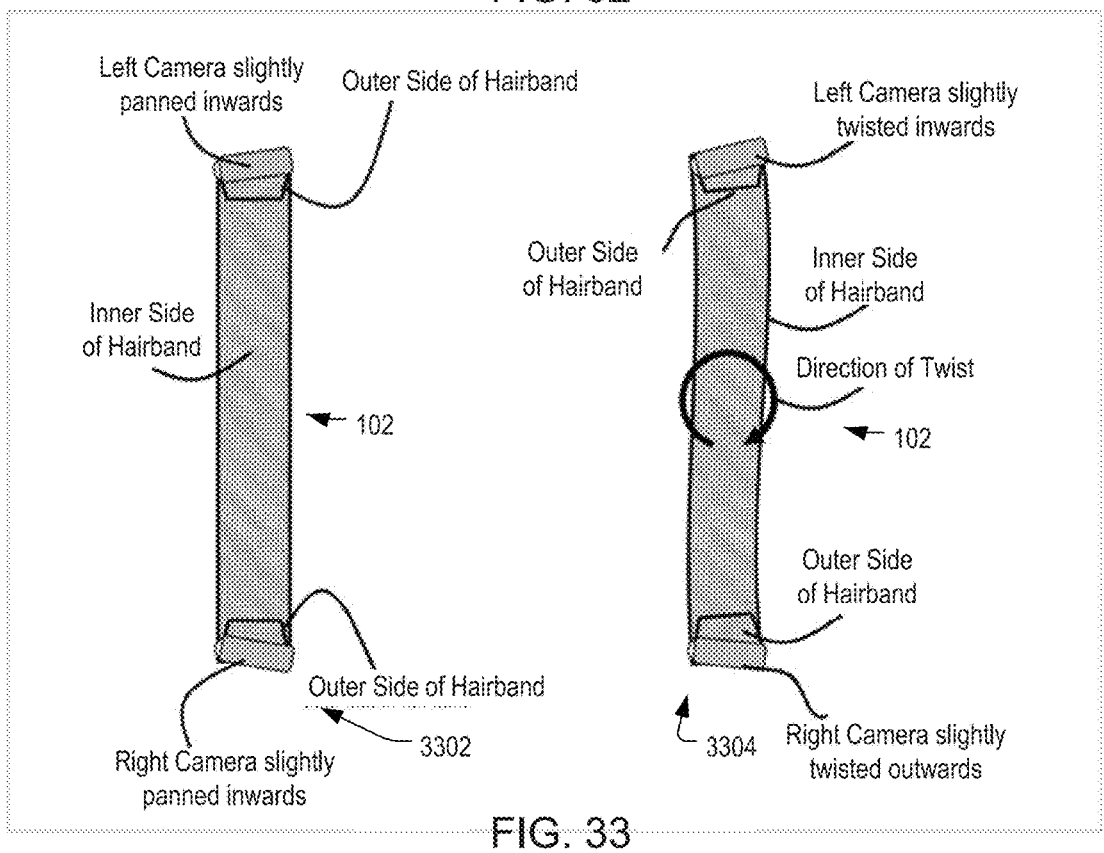
FIG. 33 is an illustration of a particular embodiment of a head-mountable camera apparatus configured in a stereo mode and an extended horizontal field of view mode.

If the NANDeye is implemented without pedestals, gimbals and motors, such embodiment of the present disclosure teaches a method to tilt each of the two cameras to a different elevation and azimuth while the headgear is formed of a single injected plastic chassis. In such an implementation, the tilt of the cameras from their default position may be based on the elasticity of the plastic. FIG. 17 illustrates an embodiment of the headgear 102 in a stereo mode 1702, a first increased view of view mode 1704, and a second increased field of view mode 1706. The headgear 102 includes a hairband 1708, a left camera 1701, and a right camera 1712. In the stereo mode 1702, the cameras 1710 and 1712 are substantially aligned. In the first increased field of view mode 1704, the headband 1708 is twisted according to a first direction of twist 1720 and as a result the left camera 1710 is tilted downward and the right camera 1712 is tilted upward. In the second increased field of view mode 1706, the headband 1708 is twisted according to a second direction of twist 1722 and as a result the left camera 1710 is tilted upward and the right camera 1712 is tilted downward. As illustrated in FIG. 17, a horizontal twist (about a vertical axis) of the cockpit of the headgear 102 causes the two trunks of the headgear 102 to elastically distort and causes one of the ear parts to tilt downwards, tilting the attached camera downwards, and the other ear part to tilt upwards, tilting the attached camera upwards. For automatic operation, an electromagnet mechanism may switch the cockpit between a "normal" (e.g., 3D or stereo recording) state and a "twisted" state (e.g., vertically extended field of view). An example of horizontal field of view adjustment via distortion caused by a twist at the cockpit is illustrated in FIG. 33.

Frequently, distance to an object in the field of view is correlated with head tilt. For example, when a person looks straight ahead, the person is typically looking at objects in the far field of view. When a person is looking down, the person is typically looking at objects in the person's hands or on a desk (or counter, table, etc.) in front of the person. Conventional multifocal eyeglasses may are typically designed so that the focal distance at the lower part of the lens is short, and the focal distance at the higher part of the lens is far. The NANDeye may have a multifocal lens that to adjust the camera for close focus at low tilt, and for far focus at eye level and up. One implementation may be to use gravitation in a way similar to the way baby-dolls close their eyes when laid back and open them when help upright. An example of such a mechanism is illustrated in FIG. 18.

Figure 18:
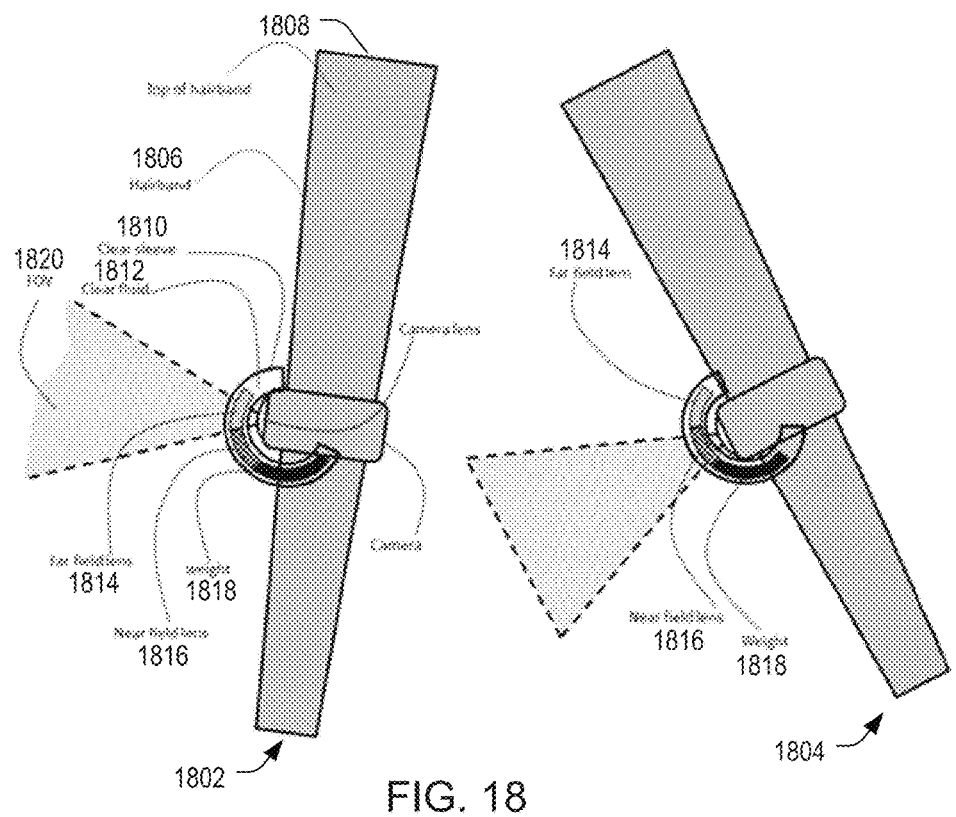
FIG. 18 is an illustration of a particular embodiment of focal distance adjustment of a head-mountable camera apparatus.

FIG. 18 illustrates a particular embodiment of the headgear 102 in a first focus condition 1802 and a second focus condition 1804. The headgear 102 includes a hairband 1806 having a top 1808 that extends over a user's head. A far field lens 1814, a near field lens 1816, and a weight 1818 are in a sleeve 1810 that is positioned in front of a camera of the headgear 102. The sleeve 1810 may also include a clear fluid 1812. The sleeve 1810 is curved to enable the weight 1818 to remain in a lowest position of the sleeve 1810 as the sleeve 1810 and the camera change tilt, maintaining a positioning of the lenses 1814-1816 and enabling the camera to change it's FOV 1820 to include the far field lens 1814 or the near field lens 1816 based on an amount of tilt of the camera. In the first focus condition 1802 the camera is tilted at slightly above horizontal (e.g., to view a distant object) so that it's FOV 1820 intersects the far field lens 1814. In the second focus condition 1804 the camera is tilted below horizontal (e.g., to view an object on the user's desk or read a book) so that a FOV 1820 of the camera intersects the near field lens 1816. A difference between the two lenses illustrated in FIG. 18 can be changing the focal length, or changing the width of the field of view.

Depth of field may be increased in NANDeye systems even through a user may not have a screen to view real-time video and therefore cannot make a real time quality control or focus adjustments. The NANDeye may enable setting of the focal lengths of separate cameras to different distances with a small overlap. A result may include two independent video streams that can be either alternatively selected by the off-line software according to the object of interest, or integrated frame by frame into an "always in focus" video clip.

Frame rate diversification may be provided by the NANDeye. In conventional 3D cameras, each frame is created by both cameras in synch to be combined to form a single 3D frame. In NANDeye, if the system is operating in a 3D mode to take 3D video, then both cameras may run in synch at the same frame rate. However, sometimes the user may indicate that 3D imaging is not important for him or that another mode of operation is to be used.

Figure 19:
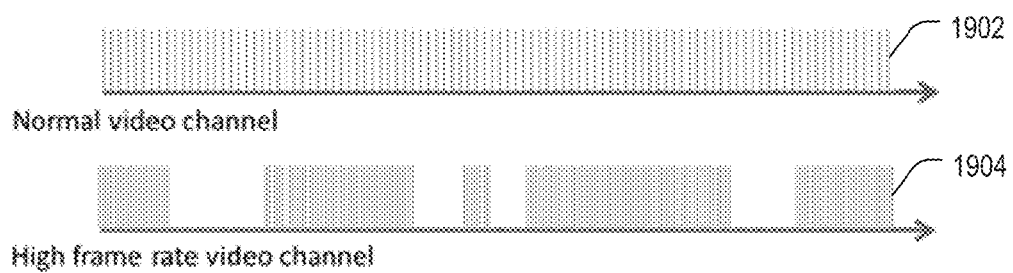
FIG. 19 is an illustration of a particular embodiment of asymmetrical frame rate data of a head-mountable camera apparatus.

When the two cameras of a dual-camera NANDeye implementation are not used for stereo imaging, one of the two cameras may be used to capture short instances of high frame rate segments. For example, the user may want to capture short segments of the scene in a high frame rate. If the camera is limited by channel bandwidth (and not by CCD sample rate) or if the user can provide strong illumination and shorten the CCD shutter time, or if there is enough ambient light for shorter a shutter time—than a more efficient use of the given bandwidth may be to run one camera at a normal frame rate (a normal video channel 1902), and to run the other camera in bursts of high frame rate (a high frame rate video channel 1904), such as illustrated in FIG. 19. Off-line software can then put one or more bookmarks with the constant speed video to indicate instances where the high frame rate channel is available. When the high frame rate channel is selected, the high frame rate channel may be provided to a viewer in slow motion. The two channels 1902, 1904 may appear as seen in the time chart illustrated in FIG. 19. Another reason to change the frame rate may be energy economy. As writing each frame to memory, such as to a flash memory, is power consuming, a reduced frame rate can provide extended battery life. However, because interpreting beacon information may use a high sampling rate of the FOV, when an active beacon is detected, an increased frame rate may be used.

Figure 20:
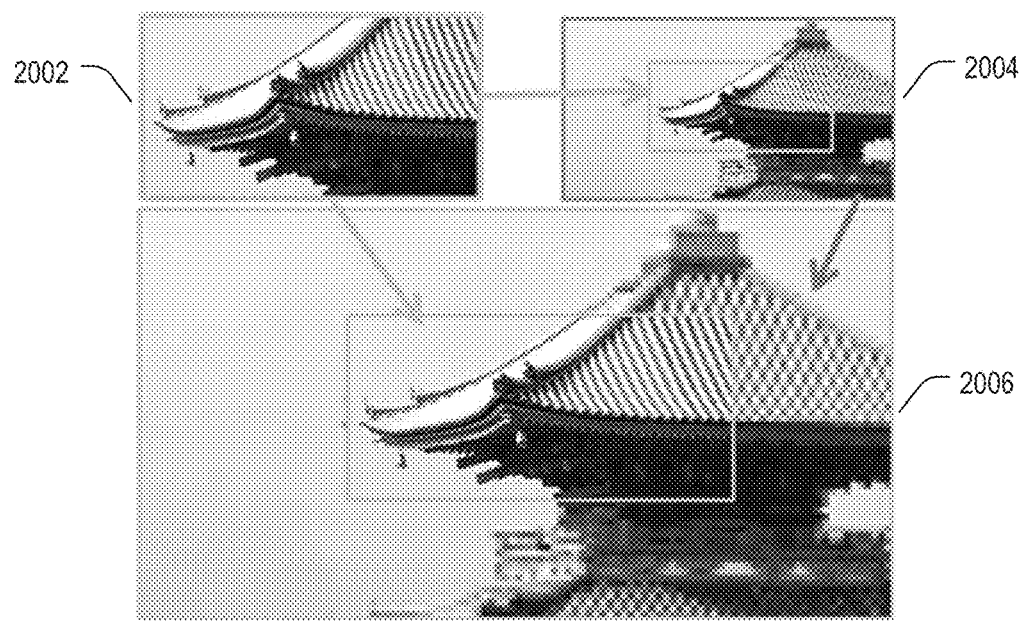
FIG. 20 is an illustration of a particular embodiment of asymmetrical focal length operation of a head-mountable camera apparatus.

Zoom and resolution diversification may be implemented in the NANDeye. Conventional photography may be subject to a trade-off between high resolution and wide field of view. Conventionally, to magnify an interesting part of an image, a field of view is narrowed so that the frame keeps the same number of pixels. NANDeye may enable operation in a mode that provides non-uniform resolution by setting both cameras (in a dual-camera implementation) to the same central field of view, but set one camera to a strong zoom and a narrow field of view (telescopic) 2002, while setting the other camera to a low zoom and a wide field of view (panorama) 2004. Off-line processing can merge both channels into one 2006, enabling a viewer to zoom in and maintain good resolution around the center of the field of view and to zoom out to see a wide field of view, as illustrated in FIG. 20. In some implementations, optical zoom can be changed by insertion of external lens in front of the camera.

Spectral coverage may be varied among NANDeye cameras. In conventional 3D cameras, both cameras have similar charge coupled device (CCD) arrays and cover either the visible light spectrum or the near infrared (IR) spectrum. In NANDeye, one of the cameras is enabled to be narrowly filtered to substantially match the color of a beacon LED. Such filtering may produce an image that enables efficient detection (e.g., with a low signal-to-noise ratio) and demodulation of one or more beacons in the field of view, while also producing a flat (e.g., almost monochromatic) general image of the field of view, usable to determine depth of objects when compared to the other, wide spectrum camera as a stereo pair. An example of two images, one image 2102 narrowly filtered to detect beacon LEDs and the other image 2104 wide spectrum, are illustrated in FIG. 21.

NANDeye may implement one or more forms of user interface. As NANDeye may be worn by a user many hours a day, a user interface by which the user can command NANDeye and change NANDeye parameters of operation may be convenient for use by the user. For example, a user interface may include one or more switches and/or controls on NANDeye headgear 102, a voice interface for a user to give NANDeye voice commands, a visual interface (i.e., via one or more of the NANDeye cameras) for a user to give NANDeye visual commands (e.g., hand gestures in front of the camera), and an interface to allow a user to communicate with NANDeye via the user's phone 106.

Various user interface types ("channels") may be implemented in NANDeye's infrastructure, and application developers may be able to select an appropriate channel for each particular application. FIG. 22 illustrates an example of a table listing basic advantages and possible 'typical' uses of various channels.

NANDeye may further be configured to receive commands via a jaw-movement based interface to provide a nearly-instant and hands-free mechanism to enable the user to control applications on NANDeye while in motion, with occupied hands, or when speech is disallowed or undesired (e.g., concert halls, libraries).

When a person lowers the person's mandible, two jaw bones (called "condyles") move forward slightly under the person's temples, illustrated by the two arrows 2302 in FIG. 23, showing the direction of motion. By moving forward, these bones are slightly, but detectably, widening that part of the person's face. This widening can be felt via two fingers placed under the temples while the jaw is lowered and raised. This area of widening may be located beneath the NANDeye headgear 102 and may spread the NANDeye headgear 102 as the user's face widens beneath the headgear 102. Such widening can be sensed in two places using a very small and inexpensive piezoelectric strain sensor.

As one example, if the hair band is flexible, then this strain can be sensed at the top of the headgear 102, where the stress at the tips of the band causes the bow of the band to increase its radius of curvature. As another example, if the headgear 102 is stiff, then the stress can be detected by a sensor, or even a soft microswitch, right below the temple just in front of an earphone.

A user may easily train to activate such as sensor or switch and to provide commands to NANDeye via the resulting quick, reliable, hands free, silent command interface. Such an interface (a "mandible switch") can deliver a variety of information, such as Left, Right, Down, Up, Left then right, Right then left, Left and right clicks, one or more other patterns or sequences, or any combination thereof.

NANDeye may be configured to distinguish between a "left click" and a "right click" corresponding to a teeth clack with a contact microphone. A left clack and a right clack (of a user's teeth) may be detected by using a left cheek contact microphone and a right cheek contact microphones and comparing the amplitude and the time of arrival (TOA) of the clack signals at both microphones.

NANDeye may be configured to help a user find an item in the user's field of view. If the NANDeye processor knows a location (e.g., has stored data representing a location in a 3-dimensional coordinate system) of the item and also the location of the NANDeye (e.g., via GPS) and the direction the user is looking (e.g., via a compass) and the tilt of the users head (e.g., via an inclinometer), the NANDeye can determine an angular gap between the center of the user's field of view and the item. This enables NANDeye to provide the user with simple audial feedback to move the user's head to bring the desired item to the center of his field of view. An example application of such item locating capability may be where the distance between the user and the item is large, and outdoors with unobstructed GPS reception, such as for tourism, military navigation, tracking, homeland security, etc.

Audial feedback may be provided by one or more earphones of the NANDeye. For example, right ear signals may refer to azimuth (left and right) and left ear signals may refer to tile (up and down). Ascending chirps may refer to "Increase" and descending chirps may refer to "decrease". An amplitude of the chirp sound (e.g., loudness) may represent error size (e.g., how far the user's CFOV is from the item). When a user looks head-on at the item, left-ear chirps and right-ear chirps will fade down to silence. An example of such a mechanism is illustrated in FIG. 24.

Figure 24:
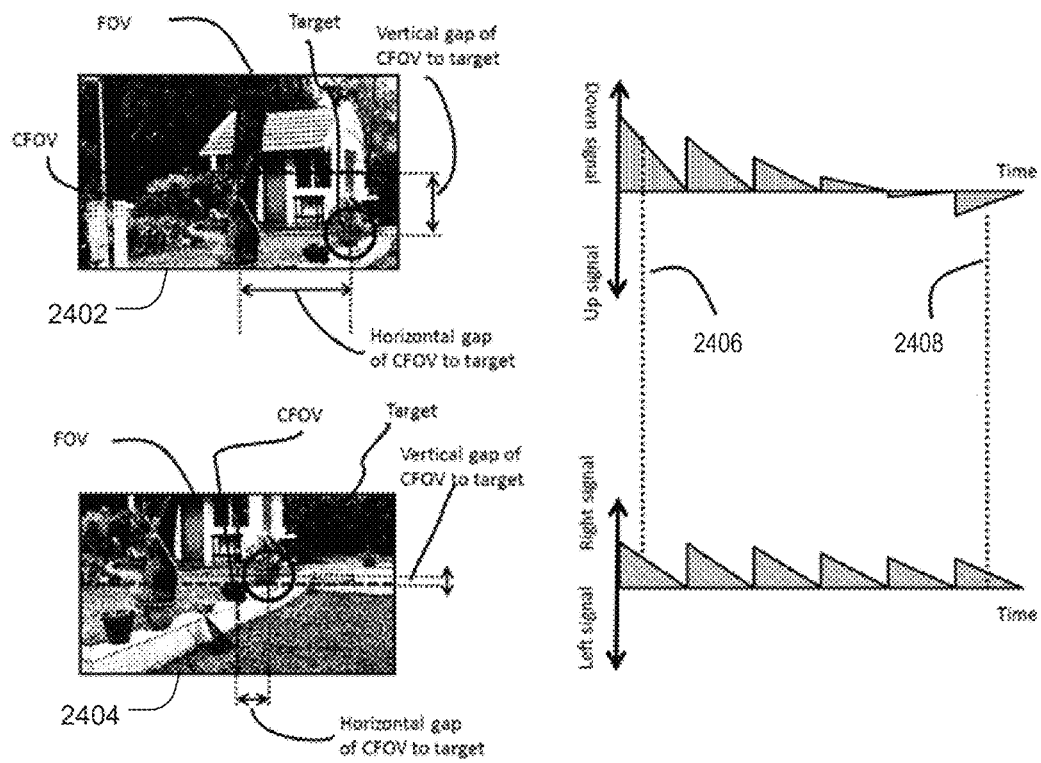
FIG. 24 is an illustration of a particular embodiment of camera image and corresponding audio signals of a target locating operation of a head-mountable camera system.

FIG. 24 illustrates a first FOV 2402 of a NANDeye at a first time 2406 where a target 2410 is offset from a center (CFOV) 2416 of the first FOV 2402 by a first horizontal amount 2412 and a first vertical amount 2414. A first audio signal 2430 (e.g., in the user's left ear) may provide a series of descending chirps indicating that the target 2410 is vertically lower than the CFOV 2416. A second audio signal 2440 (e.g., in the user's right ear) may provide a series of descending chirps indicating that the target 2410 is to the left of the CFOV 2416. In response to the signals 2430 and 2440, the user may shift the FOV 2402 to the right and downward.

As the user shifts the FOV from the first FOV 2402 to a second FOV 2404, the downward chirps of the first audio signal 2430 reduce in amplitude, become silent, and are followed by upward chirps, indicating that at a second time 2408 the target 2410 is above the adjusted CFOV 2420 by a second vertical amount 2424. The downward chirps of the second audio signal 2440 reduce in amplitude, indicating that at the second time 2408 the adjusted CFOV 2420 is to the left of the target 2410 by a second horizontal amount 2422 that is smaller than the first horizontal amount 2412.

Where on-line video processing is practical, indoors and short distance applications may use the laser pointer trace as indication of where the user is looking.

NANDeye may support integrated FOV of multiple cameras. One of the uses of the encoded beacon on NANDeye is to enable users to identify other NANDeyes that are viewed by their own cameras. This may be accomplished while maintaining privacy such that the encoded beacons do not disclose the identity of the user. A social eyewitness network may allow voluntary subscription by users. The social eyewitness network may be implemented so that only a server of that network can relate an encoded beacon with a user can route off-line messages between users. As a result, a user in need of an eyewitness or court evidence, as illustrative examples, may search for recorded video from users that were at the right place, at the right time, looking at the right direction, and logging the event from their point of view.

Figure 25:
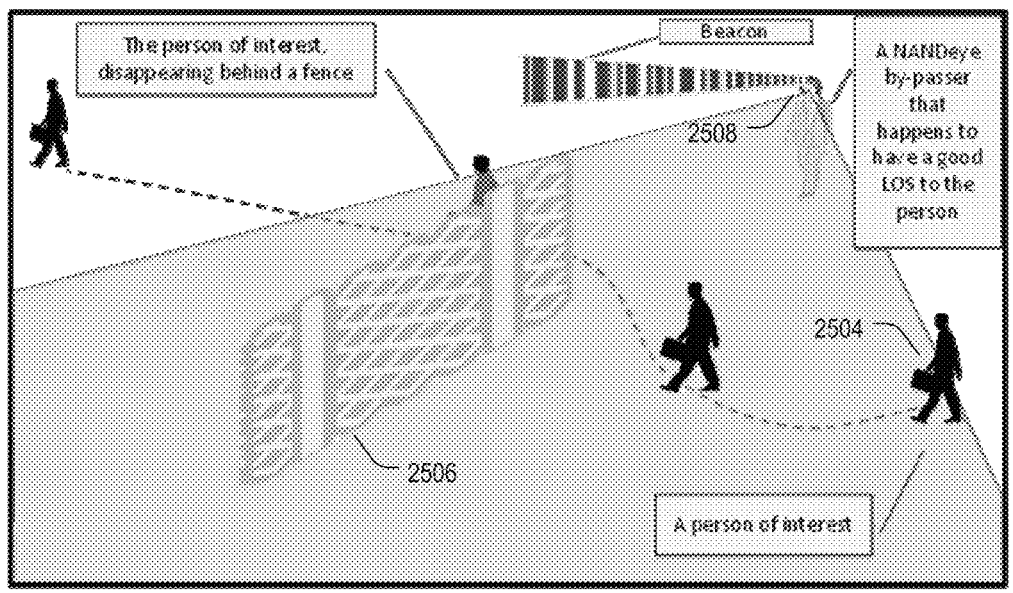
FIG. 25 is an illustration of a particular embodiment of a scenario where a head-mounted camera system having an interrupted line of sight to an object records a second head-mounted camera system having an uninterrupted line of sight to the object.

One of the uses of a social eyewitness network may be to enable a user to access video logs of other users and to use the video logs of the other users as "eye witnesses" in a time and place of interest. FIG. 25 illustrates an example of a situation where a social eyewitness network may be used.

Figure 28:
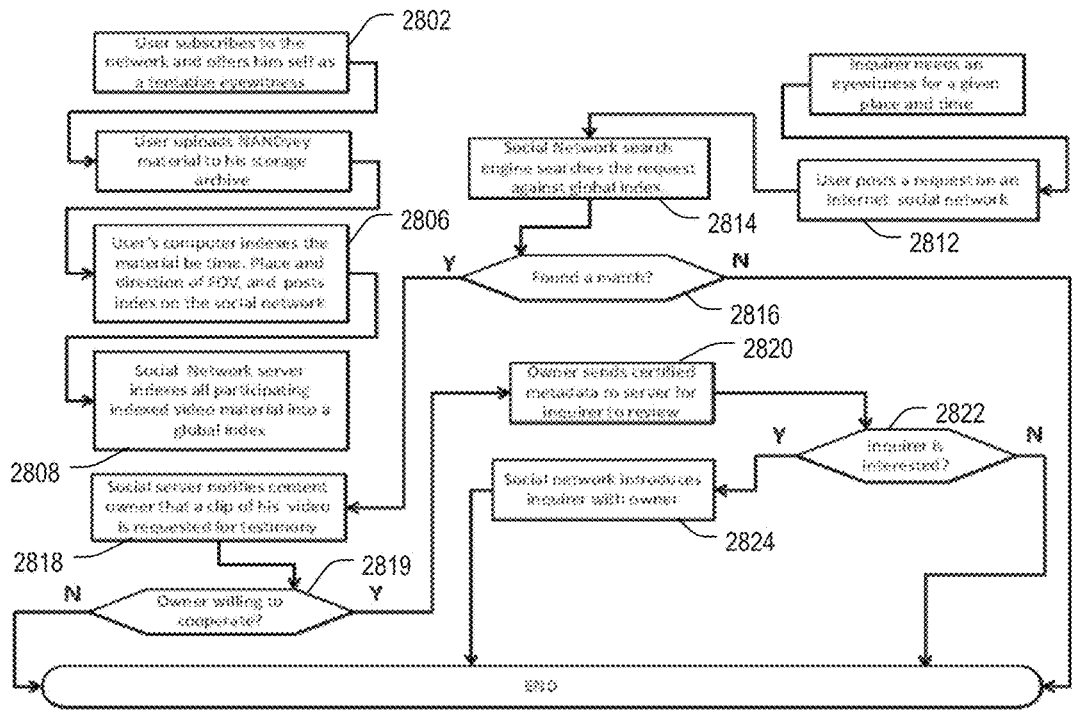
FIG. 28 is an illustration of a particular embodiment of a flow chart of a method of handing a request for video data at a server.

The illustration of FIG. 25 shows the field of view 2502 of a NANDeye user. In looking off-line at a part of the video, the user may notice an interesting, or suspicious, or attractive person that the user earlier saw (and perhaps did not notice). The user wishes to follow the person of interest through the video. Unfortunately, the person of interest 2504 walks around a tall fence 2506 and becomes hidden from the user. The user seeks another NANDeye in the field of view, and finds a second NANDeye user 2508 that the user does not know, but that stood in a position where the second NANDeye user had a line of sight with the person of interest 2504. The server described with respect to the social eyewitness network may enable the user to make contact with the second NANDeye user 2508 and/or to get a relevant piece of video data recorded by the second NANDeye user 2508, in a controlled, automatic process without compromising the privacy (e.g., the name) of either user. This may be performed through a procedure such as illustrated in the flowchart of FIG. 28.

Multiple NANDeyes may be configured to function as nodes in a "social line of sight network" that enables anonymous communication of short text messages between people wearing NANDeye. Such anonymous communications via NANDeye enables people in line of sight from each other to exchange anonymous messages.

As an example, communication between person (a), a University of Texas, Austin student, Bob that may seek to share a ride to Los Angeles (L.A.), and another person (b), another student, Joyce, that would like to visit her family in L.A. may take place as described herein. Bob takes out his phone, calls a SVMS (short visual messaging system) application, and types: "will share a ride to LA over this weekend". Then Bob may select a "load and transmit" option. Bob's NANDeye encodes this short message into his NANDeye's beacon LED and optically transmits the encoded message.

Joyce's NANDeye detects Bob's message and beeps Joyce with a message such as "you picked up an SVMS message". Joyce pulls out Joyce's phone and sees an indication of a sender of the message and the message itself, such as the screen 2602 depicted in the example of FIG. 26. Joyce may want to go to LA, but may not be impressed by Bob. For example, Joyce may suspect that Bob is too young to be trusted as a driver, and therefore Joyce may not want to ride with Bob. Joyce may also not want to offend Bob. As a result, Joyce can put Joyce's phone back into Joyce's pocket and ignore the message, and nobody is hurt.

Alice is another student in the same campus. Alice's NANDeye may also detect Bob message and beep Alice with a message such as "you got an SVMS message". Alice may pull out her phone and see a similar screen as Joyce viewed. The idea may sound attractive to Alice. Alice may approach the group of students around Bob and casually listen to the group for a while. Then Alice may become convinced that Alice wants to drive to L.A. with Bob. Alice may approach Bob and introduce herself.

Bob may pulls out his phone, call the SVMS application, and select an option to "cancel current message" because Bob's offer may no longer be available.

Clearly, Alice could have sent back to Bob a message via the same channel if she did not want to approach him yet—such as "Can I bring back a small couch?"

Figure 26:
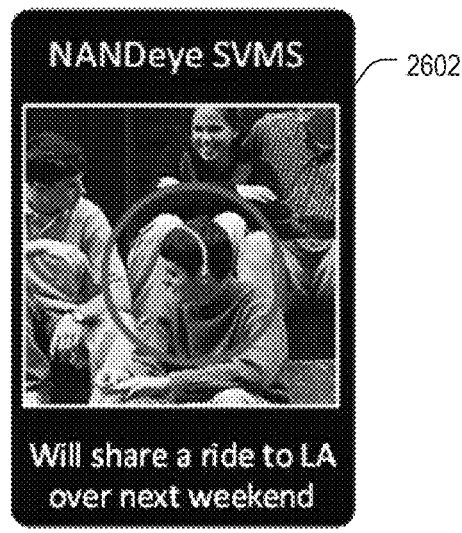
FIG. 26 is an illustration of a particular embodiment of a visual message that may be exchanged via head-mountable camera systems.
Figure 27:
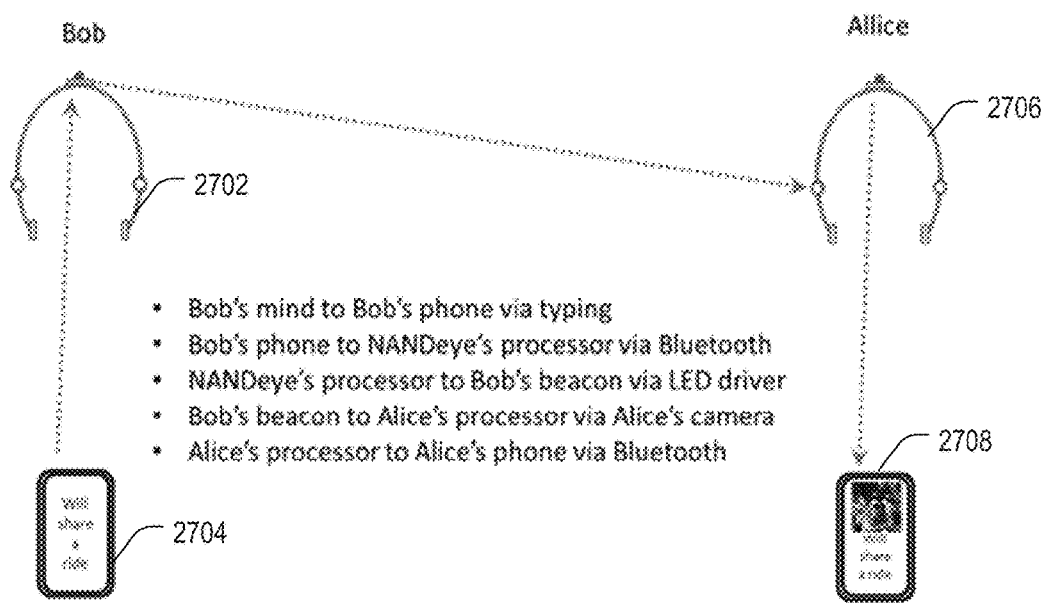
FIG. 27 is an illustration of a particular embodiment of message communication between multiple head-mountable camera systems.

FIG. 27 illustrates and example of how the communication channel described above with respect to Bob, Joyce, and Alice may operate with respect to Bob's headgear 2702, Bob's phone 2704, Allice's headgear 2706, and Allice's phone 2708. Message content may be transferred from Bob's mind to Bob's phone 2704 via typing into a user interface of Bob's phone 2704. Bob's phone 2704 may wirelessly transfer a signal to Bob's headgear 2702 to communicate the message content. The wireless signal may be received via a transceiver in Bob's headgear 2702, decoded by a processor in Bob's headgear 2702, re-encoded as a beacon modulation signal, and transmitted by a LED driver (e.g., of a beacon) of Bob's headgear 2702. The beacon may be detected by a camera of Allice's headgear 2706, demodulated/decoded by a processor of Allice's headgear 2706, and wirelessly sent from Allice's headgear 2706 to Allice's phone 2708. The message content may be displayed on a display of Allice's phone, such as illustrated in FIG. 26.

Another feature of the off-line processing in a NANDeye system may be to extract a very short (e.g., one minute) video recap of the day's activities, referred to as a "My day in one minute" summary. One purpose of such an extract may be to pack main events of a day in a short, manageable, entertaining video clip that can be stored in a calendar, sent to a friend or published over a social network. As an illustrative, non-limiting example, extraction of a 12-hour day into a 1-minute re-cap (e.g., a 720:1 compression) may be performed automatically, manually or interactively. One possible method of creating a summary comprises the following steps:

Segmenting the video log of the day into cuts, by detecting abrupt changes in the video content or in the time line.

Screening the segments according to a predefined set of criteria, such as number of people, length of the segment, quality of the video, presence of bookmarks in the segment etc.

Extracting a core part of every segment according to a predefined set of criteria such as around a specific "core bookmark", instances of zoom in, instances of high frame rate, instances of excited speaking by the user etc.

Prioritizing the extracted segments according to a predefined set of criteria such as the total length of the summary, creating even time distribution along the day, selecting segments that are visually different than others, preferring segments from different places etc.

Combining the selected segments into one video summary with aesthetic transitions between cuts, and adding captions such as time and place for each segments.

FIG. 28 illustrates a flowchart showing actions performed by several interoperating components that may be used in a NANDeye social network. A method may be performed by a server of the social network that includes receiving a subscription request of a user and an offer of the user to be a potential witness, at 2802. The server may receive, from the user's computer, NANDeye material including an index of video data, at 2806. In some embodiments, the server may also receive the video data itself. The NANDeye material may have been indexed by time, place, and direction of FOV by a user's computer after the user uploads the NANDeye material to the user's storage archive (e.g., on the user's computer). Alternatively, the server may index the NANDeye material by time, place, and direction of FOV after receiving the NANDeye material. The server may index all (or a portion) or participating indexed video material into a global index, at 2808.

The server may receive a request from another user, at 2812, such as a post on an internet social network indicating that the other user requests an eyewitness for a particular place and time. The server may search the request against the global index, such as via a search engine, at 2814. The server may make a determination, at 2816, whether the search resulting in a match. When the search results in a match, the server may send a message to a provider or owner of the matching content indicating that at least a portion of the matching content is requested, at 2818. The server may make a determination whether an indication is received that the provider or owner of the matching content is willing to allow use of the portion of the matching content, at 2819.

The server may receive certified metadata from the provider or owner of the matching content, at 2820, and may send a message to the other user to notify the other user that a potential match to the request may be available. In response to receiving an indication from the other user indicating that the other user is interested, at 2822, the server may cause an introduction to be performed of the other user and the provider or owner of the matching content, at 2824.

Figure 29:
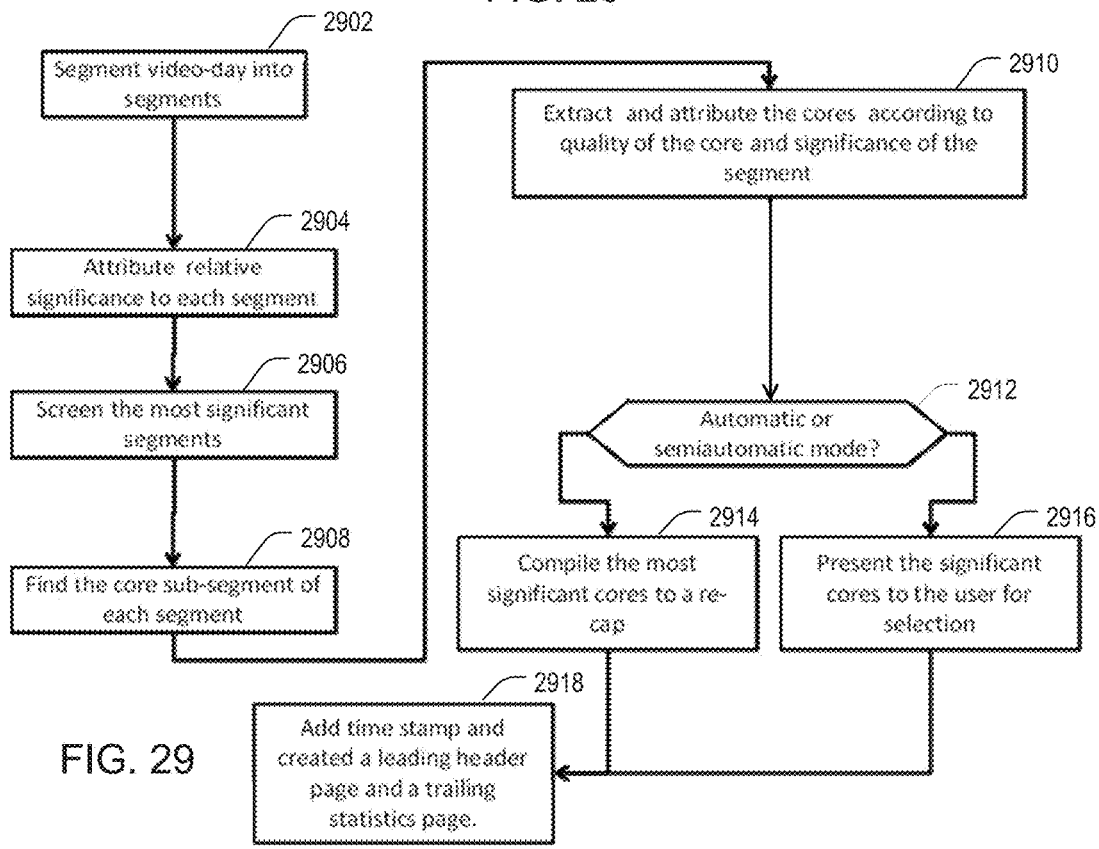
FIG. 29 is an illustration of a particular embodiment of a flow chart of a method of processing recorded video data.

FIG. 29 illustrates a flowchart of an example of a method of automatically generating such a summary. A video-day may be segmented into segments, at 2902. A relative significance may be attributed to each segment, at 2904. A screen may be performed to identify the most significant segments, at 2906. A "core" sub-segment of each of the most significant segments may be determined, at 2908. The cores may be extracted and attributed according to a quality of the cores and significance of the segment, at 2910. A determination may be made whether an automatic mode or semiautomatic mode is selected, at 2912. In response to the automatic mode being selected, the most significant cores may be compiled to a re-cap or summary, at 2914. In response to the semiautomatic mode being selected, the most significant cores may be presented to a user for selection, at 2916. A time stamp, leading header page, and/or trailing statistics page may be added, at 2918.

Off-line video processing can create a statistical summary of the day and present the statistical summary at the end of the video summary, in a graphical way such as similar to marquee presentation of credits at the end of a movie. The statistics of the day can be, for example—

| | |
|---|---|
| Took video for | 9:40 hours |
| Walked on foot | 3.9 Km |
| Drove by car | 23.9 Km |
| Commuted | 28.2 Km |
| Ate | 4 meals |
| Made phone calls | 14 |
| Received phone calls | 9 |
| Read books and magazines | 32 pages |
| Shook hands with | 13 people |
| Kissed cheeks of | 3 females |
| Danced for | 38 minutes |

Figure 30:
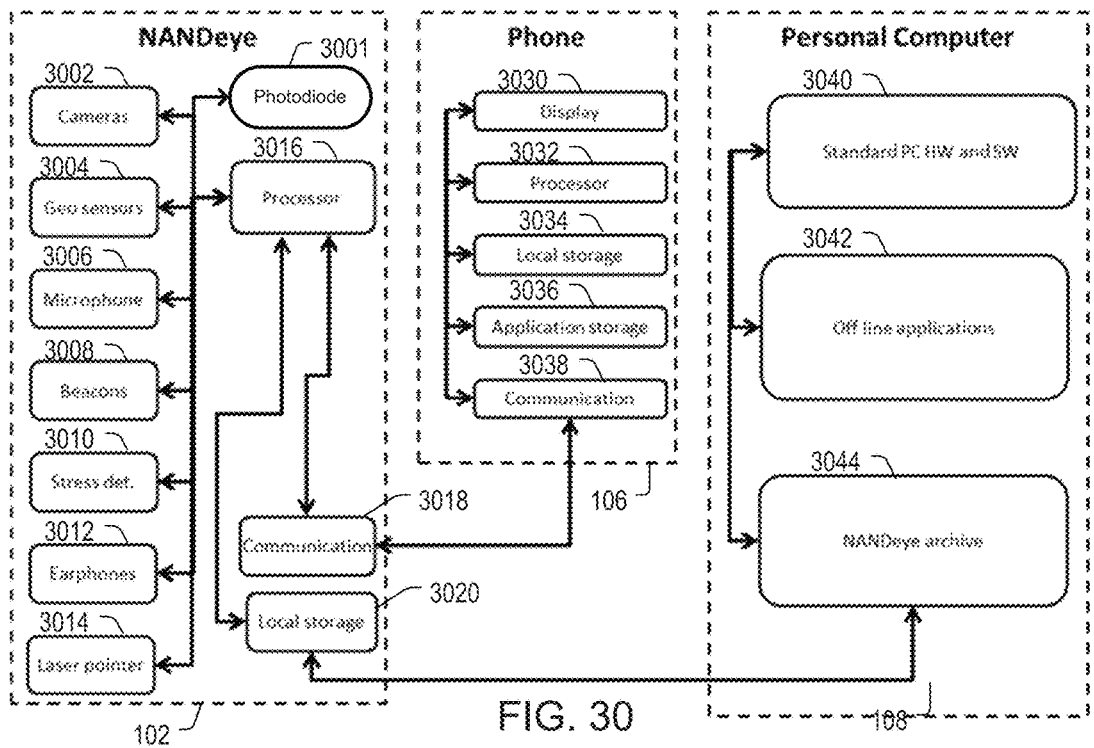
FIG. 30 is an illustration of a particular embodiment of components of a head-mountable camera system.

FIG. 30 illustrates an example of components that may be implemented in NANDeye headgear 102. The NANDeye headgear 102 includes one or more photodiodes 3001, one or more cameras 3002, one or more Geo sensors 3004, one or more microphones 3006, one or more beacons 3008, one or more stress detectors 3010, one or more earphones 3012, and one or more laser pointers 3014. Each of the components 3002-3014 may be coupled to a processor 3016 that is coupled to a communication interface 3018 and to a local storage 3020. An example of the phone 106 includes a display 3030, a processor 3032, a local storage 3034, an application storage 3036, and a communication interface 3038 that may enable wireless communication with the headgear 102 (e.g., via Bluetooth). An example of the computer 108 includes PC hardware and software 3040, off-line NANDeye applications 3042, and a NANDeye archive 3044.

Figure 31:
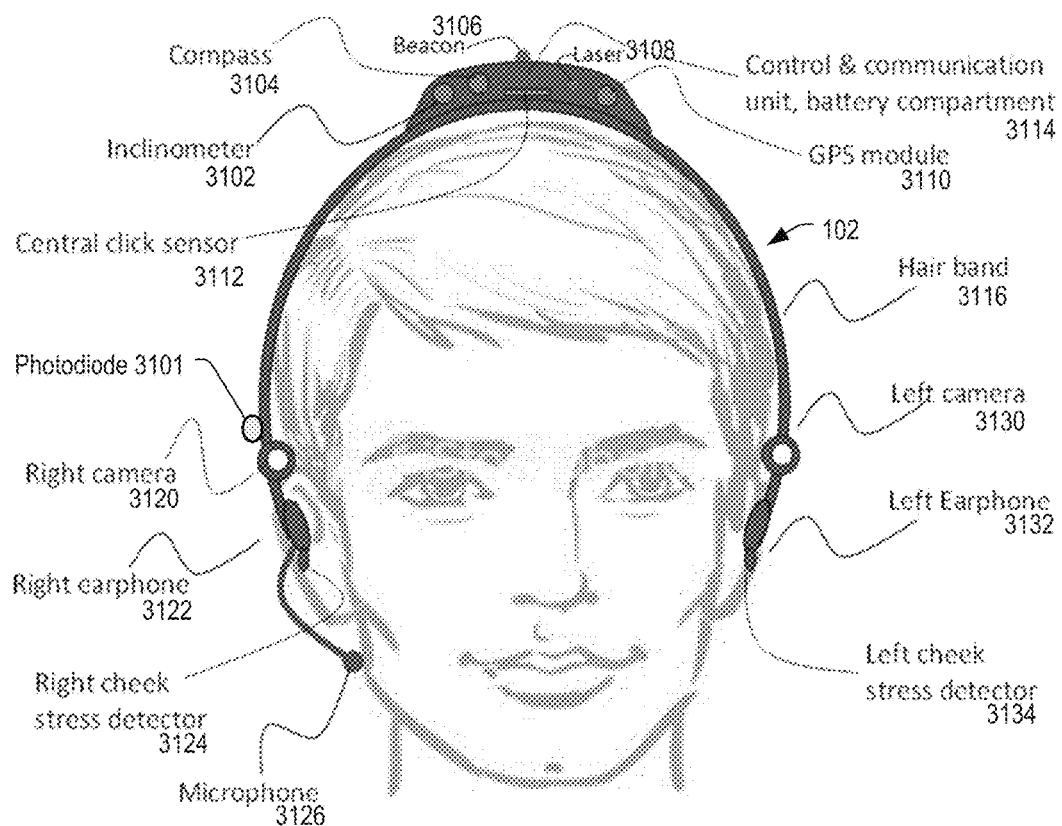
FIG. 31 is an illustration of a particular embodiment of a head-mountable camera apparatus.

FIG. 31 illustrates another example of NANDeye headgear 102. A cockpit includes one or more inclinometers 3102, one or more compasses 3104, one or more beacons 3106, one or more lasers 3108, one or more GPS modules 3110, one or more central click sensors 3112, and one or more control and communication unit and battery compartment 3114 at a top of a hairband 3116. Right-side components include one or more photodiodes 3101, one or more right cameras 3120, one or more right earphones 3122, one or more right cheek stress detectors 3124, and one or more microphones 3126. Left-side components include one or more left cameras 3130, one or more left earphones 3132, and one or more left cheek stress detectors 3134. Although the one or more photodiodes 3101 are illustrated being included in the right-side components, the one or more photodiodes 3101 may be additionally or alternatively be included in the central components and/or in the left-side components. As an illustrative, non-limiting example, the one or more photodiodes 3101 may be positioned on or coupled to the NANDeye headgear 102 at a location near a camera, such as the right camera 3120 and/or the left camera 3130.

Figure 32:
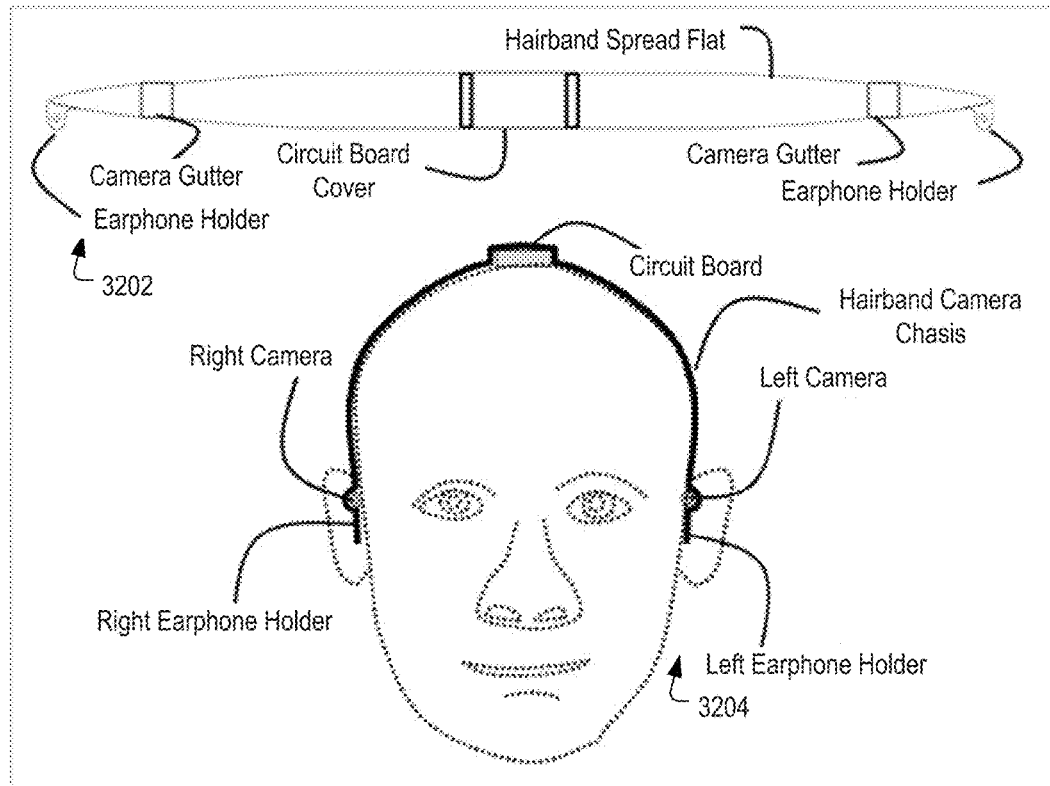
FIG. 32 is an illustration of a particular embodiment of a head-mountable camera apparatus.

FIG. 32 illustrates another example of NANDeye headgear 102 in a top view 3202 and a front view 3204.

FIG. 33 illustrates another example of NANDeye headgear 102 that may be toggled between a stereo mode and an extended field of view mode. A bottom view 3302 of the NANDeye headgear 102 illustrates a stereo mode where left and right cameras are substantially aligned with slight inward pan. A bottom view 3304 of the NANDeye headgear 102 illustrates an extended field of view mode where a twisting applied to a center of the headband (e.g., by turning a top-mounted knob) camera to slightly twist inward and the right camera to slightly twist outward.

Figure 34:
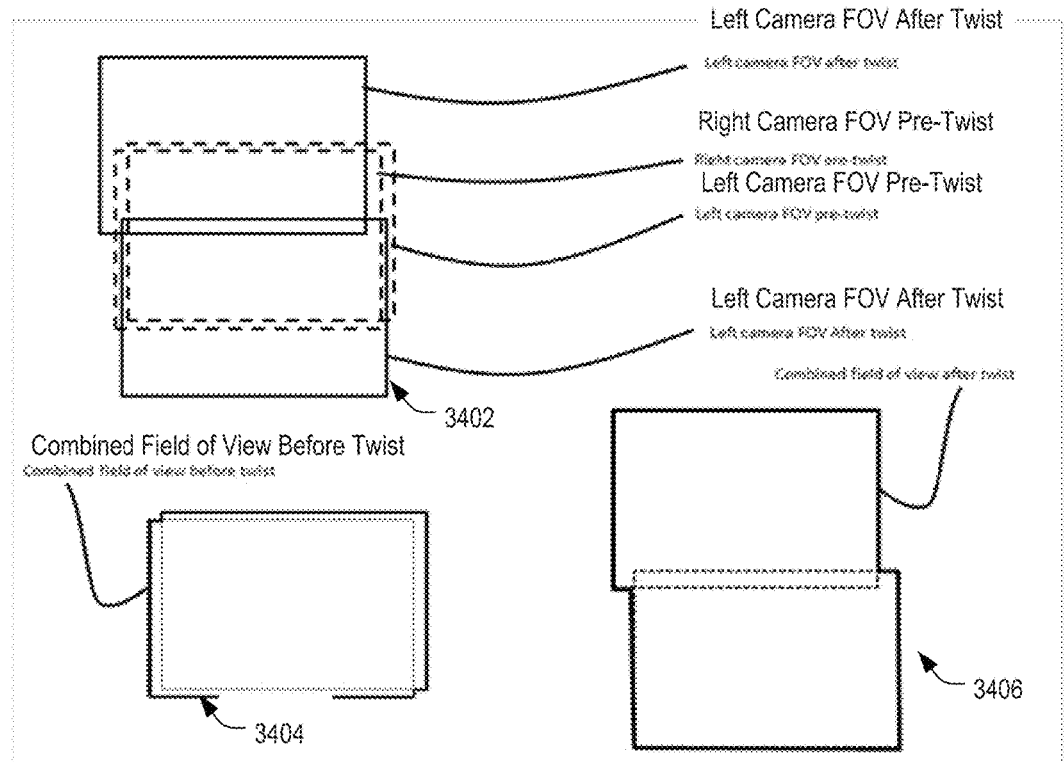
FIG. 34 is an illustration of a particular embodiment of camera image alignment of a stereo mode and an extended vertical field of view mode of a head-mountable camera apparatus.

FIG. 34 illustrates example field of views 3402 of left and right cameras of NANDeye headgear 102, such as the NANDeye headgear 102 of FIG. 17 or FIG. 33, in a 'before twist' stereo mode 3404 (similar to FIG. 15) and in an 'after twist' combined field of view mode 3406 (similar to FIG. 16). The combined field of view is illustrated as a vertically extended field of view.

Figure 35:
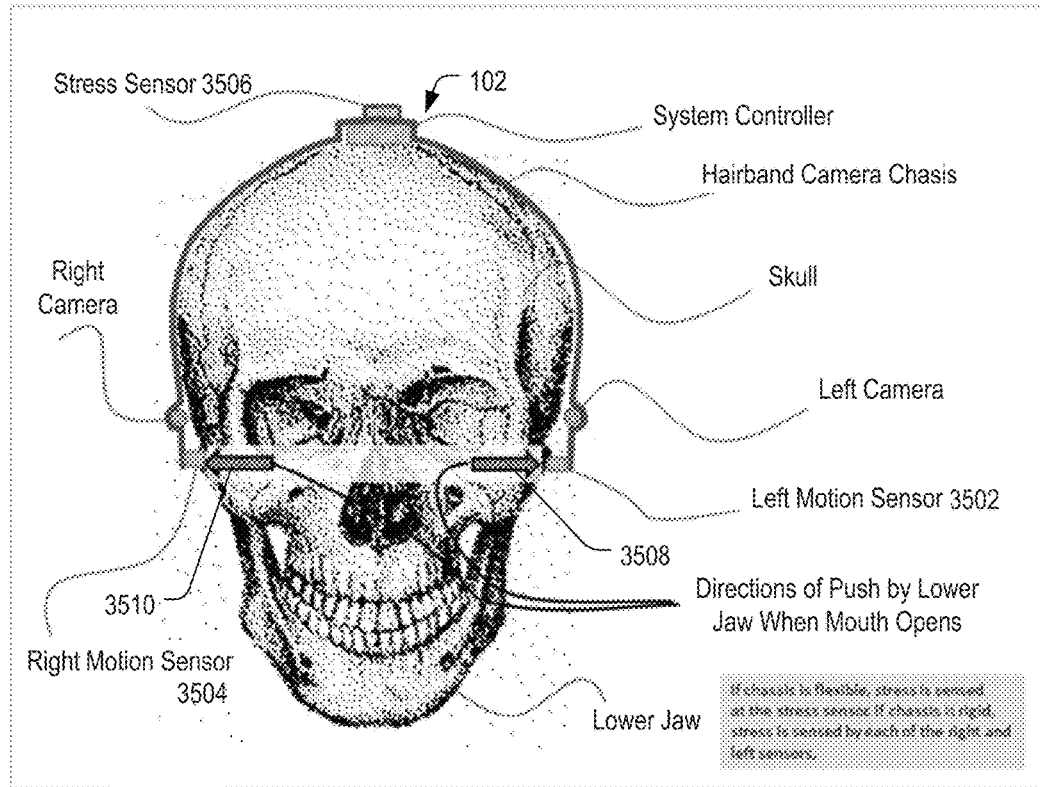
FIG. 35 is an illustration of a particular embodiment of jaw motion detection by a head-mounted camera apparatus.

FIG. 35 illustrates an example of jaw motion detection by NANDeye headgear 102 with left and right motion sensors 3502, 3504 configured to detect motion of the chassis due to movement (indicated by arrows 3508, 3510) caused by motion of the user's jaw. In embodiments where the chassis is relatively flexible, stress experienced by the chassis due to the movement may be detected by the sensors 3502, 3504. In embodiments where the chassis is rigid, stress experienced by the chassis due to the movements may be detected by a central stress sensor 3506, such as a top-mounted stress sensor.

Figure 36:
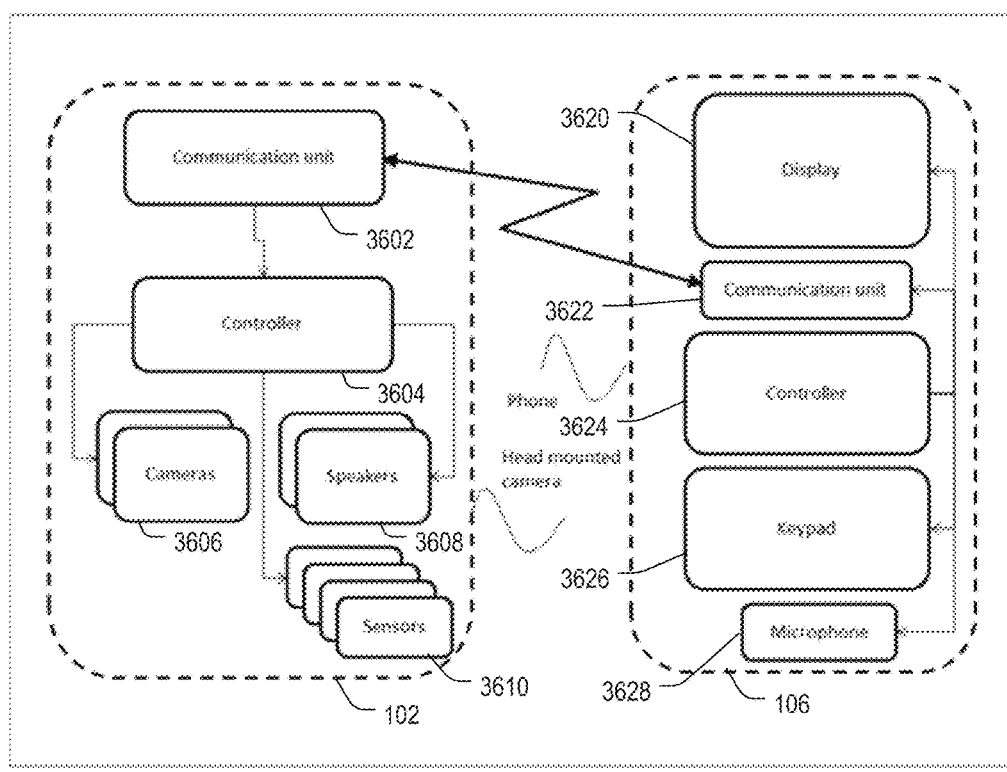
FIG. 36 is an illustration of a particular embodiment of components of a head-mountable camera system.

FIG. 36 illustrates examples of components of a NANDeye headgear 102 and an electronic device such as a mobile phone 106. A communication unit 3602 in the NANDeye headgear 102, such as a Bluetooth transceiver/interface, may enable communication with a communication unit 3622 in the electronic device 106 via wireless signaling. The headgear 102 may also include a controller 3604 coupled to the communication unit 3602 and also coupled to one or more cameras 3606, one or more speakers 3608, and one or more sensors 3610 (e.g., a photodiode). The phone 106 may also include a display 3602, a controller 3624, a keypad 3626, and a microphone 3628.

Figure 37:
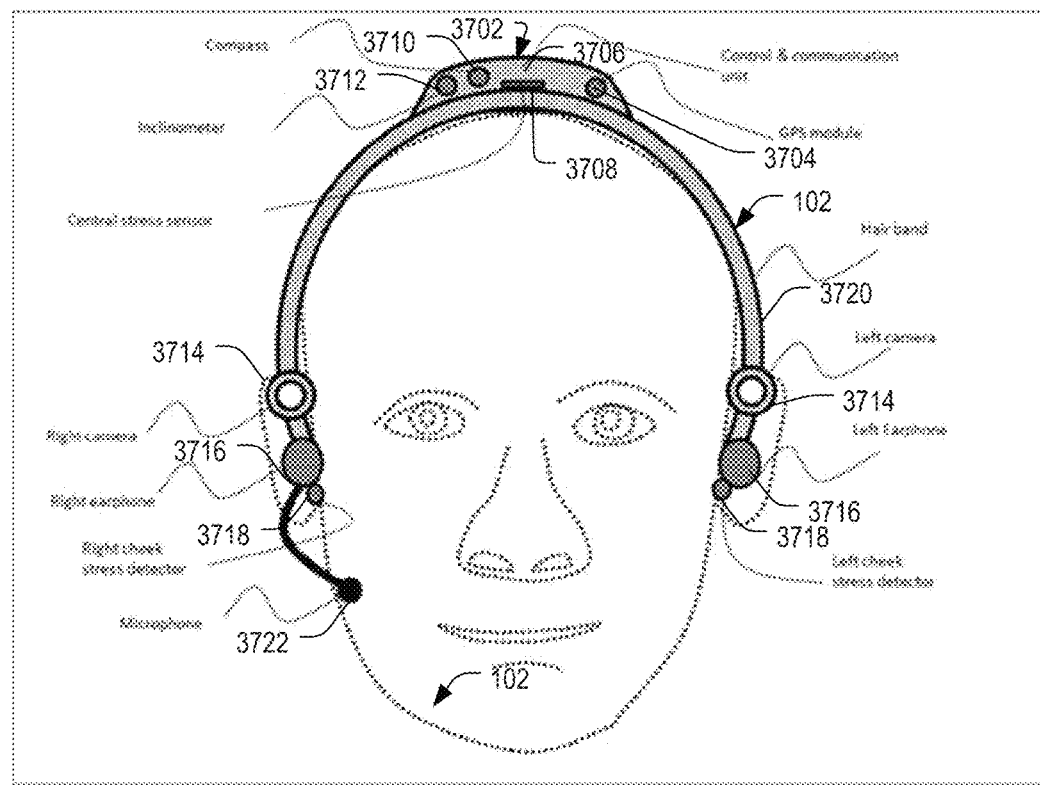
FIG. 37 is an illustration of a particular embodiment of a head-mountable camera apparatus.

FIG. 37 illustrates an example of a NANDeye headgear 102 that includes a cockpit 3702 with a GPS module 3704, a control and communication unit 3706, a central stress sensor 3708, a compass 3710, and an inclinometer 3712. The NANDeye headgear 102 includes a camera 3714, earphone 3716, and cheek stress detector 3718 on each of the right side and the left side of the hair band 3720. The NANDeye headgear 102 includes at least one microphone 3722, such as a microphone illustrated as attached to the right side of the hair band 3720.

Figure 38:
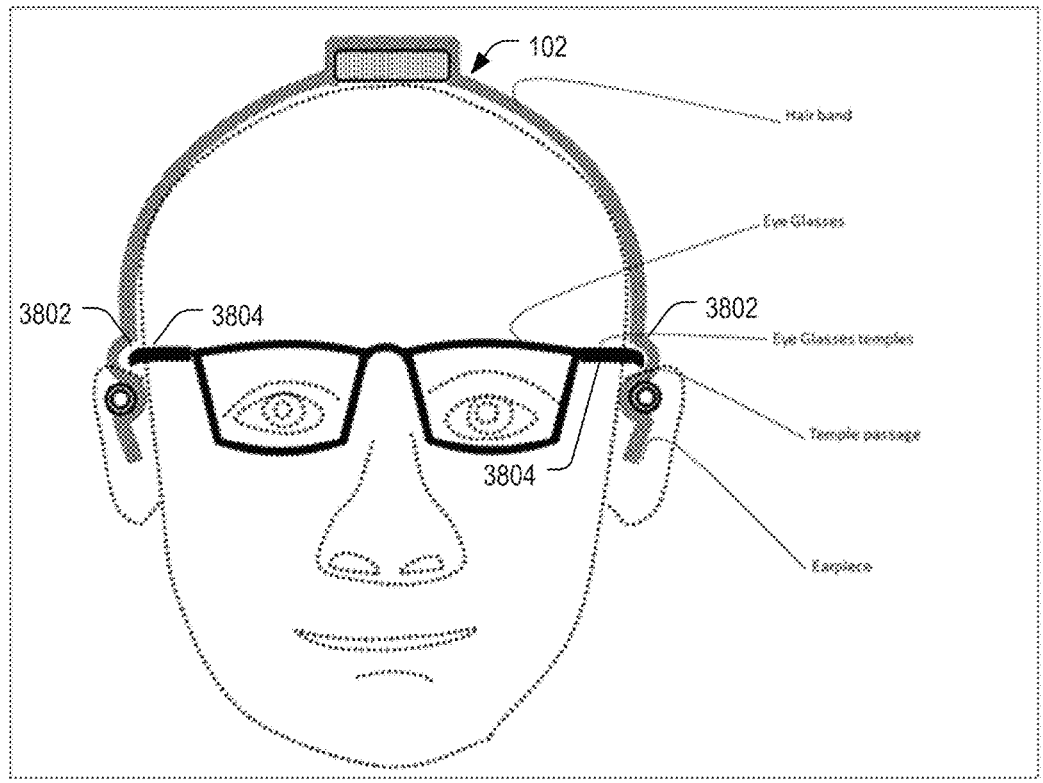
FIG. 38 is an illustration of a particular embodiment of a head-mountable camera apparatus.

FIG. 38 illustrates an example of a NANDeye headgear 102 with concave passages 3802 in proximity to temples 3804 of eyeglasses worn by the user. In some embodiments, the concave passages 3802 are configured to allow passage of the eyeglass temples 3804. In other embodiments, the concave passages 3802 are configured to support and stabilize the hair band on the eyeglass temples 3804.

Figure 39:
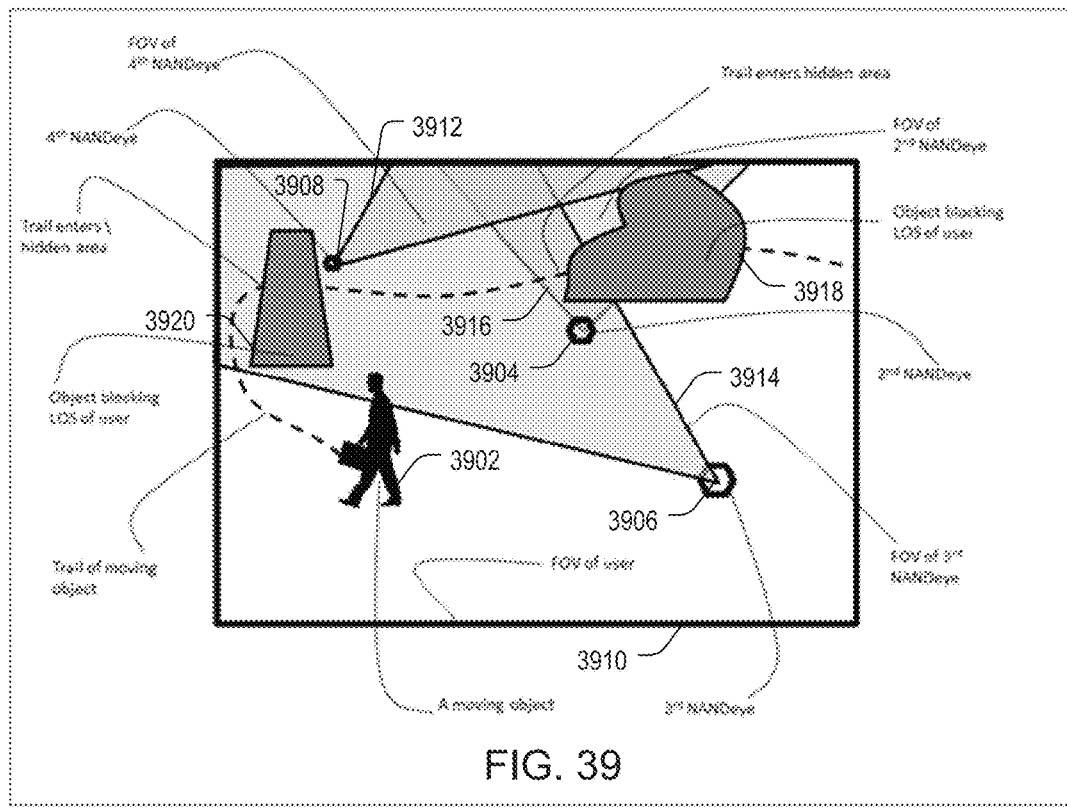
FIG. 39 is an illustration of a particular embodiment of a scenario where a head-mounted camera system having an interrupted line of sight to an object records another head-mounted camera system having an uninterrupted line of sight to the object.

FIG. 39 illustrates a scenario where a NANDeye headgear 102 having an interrupted line of sight to a moving object 3902 (e.g., a person) when the moving object 3902 enters an area hidden by an object blocking the line of sight ("LOS") of the user. The NANDeye headgear 102 or off-line processing of the video data may detect a second, third, and fourth NANDeye 3904, 3906, and 3908, respectively in the FOV 3910 of the user, and may determine a corresponding FOV 3912 of the fourth NANDeye, a FOV 3914 of the third NANDeye, and a FOV 3916 of the second NANDeye. The NANDeye headgear 102 or the off-line processing may determine that the FOV 3916 of the second NANDeye 3904 may have a line of sight to the moving object 3902 when the moving object 3902 is blocked from the user's line of sight by a first object 3918 and that the third NANDeye 3906 may have a line of sight to the moving object 3902 when the moving object 3902 is hidden from the user's FOV 3910 by a second object 3920. The user may request to retrieve video data recorded by the fourth and third NANDeyes, such as described with respect to FIG. 28.

Figure 40:
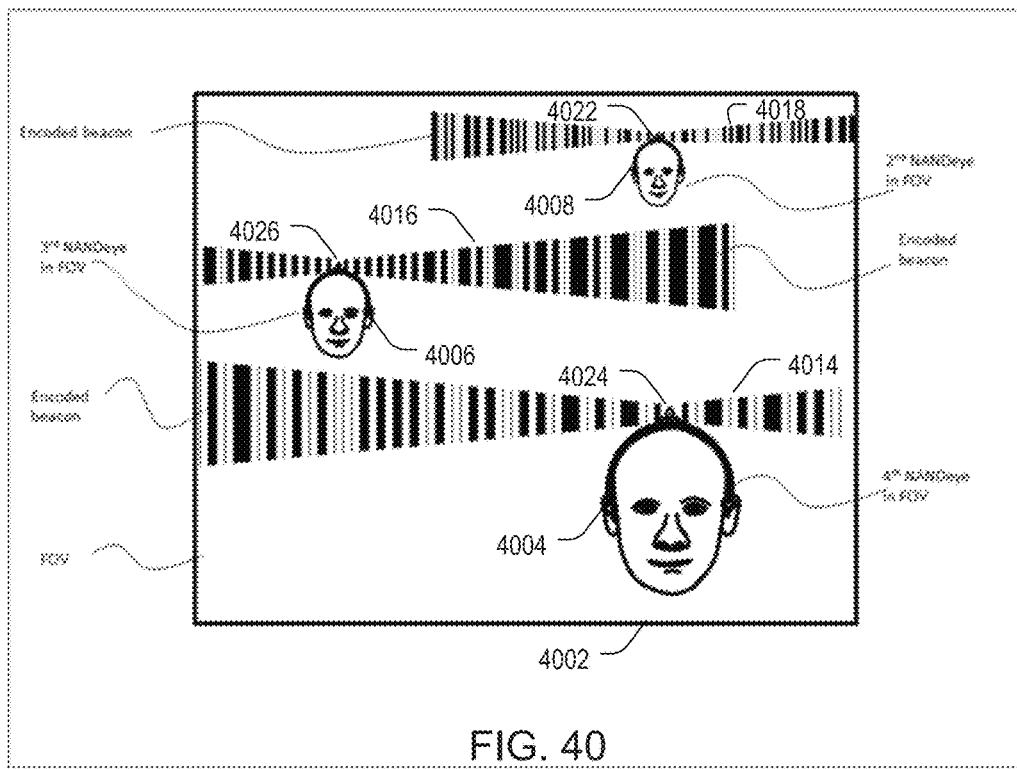
FIG. 40 is an illustration of a particular embodiment of multiple head-mountable camera devices in a field of view of a head-mountable camera apparatus.
Figure 41:
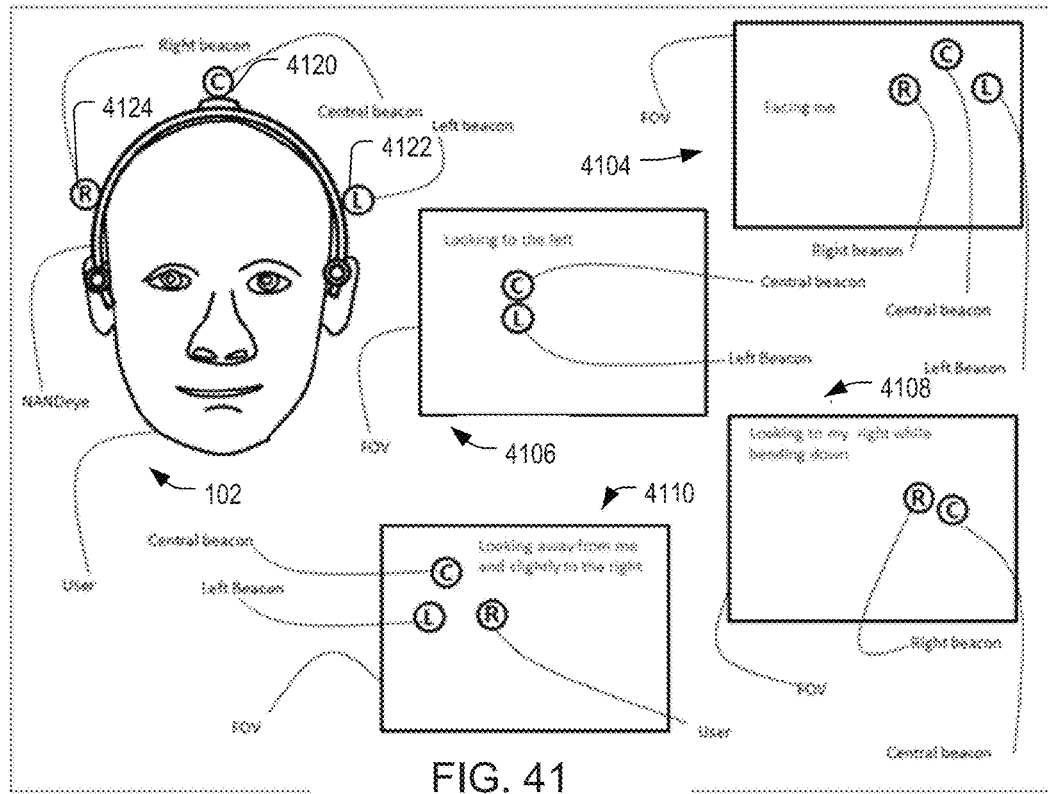
FIG. 41 is an illustration of a particular embodiment of a head-mountable camera device with multiple beacons and relative positions of the beacons in various orientations of the head-mountable camera device.

FIG. 40 illustrates an example of a field of view 4002 of a NANDeye where multiple other NANDeyes 4004, 4006, 4008 are emitting beacons 4014, 4016, 4018 via beacon emitters 4024, 4026, 4028. One or more of the beacon signals may be encoded, such as via amplitude modulation, color modulation, some other form of modulation, or any combination thereof FIG. 41 illustrates NANDeye headgear 102 including a central beacon 4120, a left beacon 4122, and a right beacon 4124. Relative positions of the beacons may enable an observer to estimate an orientation and/or FOV of the NANDeye headgear 102. A first example 4104 illustrates relative positions of the left (L), center (C), and right (R) beacons in an observer's FOV (e.g., another NANDeye user) when the wearer of the NANDeye headgear 102 is facing the observer. A second example 4106 illustrates relative positions of the C and L beacons (the R beacon being hidden) when the wearer of the NANDeye headgear 102 is looking to the observer's left. A third example 4108 illustrates relative positions of the C and R beacons (the L beacon being hidden) when the wearer of the NANDeye headgear 102 is looking to the observer's right and bending down. A fourth example 4110 illustrates relative positions of the L, C and R beacons when the wearer of the NANDeye headgear 102 is looking away from the observer and slightly to the observer's right.

Although FIG. 41 illustrates three beacon emitters (L, R, and C), in other embodiments, fewer than three beacons or more than three beacons may be used. For example, two beacons are sufficient for quarters. Further, although all beacons may be encoded (i.e., emitted beacons signals are modulated to transmit data), in some embodiments fewer than all beacons may be encoded.

Figure 42:
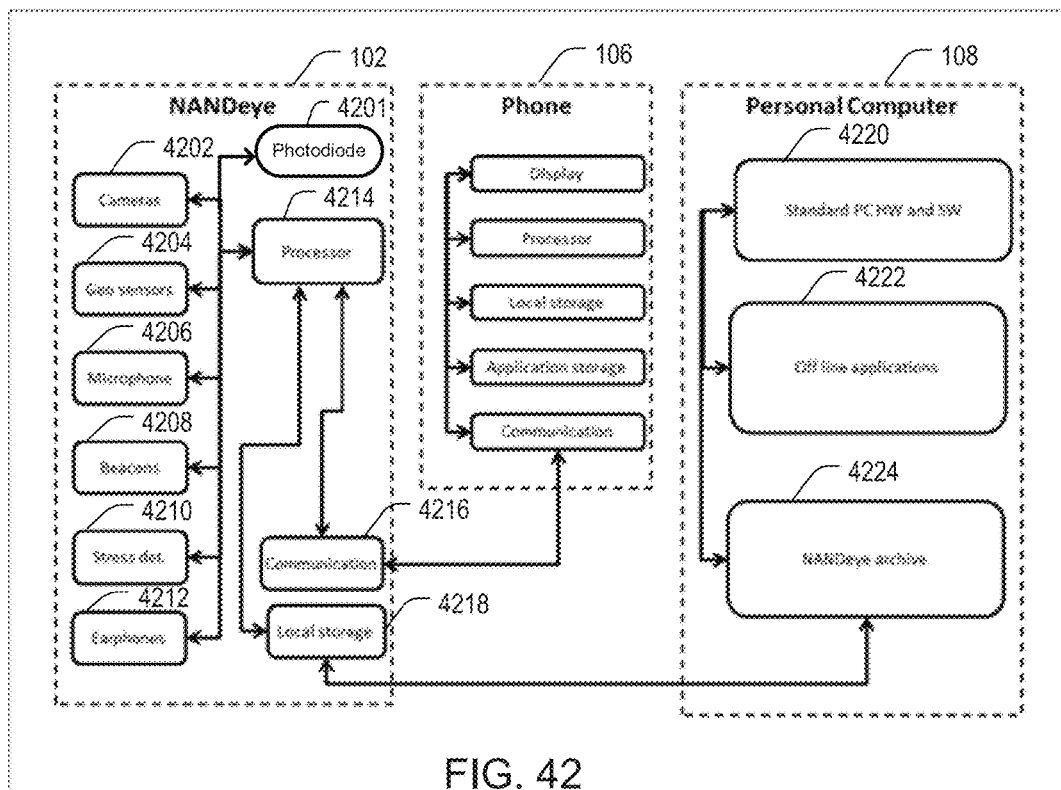
FIG. 42 is an illustration of a particular embodiment of components of a head-mountable camera system.

FIG. 42 illustrates an example of components of an example NANDeye system. A NANDeye headgear 102 may include multiple sensors such as photodiodes 4201, geo sensors 4204, microphones 4206, and stress detectors 4210, cameras 4202, and beacons 4208 coupled to a processor 4214. The processor 4214 may be configured to access processor executable instructions in a non-volatile storage medium, such as modules stored in a local storage 4218. The modules may be executable by the processor 4214 to perform various operations and methods. A communication interface 4216 may enable wireless communication with a phone 106. The NANDeye headgear 102 may also communicate with a PC for off-line video processing and archive/data storage at a NANDeye archive 4224. For example, the PC may include standard PC hardware (e.g., one or more hardware processor cores, memory, communication interfaces) 4220 and software (i.e., processor-executable instructions) 4220 that is executable by the processor core(s). The PC may also include one or more NANDeye off-line applications 4222, that may include instructions executable by the PC processor core(s) to perform various operations and methods that may be better suited to the greater processing and data storage capability of the PC as compared to the NANDeye headgear 102 and the phone 106.

Figure 43:
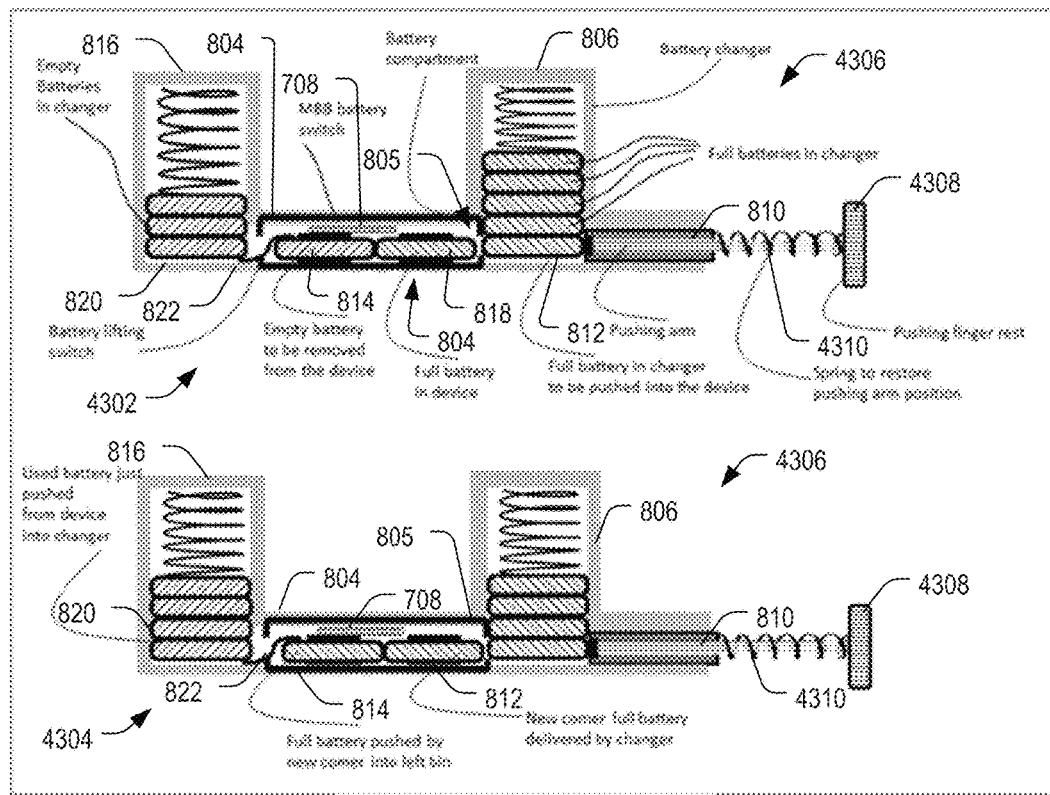
FIG. 43 is an illustration of a particular embodiment of a multi-battery power supply and a battery changer that may be used in conjunction with a head-mountable camera apparatus.

FIG. 43 illustrates another example of a battery changer 4306 similar to the example of FIG. 8. In a first stage of battery replacement 4302, an empty battery and a full battery may be in a battery holder of a device, such as a NANDeye headgear 102. The battery changer, with multiple charged batteries in a first magazine 806 and multiple uncharged batteries in a second magazine 816, is placed in contact with the battery holder housing 804 having the chamber dimensioned to hold multiple batteries. A user may push the pushing finger rest 4308 to cause the pushing arm 810 to feed a next sequential battery from an opening of the first magazine into a first location of the battery holder via the opening 805. The full battery 818 from the first location is pushed to the second location without losing electrical contact due to operation of the make-before-break (MBB) battery switch 708, such as described with respect to FIG. 7. The empty battery 814 is pushed from the second location into the second magazine. The pushing arm position is restored by a spring 4310 after the user releases the pushing finger rest 4308, resulting in a second stage of battery replacement 4304.

Figure 44:
FIG. 44 is an illustration of a multiple embodiments of a graphical feature that may be detectable by a head-mountable camera apparatus as indicating that photography is unallowed.

FIG. 44 illustrates multiple examples 4402, 4404 of a graphical feature that may be detectable by a head-mountable camera apparatus as indicating that photography is unallowed.

Figure 45:
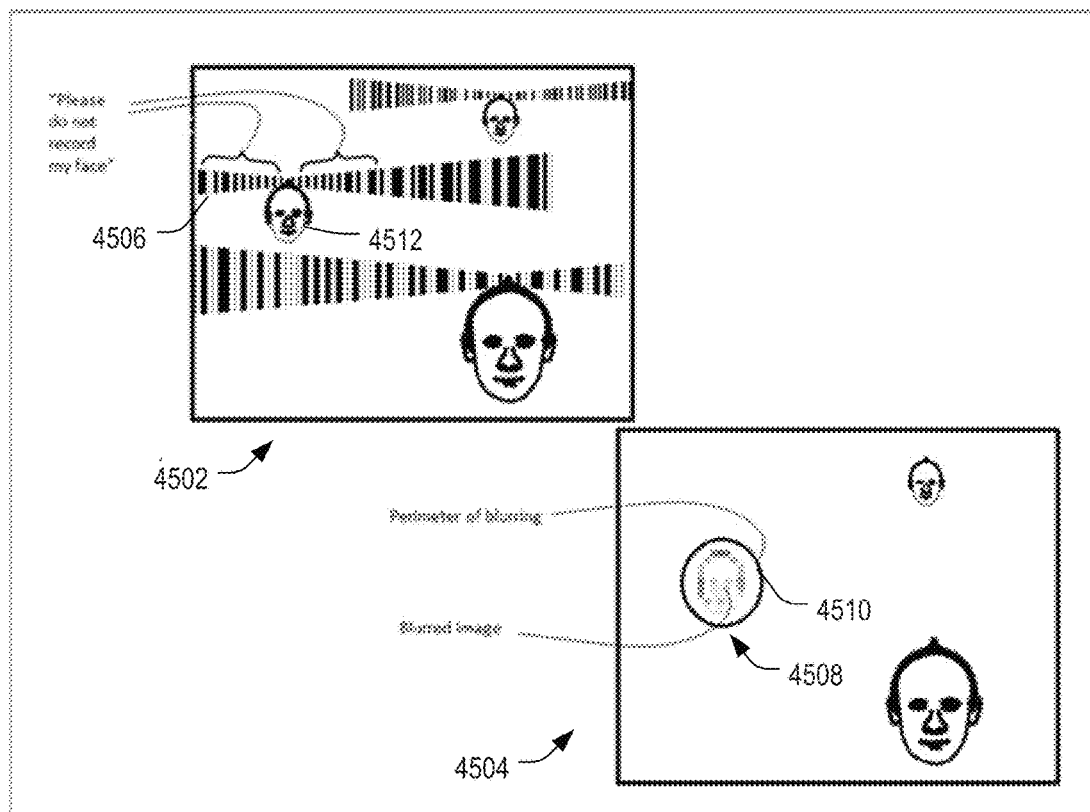
FIG. 45 is an illustration of a particular embodiment of adjusting video data to blur a face of a wearer of a head-mounted camera apparatus that transmits a beacon message.

FIG. 45 illustrates adjusting video data to blur a face of a wearer of a head-mounted camera apparatus that transmits a beacon message. A NANDeye FOV 4502 may include multiple NANDeyes emitting beacons. One of the beacons 4506 is modulated to convey a privacy message, such as "Please do not record my face." The NANDeye may detect the modulated message and may modify video data to create modified video data 4504 with a blurred image 4508 within a perimeter 4510 of blurring in an area around the face 4512 of the user of the NANDeye transmitting the privacy message. Alternatively, the message may be detected during off-line processing and the image may be modified during the off-line processing, such as by the PC of FIG. 42. Although the face 4512 is illustrated as blurred, the blurred portion may correspond to one or more parts of a user's body or the entire user's body.

Figure 46:
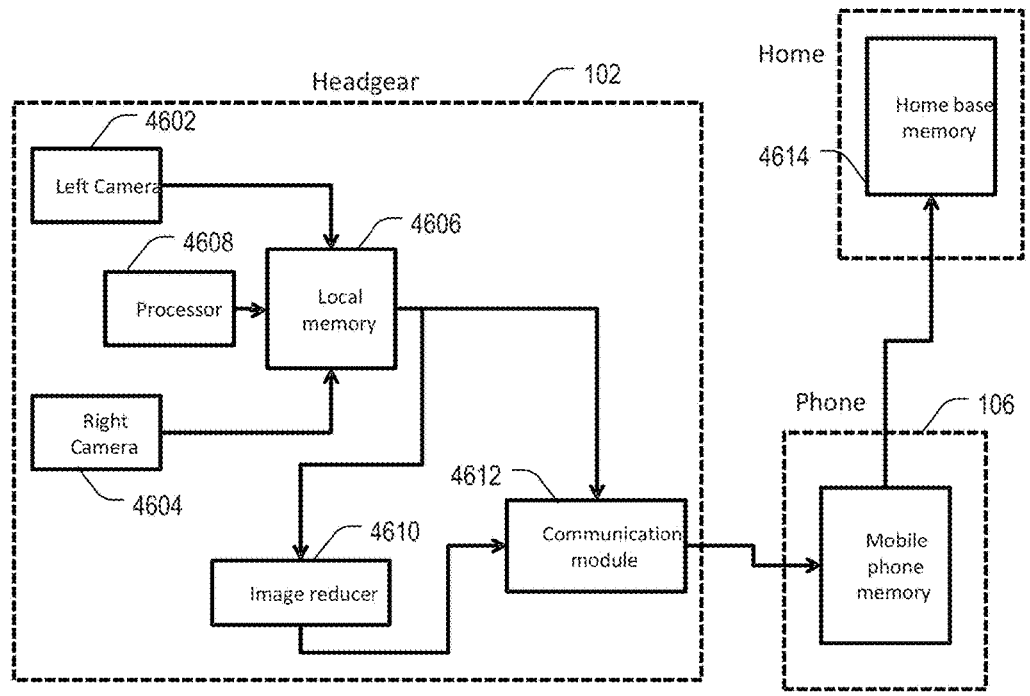
FIG. 46 is an illustration of a particular embodiment of components of a head-mountable camera system.

FIG. 46 illustrates an example of components of a NANDeye system. The NANDeye headgear 102 may include an image reducer 4610, such as to generate lower-quality image or video data to be provided to the phone 106 (e.g., having a reduced size, frame rate, color depth, etc.) while maintaining a higher-quality image or video data to be provided to a home computing or storage system 4614.

Figure 47:
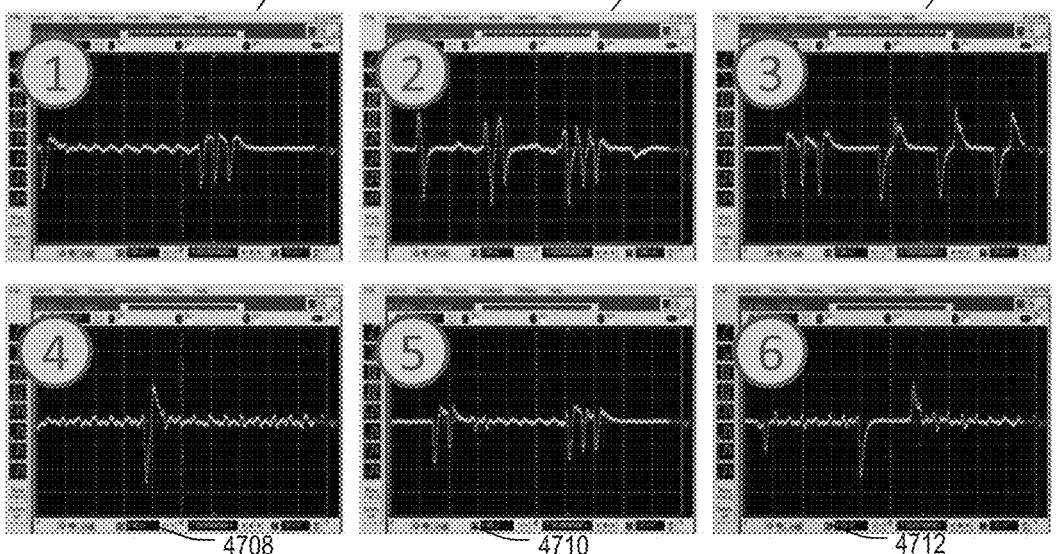
FIG. 47 is an illustration of a particular embodiment of sensor outputs responsive to various jaw motions that may be implemented in a user interface to a head-mountable camera apparatus.

FIG. 47 illustrates examples of sensor outputs responsive to various jaw motions that may be implemented in a user interface to NANDeye headgear 102. The chart, taken from the screen of an oscilloscope connected to the output of the sensor, shows that a deliberate wide mouth opening is distinguished from the natural motion of the jaw during chewing or talking. A first example 4702 illustrates an example of sensor output in response to a mouth opening event ("ope," corresponding to a larger amplitude pulse), followed by chewing gum (repeated smaller amplitude pulses), followed by three mouth opening events ("opes"), followed by talking. A second example 4704 illustrates sensor output corresponding to the sequence: talking, one ope, talking, two opes, talking, three opes, talking. A third example 4706 illustrates sensor output corresponding to the sequence: mouth shut, three opes, mouth shut, three long opes. A fourth example 4708 illustrates sensor output corresponding to the sequence: chewing aggressively, one ope, chewing aggressively. A fifth example 4710 illustrates sensor output corresponding to the sequence: mouth shut, two opes, chewing gum, three opes, mouth shut. A sixth example 4712 illustrates sensor output corresponding to the sequence: one ope, chewing, one very long ope, chewing.

Figure 48:
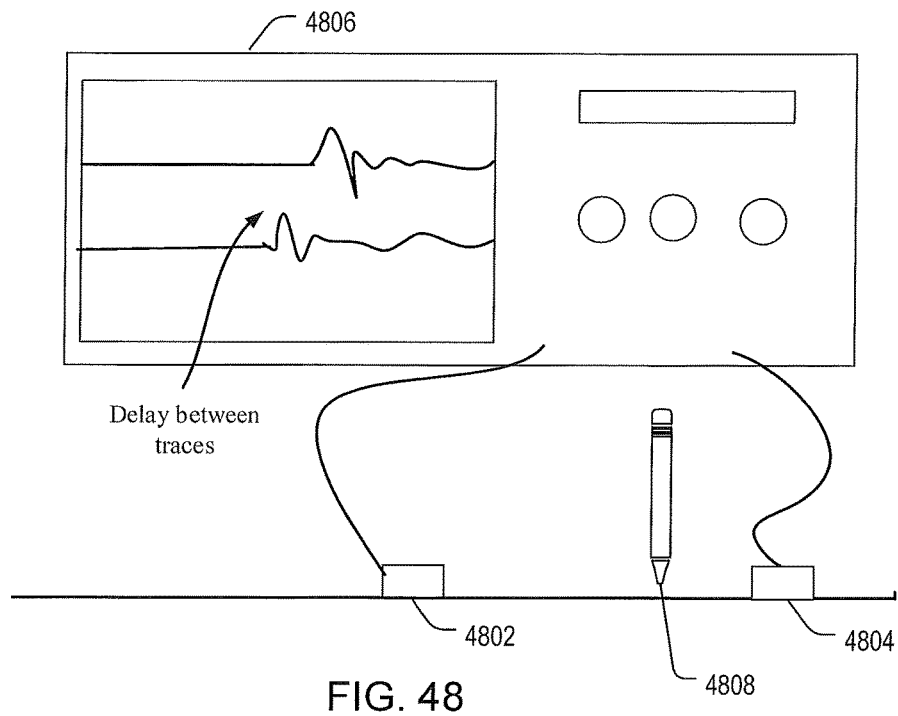
FIG. 48 is an illustration of a particular embodiment of dual sensors positioned to approximate jaw detectors of a head-mountable camera apparatus and showing dual sensor outputs having different delays based on a location of a noise source between the sensors.

FIG. 48 illustrates dual sensors 4802, 4804 positioned to approximate jaw detectors of a NANDeye headgear 102. The oscilloscope display 4806 shows a dual sensor outputs having different delays based on a location of a noise source 4808 (e.g., a dropped pencil) between the sensors. FIG. 48 shows that by measuring delta time of arrival of an audio signal to two sensors, one can reliably determine if the source of the sound is closer to the left sensor, or to the right sensor, or has the same distance from both.

Figure 49:
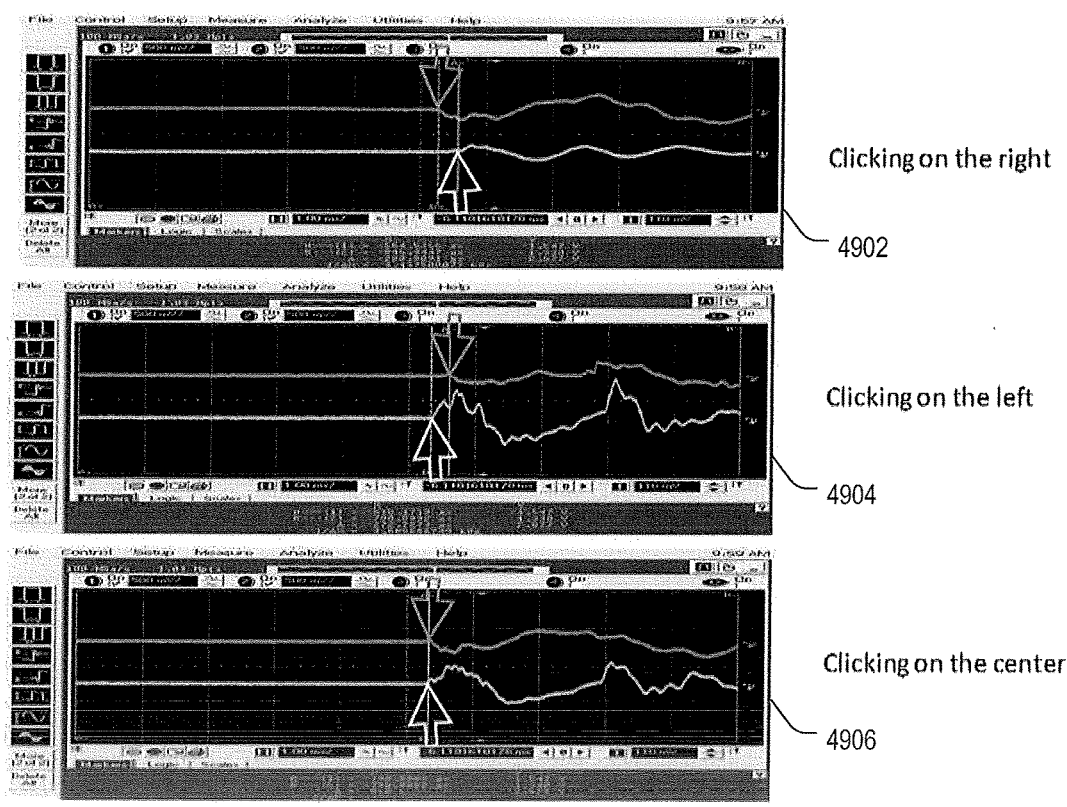
FIG. 49 is an illustration of a particular embodiment of outputs of the sensors of FIG. 48 in response to various locations of a noise source between the sensors.

FIG. 49 illustrates examples of outputs of the sensors (e.g., on the oscilloscope display 4806) of FIG. 48 in response to various locations of a noise source between the sensors. The top output 4902 shows a case where the noise source is closer to the left sensor (top trace) than to the right sensor (bottom trace). The middle output 4904 shows a case where the noise source is closer to the right sensor, and the bottom output 4906 shows a case where the noise source is closer to the right sensor more than to the left sensor.

Figure 50:
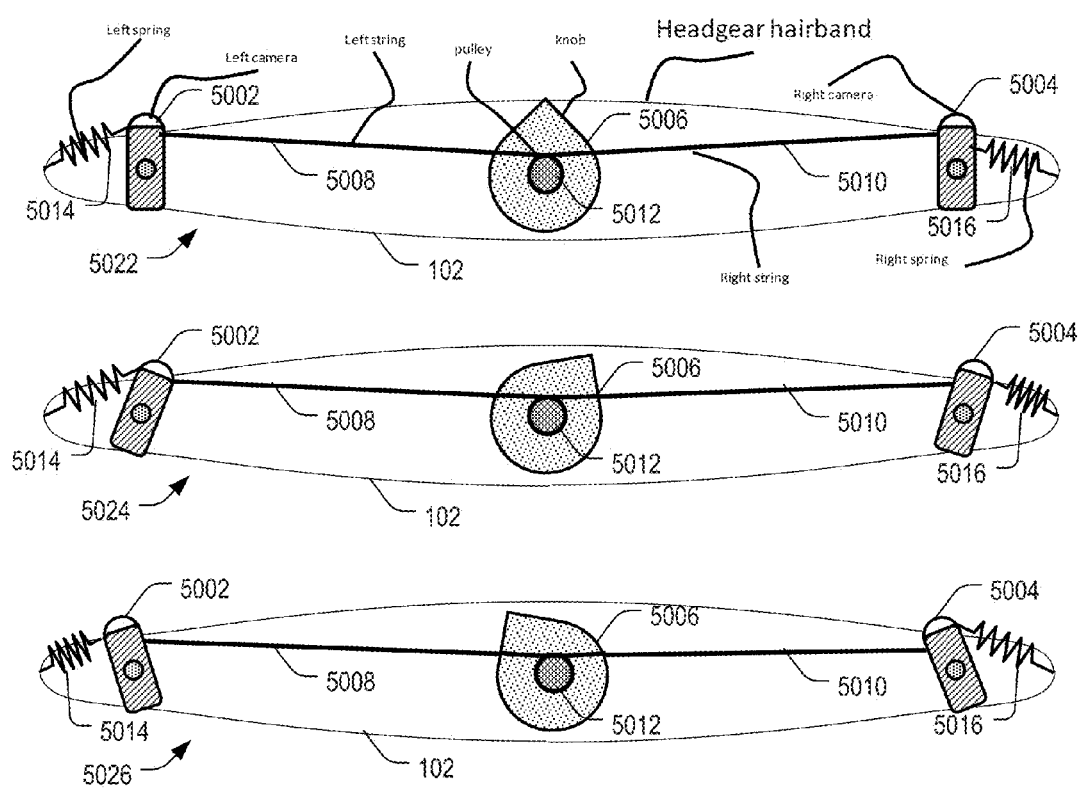
FIG. 50 is an illustration of a particular embodiment of a head-mountable camera apparatus in a stereo mode and in multiple extended field of view modes.

FIG. 50 illustrates examples of multiple modes of a dual-camera NANDeye headgear 102 implementation. For clarity, the headgear 102 is shown in a bottom view with the arch spread out and not bent around the head. A stereo mode 5022 includes a left camera 5002 and a right camera 5004 substantially aligned (e.g., substantially parallel or slightly inwardly turned to converge at a point in front of the user). A knob 5006 on top of the NANDeye headgear 102 is in a center position so that a left string 5008 and right string 5010 coupled to the respective left and right cameras 5002, 5004 and coupled to the knob 5006 (e.g., via a pulley 5012) are substantially equal length. The left string 5008 and a left spring 5014 may provide substantially equal opposing forces to the left camera 5002 to hold the left camera 5002 in the illustrated orientation. The right string 5010 and a right spring 5016 may similarly hold the right camera 5004 in an aligned orientation.

A first extended field of view mode 5024 results from turning the knob 5006 clockwise to lengthen the right string 5010 and shorten the left string 5008. The left camera 5002 is pulled to the right (i.e., panned right, up, or any combination thereof) by the left string 5008. The right camera 5004 is also pulled to the right, down, or any combination thereof, but to a lesser amount, as the right spring 5016 returns to a non-extended state. As a result, the left and right cameras form a combined extended horizontal, vertical, or any combination thereof field of view.

A second extended field of view mode 5026 results from turning the knob 5006 counterclockwise to lengthen the left string 5008 and shorten the right string 5010. The right camera 5004 is pulled to the left (i.e., panned left, down, or any combination thereof) by the right string 5010. The left camera 5002 is also pulled to the left, up, or any combination thereof, but to a lesser amount, as the left spring 5014 returns to a non-extended state. As a result, the left and right cameras form a combined extended horizontal, vertical, or any combination thereof field of view.

Figure 51:
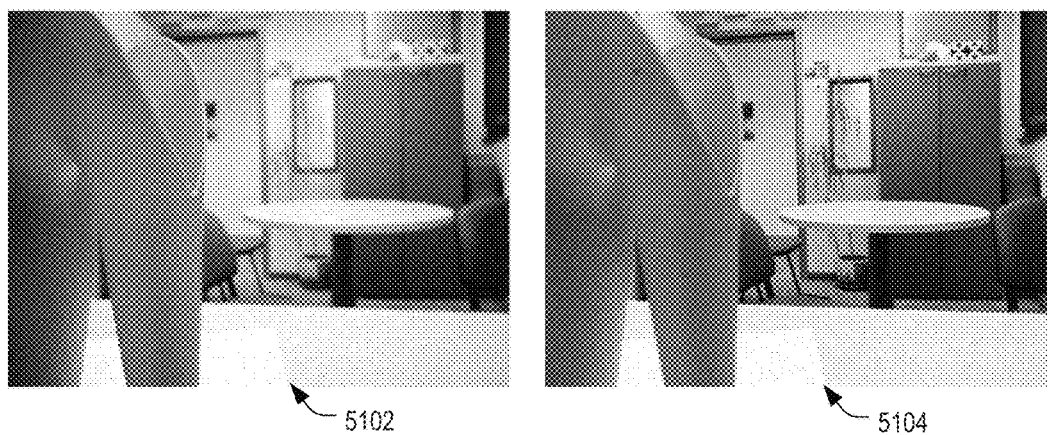
FIG. 51 is an illustration of a particular embodiment of images corresponding to an asymmetrical focal length operation of a head-mountable camera apparatus.

FIG. 51 illustrates an example of images corresponding to an asymmetrical focal length operation of a NANDeye headset. A first image 5102 is a camera image of a NANDeye camera having a short focal length so that nearer objects are in better focus than farther objects, and a second image 5104 is a camera image of another NANDeye camera having a longer focal length so that farther objects are in better focus than nearer objects. The images 5102 and 5104 can be combined to provide a resulting image with non-uniform focus, such as described with respect to FIG. 20.

Figure 52:
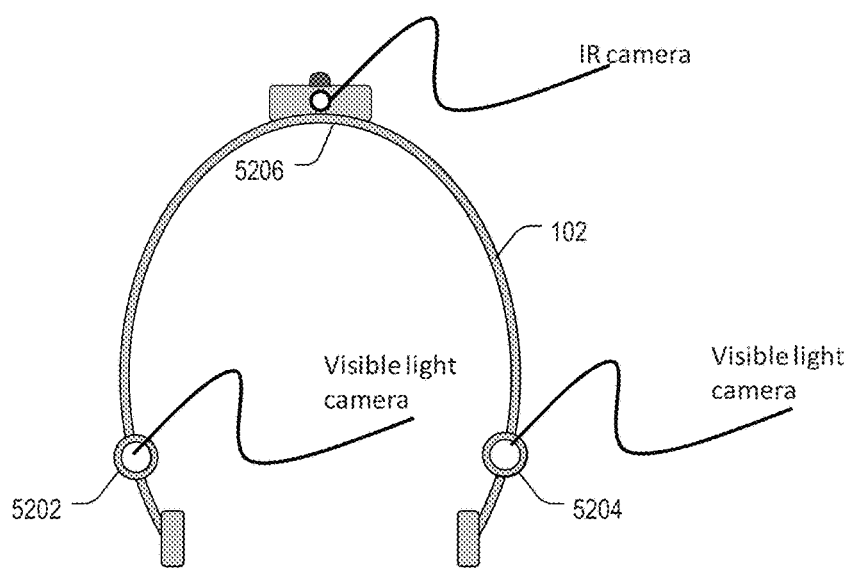
FIG. 52 is an illustration of a particular embodiment of a head-mountable camera apparatus having multiple types of cameras.

FIG. 52 illustrates an example of a NANDeye headgear 102 having multiple types of cameras, including dual visible light cameras 5202, 5204 at substantially a user's eye level and an infrared (IR) camera 5206 positioned to be on top of the user's head.

Figure 53:
FIG. 53 is an illustration of a particular embodiment of a using a laser pointer of a head-mounted camera apparatus.

FIG. 53 illustrates using a patterned laser pointer of a NANDeye headgear 102. The pattern 5302 of the patterned laser pointer may be distinctive and easily detectable in video data. A user may encircle an object of interest with the laser for later processing in the resulting video data.

Figure 54:
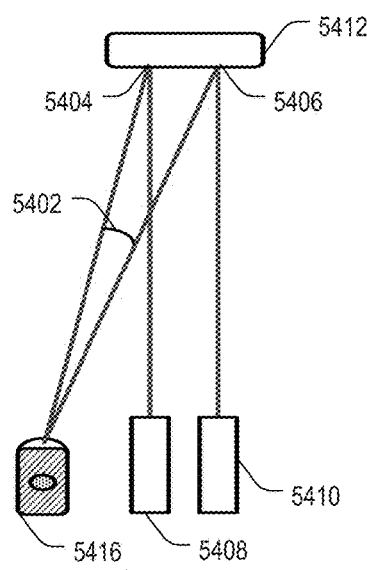
FIG. 54 is an illustration of a particular embodiment of determining distance to an object using multiple laser pointers of a head-mounted camera apparatus and a camera of the head-mounted camera apparatus.
Figure 55:
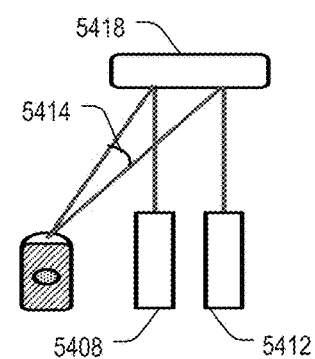
FIG. 55 is an illustration of a particular embodiment of determining distance to an object using multiple laser pointers of a head-mounted camera apparatus and a camera of the head-mounted camera apparatus.

FIG. 54 and FIG. 55 illustrate examples of determining distance to an object using multiple laser pointers of a NANDeye headgear 102 and NANDeye camera, where an angle 5402 between the points of contact 5404, 5406 of the lasers 5408, 5410 with an object 5412 as observed by the NANDeye camera 5416 is larger for a closer object 5412 illustrated in FIG. 54 than the angle 5414 for a farther object 5418 illustrated in FIG. 55.

Figure 56:
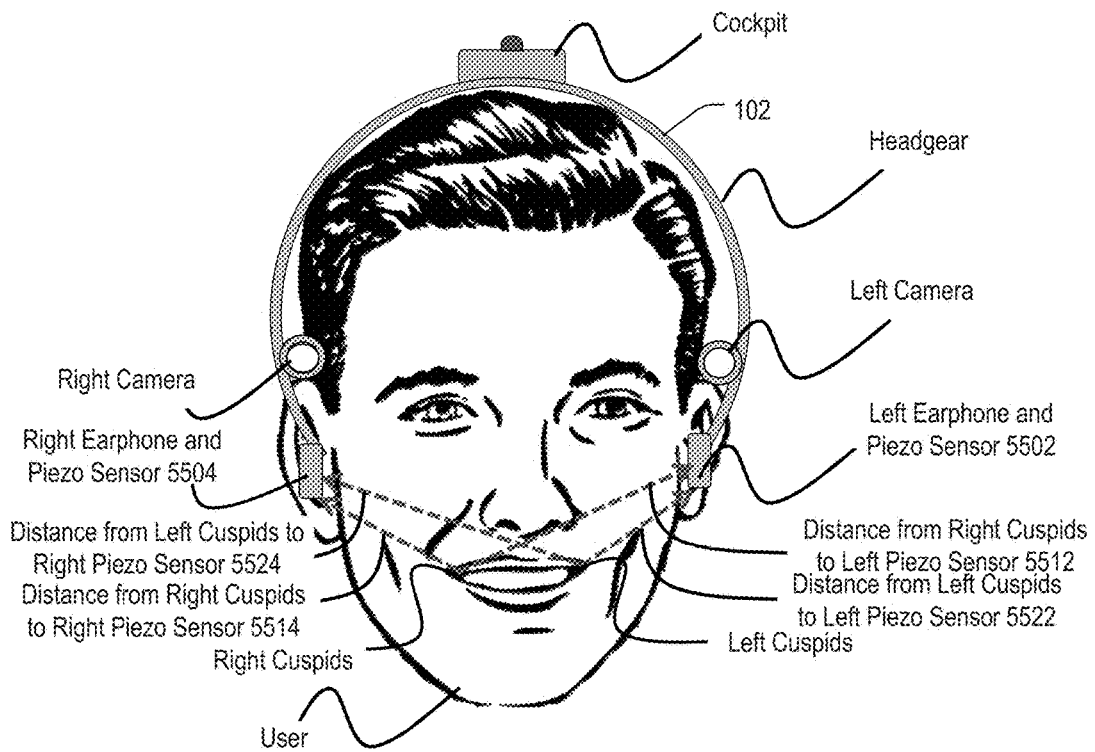
FIG. 56 is an illustration of a particular embodiment of a head-mountable camera apparatus having multiple jaw sensors.

FIG. 56 illustrates a NANDeye headgear 102 having multiple jaw sensors and relevant distances between mouth-based or jaw-based noise sources and each of the jaw sensors to enable detection of left, center, or right mouth-based signals based on signal delay differences, such as described with respect to FIGS. 48-49. The headgear 102 may include a left earphone and left piezo sensor 5502 and a right earphone and right piezo sensor 5504. A noise generated at the right cuspids (e.g., by a clicker in the user's mouth) travels a longer distance 5512 to the left sensor 5502 and a shorter distance 5514 to the right sensor 5504. As a result, the noise will be detected at the right sensor 5504 before being detected at the left sensor 5502 and a location of the noise source can be determined as being on the user's right side. A noise generated at the left cuspids (e.g., by a clicker in the user's mouth) travels a shorter distance 5522 to the left sensor 5502 and a longer distance 5524 to the right sensor 5504. As a result, the noise will be detected at the left sensor 5502 before being detected at the right sensor 5504 and a location of the noise source can be determined as being on the user's left side.

Figure 57:
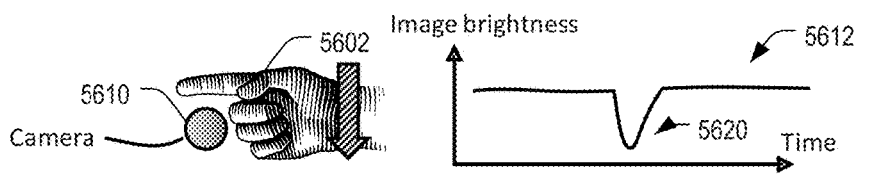
FIG. 57 is an illustration of a particular embodiment of a camera-based user interface that may be implemented by a head-mountable camera apparatus.
Figure 58:
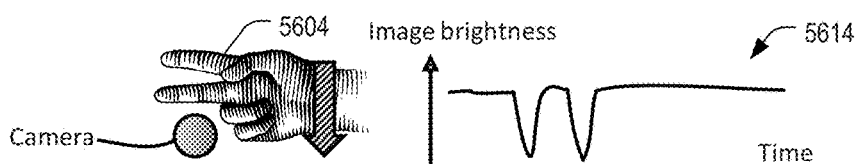
FIG. 58 is an illustration of another particular embodiment of a camera-based user interface that may be implemented by a head-mountable camera apparatus.
Figure 59:
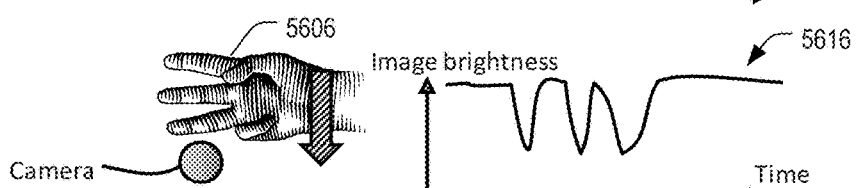
FIG. 59 is an illustration of another particular embodiment of a camera-based user interface that may be implemented by a head-mountable camera apparatus.
Figure 60:
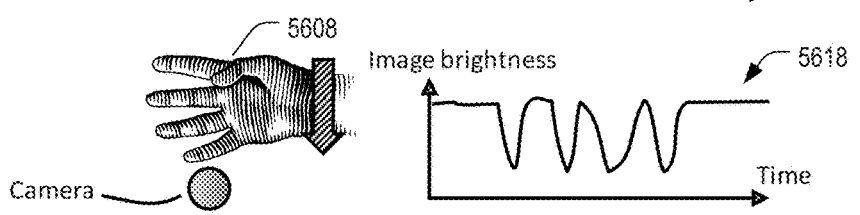
FIG. 60 is an illustration of another particular embodiment of a camera-based user interface that may be implemented by a head-mountable camera apparatus.

FIGS. 57-60 illustrate a camera-based user interface that may be implemented by a NANDeye wearer by passing one or more fingers across the field of view of one or more of the NANDeye cameras while wearing the NANDeye headgear 102. FIG. 57 illustrates a single-finger gesture 5602 and a resulting plot 5612 of image brightness as a function of time. The plot 5612 indicates a brightness reduction 5620 when the single finger passes in front of the camera 5610. FIGS. 58, 59, and 60 illustrate examples of a two-finger gesture 5604, a three-finger gesture 5606, and a four-finger gesture 5608, respectively, and example brightness plots 5614, 5616, and 5618 corresponding to each of the gestures 5604-5608 respectively. The NANDeye controller may detect one or more of the gestures 5602-5608 of FIGS. 57-60 in real-time or near real-time and respond accordingly (e.g., process a user command represented by the detected gesture).

Figure 61:
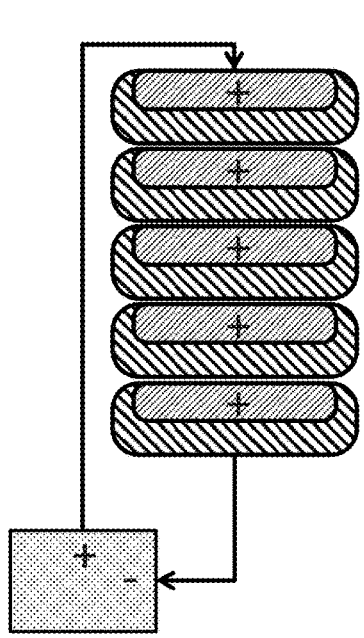
FIG. 61 is an illustration of a particular embodiment of charging multiple batteries in a battery magazine that may be used with a head-mountable camera system.
Figure 62:
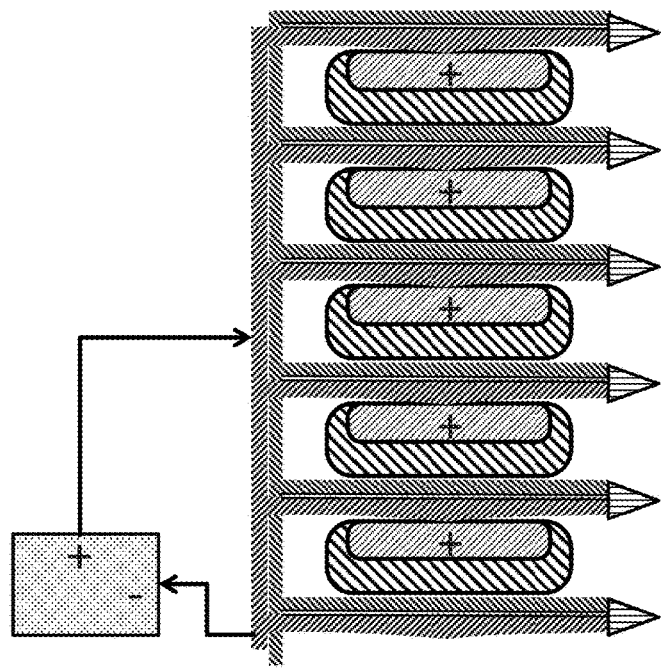
FIG. 62 is an illustration of another particular embodiment of charging multiple batteries in a battery magazine that may be used with a head-mountable camera system.

FIGS. 61-62 illustrate examples of charging multiple batteries in a battery magazine, such as a magazine of the changer described with respect to FIG. 8 or FIG. 43. The batteries are coupled serially in FIG. 61 and in parallel in FIG. 62. Serial configuration is mechanically simpler, but the charging current is small as the serial resistance of multiple batteries is higher than for a single battery. A parallel configuration is more complex but may be faster to charge and may facilitate detection of battery failure.

Figure 63:
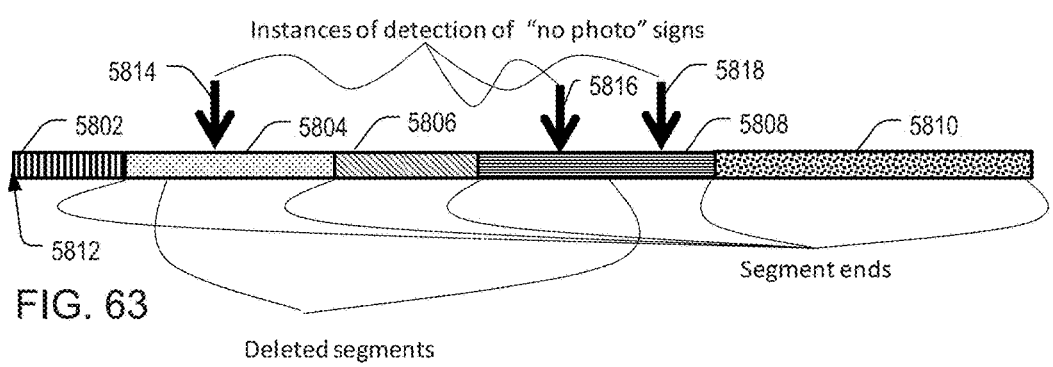
FIG. 63 is an illustration of a particular embodiment of video data having video data segments to be deleted based on content of the video data segments.
Figure 64:
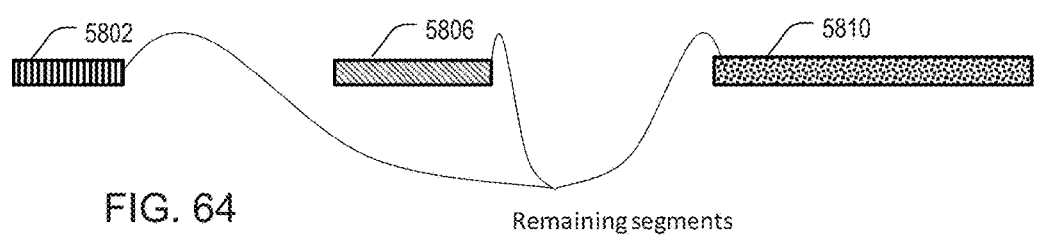
FIG. 64 is an illustration of a particular embodiment of deletion of remaining segments of the video data of FIG. 63 after deletion of video data segments based on content of the video data segments.

FIGS. 63-64 illustrate an example of deletion of video data segments 5802-5810 based on content of the video data segments. In FIG. 63, video data is illustrated as a horizontal bar 5812 including segments 5802-5810 corresponding to recording time periods. Instances of detection of signs or other graphical representations indicating that photography is unallowed, such as illustrated in FIGS. 12 and 44, are illustrated as arrows 5814, 5616, 5818 at times where the video data captures the sign or representation. In FIG. 64, segments 5804 and 5808 containing the detected signs or representations have been deleted. Detection may be performed by a processor of the NANDeye headgear 102 in real-time or near real-time, and the segments may be prevented from being stored, or stored and then deleted. Alternatively, detection and removal of segments may be performed during off-line processing.

Figure 65:
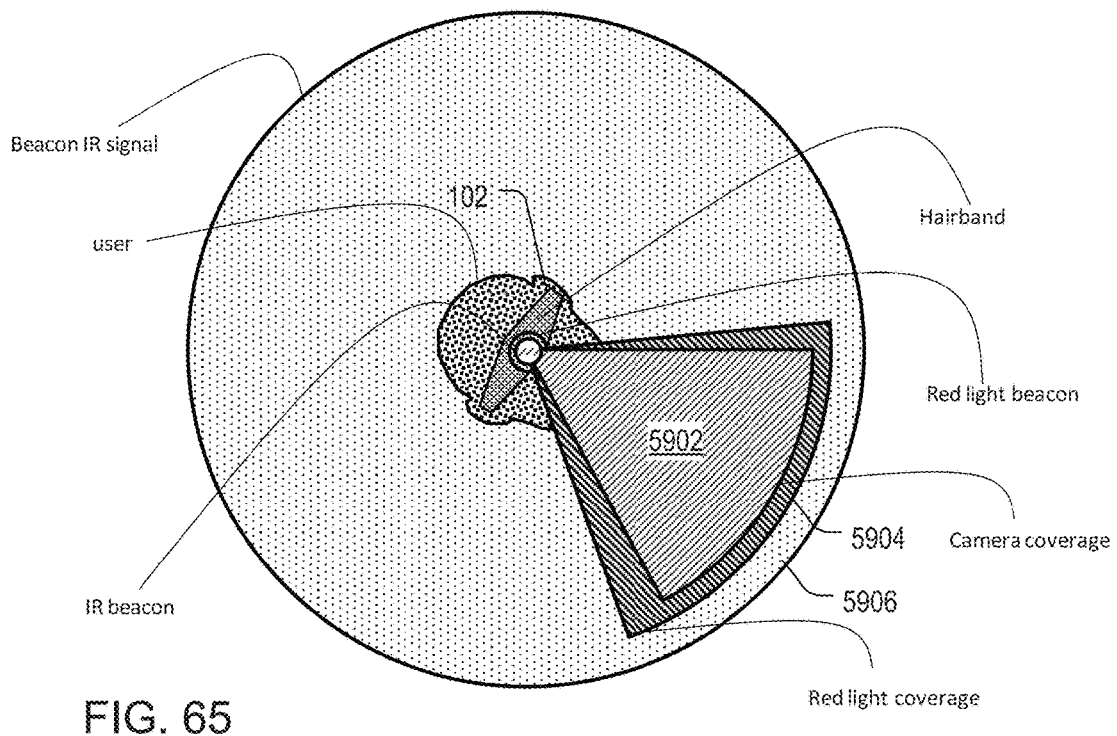
FIG. 65 is an illustration of a particular embodiment of a camera field of view, a directional beacon field, and omni-directional beacon field of a head-mountable camera apparatus.

FIG. 65 is a top view illustration of an typical camera field of view 5902, a directional beacon field 5904, and omnidirectional beacon field 5906 of a head-mountable camera apparatus 102. The directional beacon field 5904 (e.g., blinking red light coverage) substantially corresponds to the camera field of view 5902 (camera coverage). The directional beacon field may be a visible beacon that may alert others that the NANDeye camera(s) is recording and that may not be noticeable or detectable to people not in (or close to) the camera field of view 5902. The omnidirectional beacon field of view 5906 may correspond to a beacon emitter transmitting a substantially omnidirectional beacon signal. The omnidirectional beacon may be an IR signal to be outside a visible spectrum of other people (e.g., invisible to the unaided human eye).

Figure 66:
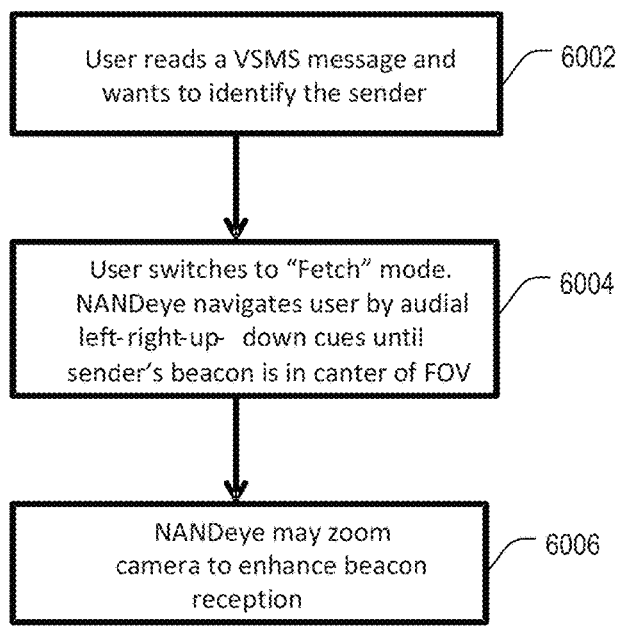
FIG. 66 is an illustration of a particular embodiment of a flowchart of a method of locating a beacon in a field of view of a head-mountable camera apparatus using audio signals.

FIG. 66 illustrates an example of a method of locating a beacon in a field of view of NANDeye headgear 102 using audio signals. Audible cues may be provided to the user to locate the target beacon, such as described with respect to FIG. 24. For example, a user may read a VSMS message or a Vtext and may want to identify a sender of the message, at 6002. The user may switch a NANDeye system to a "fetch" mode, at 6004. In the fetch mode, the NANDeye system may navigate the user's focus by audial signaling until a beacon of the sender of the VSMS is in a center of the user's FOV. For example, the NANDeye system (e.g., the user's headgear 102, or the user's phone 106, or a combination thereof) may determine a direction from the center of the user's FOV to the beacon and generate audible signals that are provided to the user, such as described with respect to FIG. 24. When the transmitting beacon is in or near the center of the user's FOV, a camera of the user's NANDeye may automatically zoom in to enhance reception of the beacon, at 6006.

In an embodiment, the system plays in the earphones a series of audible beeps that are time-correlated with the blinking of the intended beacon in the field of view. As the beacons are typically not synchronized with one another, only one of the beacons will blink in perfect correlation with the audial tone. The user visually scans his field of view, seeking a blinking led that is synchronized with the audial signals. Once found, the user can zoom the camera and/or direct his eye-sight to that beacon, as described in the flow chart of FIG. 67.

Figure 67:
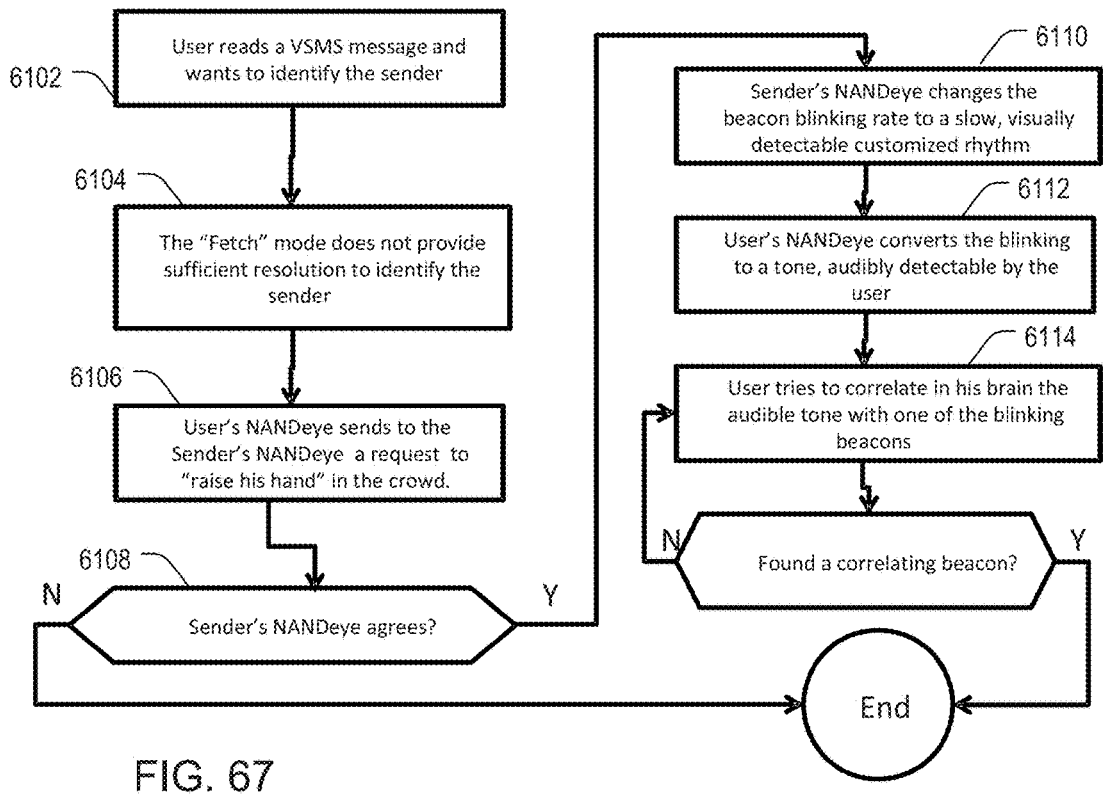
FIG. 67 is an illustration of a particular embodiment of a flowchart of a method of locating another user of a head-mountable camera apparatus using audio signals.

FIG. 67 illustrates by a flowchart an example that includes using the above mentioned method of locating another NANDeye user using audio signals. A NANDeye user may read a VSMS message and may want to identify the sender of the message, at 6102. The user may perform the "fetch" operation such as described with respect to FIG. 66, at 6104. However, the NANDeye may have insufficient resolution to locate the sender via the fetch operation. The user's NANDeye may send a request to the sender's NANDeye to provide a distinctive blinking pattern for visual recognition ("raise his hand"), at 6106. If the sender's NANDeye agrees, at 6108, the sender's NANDeye may change a beacon blinking rate, such as to a relatively slow, visually detectable customized rhythm, at 6110. The receiving user's NANDeye may convert the sender's blinking to a tone that is audibly detectable by a user, at 6112. A NANDeye user may compare visible blinking beacon signals to the audible tones (e.g., a pulse pattern) corresponding to blinking beacon signals of other NANDeyes to identify a NANDeye with a blinking beacon matching the tones, at 6114. In some implementations, the user may visually scan the user's FOV to locate a beacon matching the audible tones.

Figure 68:
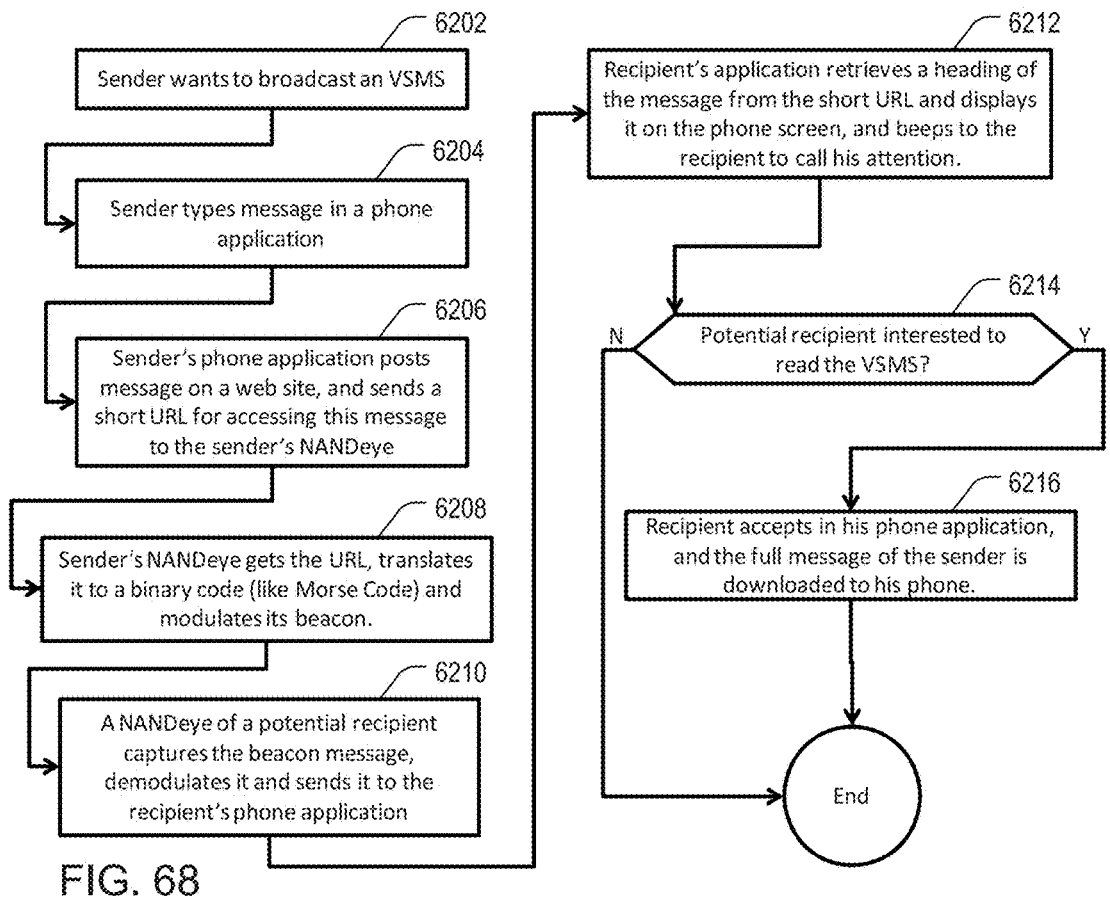
FIG. 68 is an illustration of a particular embodiment of a flowchart of a method of communication between head-mountable camera systems.

FIG. 68 illustrates an example of a method of communication between head-mountable camera systems including VSMS, such as described with respect to FIGS. 26-27. A sender may want to broadcast a VSMS message, at 6202. The sender may type a message using an application on the sender's phone, at 6204. An application on the sender's phone may post the message on a web site and may send a URL for accessing the message to the sender's NANDeye headgear, at 6206. The sender's NANDeye headgear may receive the URL, translate the URL to a binary code, and modulate a beacon of the NANDeye headgear using the binary code, at 6208.

A camera of a NANDeye of a potential recipient may detect the beacon message, demodulate the beacon message and send the resulting message (e.g., the URL) to an application on the recipient's phone, at 6210. The application on the recipient's phone may retrieve a heading of the message from the URL, display the heading on a screen of the phone, and signal the recipient (e.g., via a beeping noise), at 6212. A determination is made, at 6214, whether user input is received at the recipient's phone indicating the recipient wants to see the VSMS, at 6214. If so, the phone may download the full sender's message and display the message to the recipient, at 6216.

Figure 69:
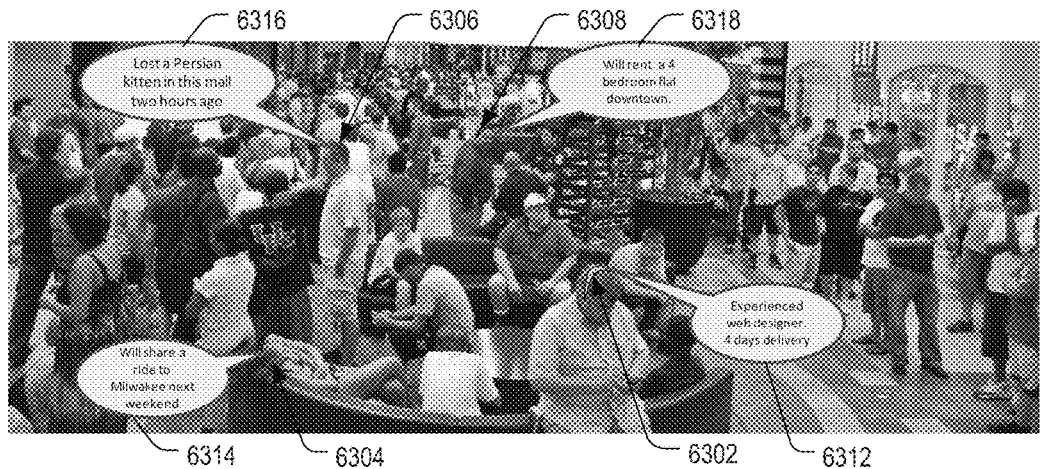
FIG. 69 is an illustration of a particular embodiment of a display showing messaging transmitted by multiple head-mounted beacons.

FIG. 69 illustrates an example of displaying messaging transmitted by multiple head-mounted beacons 6302-6308 of multiple NANDeye wearers as textual messages 6312-6314 in balloons that may be added to display with the video recording, such as by a phone 106 or a PC that processes video data recorded by a NANDeye headgear 102.

Figure 70:
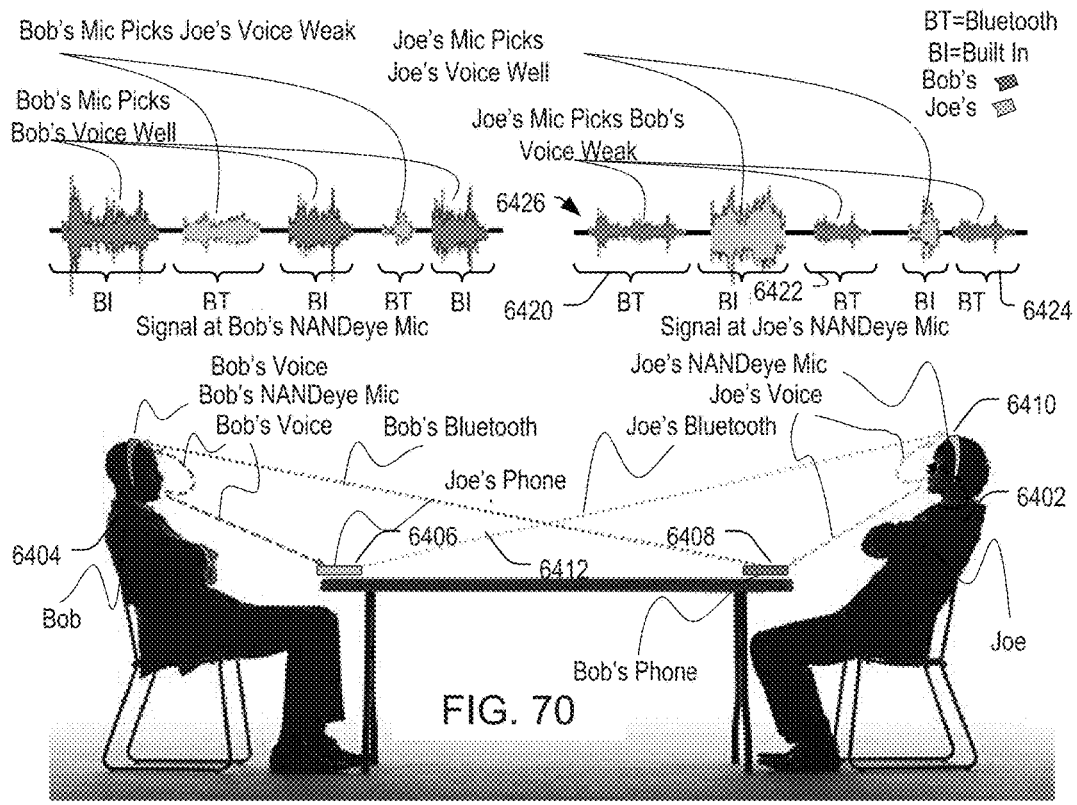
FIG. 70 is an illustration of a particular embodiment of multiple audio recording signals using multiple head-mountable camera devices and other recording devices.

FIG. 70 illustrates an example of multiple audio recording signals using multiple head-mountable camera devices and other recording devices. One NANDeye user Joe 6402 and another NANDeye user Bob 6404 may each record a conversation with their respective NANDeyes. Because of a large distance between them, Joe 6402 may position Joe's phone 6406 near Bob 6404, and Bob 6404 may position Bob's phone 6408 near Joe 6402. One or more microphones 6410 of Joe's NANDeye headgear 102 may clearly capture Joe's voice but may not capture Bob's voice as robustly due to the distance involved. However, one or more microphones of Joe's phone 6406 may capture Bob's voice more clearly (and may also capture Joe's voice less clearly) and may wirelessly transmit audio data 6412 to Joe's NANDeye headgear. Joe's NANDeye headgear may merge the audio of Bob's voice and Joe's voice from the NANDeye microphones 6410 and from the phone microphones. In one example, the NANDeye headgear may combine Bob's voice from both sources, may combine Joe's voice from both sources, or both. In another example, the NANDeye headgear may replace Bob's voice in portions 6420, 6422, 6424 of the audio data 6426 recorded at the NANDeye headgear with Bob's voice as recorded at Joe's phone. Bob's NANDeye headgear and phone may operate in a similar manner as described with respect to Joe's NANDeye headgear and phone.

Figure 71:
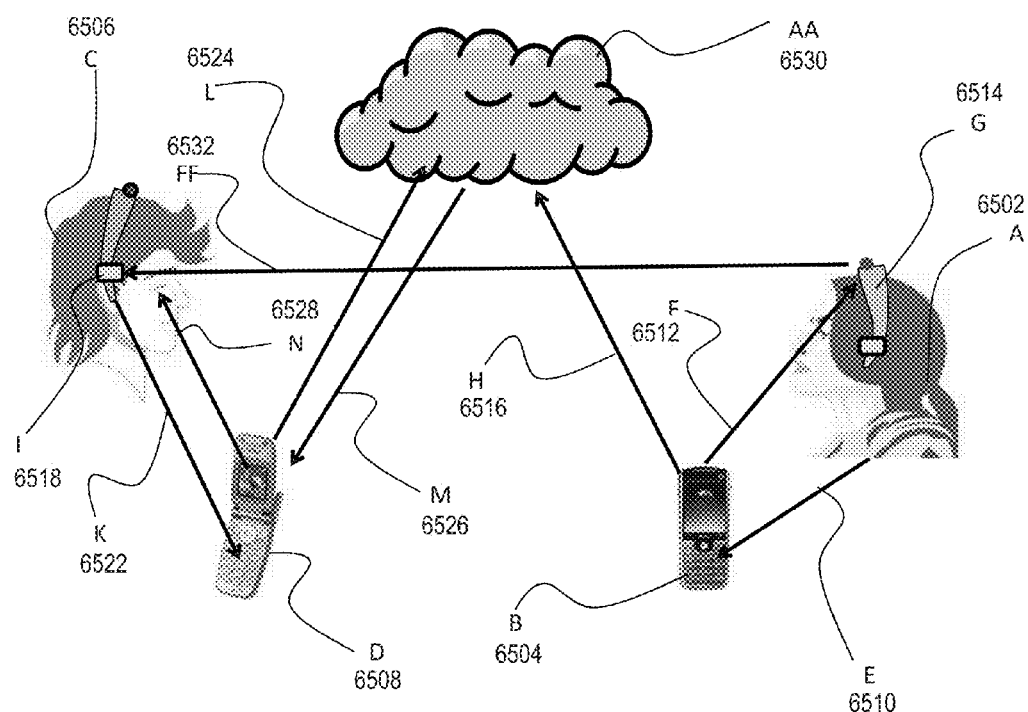
FIG. 71 is an illustration of a particular embodiment of communication between multiple head-mountable camera systems.

FIG. 71 illustrates an example communication between multiple NANDeye systems. A first NANDeye user (A) 6502 has a phone (B) 6504 and a second NANDeye user (C) 6506 has a phone (D) 6508. A 6502 enters into her phone B 6504 a message (E) 6510 to transmit via A's NANDeye headgear 102 beacon. A's phone B 6504 sends a wireless command (F) 6512 to instruct A's NANDeye headgear 102 (G) 6514 to transmit a message (FF) 6532 via a beacon. In addition, data (H) 6516 is uploaded to a server coupled to a network (AA) 6530 (e.g., the Internet). The message FF 6532 may include a URL to the data H 6516.

A camera (I) 6518 on C's NANDeye headgear 102 detects the transmitted message FF 6532 (e.g., by decoding a modulated beacon signal) and provides message information (K) 6522 to C's phone D 6508 for display, such as business card, message, or other information, and may also include the URL for the data H 6516. In response to a selection by C 6506 to retrieve the data H 6516, a request (L) 6524 is sent to the server and a reply (M) 6526 is received at the second user's phone. Alternatively or additionally, the NANDeye of the second NANDeye user (C) 6506 may detect the transmitted message FF 6532 via a photodiode on C's NANDeye headgear 102.

Implementation of NANDeye using headgear 102 may provide several features, such as offering the highest point on the body for the beacon, enabling positioning the cameras at eye level, and rotating with the user's head both in tilt and pan. In addition, location of the headgear 102 near the ears provides a natural place for earphones, and contact may be established through one or more of the user's checks (e.g., with the mandible condyle bones).

However, although NANDeye is illustrated and described according to implementations using headgear 102, in other implementations NANDeye may not be implemented using headgear 102 and may instead be implemented using one or more other configurations.

NANDeye may provide a user with the freedom to log what the user hears, sees and does. NANDeye may help users in one or more of many other ways:

Recalling what the user saw if the user is not certain
    Extracting more value from special visual experiences
    Relief from summarizing meetings
    Relief from summarizing lectures
    Extend the user's virtual field of view
    Prove what the user did and what the user did not do
    Prove where the user has been and where the user has not been
    Protect the user from false professional liabilities
    Bookmark items the user sees for off-line handling
    Identify off-line items the user does not recognize in real time
    Automatically tag visual archive for future searches
    Make logging a routine habit, avoid an explicit gesture
    Stream new acquaintances into the user's contact base
    Count how much the user eats and/or chews
    Recognize things the user has seen before
    Track expenses without sorting and summing receipts
    Track quantity and quality of gait motions
    Identify people approaching the user
    Record and process billable time
    Extending a spouse's shopping arm
    Monitoring back posture (e.g., in school)
    Enhance free-lance news-reporting and interviews
    Subscribe to a social eye-witness network Develop, share and sell new NAND-apps Deter personal violence Contribute civil and social visual evidence Examples of some use cases in the user experience with NANDeye are provided in the following illustrative narrative.

The user starts his NANDeye day by wearing the device on his head, removing the battery changer from the charger and placing the battery changer in the user's pocket. The user turns NANDeye on, does a quick CFOV calibration and forgets about NANDeye.

As the user goes out of the user's home, the user sees many other people wearing their NANDeye. Some of the other people are having a phone call, some of the other people are listening to music, and some of the other people are logging video using NANDeye. Those who log video have a blinking red LED on the top of their headgear.

When the user goes into a classroom to hear a lecture, the user turns NANDeye on, and so do several other students in the class. After the lecture, the user and the other students may activate a "share" function—they may all upload their video to the NANDeye server, and a professional, multi-feed, edited lecture may be downloaded to them for archiving.

On a few occasions during class, the user gets a beep from the NANDeye to alert the user that the user is sitting in a posture that is not good for the user's back. The user straightens up.

Before the user leaves the campus to go to his office, on his way to his car, the user notes a group of students, some of them wearing NANDeye, and one of the NANDeye blinks in the high "broadcast" power. The user is curious to see what is this guy "selling" and stops to look at the "selling" guy in the center of his FOV. A message shows up on the user's phone screen "will adopt a cute kitten". The user may have no kittens to offer for adoption, so the user may continue without interacting with the group of students.

Back in the office, the user may have to attend two meetings. The user wears NANDeye to get a summary of the meetings. During the meetings, the user bookmarks 2-3 segments where meeting participants discuss the user's duties. Tomorrow morning the user will get a transcript of the user's action items by mail, with the video clips from the bookmarked segments in case the transcript misses something.

Then the user may recall that when the user strolled in the mall with the user's spouse last evening, they stopped at a bookstore window and talked about a new book that they saw. The user could not recall the name of the author. The user logs into the user's home PC and searches for "Monday evening, bookstore". A link to a short video clip arrives. The user selects the link, views the video clip, and orders the book for the user's spouse.

As another example, NANDeye may be used in the context of medical procedures. To illustrate, NANDeye headgear may be used for tracking and/or guiding during medical procedures, such as surgical procedures. A surgeon's view may be captured by the head-mounted camera(s) and may be provided to students for educational purposes, provided to a remote medical practitioner for collaboration or instruction during a surgical procedure, archived as evidence (e.g., for potential malpractice assertions), etc. However, medical applications are not limited to surgical applications and may include other applications such as physical examinations, laboratory procedures, psychiatric evaluations, etc.

NANDeye may provide many more applications than described herein. As users begin to develop NANDapps (e.g., NANDeye applications) for smart phones, many other applications may be added.

In accordance with one or more of the above-described embodiments and methods, an apparatus may include at least two cameras and a mounting structure to which are mounted the at least two cameras. The mounting structure is configured, while the mounting structure is worn on a user's head, to remain substantially or entirely outside of a field of vision of the user so that the mounting structure and the cameras remain out of the user's eyesight and to position the at least two cameras to be substantially or entirely outside of the field of vision of the user and to be at approximately eye level of the user. The at least two cameras may be positioned to enable stereo video recording via the at least two cameras.

A method may be performed at a head mountable device that includes a memory and at least two cameras coupled to a mounting structure, where the mounting structure is configured to remain substantially or entirely outside of a field of vision of a user and to position the at least two cameras to be substantially or entirely outside of the field of vision of the user and to be at approximately eye level of the user. The method may include performing, while the head mountable device is worn on a user's head, initiating video recording via at least one of the cameras while the at least two cameras and the mounting structure are substantially or entirely outside of a field of vision of a user so that the user's field of vision is not obstructed during the video recording, where the video recoding may substantially correspond to a recording of a visual experience of the user, such as observed from a point of view of the user, and storing video data from the at least one camera in the memory.

As a non-limiting example, the apparatus may correspond to the NANDeye headgear 102 depicted in FIG. 31 and the method may be performed by the NANDeye headgear 102 depicted in FIG. 31.

In accordance with one or more of the above-described embodiments and methods, an apparatus may include a camera, a sensor, and a controller configured to adjust at least one of a focal distance of the camera and a field of view of the camera in response to receiving an output of the sensor. The sensor may include at least one of an inclinometer or a satellite-based positioning sensor. A second camera may be coupled to the controller. The controller may be configured to toggle between multiple modes of operation of the camera and the second camera. The multiple modes may include a stereo recording mode and an extended field of view mode. Toggling between the multiple modes may be based on the output of the sensor.

A method may be performed at a device that includes a camera and a sensor. The method may include receiving an output of the sensor, and adjusting at least one of a focal distance of the camera and a field of view of the camera in response to receiving the output of the sensor, where the sensor may include at least one of an inclinometer or a satellite-based positioning sensor.

The device may include a second camera. The method may include toggling between multiple modes of operation of the camera and the second camera, the multiple modes including a stereo recording mode and an extended field of view mode.

As a non-limiting example, the apparatus may correspond to, and the method may be performed by, the NANDeye headgear 102 depicted in FIG. 17, 33, or 50.

In accordance with one or more of the above-described embodiments and methods, an apparatus may include a mounting structure that is configured to be worn on a user's head and to hold a camera, a storage device attached to the mounting structure and configured to store first data received from the camera, the first data including one or both of image data and video data, where the stored first data has a first quality, and a controller coupled to the mounting structure and configured to provide second data to a transmitter, where the second data corresponds to the first data and where the second data has a second quality different from the first quality.

A method may be performed at a head mountable device that may include a mounting structure that is configured to be worn on a user's head and to hold a camera, a storage device coupled to the mounting structure, and a transmitter coupled to the mounting structure. The method may include storing, in the storage device, first data received from the camera, the first data including one or both of image data and video data, where the stored first data has a first quality, and providing second data to the transmitter, where the second data corresponds to the first data and where the second data has a second quality different from the first quality.

The first quality may correspond to a first frame rate and the second quality may correspond to a second frame rate that is less than the first frame rate. The first quality may correspond to a first resolution and the second quality may correspond to a second resolution that is less than the first resolution. The first quality may correspond to a first color depth and the second quality may correspond to a second color depth that is less than the first color depth.

As a non-limiting example, the apparatus may correspond to, and the method may be performed by, the NANDeye headgear 102 depicted in FIG. 5 or 46.

In accordance with one or more of the above-described embodiments and methods, an apparatus may include a chassis including a central portion, a first leg coupled to the central portion, and a second leg coupled to the central portion. The chassis may be configured to support a camera attached to the first leg or to the second leg substantially at an eye level of a user's head while worn on a user's head with the central portion in contact with the top of the user's head and with the first and second legs extending downward from the top of the user's head and on opposite sides of the user's head.

The apparatus may also include a first camera attached to the chassis, and a second camera attached to the chassis, where the first camera and the second camera are positioned substantially at the eye level of the user's head while the chassis is worn on the user's head. The apparatus may also include at least one earphone positioned to be proximate to an ear of the user's head while the chassis is worn on the user's head. The apparatus may also include a transmitter configured to wirelessly transmit data. The apparatus may also include a jaw motion sensor configured to detect a predetermined motion of the jaw of the user's head while the chassis is worn on the user's head.

A method may be performed at a chassis having a central portion, a first leg coupled to the central portion, and a second leg coupled to the central portion. The method may include performing, while the chassis is worn on a user's head and with the first and second legs extending downward from the top of the user's head and on opposite sides of the user's head, contacting, by the central portion, the top of the user's head, and supporting a camera attached to the first leg or to the second leg substantially at an eye level of the user's head. A first camera may be attached to the chassis and a second camera may be attached to the chassis, where the first camera and the second camera are positioned substantially at the eye level of the user's head while the chassis is worn on the user's head. At least one earphone may be positioned to be proximate to an ear of the user's head while the chassis is worn on the user's head. The method may include wirelessly transmitting data from the chassis. The method may include detecting a predetermined motion of the jaw of the user's head while the chassis is worn on the user's head.

As a non-limiting example, the apparatus may correspond to, and the method may be performed by, the NANDeye headgear 102 depicted in FIG. 31.

In accordance with one or more of the above-described embodiments and methods, an apparatus may include a chassis including a central portion, a first leg coupled to the central portion, and a second leg coupled to the central portion. The chassis may be configured to support a camera substantially at an eye level of a user's head while worn on a user's head with the central portion in contact with the top of the user's head and with the user's head between the first and second legs. The first leg may include a first curved portion to enable passage of a first eyeglass temple worn on the user's head and the second leg may include a second curved portion to enable passage of a second eyeglass temple worn on the user's head.

A method may be performed at a chassis having a central portion, a first leg coupled to the central portion, and a second leg coupled to the central portion, where the first leg may include a first curved portion to enable passage of a first eyeglass temple worn on a user's head and the second leg may include a second curved portion to enable passage of a second eyeglass temple worn on the user's head. The method may include performing, while the chassis is worn on the user's head and with the user's head between the first and second legs, contacting, by the central portion, the top of the user's head, and supporting a camera substantially at an eye level of the user's head.

As a non-limiting example, the apparatus may correspond to, and the method may be performed by, the NANDeye headgear 102 depicted in FIG. 38.

In accordance with one or more of the above-described embodiments and methods, an apparatus may include a chassis including a central portion, a first leg coupled to the central portion, and a second leg coupled to the central portion. The chassis may be configured to support a camera substantially at an eye level of a user's head while worn on a user's head with the central portion over the user's head and with the user's head between the first and second legs. The first leg may include a first curved portion to contact a first eyeglass temple worn on the user's head and the second leg may include a second curved portion to contact a second eyeglass temple worn on the user's head.

A method may be performed at a chassis having a central portion, a first leg coupled to the central portion, and a second leg coupled to the central portion, where the first leg may include a first curved portion to contact a first eyeglass temple worn on a user's head and the second leg may include a second curved portion to contact a second eyeglass temple worn on the user's head. The method may include performing, while the chassis is worn on the user's head and with the user's head between the first and second legs, contacting, by the central portion, the top of the user's head, and supporting a camera substantially at an eye level of the user's head.

As a non-limiting example, the apparatus may correspond to, and the method may be performed by, the NANDeye headgear 102 depicted in FIG. 38.

In accordance with one or more of the above-described embodiments and methods, an apparatus may include a chassis configured to support a camera while the chassis may be worn on a user's head, a sensor configured to detect a condition corresponding to whether the chassis is being worn, and a controller configured to modify an operation of the camera in response to an output of the sensor corresponding to the chassis not being worn. The sensor may include a pulse detector. The sensor may include a respiration detector. The sensor may include a motion detector.

A method may be performed at a device including a chassis, the chassis configured to be worn on a user's head, the device including a camera and a sensor. The method may include receiving an output of the sensor, and modifying an operation of the camera in response to the output of the sensor corresponding to the chassis not being worn.

As a non-limiting example, the apparatus may correspond to, and the method may be performed by, the NANDeye headgear 102 depicted in FIG. 31, 35, or 37. As another example, one or more of the sensors illustrated in FIG. 36 may include a pulse detector, a respiration detector, a motion detector, or any combination thereof.

In accordance with one or more of the above-described embodiments and methods, an apparatus may include a chassis configured to support a camera while the chassis is worn on a user's head, and a lens holder configured to adjust a position of an external lens relative to a field of view of the camera in response to a change of orientation of the chassis.

A method may be performed at a device including a chassis, the chassis configured to be worn on a user's head, the device including a camera. The method may include positioning an external lens at a first orientation relative to the camera, and positioning the external lens at a second orientation relative to the camera in response to a change in orientation of the chassis.

As a non-limiting example, the apparatus may correspond to, and the method may be performed by, the NANDeye headgear 102 depicted in FIG. 18.

In accordance with one or more of the above-described embodiments and methods, an apparatus may include a chassis configured to support a first camera and a second camera at approximately an eye level of a user's head while the chassis is worn on the user's head. The apparatus may include a mechanical adjustment mechanism coupled to the chassis and configured to change a first tilt of the first camera in a first direction and to concurrently change a second tilt of the second camera in a second direction opposite to the first direction.

A method may be performed at a device including a chassis, the device including a first camera, a second camera, and a mechanical adjustment mechanism coupled to the chassis, the chassis configured to support the first camera and the second camera at approximately an eye level of a user's head while the chassis is worn on the user's head. The method may include performing, while the chassis is worn on the user's head, receiving a user input at the mechanical adjust mechanism, and in response to the received user input, changing a first tilt of the first camera in a first direction and concurrently changing a second tilt of the second camera in a second direction opposite to the first direction.

As a non-limiting example, the apparatus may correspond to, and the method may be performed by, the NANDeye headgear 102 depicted in FIG. 17.

In accordance with one or more of the above-described embodiments and methods, an apparatus may include a first camera and a second camera coupled to a chassis that is configured to support the first camera and the second camera at approximately an eye level of a user's head while the chassis is worn on the user's head. The apparatus may include a controller coupled to the first camera and to the second camera to enable stereo video recording, where the controller is configured to initiate video recording at the first camera according to a first frame rate and to initiate video recording at the second camera at a second frame rate that is different than the first frame rate.

A method may be performed at a device including a chassis, the device including a first camera and a second camera, the chassis configured to support the first camera and the second camera at approximately an eye level of a user's head while the chassis is worn on the user's head. The method may include performing, while the chassis is worn on the user's head, initiating video recording at the first camera according to a first frame rate, and selectively initiating video recording at the second camera at a second frame rate that is different than the first frame rate.

As a non-limiting example, the apparatus may correspond to, and the method may be performed by, the NANDeye headgear 102 depicted in FIG. 31 operating in accordance with the description of FIG. 19.

In accordance with one or more of the above-described embodiments and methods, an apparatus may include a first camera and a second camera coupled to a chassis that is configured to support the first camera and the second camera at approximately an eye level of a user's head while the chassis is worn on the user's head. The apparatus may include a controller coupled to the first camera and to the second camera to enable stereo video recording, where the controller is configured to adjust a first focal length of the first camera to be different from a second focal length of the second camera.

A method may be performed at a device including a chassis, the device including a first camera and a second camera, the chassis configured to support the first camera and the second camera at approximately an eye level of a user's head while the chassis is worn on the user's head. The method may include performing, while the chassis is worn on the user's head, setting a first focal length of the first camera to be substantially equal to a second focal length of the second camera, and adjusting the first focal length of the first camera to be different from the second focal length of the second camera.

As a non-limiting example, the apparatus may correspond to, and the method may be performed by, the NANDeye headgear 102 depicted in FIG. 31 operating in accordance with the description of FIG. 20 or FIG. 51.

In accordance with one or more of the above-described embodiments and methods, an apparatus may include a first camera and a second camera coupled to a chassis that is configured to support the first camera and the second camera. The apparatus may include a controller coupled to the first camera and to the second camera to enable stereo video recording, where the controller is configured to adjust a first image resolution of the first camera to a value that is different from a second image resolution of the second camera.

A method may be performed at a device including a chassis, the device including a first camera and a second camera, the chassis configured to support the first camera and the second camera. The method may include setting a first image resolution of the first camera to be substantially equal to a second image resolution of the second camera, and adjusting the first image resolution of the first camera to a value that is different from the second image resolution of the second camera.

As a non-limiting example, the apparatus may correspond to, and the method may be performed by, the NANDeye headgear 102 depicted in FIG. 31 operating in accordance with the description of FIG. 20.

In accordance with one or more of the above-described embodiments and methods, an apparatus may include a first camera and a second camera coupled to a chassis that is configured to support the first camera and the second camera at approximately an eye level of a user's head while the chassis is worn on the user's head. The apparatus may include a controller coupled to the first camera and to the second camera to calibrate a first field of view of the first camera with a second field of view of the second camera by locating a feature in the first field of view, locating the feature in the second field of view and determining at least one of a pan offset and a tilt offset based on a position difference between the feature in the first field of view and the feature in the second field of view.

A method may be performed at a device including a chassis, the device including a first camera and a second camera, the chassis configured to support the first camera and the second camera at approximately an eye level of a user's head while the chassis is worn on the user's head. The method includes calibrating a first field of view of the first camera with a second field of view of the second camera by performing, while the chassis is worn on the user's head, locating a feature in the first field of view, locating the feature in the second field of view, and determining at least one of a pan offset and a tilt offset based on a position difference between the feature in the first field of view and the feature in the second field of view.

As a non-limiting example, the apparatus may correspond to, and the method may be performed by, the NANDeye headgear 102 depicted in FIG. 31 operating in accordance with the description of FIG. 14.

In accordance with one or more of the above-described embodiments and methods, an apparatus may include a first camera and a second camera coupled to a chassis that is configured to support the first camera and the second camera. The apparatus may include a controller coupled to the first camera and to the second camera to enable stereo video recording, where the controller is configured to adjust a first spectral sensitivity of the first camera to a value that is different from a second spectral sensitivity of the second camera.

A method may be performed at a device including a chassis, the device including a first camera and a second camera, the chassis configured to support the first camera and the second camera. The method may include setting a first spectral sensitivity of the first camera to be substantially equal to a second spectral sensitivity of the second camera, and adjusting the first spectral sensitivity of the first camera to a value that is different from the second spectral sensitivity of the second camera.

As a non-limiting example, the apparatus may correspond to, and the method may be performed by, the NANDeye headgear 102 depicted in FIG. 31 operating in accordance with the description of FIG. 21.

In accordance with one or more of the above-described embodiments and methods, an apparatus may include a chassis configured to be worn on a user's head, and a patterned laser pointer device attached to the chassis.

In accordance with one or more of the above-described embodiments and methods, a method may be performed at a device including a chassis configured to be worn on a user's head and a patterned laser pointer device attached to the chassis. The method may include, in response to receiving a first user input, activating the patterned laser pointer device, and in response to receiving a second user input, deactivating the patterned laser pointer device.

As a non-limiting example, the apparatus may correspond to, and the method may be performed by, the NANDeye headgear 102 depicted in FIG. 31 operating in accordance with the description of FIG. 53.

In accordance with one or more of the above-described embodiments and methods, an apparatus may include a chassis configured to be worn on a user's head, a first laser pointer device attached to the chassis, and a second laser pointer device attached to the chassis, where the first laser pointer device is configured to generate a first beam and where the second laser pointer device is configured to generate a second beam substantially parallel to the first beam.

A method may be performed at a device including a chassis configured to be worn on a user's head, the device including a first laser pointer device attached to the chassis and a second laser pointer device attached to the chassis. The method may include generating a first beam from the first laser pointer device, and generating a second beam from the second laser pointer device, where the second beam is substantially parallel to the first beam.

As a non-limiting example, the apparatus may correspond to, and the method may be performed by, the NANDeye headgear 102 depicted in FIG. 31 operating in accordance with the description of FIGS. 54-55.

In accordance with one or more of the above-described embodiments and methods, an apparatus may include a chassis configured to be worn on a user's head, a first laser pointer device attached to the chassis and a second laser pointer device attached to the chassis, where the first laser pointer device is configured to generate a first beam and where the second laser pointer device is configured to generate a second beam. The apparatus may include a camera attached to the chassis and a controller configured to determine a distance to an object by detecting a first point of contact of the first beam and a second point of contact of the second beam with the object in image data from the camera and determining an angular distance between the first point and the second point.

A method may be performed at a device including a chassis, the chassis configured to be worn on a user's head, the device including a first laser pointer device attached to the chassis, a second laser pointer device attached to the chassis, and a camera attached to the chassis, where the first laser pointer device is configured to generate a first beam and where the second laser pointer device is configured to generate a second beam. The method may include determining a distance to an object by detecting a first point of contact of the first beam and a second point of contact of the second beam with the object in image data from the camera, and determining an angular distance between the first point and the second point.

As a non-limiting example, the apparatus may correspond to, and the method may be performed by, the NANDeye headgear 102 depicted in FIG. 31 operating in accordance with the description of FIGS. 54-55.

In accordance with one or more of the above-described embodiments and methods, an apparatus may include a camera, a chassis that is configured to support the camera while the chassis is worn on a user's head, a speaker coupled to the chassis, and a controller coupled to receive video data generated by the camera and to cause the speaker to generate an audio signal based on a location of an object in a field of view of the camera to enable object-locating information to be provided to a user while the user is wearing the chassis.

A method may be performed at a device including a camera, a chassis configured to support the camera while the chassis is worn on a user's head, and a speaker coupled to the chassis. The method may include receiving video data generated by the camera, and generating an audio signal based on a location of an object in a field of view of the camera to enable object-locating information to be provided to a user while the user is wearing the chassis.

As a non-limiting example, the apparatus may correspond to, and the method may be performed by, the NANDeye headgear 102 depicted in FIG. 31 operating in accordance with the description of FIG. 24.

In accordance with one or more of the above-described embodiments and methods, an apparatus may include a camera, a chassis that is configured to support the camera while the chassis is worn on a head of a user, and a controller coupled to receive video data generated by the camera and to calibrate a field of view of the camera with respect to a field of view of the user while the chassis is worn on the head of the user by detecting a feature in the video data and determining an offset corresponding to a location of the feature in the video data relative to a reference point in the field of view of the camera.

A method may be performed at a device including a camera and a chassis configured to support the camera while the chassis is worn on a user's head. The method may include receiving video data generated by the camera. The method may include calibrating a field of view of the camera with respect to a field of view of a user while the chassis is worn on the head of the user by detecting a feature in the video data, and determining an offset corresponding to a location of the feature in the video data relative to a reference point in the field of view of the camera.

As a non-limiting example, the apparatus may correspond to, and the method may be performed by, the NANDeye headgear 102 depicted in FIG. 31 operating in accordance with the description of FIG. 14.

In accordance with one or more of the above-described embodiments and methods, an apparatus may include a camera and a processor coupled to receive video data generated by the camera and to adjust at least one of a frame rate, a focal length, or an image resolution of the camera in response to content of the video data.

A method may be performed at a device including a camera. The method may include receiving video data generated by the camera and adjusting at least one of a frame rate, a focal length, or an image resolution of the camera in response to content of the video data.

As a non-limiting example, the apparatus may correspond to, and the method may be performed by, the NANDeye headgear 102 depicted in FIG. 31 operating in accordance with a description of one or more of FIGS. 13 and 15-20.

In accordance with one or more of the above-described embodiments and methods, an apparatus may include a camera, a chassis that is configured to support the camera while the chassis is worn on a head of a user, and a sensor coupled to the chassis and configured to detect jaw movement through a cheek of the user while the chassis is worn on the head of the user, where an operation of the camera is responsive to an output of the sensor.

A method may be performed at a device including a camera, a chassis that is configured to support the camera while the chassis is worn on a head of a user, and a sensor coupled to the chassis. The method may include detecting, via the sensor, jaw movement through a cheek of the user while the chassis is worn on the head of the user, and controlling operation of the camera responsive to an output of the sensor.

As a non-limiting example, the apparatus may correspond to, and the method may be performed by, the NANDeye headgear 102 depicted in FIG. 31, 35, 37, etc.

In accordance with one or more of the above-described embodiments and methods, an apparatus may include a camera, a chassis that is configured to support the camera while the chassis is worn on a head of a user, and a sensor coupled to the chassis and configured to detect deformation of the chassis corresponding to jaw movement of the user while the chassis is worn on the head of the user, where an operation of the camera is responsive to an output of the sensor.

A method may be performed at a device including a camera, a chassis that is configured to support the camera while the chassis is worn on a head of a user, and a sensor coupled to the chassis. The method may include detecting, via the sensor, deformation of the chassis corresponding to jaw movement of the user while the chassis is worn on the head of the user, and controlling operation of the camera responsive to an output of the sensor.

As a non-limiting example, the apparatus may correspond to, and the method may be performed by, the NANDeye headgear 102 depicted in FIG. 31, 35, 37, etc.

In accordance with one or more of the above-described embodiments and methods, an apparatus may include a camera and a sensor configured to detect an audio signal of a clicking device while the clicking device is within a mouth of a user of the camera, where an operation of the camera is responsive to an output of the sensor.

A method may be performed at a device including a camera and a sensor. The method may include detecting, via the sensor, an audio signal of a clicking device while the clicking device is within a mouth of a user of the camera, and controlling operation of the camera responsive to an output of the sensor.

As a non-limiting example, the apparatus may correspond to, and the method may be performed by, the NANDeye headgear 102 depicted in FIG. 31 operating in accordance with a description of one or more of FIGS. 47-49.

In accordance with one or more of the above-described embodiments and methods, an apparatus may include a camera, a chassis connected to the camera, and a sensor coupled to the chassis. The sensor is configured to detect one or more environmental conditions of the camera and to provide a sensor output. At least one adaptive parameter of the camera is adjusted responsive to the sensor output, the at least one adaptive parameter including one or more of a frame rate, a focal length, and an image resolution. For example, the at least one adaptive parameter may include the frame rate. As another example, the at least one adaptive parameter may include the focal length. As anther example, the at least one adaptive parameter may include the image resolution.

A method may be performed at a device including a camera, a chassis connected to the camera, and a sensor coupled to the chassis. The method may include detecting, via the sensor, one or more environmental conditions of the camera, and adjusting at least one adaptive parameter of the camera responsive to an output of the sensor, the at least one adaptive parameter including one or more of a frame rate, a focal length, and an image resolution.

As a non-limiting example, the apparatus may correspond to, and the method may be performed by, the NANDeye headgear 102 depicted in FIG. 30 or FIG. 36. One or more of the sensors, such as the sensors depicted in FIG. 30 or FIG. 36, may detect an environmental condition and in response adjust an adaptive parameter. For example, as illustrated in FIG. 13 a field of view parameter may be adjusted in response to a sensor (e.g., an inclinometer) detecting repeated tilt of user's head, or a focal length parameter may be adjusted in response to a sensor (e.g., a camera) detecting near and far objects in a scene, as illustrative, non-limiting examples.

In accordance with one or more of the above-described embodiments and methods, an apparatus may include a camera, a chassis that is configured to support the camera while the chassis is worn on a head of a user, and means for adjusting at least one of a focus length of the camera or a width of field of view of the camera in response to an inclination of the chassis. As an example, the means for adjusting may include a lens connected to a pendulum.

As another example, the means for adjusting may include an inclinometer connected to the chassis and a controller coupled to the inclinometer and to the camera, where the controller is configured to receive an output of the inclinometer and to send a signal to the camera indicating an adjustment of the at least one of the focus length of the camera or the width of the field of view of the camera. The signal depends on the output of the inclinometer.

A method may be performed at a device including a camera and a chassis that is configured to support the camera while the chassis is worn on a head of a user. The method may include detecting an inclination of the chassis, and adjusting at least one of a focus length of the camera or a width of field of view of the camera in response to the inclination of the chassis. The device may include a lens connected to a pendulum.

The device may include an inclinometer connected to the chassis, and the method may include receiving an output of the inclinometer and sending a signal to the camera indicating an adjustment of the at least one of the focus length of the camera or the width of the field of view of the camera, where the signal depends on the output of the inclinometer.

As a non-limiting example, the apparatus may correspond to, and the method may be performed by, the NANDeye headgear 102 depicted in FIG. 5 operating in accordance with the description of one or more of FIGS. 13 and 15-20.

In accordance with one or more of the above-described embodiments and methods, an apparatus may include multiple cameras configurable to operate according to a stereo video recording mode, a chassis that is configured to support the multiple cameras while the chassis is worn on a head of a user, and a receiver configured to wirelessly receive camera operating instructions from a portable electronic device, where at least one of the multiple cameras is responsive to the camera operating instructions. The portable electronic device may include a mobile phone 106.

A method may be performed at a device including multiple cameras configurable to operate according to a stereo video recording mode, a chassis that is configured to support the multiple cameras while the chassis is worn on the head of a user, and a receiver. The method may include wirelessly receiving camera operating instructions from a portable electronic device, and controlling operation of at least one of the multiple cameras responsive to the camera operating instructions.

As a non-limiting example, the apparatus may correspond to, and the method may be performed by, the NANDeye headgear 102 depicted in FIG. 1 receiving operating instructions from the smartphone programmed to run NANDeye applications as depicted in FIG. 1.

In accordance with one or more of the above-described embodiments and methods, an apparatus may include a portable electronic device including a display and a transmitter. The portable electronic device is configured to provide a user interface via the display to receive a camera operating instruction of a user, the camera operating instruction corresponding to an operation of a multi-camera stereo video recording device. The portable electronic device is configured to transmit the camera operating instruction to a head-mounted multi-camera stereo video recording device while the portable electronic device is wirelessly coupled to the head-mounted multi-camera stereo video recording device. The portable electronic device may include a mobile phone 106.

A method may be performed at a portable electronic device including a display and a transmitter. The method may include receiving a camera operating instruction of a user, the camera operating instruction corresponding to an operation of a multi-camera stereo video recording device, and transmitting the camera operating instruction to a head-mounted multi-camera stereo video recording device while the portable electronic device is wirelessly coupled to the head-mounted multi-camera stereo video recording device.

As a non-limiting example, the apparatus may correspond to, and the method may be performed by, the smartphone programmed to run NANDeye applications depicted in FIG. 1 sending camera operating instructions to the NANDeye headgear 102 depicted in FIG. 1.

In accordance with one or more of the above-described embodiments and methods, an apparatus may include a camera, a chassis that is configured to support the camera while the chassis is worn on a head of a user, a user interface configured to receive, during a video recording operation of the camera, a first user input corresponding to a beginning of a video segment and a second user input corresponding to an ending of the video segment, and a controller configured to associate a first receipt time of the first user input and a second receipt time of the second user input with video data received from the camera to enable the video segment to be identified during a video post-processing operation. The controller may be further configured to store a first indication of the first user input and a second indication of the second user input to enable the video segment to be edited during the video post-processing operation.

The first user input and the second user input may have a single input type. The single input type may be one of an audio type that is received via a microphone coupled to the chassis, a visual type that is received via the camera, or a jaw movement type that is received via a sensor coupled to the chassis.

The first user input may indicate a beginning of a deletion operation to be applied to the video segment and where the second user input indicates an end of the deletion operation. The first user input may indicate a beginning of a video-to-still-image conversion operation to be applied to the video segment and the second user input may indicate an end of the video-to-still-image conversion operation.

The controller may be configured to associate a third receipt time of a third user input, the third receipt time after the first receipt time and before the second receipt time, with an offset of a beginning of an extended video segment that begins prior to the first receipt time. A time difference between the first receipt time and the third receipt time may correspond to a time difference between the beginning of the extended video segment and the beginning of the video segment.

A method may be performed at a device including a camera and a chassis that is configured to support the camera while the chassis is worn on the head of a user. The method may include receiving, during a video recording operation of the camera, a first user input corresponding to a beginning of a video segment and a second user input corresponding to an ending of the video segment, and associating a first receipt time of the first user input and a second receipt time of the second user input with video data received from the camera to enable the video segment to be identified during a video post-processing operation.

The method may include associating a third receipt time of a third user input, the third receipt time after the first receipt time and before the second receipt time, with an offset of a beginning of an extended video segment that begins prior to the first receipt time, where a time difference between the first receipt time and the third receipt time corresponds to a time difference between the beginning of the extended video segment and the beginning of the video segment. The method may include storing a first indication of the first user input and a second indication of the second user input to enable the video segment to be edited during the video post-processing operation.

As a non-limiting example, the apparatus may correspond to, and the method may be performed by, the NANDeye headgear 102 depicted in FIG. 31 operating in accordance with the description of FIG. 11.

In accordance with one or more of the above-described embodiments and methods, an apparatus may include a camera and a processor coupled to the camera, where the processor is configured to process video data received from the camera to determine whether the video data may include a hand gesture instruction by comparing a time-varying pattern of brightness of the video data to pattern of brightness that is characteristic of at least a portion of a user's hand being passed across a field of view of the camera, and where in response to detecting the hand gesture instruction the processor is configured to process the hand gesture instruction.

A method may be performed at a device including a camera. The method may include processing video data received from the camera to determine whether the video data may include a hand gesture instruction by comparing a time-varying pattern of brightness of the video data to a pattern of brightness that is characteristic of at least a portion of a user's hand being passed across a field of view of the camera, and processing the hand gesture instruction in response to detecting the hand gesture instruction.

As a non-limiting example, the apparatus may correspond to, and the method may be performed by, the NANDeye headgear 102 depicted in FIG. 31 operating in accordance with the description of one or more of FIGS. 22 and 57-60.

In accordance with one or more of the above-described embodiments and methods, an apparatus may include a camera and a processor coupled to the camera, where the processor is configured to process video data received from the camera to determine whether the video data may include an image of a barcode, and where in response to detecting the image of the barcode the processor is configured to translate the barcode to determine a content of the barcode and to control at least one of a camera parameter or a video data processing parameter based on the content of the barcode. In response to the content of the barcode indicating that video recording is unallowed, the processor may be configured to prevent storage of at least a portion of the video data and/or erasing at least the portion of the video data.

A method may be performed at a device including a camera. The method may include processing video data received from the camera to determine whether the video data may include an image of a barcode, and in response to detecting the image of the barcode, translating the barcode to determine a content of the barcode and to control at least one of a camera parameter or a video data processing parameter based on the content of the barcode. The method may include, in response to the content of the barcode indicating that video recording is unallowed, at least one of preventing storage of at least a portion of the video data and erasing at least the portion of the video data.

As a non-limiting example, the apparatus may correspond to, and the method may be performed by, the NANDeye headgear 102 depicted in FIG. 31 operating in accordance with the description of one or more of FIGS. 12 and 63-64.

In accordance with one or more of the above-described embodiments and methods, an apparatus may include a camera and a processor coupled to the camera, where the processor is configured to process video data received from the camera to determine whether the video data may include a modulated light signal of a predetermined modulation type, and where in response to detecting the modulated light signal the processor is configured to demodulate the modulated light signal to determine a content of the modulated light signal and to control at least one of a camera parameter or a video data processing parameter based on the content of the modulated light signal. In response to the content of the modulated light signal indicating that video recording is prohibited, the processor may be configured to prevent storage of at least a portion of the video data. The light source in the field of view of the camera may include a light emitting diode (LED).

A method may be performed at a device including a camera. The method may include processing video data received from the camera to determine whether the video data may include a modulated light signal of a predetermined modulation type, and in response to detecting the modulated light signal, demodulating the modulated light signal to determine a content of the modulated light signal and controlling at least one of a camera parameter or a video data processing parameter based on the content of the modulated light signal. The method may include preventing storage of at least a portion of the video data in response to the content of the modulated light signal indicating that video recording is prohibited. The light source in the field of view of the camera may include a light emitting diode (LED).

As a non-limiting example, the apparatus may correspond to, and the method may be performed by, the NANDeye headgear 102 depicted in FIG. 31 operating in accordance with the description of FIG. 45.

In accordance with one or more of the above-described embodiments and methods, an apparatus may include a hairband, a first camera attached to the hairband, and a second camera attached to the hairband, where the hairband is configured to support the first camera and the second camera substantially at an eye level of a user while the hairband is worn on a head of the user.

A method may be performed at a hairband that may include a memory, a first camera, and a second camera, where the hairband is configured to support the first camera and the second camera substantially at an eye level of a user while the hairband is worn on the head of the user. The method may include initiating video recording via at least one of the cameras, and storing video data from the at least one camera in the memory.

As a non-limiting example, the apparatus may correspond to, and the method may be performed by, the NANDeye headgear 102 depicted in FIG. 31.

In accordance with one or more of the above-described embodiments and methods, an apparatus may include a chassis, a camera attached to the chassis, a beacon emitter attached to the chassis, and a controller coupled to the camera and configured to process video data from the camera to identify whether a beacon signal of another beacon emitter is received by the camera. The controller may be configured to process the video data during a video capture operation of the camera to identify in real-time or near real-time whether the beacon is received. The controller may be configured to process the video data during a post-processing operation after the video data has been stored to a memory device to identify whether the beacon is received. The beacon emitter may be configured to emit visible light. The visible light may be amplitude-modulated. The visible light may be color-modulated. The beacon emitter may be configured to generate a beacon signal having a frequency outside a visible light spectrum.

The apparatus may further include a second beacon emitter coupled to the chassis, where a first beacon signal of the beacon emitter differs from a second beacon signal of the second beacon emitter to enable the first beacon signal to be identified as corresponding to the beacon emitter and the second beacon signal to be identified as corresponding to the second beacon emitter.

A method may be performed at a device including a chassis, a camera attached to the chassis, and a beacon emitter attached to the chassis. The method may include receiving video data from the camera, and processing the received video data to identify whether a beacon signal of another beacon emitter is received by the camera. The method may include processing the video data during a video capture operation of the camera to identify in real-time or near real-time whether the beacon is received.

The device may include a memory device, and the method may include processing the video data during a post-processing operation after the video data has been stored to the memory device to identify whether the beacon is received. The beacon emitter may be configured to emit visible light. The visible light may be amplitude-modulated. The visible light may be color-modulated. The beacon emitter may be configured to generate a beacon signal having a frequency outside a visible light spectrum.

As a non-limiting example, the apparatus may correspond to, and the method may be performed by, the NANDeye headgear 102 depicted in FIG. 31 operating in accordance with the description of FIG. 25.

In accordance with one or more of the above-described embodiments and methods, an apparatus may include a first beacon emitter, a first camera, and a processor coupled to the camera, where the processor is configured to process video data from the first camera to determine whether a modulated beacon signal of a second beacon emitter coupled to a second camera is detected in a field of view of the first camera.

The processor may be configured to process the video data during a video capture operation of the first camera to determine in real-time or near real-time whether the modulated beacon signal is detected. The processor may be configured to process the video data during a post-processing operation after the video data has been stored to a memory device to determine whether the modulated beacon signal is received. In response to detecting the modulated beacon signal, the processor may be configured to demodulate the modulated beacon signal.

In response to detecting the modulated beacon signal, the processor may be configured to determine a direction to a source of the modulated beacon signal. The processor may be further configured to determine an orientation estimate of the second camera.

In response to detecting the modulated beacon signal and a second modulated beacon signal in the video data, the processor may be configured to determine a distance estimate from the first camera to a beacon base that is coupled to the second beacon emitter and that is coupled to a third beacon emitter that is a source of the second modulated beacon signal.

The processor may be further configured to modify the video data to indicate an estimated field of view of the second camera based on the distance estimate.

A method may be performed at a device including a first beacon emitter and a first camera. The method may include receiving video data from the first camera, and processing the received video data to determine whether a modulated beacon signal of a second beacon emitter coupled to a second camera is detected in a field of view of the first camera.

The method may include processing the video data during a video capture operation of the first camera to determine in real-time or near real-time whether the modulated beacon signal is detected. The method may include processing the video data during a post-processing operation after the video data has been stored to a memory device to determine whether the modulated beacon signal is received. The method may include demodulating the modulated beacon signal in response to detecting the modulated beacon signal. The method may include, in response to detecting the modulated beacon signal, determining a direction to a source of the modulated beacon signal. The method may include determining an orientation estimate of the second camera. The method may include, in response to detecting the modulated beacon signal and a second modulated beacon signal in the video data, determining a distance estimate from the first camera to a beacon base that is coupled to the second beacon emitter and that is coupled to third beacon emitter that is a source of the second modulated beacon signal. The method may include modifying the video data to indicate an estimated field of view of the second camera based on the distance estimate.

As a non-limiting example, the apparatus may correspond to, and the method may be performed by, the NANDeye headgear 102 depicted in FIG. 31 operating in accordance with the description of one or more of FIGS. 25, 39, and 41.

In accordance with one or more of the above-described embodiments and methods, a server may include a processor coupled to a memory and a network interface coupled to the processor. The memory includes a video storage module that is executable by the processor to receive video data via the network interface and to store the received video data in the memory, a search module that is executable by the processor to receive location data and time data and to locate stored video data corresponding to the received location data and time data, and a search communication module that is executable by the processor to receive a request via the network interface, the request including the location data and time data, and to send the located video data to a requestor via the network interface.

A method may be performed at a server. The method may include receiving a request including location data and time data, locating stored video data corresponding to the received location data and time data, and sending the located video data to a requestor.

As a non-limiting example, the server may correspond to, and the method may be performed by, a server operating in accordance with a social network server according to the description of FIG. 28.

In accordance with one or more of the above-described embodiments and methods, an apparatus may include a video data processor configured to receive first video data recorded by a first camera and to process the first video data according to an operation of detection of a camera device, a communication device coupled to the video data processor and configured to send a request to a video data server for second video data recorded by a second camera, the request indicating camera location data and recording time data generated by the operation. The communication device is further configured to receive the second video data of the video data server corresponding to a video recording by the second camera when the second camera was at a location corresponding to the camera location data during a time corresponding to the recording time data. The communication device may include a display device configured to display the received second video data.

Detection of the second camera and receipt of the second video data based on the camera location data and the recording data time may enable a viewer of the first video data to obtain video content captured by the second camera without the viewer having access to an identification of the second camera or an identification of an owner of the second camera.

A method may be performed at a device including a video data processor, a communication device, and a display device. The method may include receiving first video data recorded by a first camera and processing the first video data according to an operation to detect camera devices, sending a request to a video data server for second video data recorded by a second camera, the request indicating camera location data and recording time data generated by the operation, and receiving the second video data of the video data server corresponding to a video recording by the second camera when the second camera was at a location corresponding to the camera location data during a time corresponding to the recording time data.

As a non-limiting example, the apparatus may correspond to, and the method may be performed by, a computer such as the computer illustrated in FIG. 30, programmed to interact with a NANDeye social network such as described with respect to FIG. 28.

In accordance with one or more of the above-described embodiments and methods, an apparatus may include a housing dimensioned to accommodate a battery in a battery housing location, a battery connector positioned to electrically couple to a first battery while the first battery is positioned in the battery housing location, and a make-before-break switch connected to the battery connector and configured to establish a second electrical connection with a second battery prior to breaking a first electrical connection with the first battery to enable the first battery to be replaced in the battery housing location with another battery, where the second battery has substantially a same capacity as the first battery.

A method may be performed at a device including a housing, a battery connector, a battery housing location, a first battery, a second battery, and a make-before-break switch connected to the battery connector, where the housing is dimensioned to accommodate the first battery in the battery housing location. The method may include establishing a first electrical connection with the first battery while the first battery is positioned in the battery housing location, and establishing a second electrical connection with the second battery prior to breaking the first electrical connection with the first battery to enable the first battery to be replaced in the battery housing location with another battery, where the second battery has substantially a same capacity as the first battery.

As a non-limiting example, the apparatus may correspond to, and the method may be performed by, NANDeye headgear 102 including a multi-battery housing and MBB switch such as described with respect to FIGS. 7-8.

In accordance with one or more of the above-described embodiments and methods, an apparatus may include a housing, a battery connector positioned to electrically couple to a battery while the battery is positioned in a battery housing location in the housing, an inserter configured to insert a first battery into the battery housing location, and a collector configured to receive a second battery that is ejected in response to insertion of the first battery into the battery housing location.

A method may be performed at a device including a housing, a battery connector, a battery housing location in the housing, an inserter, and a collector. The method may include inserting, via the inserter, a first battery into the battery housing location, where the battery connector electrically couples to the first battery upon insertion of the first battery into the battery housing location, and receiving, via the collector, a second battery that is ejected in response to insertion of the first battery into the battery housing location.

As a non-limiting example, the apparatus may correspond to, and the method may be performed by, NANDeye headgear 102 including a multi-battery housing connected to a changer such as described with respect to FIGS. 8 and 43.

In accordance with one or more of the above-described embodiments and methods, an apparatus may include a battery holder having a chamber dimensioned to hold multiple batteries and having an opening to enable batteries to be sequentially loaded into the chamber or to be sequentially removed from the chamber via the opening, the battery holder configured to be attached to a housing to provide at least one of a supply of batteries to be sequentially inserted into the housing for powering an electronic device or a container to collect discarded batteries that are ejected from the housing.

A method may be performed at a battery holder having a chamber dimensioned to hold multiple batteries and having an opening to enable batteries to be sequentially loaded into the chamber or to be sequentially removed from the chamber via the opening. The method may include performing, while the battery holder is attached to a housing, at least one of providing a battery from the chamber to the housing via the opening, and receiving an ejected battery from the housing via the opening.

As a non-limiting example, the apparatus may correspond to, and the method may be performed by, a battery changer such as described with respect to FIGS. 8 and 43.

In accordance with one or more of the above-described embodiments and methods, an apparatus may include a housing having a first battery location and a second battery location, a switch configurable to electrically couple to at least one of a first battery and a second battery while the first battery is in the first battery location and the second battery is in the second battery location, and a battery replacer configured to insert another battery into the first battery location or into the second battery location and to receive an ejected one of the first battery from the first battery location or the second battery from the second battery location.

A method may be performed at a device including a housing having a first battery location and a second battery location, a switch configurable to electrically couple to at least one of the first battery and the second battery while the first battery is in the first battery location and the second battery is in the second battery location, and a battery replacer. The method may include inserting another battery into the first battery location or into the second battery location, and receiving an ejected one of the first battery from the first battery location or the second battery from the second battery location.

As a non-limiting example, the apparatus may correspond to, and the method may be performed by, a NANDeye headgear 102 with a multi-battery housing that can be coupled to a battery changer such as described with respect to FIGS. 7-8 and 43.

In accordance with one or more of the above-described embodiments and methods, a server may include a processor coupled to a memory, and a network interface coupled to the processor. The memory may include a video storage module that is executable by the processor to receive video data via the network interface and to store the received video data in the memory, a metadata storage module that is executable by the processor to receive metadata via the network interface and to store the metadata in the memory, the metadata including location and camera orientation data corresponding to the received video data, and a search module that is executable by the processor to receive coordinate data and to locate stored video data corresponding to the received coordinate data based on the metadata, the search module further configured to process the located video data to determine whether a beacon signal indicative of a video recording device is detected in the located video data.

The search module may enable remote users of a video sharing social network to search for video content that is recorded by other users of the video sharing social network and stored in the memory based on location of recording of the video content.

A method may be performed at a server including a processor, a memory coupled to the processor, and a network interface coupled to the processor. The method may include receiving video data via the network interface and storing the received video data in the memory, receiving metadata via the network interface and storing the metadata in the memory, the metadata including location and camera orientation data corresponding to the received video data, receiving coordinate data and locating stored video data corresponding to the received coordinate data based on the metadata, and processing the located video data to determine whether a beacon signal indicative of a video recording device is detected in the located video data. Receiving the coordinate data and processing the located video data may enable remote users of a video sharing social network to search for video content that is recorded by other users of the video sharing social network and stored in the memory based on location of recording of the video content.

As a non-limiting example, the server may correspond to, and the method may be performed by, a server operating in accordance with a social network server according to the description of FIG. 28.

In accordance with one or more of the above-described embodiments and methods, an apparatus may include a beacon emitter configured to transmit a modulated beacon signal, the modulated beacon signal including an encoded message, a camera, and a processor coupled to the camera and to the beacon emitter. The processor is configured to process video data from the camera to detect a received message from another device and to decode the received message to be displayed via a user interface. The processor is further configured to encode user data received via the user interface to be transmitted via the modulated beacon signal. The apparatus may also include the user interface. The apparatus may include a wireless interface coupled to the processor and configured to enable wireless communication with a mobile electronic device that may include the user interface.

A method may be performed at a device including a beacon emitter and a camera, the beacon emitter configured to transmit a modulated beacon signal, the modulated beacon signal including an encoded message. The method may include processing video data from the camera to detect a received message from another device and to decode the received message to be displayed via a user interface, and encoding user data received via the user interface to be transmitted via the modulated beacon signal. The device may include the user interface. The device may include a wireless interface, and the method may include wirelessly communicating with a mobile electronic device that may include the user interface.

As a non-limiting example, the apparatus may correspond to, and the method may be performed by, a NANDeye headgear 102 such as described with respect to one or more of FIGS. 27 and 71.

In accordance with one or more of the above-described embodiments and methods, an apparatus may include a memory and a processor configured to process video data to locate a predetermined graphical feature in the video data and to store an updated version of the video data in the memory, where one or more frames of the video data identified as including the predetermined graphical feature are modified or removed upon storing the updated version of the video data.

A method may be performed at a device including a memory. The method may include receiving video data, and processing the received video data to locate a predetermined graphical feature in the video data and to store an updated version of the video data in the memory, where one or more frames of the video data identified as including the predetermined graphical feature are modified or removed upon storing the updated version of the video data.

As a non-limiting example, the apparatus may correspond to, and the method may be performed by, a NANDeye headgear 102 such as described with respect to one or more of FIGS. 12, 44, and 63-64. As other examples, the apparatus may include a device programmed to execute NANDeye video processing, such as the phone 106 and/or computer of FIG. 1.

In accordance with one or more of the above-described embodiments and methods, an apparatus may include a memory and a processor configured to process video data to locate a predetermined graphical feature in the video data and to store an updated version of the video data in the memory, where a segment of the video data that may include multiple frames within a determined proximity to a located frame is removed upon storing the updated version of the video data in response to the located frame being identified as including the predetermined graphical feature.

A method may be performed at a device including a memory. The method may include receiving video data, and processing the received video data to locate a predetermined graphical feature in the video data and to store an updated version of the video data in the memory, where a segment of the video data that may include multiple frames within a determined proximity to a located frame is removed upon storing the updated version of the video data in response to the located frame being identified as including the predetermined graphical feature.

As a non-limiting example, the apparatus may correspond to, and the method may be performed by, a NANDeye headgear 102 such as described with respect to one or more of FIGS. 12, 44, and 63-64. As other examples, the apparatus may include a device programmed to execute NANDeye video processing, such as the phone 106 and/or computer of FIG. 1.

In accordance with one or more of the above-described embodiments and methods, an apparatus may include a sensor operable to detect a photography-prohibited message while a source of the photography-prohibited message is within an operation range of the sensor, and a controller configured to generate a camera disable signal in response to an output of the sensor indicating detection of the photography-prohibited message.

A method may be performed at a device including a sensor. The method may include detecting a photography-prohibited message while a source of the photography-prohibited message is within an operation range of the sensor, and generating a camera disable signal in response to an output of the sensor indicating detection of the photography-prohibited message.

As a non-limiting example, the apparatus may correspond to, and the method may be performed by, a NANDeye headgear 102 such as described with respect to FIG. 45.

In accordance with one or more of the above-described embodiments and methods, an apparatus may include a memory and a processor configured to process video data to detect a particular property of a beacon signal in the video data and to store an updated version of the video data in the memory, where the processor is configured to modify the video data to obscure parts of an image represented by the video data that have predetermined properties within a determined distance from a source of a detected beacon signal having the particular property. The parts may be human body parts. The parts may be faces. The processor may be further configured to apply a watermark to the updated version of the video data to tag the video data.

A method may be performed at a device including a memory. The method may include receiving video data, processing the received video data to detect a particular property of a beacon signal in the video data and to store an updated version of the video data in the memory, and modifying the video data to obscure parts of an image represented by the video data that have predetermined properties within a determined distance from a source of a detected beacon signal having the particular property. The parts may be human body parts. The parts may be faces. The method may include applying a watermark to the updated version of the video data in response to tag the video data.

As a non-limiting example, the apparatus may correspond to, and the method may be performed by, a NANDeye headgear 102 such as described with respect to FIG. 45. As other examples, the apparatus may include a device programmed to execute NANDeye video processing, such as the phone 106 and/or computer of FIG. 1.

In accordance with one or more of the above-described embodiments and methods, an apparatus may include a camera and a directional beacon emitter configured to transmit a beacon signal having a field of transmission that substantially corresponds to a field of view of the camera, where a detectable signal strength of the beacon signal is substantially above a particular threshold within the field of view of the camera and where the detectable signal strength of the beacon signal is substantially below the particular threshold outside of the field of view of the camera.

A method may be performed at a device including a camera and a directional beacon emitter. The method may include activating the camera, and transmitting a beacon signal having a field of transmission that substantially corresponds to a field of view of the camera, where a detectable signal strength of the beacon signal is substantially above a particular threshold within the field of view of the camera and where the detectable signal strength of the beacon signal is substantially below the particular threshold outside of the field of view of the camera.

As a non-limiting example, the apparatus may correspond to, and the method may be performed by, a NANDeye headgear 102 such as described with respect to FIG. 65.

In accordance with one or more of the above-described embodiments and methods, an apparatus may include a beacon emitter configured to transmit a beacon signal substantially omnidirectionally, and a mounting structure attached to the beacon emitter and configured to, while the mounting structure is worn on a user's head, position the beacon emitter at an elevation higher than the top of the user's head.

A method may be performed at a head mountable device that may include a mounting structure that is configured to be worn on a user's head and to hold a beacon emitter. The method may include performing, while the head mountable device is worn on a user's head, supporting the beacon emitter at an elevation higher than a top of the user's head, and transmitting a beacon signal substantially omnidirectionally.

As a non-limiting example, the apparatus may correspond to, and the method may be performed by, a NANDeye headgear 102 such as described with respect to FIG. 65.

In accordance with one or more of the above-described embodiments and methods, an apparatus may include a camera, a first beacon emitter configured to transmit a first beacon signal, where the first beacon signal comprises light having a frequency in a visible spectrum and where the first beacon emitter is configured to directionally transmit the first beacon signal to produce a field of transmission that substantially corresponds to a field of view of the camera, and a second beacon emitter configured to transmit a second beacon signal, where the second beacon signal is substantially devoid of components outside of the visible spectrum and where the second beacon emitter is configured to transmit the second beacon signal substantially omnidirectionally.

A method may be performed at a device including a camera, a first beacon emitter, and a second beacon emitter. The method may include directionally transmitting a first beacon signal to produce a field of transmission that substantially corresponds to a field of view of the camera, where the first beacon signal comprises light having a frequency in a visible spectrum, and transmitting a second beacon signal substantially omnidirectionally, where the second beacon signal is substantially devoid of components outside of the visible spectrum.

As a non-limiting example, the apparatus may correspond to, and the method may be performed by, a NANDeye headgear 102 such as described with respect to FIG. 65.

In accordance with one or more of the above-described embodiments and methods, an apparatus may include a camera, a processor configured to process video data of the camera to determine whether one or more blinking beacon signals are detected in the video data, where in response to determining a blinking beacon signal is detected in the video data the processor is configured to generate a signal that is substantially synchronized with a blinking pattern of a particular detected blinking beacon signal, and a speaker coupled to receive the generated signal and to produce an audio signal that is substantially synchronized with the blinking pattern.

The processor may be further configured, in response to receiving a first user input indicating that the particular detected blinking beacon signal is a signal of interest, to track the particular detected blinking beacon signal, and in response to receiving a second user input indicating that the particular detected blinking beacon signal is not a signal of interest, to produce another audio signal that is substantially synchronized with another blinking beacon signal in the video data.

A method may be performed at a device including a camera and a speaker. The method may include processing video data of the camera to determine whether one or more blinking beacon signals are detected in the video data, and in response to determining a blinking beacon signal is detected in the video data, generating a signal that is substantially synchronized with a blinking pattern of a particular detected blinking beacon signal, and receiving the generated signal and producing an audio signal that is substantially synchronized with the blinking pattern.

The method may include, in response to receiving a first user input indicating that the particular detected blinking beacon signal is a signal of interest, tracking the particular detected blinking beacon signal. The method may include, in response to receiving a second user input indicating that the particular detected blinking beacon signal is not a signal of interest, producing another audio signal that is substantially synchronized with another blinking beacon signal in the video data.

As a non-limiting example, the apparatus may correspond to, and the method may be performed by, a NANDeye headgear 102 configured to operate in a manner such as described with respect to one or more of FIGS. 66-67.

In accordance with one or more of the above-described embodiments and methods, an apparatus may include a processor configured to send a message to be stored at a server and to be retrievable via access to the server using a network resource indicator, and a beacon coupled to the processor and configured to receive information corresponding to the network resource indicator and to transmit the information corresponding to the network resource indicator via modulation of a beacon signal. The network resource indicator may include a uniform resource locator (URL).

A method may be performed at a device including a beacon. The method may include sending a message to be stored at a server and to be retrievable via access to the server using a network resource indicator, and receiving information corresponding to the network resource indicator and transmitting the information corresponding to the network resource indicator via modulation of a beacon signal. The network resource indicator may include a uniform resource locator (URL).

As a non-limiting example, the apparatus may correspond to, and the method may be performed by, a portable electronic device, such as a phone 106, configured to operate in a manner such as described with respect to the operation of the phone 106 in the flowchart of FIG. 68 or the first user's phone (B) of FIG. 71.

In accordance with one or more of the above-described embodiments and methods, an apparatus may include a processor configured to send a message to be stored at a server and to be retrievable via access to the server using a network resource indicator, where the processor is further configured to encode the network resource indicator according to a fountain code to generate encoded network resource information. The apparatus may also include a beacon coupled to the processor and configured to transmit the encoded network resource information via modulation of a beacon signal. The network resource indicator may include a uniform resource locator (URL).

A method may be performed at a device including a beacon. The method may include sending a message to be stored at a server and to be retrievable via access to the server using a network resource indicator, encoding the network resource indicator according to a fountain code to generate encoded network resource information, and transmitting the encoded network resource information via modulation of a beacon signal. For example, a fountain code may include an erasure code where a sequence of encoding symbols can be generated from a given set of source symbols such that the original source symbols may be recovered from any subset of the encoding symbols of size equal to, or slightly larger than, the number of source symbols, without using a fixed code rate, such as a Raptor code.

Transmission of a message using a fountain code may include sending a stream parity bits corresponding to the message. For example, at each stage of transmission, a set of bits may be chosen from the message, operated upon (e.g., XOR the chosen bits together), and transmit the result. If a receiving NANDeye can detect the transmitted signal without errors, then once a sufficient number of parity bits have been transmitted to enable recovery of the message, the receiving NANDeye can decode the parity bits to recover the message. If the receiving NANDeye is further away, or experiences noise in detection of the signal, the receiving NANDeye may miss one or more of the parity bits, and so one or more additional parity bits will be required to be received before decoding of the message may be accomplished.

The network resource indicator may include a uniform resource locator (URL). As a non-limiting example, the apparatus may correspond to, and the method may be performed by, a NANDeye headgear 102 configured to operate in a manner such as described with respect to the operation of the NANDeye headgear 102 in the flowchart of FIG. 68 or the first user's phone (B) of FIG. 71.

Fountain codes may be used in conjunction with a NANDeye beacon in various embodiments. For example, as described above, one or more fountain codes may be used to transmit network resource information to locate a message. In other embodiments, the message itself (rather than a message locator) may be encoded and transmitted by a NANDeye beacon using one or more fountain codes.

To illustrate, a user with a NANDeye may use a NANDeye beacon to transmit a message (e.g., "I want to sell my bike"). Other NANDeye users that are in line of sight with the user of the transmitting NANDeye and seeing its beacon may be automatically recording this message with their NANDeye (e.g., during video logging). One or more of the users may receive an instantaneous alert on this message (e.g., on their cell phone screen). Alternatively, one or more of the users may view the message at a later time, such as when they watch the video and then see various "hidden" messages in it. The alert (e.g., in the form of a message "balloon" on the recorded video, such as illustrated in FIG. 69) can be generated by analyzing the recorded video, decoding the "hidden" messages, and displaying the decoded messages on the screen. This may be done either by an application on the phone 106, or by a network service.

Because each receiving user may see the transmitting user (e.g., be in line of sight) for a different amount of time and with a different quality (e.g., far vs. near, or in a center of a field of view vs. in a periphery of the field of view, as illustrative examples) and may also start receiving the message at a different time, use of fountain codes enable each user's NANDeye to start "collecting" transmitted symbols (i.e., picture frames with the beacon) at any time and once the user's NANDeye "collects" a sufficient number of symbols (collect any K symbols or slightly more for a K symbol message), the user's NANDeye can decode the message. Thus, message broadcast via fountain codes enables delivery of a message broadcast to multiple users, each user experiencing a different channel quality and with no synchronization.

A user of NANDeye may "broadcast" a short message to be received by anyone in his line of sight. The user may enter the message (possibly using the user's phone 106) and the NANDeye system may either encode the message text and transmits the message via a NANDeye beacon, or store the message to a dedicated URL, encode the URL as text, and transmit the URL via the NANDeye beacon.

Any NANDeye user that sees the transmitting beacon may detect that there is a message, isolate the message from the surrounding noise by filtering to the specific angle (e.g., azimuth and elevation) of the desired beacon, and decoding and/or recording the encoded message. If the message was a URL, the receiving NANDeye can access the URL and retrieve the message. The decoded message can be displayed as a balloon over the transmitter's image in off-line display.

In accordance with one or more of the above-described embodiments and methods, an apparatus may include a memory, a video player configured to display video content corresponding to video data stored at the memory, a beacon detector configured to process the video data to determine whether one or more beacon signals are detected in the video data, a beacon translator configured to determine a message corresponding to a detected beacon signal in response to receiving an output from the beacon detector indicating the detected beacon signal, and a display interface configured to display the message at a display device.

The display interface may be configured to display the message via insertion of graphical or textual data during playback of the video content. The display interface may be configured to display the message to appear as a bubble in the video content. The display interface may be configured to display the message to appear as a caption during playback of the video content.

The beacon translator may be configured to perform a demodulation operation to determine a network resource indicator and to cause a network access request for the message to be sent to a server corresponding to the network resource indicator.

A method may be performed at a device including a memory, a video player, a beacon detector, a beacon translator, and a display device. The method may include displaying video content corresponding to video data stored at the memory, processing the video data to determine whether one or more beacon signals are detected in the video data, determining a message corresponding to a detected beacon signal in response to receiving an output indicating the detected beacon signal, and displaying the message at the display device.

The device may include a display interface, and the method may include displaying the message via the display interface via insertion of graphical or textual data during playback of the video content. The device may include a display interface, and the method may include displaying the message via the display interface to appear as a bubble in the video content. The device may include a display interface, and the method may include displaying the message via the display interface to appear as a caption during playback of the video content. The method may include performing a demodulation operation to determine a network resource indicator and to cause a network access request for the message to be sent to a server corresponding to the network resource indicator.

As a non-limiting example, the apparatus may correspond to, and the method may be performed by, an electronic device, such as a phone 106, configured to operate in a manner such as described with respect to the operation of the phone 106 in the flowchart of FIG. 68 or the second user's phone (D) of FIG. 71, and/or to display messages as bubbles appearing in the video data such as illustrated in FIG. 69.

In accordance with one or more of the above-described embodiments and methods, an apparatus may include a memory, an event detection search engine configured to process video data of a head-mounted camera according to one of more filters to detect occurrences in the video data of characteristics corresponding to one or more detectable events, and an event marker responsive to the event detection search engine to store an indication of detected events of the video data in the memory to enable location of the detected events during playback of the video data.

The one or more detectable events may include a hand substantially blocking a field of view in the video data. The one or more detectable events may include a repeated motion of a field of view. The repeated motion may correspond to motion of the head-mounted camera due to head nodding. The one or more detectable events may include a door slam in an audio portion of the video data. The one or more detectable events may include a starting of a car engine in an audio portion of the video data. The one or more detectable events may include a face of a person exceeding a threshold size in the video data.

A method may be performed at a device including a memory, an event detection search engine, and an event marker. The method may include processing video data of a head-mounted camera according to one of more filters to detect occurrences in the video data of characteristics corresponding to one or more detectable events, and storing an indication of detected events of the video data in the memory to enable location of the detected events during playback of the video data.

The one or more detectable events may include a hand substantially blocking a field of view in the video data. The one or more detectable events may include a repeated motion of a field of view. The repeated motion may correspond to motion of the head-mounted camera due to head nodding. The one or more detectable events may include a door slam in an audio portion of the video data. The one or more detectable events may include a starting of a car engine in an audio portion of the video data. The one or more detectable events may include a face of a person exceeding a threshold size in the video data.

As a non-limiting example, the apparatus may correspond to, and the method may be performed by, a device programmed to execute NANDeye video processing, such as the phone 106 and/or computer of FIG. 1.

In accordance with one or more of the above-described embodiments and methods, an apparatus may include a camera, a chassis that is configured to support the camera while the chassis is worn on a head of a user, a user tag interface configured to receive, during a video recording operation of the camera, user input corresponding to at least one of an audio signal corresponding to a spoken keyword detected by a microphone or user input text data received, via wireless transmission, from a mobile electronic device having a text entry interface, and a controller configured to store the user input in conjunction with video data of the camera during the video recording operation.

A method may be performed at a device including a camera, a chassis configured to support the camera while the chassis is worn on the head of a user, and a user tag interface. The method may include receiving, during a video recording operation of the camera, user input corresponding to at least one of an audio signal corresponding to a spoken keyword detected by a microphone or user input text data received, via wireless transmission, from a mobile electronic device having a text entry interface, and storing the user input in conjunction with video data of the camera during the video recording operation.

As a non-limiting example, the apparatus may correspond to, and the method may be performed by, NANDeye headgear 102.

In accordance with one or more of the above-described embodiments and methods, an apparatus may include a processor coupled to a memory storing video data, the memory further storing a video segmenter executable by the processor to divide the video data and to generate multiple segments of the video data, and a first filter executable by the processor to select one or more of the segments based on an estimation of a user interest of segment content.

The apparatus may include a second filter executable by the processor to identify, for each particular segment of the selected segments, a representative portion of the particular segment. The apparatus may include a third filter executable by the processor to determine a ranking of each the selected segments according to one or more prioritization criteria. The apparatus may include a combiner executable by the processor to generate and store a video file including the representative portions of the selected segments in an order of appearance in the video file matching an order of the ranking of each of the selected segments.

A method may be performed at a device including a memory storing video data. The method may include dividing the video data and generating multiple segments of the video data, and selecting one or more of the segments based on an estimation of a user interest of segment content.

The method may include identifying, for each particular segment of the selected segments a representative portion of the particular segment. The method may include determining a ranking of each the selected segments according to one or more prioritization criteria. The method may include generating and storing a video file including the representative portions of the selected segments in an order of appearance in the video file matching an order of the ranking of each of the selected segments.

As a non-limiting example, the apparatus may correspond to, and the method may be performed by, a computer configured to operate in a manner such as described with respect to FIG. 29.

In accordance with one or more of the above-described embodiments and methods, an apparatus may include a memory coupled to a processor, where the memory may include a first filter executable by the processor to identify, in video data, a feature remaining substantially in a center of a field of view of the video data for a duration exceeding a threshold, a second filter executable by the processor to identify, in the video data or in metadata corresponding to the video data, a bookmarking gesture, and a bookmarking detector executable by the processor to generate a bookmarking indicator in response to the second filter identifying the bookmarking gesture as being recorded while the feature is substantially in the center of the field of view and after threshold duration is exceeded.

A method may be performed that includes identifying, in video data, a feature remaining substantially in a center of a field of view of the video data for a duration exceeding a threshold, identifying, in the video data or in metadata corresponding to the video data, a bookmarking gesture, and generating a bookmarking indicator in response to identifying the bookmarking gesture as being recorded while the feature is substantially in the center of the field of view and after the threshold duration is exceeded.

In accordance with one or more of the above-described embodiments and methods, an apparatus may include a camera, a chassis that is configured to support the camera while the chassis is worn on the head of a user, a wireless interface configured to receive wireless audio data corresponding to recorded audio from a mobile electronic device, and a controller configured to, in response to receiving the wireless audio data during a video recording operation, synchronize and store the recorded audio from the mobile electronic device with video data received from the camera.

The controller may be configured to replace audio data received from the camera with the recorded audio from the mobile electronic device. The controller may be configured to merge audio data received from the camera with the recorded audio from the mobile electronic device.

A method may be performed at a device including a camera, a chassis configured to support the camera while the chassis is worn on a head of a user, and a wireless interface. The method may include receiving, via the wireless interface, wireless audio data corresponding to recorded audio from a mobile electronic device, and in response to receiving the wireless audio data during a video recording operation, synchronizing and storing the recorded audio from the mobile electronic device with video data received from the camera.

The method may include replacing audio data received from the camera with the recorded audio from the mobile electronic device. The method may include merging audio data received from the camera with the recorded audio from the mobile electronic device.

As a non-limiting example, the apparatus may correspond to, and the method may be performed by, a NANDeye headgear 102 configured to operate in a manner such as described with respect to FIG. 70.

In accordance with one or more of the above-described embodiments and methods, an apparatus may include a first beacon emitter configured to generate a first beacon signal having a first color, a second beacon emitter configured to generate a second beacon signal having a second color distinct from the first color, and a controller coupled to the first beacon emitter and to the second beacon emitter and configured to control first modulation of the first beacon signal to form a first data transmission channel and to control second modulation of the second beacon signal to form a second data transmission channel.

The apparatus may also include a third beacon emitter configured to generate a third beacon signal having a third color distinct from the first color and distinct from the second color, and where the controller is further configured to control modulation of the third beacon signal to form a third data transmission channel.

A method may be performed at a device including a first beacon emitter and a second beacon emitter. The method may include generating, at the first beacon emitter, a first beacon signal having a first color, generating, at the second beacon emitter, a second beacon signal having a second color distinct from the first color, and controlling a first modulation of the first beacon signal to form a first data transmission channel and controlling a second modulation of the second beacon signal to form a second data transmission channel.

The device may include a third beacon emitter, and the method may include generating, at the third beacon emitter, a third beacon signal having a third color distinct from the first color and distinct from the second color, and controlling a third modulation of the third beacon signal to form a third data transmission channel.

As a non-limiting example, the apparatus may correspond to, and the method may be performed by, a NANDeye headgear 102 including multiple beacon emitters.

In accordance with one or more of the above-described embodiments and methods, an apparatus may include a chassis that is configured to be worn on the head of a user, and a beacon emitter attached to the chassis and configured to transmit a beacon signal that is modulated to encode at least one of personal information or professional information corresponding to the user.

A method may be performed at a device including a beacon emitter and a chassis that is configured to be worn on a head of a user. The method may include transmitting a beacon signal, and modulating the beacon signal to encode at least one of personal information or professional information corresponding to the user.

As a non-limiting example, the apparatus may correspond to, and the method may be performed by, a NANDeye headgear 102.

Figure 72:
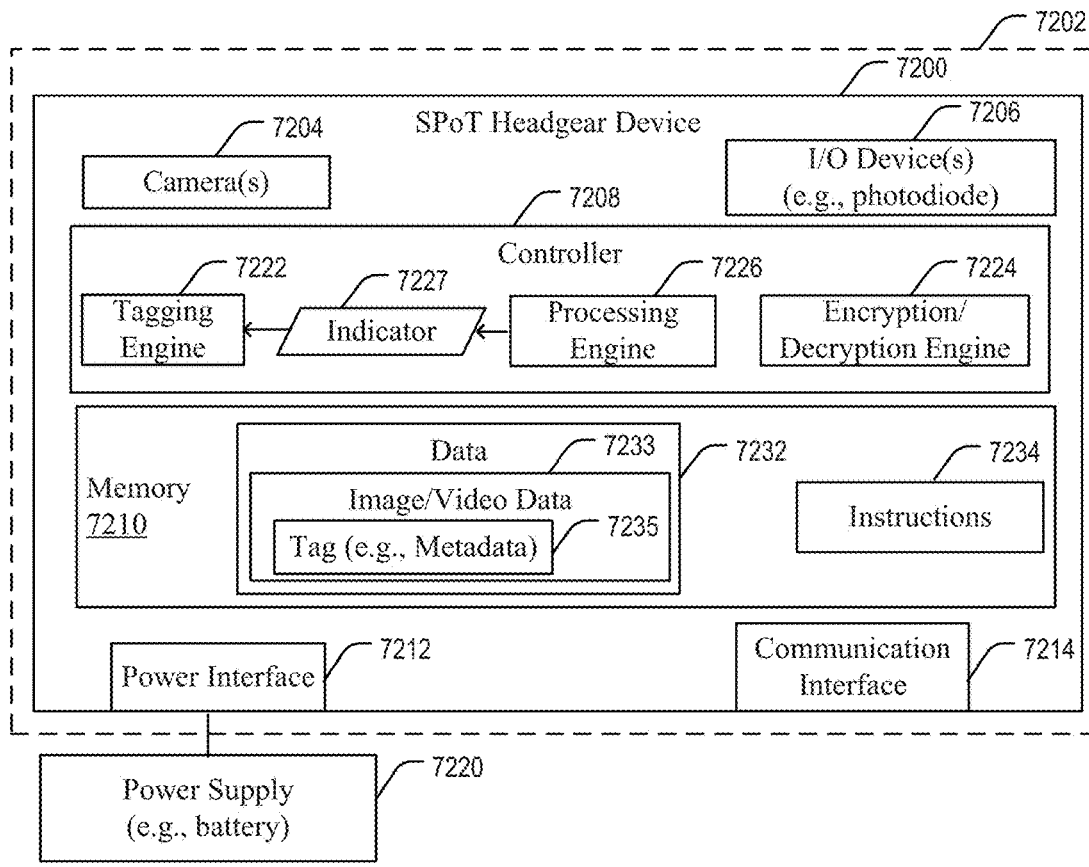
FIG. 72 is an illustration of a particular embodiment of a head-mountable camera apparatus.

FIG. 72 illustrates an example of a SPoT headgear device 7200. The SPoT headgear device 7200 may include or correspond to the headgear 102 of FIG. 1.

The SPoT headgear device 7200 may include one or more components, such as one or more cameras 7204, one or more input/output (I/O) device 7206 (e.g., a photodiode), a controller 7208 (e.g., a processor), a memory 7210, and one or more interfaces. The one or more interfaces may include a power interface 7212 and/or a communication interface 7214. The components of the SPoT headgear device 7200 may be included in or attached to a body 7202, such as a frame, a chassis, or a housing structure of the SPoT headgear device 7200. One or more components of the SPoT headgear device 7200 may be powered by a power source 7220. The SPoT headgear device 7200 may include and/or be configured to receive power from the power source 7220. For example, the power source 7220 may include one or more batteries that are rechargeable and/or replaceable.

The body 7202 may be configured to be worn on a head of a user. For example, the body 7202 may include a mounting structure that is configured to be placed on the head of the user. To illustrate, the body 7202 may be a suitable material, structure, and/or shape to enable the body 7202 to be worn by a user of the SPoT headgear device 7200. The body 7202 may be adjustable in size to accommodate of a range of head sizes. The body 7202 may be constructed in a variety of shapes and designs. For example, the body 7202 may be configured as the headgear 102 of FIG. 1 having the hairband configuration of FIG. 2. As another example, the body may be configured to wrap around a portion or all of the head of the user. To illustrate, the body 7202 may be supported on the head of the user by the user's ears and may wrap around a rear of the head. As another example, the body 7202 may be incorporated into a head covering, such as a hat, helmet, etc. While the mounting structure is on a user's head, the mounting structure may be configured to at least partially wrap around a back of the user's head, and to position the one or more cameras 7204 to be substantially or entirely at approximately an eye level of the user.

The one or more cameras 7204 may be configured to generate image data and/or video data. For example, the video data may include multiple frames and each frame may correspond to an image having corresponding image data. The image data and/or the video data may be associated with a field of view of the user. The one or more cameras 7204 may include or correspond to the cameras 1710, 1712 of FIG. 17, the cameras 3002 of FIG. 30, the right camera 3120 and the left camera 3130 of FIG. 31, the cameras 3606 of FIG. 36, the camera 3714 of FIG. 37, the cameras 4202 of FIG. 42, the left camera 4602 and the right camera 4604 of FIG. 46, the left camera 5002 and the right camera 5004 of FIG. 50, the cameras 5202, 5204 of FIG. 52, the SPoT camera 5416 of FIG. 54, or the camera 6518 of FIG. 71, as illustrative, non-limiting examples.

As an illustrative, non-limiting example, the one or more cameras 7204 may include a first camera and a second camera that are configurable to operate according to a stereo recording mode, such that a first output of the first camera and a second output of the second camera are synchronized in time. The first camera may produce, from a first perspective, first image data and/or first video data of a first portion a scene of interest. The second camera may produce, from a second perspective, second image data and/or second video data of a second portion the scene of interest. Accordingly, the first camera and the second camera may each record the scene of interest from a different perspective.

The one or more I/O devices 7206 may include a sensor and/or a device. A sensor may include a biological sensor or an environmental sensor, as illustrative, non-limiting examples. One or more biological sensors may be configured to measure or detect a pulse rate, a blood pressure, a galvanic skin response (GSR), brain wave activity, a respiration rate, a palpitation, an arrhythmia, a hiccup, a temperature (e.g., a fever), etc., as illustrative, non-limiting examples. One or more environmental sensors may measure or detect light intensity, barometric pressure, temperature, humidity, acceleration, location, inclination, etc., as illustrative, non-limiting examples. Other sensors may be configured to detect movement of the head or face of the user, such as resulting from a smile or nodding. Devices may include a photodiode, a laser pointer, a light emitting diode (e.g., a beacon emitter), a display, a user interface (e.g., a keyboard), a microphone, an earphone(s), a communication device (e.g., Bluetooth), a battery sensor, a satellite-based location sensor such as a global positioning system (GPS), an accelerometer, a compass, an inclinometer, one or more cheek sensor, or one or more other interface devices, as illustrative, non-limiting examples.

The one or more interfaces may enable the SPoT headgear device 7200 to be coupled (e.g., physically coupled or communicatively coupled) to one or more other devices or components. For example, the one or more interfaces may include the power interface 7212 and/or the communication interface 7214.

The power interface 7212 may couple one or more components or devices of the SPoT headgear device 7200 to the power source 7220. The power interface 7212 may include or correspond to the dual battery compartment or housing 702 of FIG. 72 or another interface as described further herein. For example, the power interface 7212 may include one or more terminals, such as a positive terminal and a negative terminal, via which the SPoT headgear device 7200 is to receive power from the power source 7220. As an illustrative, non-limiting example, the power interface 7212 may include one or more magnets that operate as a terminal(s), as described with reference to FIGS. 90-91. The one or more magnets of the power interface 7212 may correspond to one or more magnets of the power source 7220 or a holder of the power source 7220, as described in further detail with reference to FIGS. 90-91.

The communication interface 7214 may enable the SPoT headgear device 7200 to communicate, such as via a wired link, a wireless link, or a combination thereof, to one or more electronic devices. For example, the communication interface 7214 may include or correspond to the communication interface 3018 of FIG. 30, the communication unit 3602, the communication interface 4216 of FIG. 42, or the communication module 4612 of FIG. 46, as illustrative, non-limiting examples. The one or more electronic devices may include a mobile communication device (e.g., the phone 106 of FIG. 1), a computer (e.g., the computer 108 of FIG. 1), a server associated with the SPoT headgear device 7200, or a combination thereof. When the SPoT headgear device 7200 is coupled to a particular electronic device via a wired connection, the SPoT headgear device 7200 may receive power via the wired connection. Power received via the wired connection may be used for charging the power source 7220.

The controller 7208 may be coupled to the one or more cameras 7204, to the memory 7210, to the one or more I/O devices 7206, to the one or more interfaces, to one or more other components, or a combination thereof. The controller 7208 may include a tagging engine 7222, a processing engine 7226, an encryption/decryption engine 7224, or a combination thereof. The controller 7208 may include dedicated circuitry, an application running at a processor of the SPoT headgear device 7200 (e.g., a processor of the controller 7208), or a combination of dedicated circuitry and an executing application. For example, the processor running at the controller 7208 may execute one or more instructions that cause the processor to execute one or more operations. The one or more instructions may be stored in a memory of the SPoT headgear device 7200, such as the memory 7210. The controller 7208 may include or correspond to the processor 3016 of FIG. 30, the controller 3604 of FIG. 36, the processor 4214 of FIG. 42, the processor 4608 and/or the image reducer 4610 of FIG. 46, or a combination thereof.

The controller 7208 may be configured to store the image data and/or the video data from the one or more cameras 7204 at the memory 7210 or to send the image data and/or the video data to one or more electronic devices via the communication interface 7214.

The controller 7208 may be configured to perform one or more SPoT functions associated with at least one of the image data and/or the video data received from the one or more cameras 7204, data received from the one or more I/O devices 7206, information received via the one or more interfaces, or a combination thereof, as described further herein. The one or more SPoT functions may be associated with monitoring the user of the SPoT headgear device 7200, processing the image data and/or the video data from the one or more cameras 7204, communicating with the user of the SPoT headgear device 7200, or a combination thereof. The SPoT functions may be associated with one or more SPoT commands or instructions stored at the memory 7210.

The controller 7208 may be configured to process the video data from the one or more cameras 7204 to identify whether a beacon signal of a beacon emitter is received via the one or more cameras 7204. The beacon signal may include an encoded message (e.g., an encrypted message) or may include a link to content that is accessible based on a key, as described with reference to FIG. 87, as illustrative, non-limiting examples. The controller 7208 may decode the encoded message or provide a key to access the content corresponding to the link. Alternatively or additionally, the controller 7208 may be configured to encode a message to be transmitted via a beacon emitter of the SPoT headgear device 7200.

The controller 7208 may be configured to tag a portion of the video data based on an indicator 7227, such as described further herein. The indicator 7227 may correspond to detection of one or more conditions associated with data received from the one or more cameras 7204, from the one or more I/O devices 7206, via the one or more interfaces, or a combination thereof. The controller 7208 may detect the one or more conditions and/or may receive, from another device, an indicator 7227 based on the one or more conditions. As an illustrative, non-limiting example, the controller 7208 may be configured to process the data (e.g., the image data and/or the video data) to detect the one or more conditions and to generate the indicator 7227 responsive to the detection of the one or more conditions. Alternatively or additionally, the SPoT headgear device 7200 may provide the data (e.g., received from the one or more cameras 7204, from the one or more I/O devices 7206, via the one or more interfaces, or a combination thereof) to a particular device that processes the data to detect the one or more conditions. Based on the detection of the one or more conditions, the particular device may send the indicator 7227 to the SPoT headgear device 7200. The controller 7208 may be configured to provide a notification to the user based on the indicator 7227, such as a notification provided via the one or more I/O devices 7206.

As a first illustrative example, the detection of the one or more conditions may include detecting a sign identifier in image data and/or the video data, as described with reference to FIG. 74. As a second illustrative example, the detection of the one or more conditions may include detecting an object in the image data and/or the video data. The object being detected may be a particular object selected by the user to be detected, as described with reference to FIG. 75. As a third illustrative example, the detection of the one or more conditions may include detecting a reflection of a face the user that is using (e.g., wearing) the SPoT headgear device 7200, as described with reference to FIG. 76. As a fourth example, the detection of the one or more conditions may include detecting a biological condition of the user and detecting a physiological condition of the user, as described with reference to FIGS. 79-80. As a fifth illustrative example, the detection of the one or more conditions may include detecting a pointer, as described with reference to FIGS. 81-84.

As a sixth illustrative example, when the one or more cameras 7204 includes two cameras operating in a stereo recording mode, such as the first camera and the second camera, the detection of the one or more conditions may include detecting the object based on the pointer included in the first video data and the second video data, as described with reference to FIGS. 83-84. As a seventh illustrative example, when the one or more cameras 7204 includes two cameras operating in the stereo recording mode, the detection of the one or more conditions may include detecting an instance of an object being brought towards a user's mouth, as described with reference to FIG. 77. As an eighth illustrative example, when the one or more cameras 7204 includes two cameras operating in the stereo recording mode, the detection of the one or more conditions may include detecting a particular object in the first video data and the second video data, as described with reference to FIGS. 85 and 86A-B. When the particular object is detected in the first video data and the second video data, the controller 7208 may be configured to crop a first image based on the first video data, to crop a second image based on the second video data, and to generate a combined image by combining the first cropped image and the second cropped image. Cropping the first image may remove the particular object from the first image and cropping the second image may remove the particular object from the second image. As a ninth illustrative example, the detection of the one or more conditions may include detecting a movement of the SPoT headgear or movement of an object in a field of vision of a camera toward a center of the field of vision to enable a laser pointer to be selectively activated or deactivated, as described with reference to FIG. 78A.

The controller 7208 may be configured to request a device identifier from a server associated with a video logging device, as described with reference to FIGS. 88-90. The device identifier may be generated by the server and issued to the SPoT headgear device 7200 to uniquely identify the SPoT headgear device 7200. The controller 7208 may receive the device identifier from the server via the communication interface 7214 and initiate a particular I/O device, such as a beacon emitter, to transmit a beacon signal based on the device identifier.

The tagging engine 7222 may be configured to attach a tag to image data and/or to attach a tag to a portion of video data based on the indicator 7227. For example, the tagging engine 7222 may receive the indicator 7227 from the processing engine 7226. The tag may include metadata associated with the indicator 7227. Alternatively or additionally, the tag may be configured to index the video data. As an illustrative, non-limiting example, the tag may include physiological data associated with the user. The tag may be stored with the image data and/or the video data at the memory 7210 or may be provided to another device via the communication interface 7214.

The processing engine 7226 may be configured to process data received from the one or more cameras 7204, from the one or more I/O devices 7206, via the one or more interfaces, or a combination thereof. For example, the processing engine 7226 may process the image data and/or the video data generated by the one or more cameras 7204 to detect the one or more conditions. Based on detection of the one or more conditions, the processing engine 7226 may generate the indicator 7227. The processing engine 7226 may cause the indicator 7227 to be sent to the tagging engine 7222 or to an electronic device associated with the SPoT headgear device 7200.

The encryption/decryption engine 7224 may be configured to encrypt and/or decrypt data transmitted or received by the SPoT headgear device 7200. For example, the encryption/decryption engine 7224 may encrypt data to be transmitted via a particular I/O device, such as a beacon emitter, or to be transmitted via the communication interface 7214. As another example, the encryption/decryption engine 7224 may decrypt data received via the one or more cameras 7204, received via the one or more I/O devices 7206, or received via the communication interface 7214.

The memory 7210, such as a non-volatile memory, may include data storage 7232 and/or SPoT executable instructions 7234. For example, the memory 7210 may include or correspond to the local storage 3020 of FIG. 30, the local storage 4218 of FIG. 42, or the local memory 4606 of FIG. 46. The data storage 7232 may include data (e.g., the image/video data 7235) from the one or more cameras 7204, one or more tags attached by the tagging engine 7222, processed data from the processing engine 7226, data received from the one or more I/O devices 7206, information received via the one or more interfaces, other data, or a combination thereof.

The SPoT executable instructions 7234 may include one or more instructions or rules to be implemented by the controller 7208. For example, the one or more instructions or rules may be implemented by the tagging engine 7222, the processing engine 7226, the encryption/decryption engine 7224, a processor of the controller 7208, or a combination thereof. The SPoT executable instructions 7234 may dictate the one or more conditions detected by the controller 7208. The controller 7208 may be configured to update the one or more instructions or rules stored at the memory 7210. For example, the controller 7208 may update the one or more instructions or rules based on an update received from the a user of the SPoT headgear device 7200 or from one or more devices communicatively coupled to the SPoT headgear device 7200.

The power source 7220 may be configured to supply power to one or more components of the SPoT headgear device 7200. The power source 7220 may include a battery and may also include a battery holder. The power source 7220 may include one or more terminals configured to be electrically coupled with one or more terminals of the power interface 7212. As an illustrative, non-limiting example, the power source 7220 may include at least one magnet that operates as a power terminal of the power source 7220, as described with reference to FIGS. 90-91. The at least one magnet may physically and electrically couple the power source 7220 to the body 7202 of the SPoT headgear device 7200.

During operation of the SPoT headgear device 7200, the controller 7208 may receive one or more data inputs, such as data received from the one or more cameras 7204, from the one or more I/O devices 7206, via the one or more interfaces, or a combination thereof. The one or more data inputs may be stored in the memory 7210 of the SPoT headgear device 7200.

For example, the controller 7208 may receive the video data from the one or more cameras 7204. During a video recording operation of the one or more cameras 7204, the controller 7208 may receive the indicator 7227 associated with detection of one or more conditions. The indicator 7227 may be associated with the one or more data inputs received at the controller 7208. As an illustrative, non-limiting example, the indicator 7227 may be based on a portion of first video data generated by a first camera of the one or more cameras 7204. The indicator 7227 may be generated by the controller 7208 or by another device coupled to the SPoT headgear device 7200. For example, the SPoT headgear device 7200 may detect the one or more conditions based on a portion of the portion of the video data and may generate the indicator 7227 based on the one or more detected conditions.

The controller 7208 may store the indicator 7227 at the memory 7220. For example, the controller may 7208 generate a tag 7235 based on the indicator 7227 and may attach the tag 7235 to the video data and/or image data. The video data and the tag 7235 may be stored at the memory 7210. For example, the controller may attach the tag 7235 to image/video data 7233 stored at the memory 7210

The SPoT headgear device 7200 may advantageously record and/or process one or more data inputs, such as data received from the one or more cameras 7204, from the one or more I/O devices 7206, via the one or more interfaces, or a combination thereof. The data inputs may be used to provide a user of the SPoT headgear device 7200 with the "raw" data or the processed data. For example, the SPoT headgear device 7200 may be used to generate a visual log of what is visible to the user while the SPoT headgear device 7200 is activated and worn by the user.

Although various components depicted herein are illustrated as block components and described in general terms, such components may include one or more microprocessors, state machines, or other circuits configured to enable the SPoT headgear device 7200 to perform one or more functions. For example, the controller 7208 may represent physical components, such as hardware controllers, state machines, logic circuits, or other structures, to enable the controller 7208 to perform tagging at the tagging engine 7222, to perform processing the processing engine 7226, and/or to perform decryption/encryption at the encryption engine 7224.

Alternatively or additionally, the components may include one or more microprocessors, state machines, or other circuits configured to enable the controller 7208 to perform one or more functions. As an example, the tagging engine 7222, the processing engine 7226, and/or the encryption/decryption engine 7224, or a combination thereof, may represent physical components, such as hardware controllers, state machines, logic circuits, or other structures, to enable the controller 7208 to perform one or more security functions.

One or more of the tagging engine 7222, the processing engine 7226, and/or the encryption/decryption engine 7224 may be implemented using a microprocessor or microcontroller programmed to perform functions described with respect to the particular engine 7222-7226. For example, to implement the encryption/decryption engine 7224 the microprocessor or the microcontroller may be programmed to receive an encryption/decryption key. The microprocessor or microcontroller may also be configured to receive data to be encrypted and/or decrypted. The microprocessor or microcontroller may also be configured to execute instructions that apply an encryption/decryption algorithm to the received data to generate encrypted data and/or decrypted data. For example, the encryption algorithm may include a publicly available cryptographic algorithm, such as an Advanced Encryption Standard (AES) compliant with the United States Government's National Institute of Standards and Technology (NIST) Federal Information Processing Standard (FIPS) Publication 140-2, (FIPS PUB 140-2), as an illustrative, non-limiting implementation.

As another example, to implement the tagging engine 7222, the microprocessor or the microcontroller may be programmed to receive and/or generate an indicator 7227 and attach a tag 7235 to image data and/or video data (e.g., the image/video data 7233 stored at the memory 7210) based on the indicator 7227. The microprocessor or the microcontroller may be programmed to generate metadata based on the indicator 7227 and to store the metadata at a particular location of the video data.

As another example, to implement the processing engine 7226, the microprocessor or the microcontroller may be programmed to process image data and/or video data. The microprocessor or the microcontroller may be programmed to process the image data and/or the video data to detect or identify one or more conditions based on data received from the SPoT headgear device 7200, such as video data, image data, I/O data, power data, communication data, etc. The microprocessor or the microcontroller may be programmed to generate an indicator 7227 based on the one or more detected conditions.

The controller 7208 may include a processor executing instructions that are stored at a non-volatile memory, such as at the memory 7210. Alternatively or additionally, executable instructions that are executed by the processor may be stored at a separate memory location that is not part of the non-volatile memory, such as at a read-only memory (ROM).

In accordance with one or more of the above-described embodiments and methods, an apparatus may include a body that is configured to support a camera while the body is worn on a head of a user. The apparatus may further include a controller coupled to the body and configured to attach a tag to a portion of video data generated by the camera based on an indicator. The indicator may be generated responsive to detection of one or more conditions associated with the portion of the video data.

A method may be performed at a device including a camera and a body, wherein the body is configured to support the camera while the body is worn on the head of a user. The method may include receiving, during a video recording operation of the camera, an indicator generated responsive to detection of one or more conditions associated with a portion of video data generated by the camera. The method may further include storing data based on the indicator. The data may be stored in conjunction with the portion of the video data.

As a non-limiting example, the apparatus may correspond to, and the method may be performed by, one or more components of a SPoT headgear device, such as the SPoT headgear device 7200 of FIG. 72.

Figure 73:
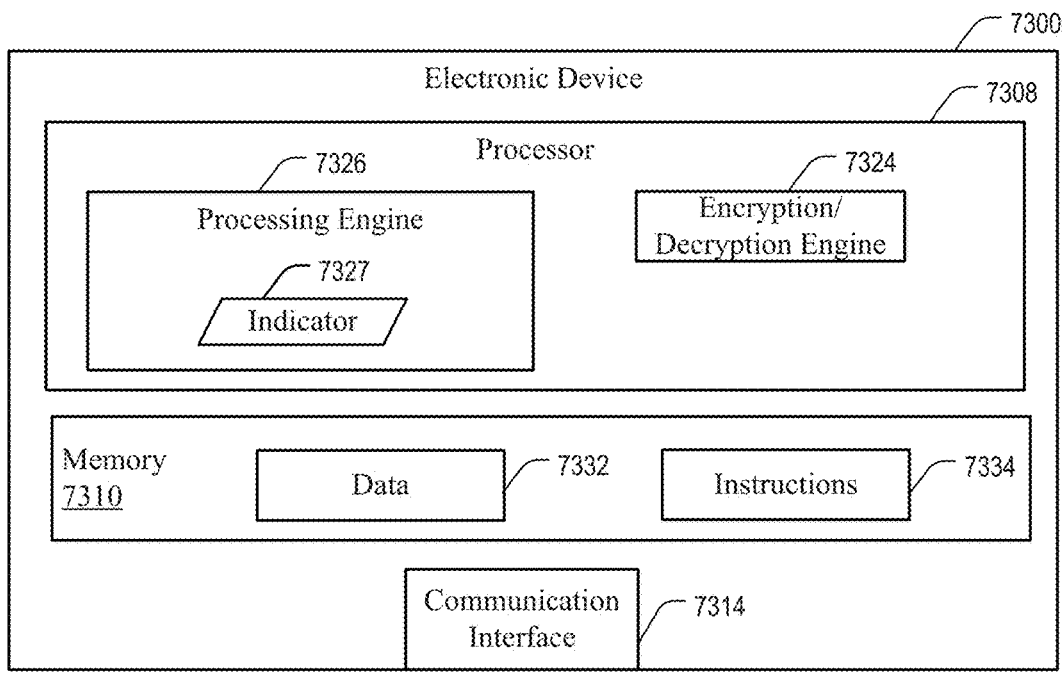
FIG. 73 is an illustration of a particular embodiment of an electronic device that may be coupled to a head-mountable camera apparatus.

FIG. 73 illustrates an example of an electronic device 7300 that may be coupled to a SPoT headgear device. For example, the electronic device 7300 may be configured to be communicatively coupled and/or physically coupled to a SPoT headgear device, such as the headgear 102 of FIG. 1 or the SPoT headgear device 7200 of FIG. 72. The electronic device 7300 may include or correspond to a mobile communication device (e.g., the phone 106 of FIG. 1), a computer (e.g., the computer 108 of FIG. 1), a server associated with the SPoT headgear device 7200, or another device.

The electronic device 7300 may include a processor 7308 (e.g., a controller), a memory 7310, and a communication interface 7314. The communication interface 7314, such as a transceiver, may enable the electronic device 7300 to communicate with one or more other devices or components, such as the SPoT headgear device 7200 of FIG. 72. For example, the electronic device 7300 may be coupled (e.g., physically coupled and/or communicatively coupled using a wired connection, a wireless connection, or a combination thereof) via the communication interface 7314 with the one or more other devices or components. The communication interface 7314 may include or correspond to the communication interface 3038 of FIG. 30, the communication unit 3622 of FIG. 36, or the communication interface of the phone 106 of FIG. 42.

The processor 7308 may be coupled to the communication interface 7314, the memory 7310, or a combination thereof. The processor 7308 may include or correspond to the processor 3032, the PC hardware and software 3040, or the off-line SPoT applications 3042 of FIG. 30, the controller 3624 of FIG. 36, the processor of the phone 106, the PC hardware and software 4220, or the off-line applications 4222 of FIG. 42.

The processor 7308 may include a processing engine 7326 and an encryption/decryption engine 7324. As an illustrative, non-limiting example, the processor 7308 may be configured to process particular data received from a particular SPoT headgear device to detect the one or more conditions and to generate the indicator 7327 responsive to the detection of one or more conditions, such as the one or more conditions as described with reference to FIG. 72. For example, when the particular SPoT headgear device is the SPoT headgear device 7200 of FIG. 72, the particular data may include data received from the one or more cameras 7204, from the one or more I/O devices 7206, via the one or more interfaces, or a combination thereof. Based on the detection of the one or more conditions, the electronic device 7300 may send the indicator 7327 to the SPoT headgear device 7200. The processor 7308, such as a controller, may include dedicated circuitry, an application running at the processor 7308, or a combination of dedicated circuitry and an executing application.

The encryption/decryption engine 7324 may be configured to encrypt and/or decrypt data transmitted or received by the SPoT headgear device 7200. For example, the encryption/decryption engine 7324 may encrypt data to be transmitted via a particular I/O device, such as a beacon emitter, or to be transmitted via the communication interface 7314. As another example, the encryption/decryption engine 7324 may decrypt data received via the communication interface 7314, such as data captured via the one or more cameras 7204 or via the one or more I/O devices 7206 of the SPoT headgear device 7200 and encrypted prior to transmission to the electronic device 7300.

The processing engine 7326 may be configured to process the particular data received from the particular SPoT headgear device, such as the SPoT headgear device 7200 of FIG. 72. For example, the processing engine 7326 may detect the one or more conditions by processing image data and/or video data generated by the one or more cameras 7204.

The memory 7310 may include data storage 7332 and executable instructions 7334. The memory 7310 may include or correspond to the local storage 3034, the application storage 3036, the SPoT archive 3044 of FIG. 30, the local storage or the application storage of the phone 106, or the SPoT archive 4224 of FIG. 42, the mobile phone memory of the phone 106 or the home base memory 4614 of FIG. 46. The data storage 7332 may include data from the SPoT headgear device, such as data from one or more cameras, one or more tags attached by a tagging engine, processed data from a processing engine, data received from one or more I/O devices, information received via one or more interfaces, other data, or a combination thereof.

The executable instructions 7334 may include one or more instructions or rules to be implemented by the processor 7308. For example, the one or more instructions or rules may be implemented by the processor 7308, the processing engine 7326, the encryption/decryption engine 7324, or a combination thereof. The executable instructions 7334 may dictate the one or more conditions to be detected by the processor 7308. The processor 7308 may be configured to update the one or more instructions or rules stored at the memory 7310. For example, the processor 7308 may update the one or more instructions or rules based on an update received from the a user of the electronic device 7300, from one or more devices communicatively coupled to the electronic device, or from a server associated with the electronic device 7300.

During operation, the electronic device 7300 may receive particular data from a particular SPoT headgear device via the communication interface 7314. The particular data may include or correspond to data recorded or acquired by the particular SPoT headgear device. The electronic device 7300 may store the particular data at the memory 7310.

The processor 7308 may process the particular data to detect one or more conditions based on the particular data. In response to detection of the one or more conditions, the processor 7308 may generate an indicator 7327. The indicator 7327 may be stored in the memory 7310 in conjunction with the stored particular data, provided to the particular SPoT headgear device, presented via a display of the electronic device 7300, provided to another electronic device (e.g., a server associated with the particular SPoT headgear device), or a combination thereof.

As an illustrative, non-limiting example, an electronic device 7300 may include a receiver (e.g., the communication interface 7314) configured to receive video data from a headgear device (e.g., the SPoT headgear device 7200 of FIG. 72). The SPoT headgear device may include at least one camera attached to a body that is configured to be worn about a user's head. For example, the body may include or correspond to the body 7202 of FIG. 72. The electronic device 7300 may further include the processor 7308 that is configured to process the received video data to detect one or more conditions. The processor may generate an indicator (e.g., the indicator 7327) that is representative of the one or more detected conditions.

As another illustrative, non-limiting example, a method performed by the electronic device 7300 may include receiving video data and processing the received video data to detect one or more conditions based on data generated at a headgear device. The method may further include generating an indicator (e.g., the indicator 7327) that is representative of the one or more detected conditions.

The electronic device 7300 may advantageously receive and process one or more data inputs of a SPoT headgear device, such as data received from one or more cameras of the SPoT headgear device, one or more I/O devices of the SPoT headgear device, via one or more interfaces of the SPoT headgear device, or a combination thereof. The data inputs may be used to generate one or more indicators, such as the indicator 7327, responsive to detection of one or more conditions based on the one or more data inputs. For example, the electronic device 7300 may process the one or more data inputs to generate processed data, the one or more indicators, or a combination thereof. By processing the one or more data inputs at the electronic device 7300, the electronic device 7300 may alleviate a processing burden of the SPoT headgear device. By alleviating the processing burden of the SPoT headgear device, the SPoT headgear device may realize a savings in cost by not needing as powerful a processor as the electronic device 7300 and/or a savings in power by offloading processing of the one or more data inputs.

Although various components depicted herein are illustrated as block components and described in general terms, such components may include one or more microprocessors, state machines, or other circuits configured to enable the electronic device 7300 to perform one or more functions. For example, the processor 7308 may represent physical components, such as hardware controllers, state machines, logic circuits, or other structures, to enable the processor 7308 to perform processing at the processing engine 7326 and/or to perform decryption/encryption at the encryption/decryption engine 7324.

Alternatively or additionally, the components may include one or more microprocessors, state machines, or other circuits configured to enable the processor 7308 to perform one or more functions. As an example, the processing engine 7326, the encryption/decryption engine 7324, or a combination thereof, may represent physical components, such as hardware controllers, state machines, logic circuits, or other structures, to enable the processor 7308 to perform one or more security functions One or more of the processing engine 7326 and/or the encryption/decryption engine 7324 may be implemented using a microprocessor or microcontroller programmed to perform functions described with respect to the particular engine 7324-7326. For example, to implement the encryption/decryption engine 7324 the microprocessor or the microcontroller may be programmed to receive an encryption key. The microprocessor or microcontroller may also be configured to receive data to be encrypted and/or decrypted. The microprocessor or microcontroller may also be configured to execute instructions that apply an encryption algorithm and/or a decryption algorithm to the received data to generate encrypted data and/or decrypted data. For example, the encryption algorithm and/or decryption algorithm may include a publicly available cryptographic algorithm, such as an Advanced Encryption Standard (AES) compliant with the United States Government's National Institute of Standards and Technology (NIST) Federal Information Processing Standard (FIPS) Publication 140-2, (FIPS PUB 140-2), as an illustrative, non-limiting implementation.

As another example, to implement the processing engine 7326, the microprocessor or the microcontroller may be programmed to process image data and/or video data. The microprocessor or the microcontroller may be programmed to process the image data and/or the video data to detect or identify one or more conditions based on data received from the SPoT headgear device 7200, such as video data, image data, I/O data, power data, etc. The microprocessor or the microcontroller may be programmed to generate the indicator 7327 based on the one or more detected conditions. The microprocessor or the microcontroller may be programmed to initiate transmission of the indicator 7327 to the SPoT headgear device to another device or to present the indicator 7327 via a user interface of the electronic device 7300.

The processor 7308 may include a particular processor executing instructions that are stored at a non-volatile memory, such as at the memory 7310. Alternatively or additionally, executable instructions that are executed by the particular processor may be stored at a separate memory location that is not part of the non-volatile memory, such as at a read-only memory (ROM).

In accordance with one or more of the above-described embodiments and methods, an apparatus may include a receiver configured to receive video data from a headgear device. The headgear device includes a body that is configured to be worn on a user's head. The apparatus may further include a processor configured to process the received video data to detect one or more conditions based on the video data. The processor may further be configured to generate an indicator that is representative of the one or more detected conditions based on the video data and to cause transmission of the indicator to the headgear device or to an electronic device associated with the user.

A method may be performed at a device including a memory. The method may include receiving video data from a headgear device that includes a body that is configured to be worn on a user's head, processing the received video data to detect one or more conditions, and generating an indicator that is representative of the one or more conditions. The method may further include sending the indicator to the headgear device or to an electronic device associated with the user.

As a non-limiting example, the apparatus may correspond to, and the method may be performed by, a computer configured to operate in a manner such as described with respect to the electronic device 7300 of FIG. 73.

Figure 74:
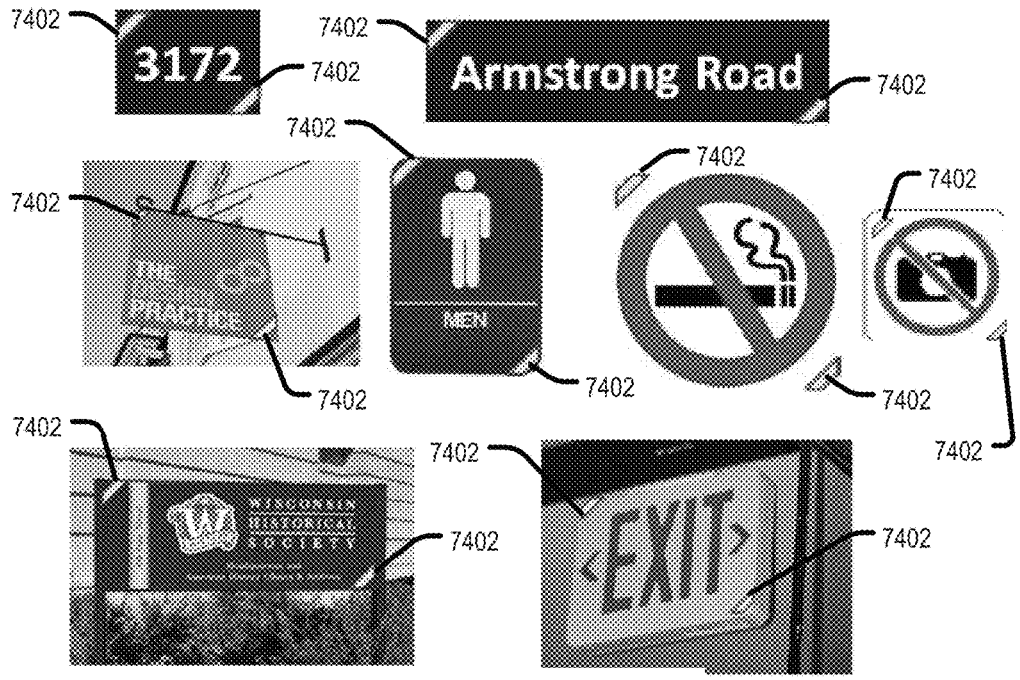
FIG. 74 is an illustration of particular embodiments of signs that may be detected using a head-mountable camera apparatus.

FIG. 74 illustrates examples of signs that may be detected using a SPoT headgear device alone or as part of a SPoT system. One or more of the signs may be detected by the SPoT headgear device or an electronic device using data collected by the SPoT headgear device. The SPoT headgear device may include or correspond to the headgear 102 of FIG. 1 or the SPoT headgear device 7200 of FIG. 72.

The SPoT headgear device may be used to detect one or more signs, such as a street sign, an advertisement, a street address, a construction sign, a warning sign, etc. For example, the SPoT headgear may detect a sign identifier, such as a sign icon, in a frame of video data generated by the SPoT headgear device. When the SPoT headgear device is utilized by a user having a visual impairment, the SPoT headgear device may assist the user to detect one or more signs that the user may not otherwise see.

Conventionally, to make a sign that may be detected by a video camera and read-out to a visually impaired person, the sign may be altered and the video camera (e.g., a video system) may be trained to detect the sign. For example, braille signs may be used to convey information to visually impaired persons. To read a braille sign, a visually impaired person may locate the braille sign and feel the braille sign to read braille bumps on the braille sign. When the visually impaired person is blind, locating a particular braille sign may be difficult. Additionally or alternatively, other signs to convey information may include barcodes, such as quick response (QR) codes, that may be read by using a barcode reader. The barcodes included in such signs are typically small and are designed to be read when an individual is within a short distance from the barcode. Such signs may not be as useful as alert signs or out-door signs that need to be seen from a distance.

To make signs more accessible to individuals such as visually impaired or blind persons, an individual may use the SPoT headgear device to detect and determine the content of one or more signs. For example, the SPoT headgear device may record an image of a particular sign and a SPoT application may detect the particular sign. The SPoT application may determine content of the sign and initiate presentation of the content to the user of the SPoT headgear device. For example, the SPoT application may be executed by the SPoT headgear device or the electronic device, such as a handset (e.g., a mobile phone) used in conjunction with the SPoT headgear device. The content of the sign may be presented to the user via an I/O device of the SPoT headgear device or an I/O device (e.g., a speaker and/or a display) of the electronic device.

To enhance detectability of a sign detectable to a device executing the SPoT application, the sign may include one or more icons (e.g., one or more sign detection icons). For example, the sign may include two icons that are positioned in opposing corners of the sign, as icons 7402 depicted in the signs of FIG. 74 as substantially trapezoidal regions proximate to opposite sign corners having a color or brightness and/or a border the contrasts with the sign or that encodes sign identification information. The one or more icons may make the sign detectable and recognizable to the device executing the SPoT application. As an illustrative, non-limiting example, the sign may include two icons, a first icon positioned in a top left corner and a second icon positioned in a bottom right corner. The two icons may operate to "bracket" a portion of the sign that conveys information, such as text or an image.

To illustrate, the one or more icons (e.g., "read out" icons) may be printed as part of a sign, or may include stickers or magnets that are attached to a particular sign, to make the sign detectable to the SPoT headgear device. The sign that may be detected (based on the icons) and read, such as to a visually impaired person, without training the SPoT headgear device to detect a particular sign. The one or more icons may be positioned on the particular sign (e.g., a text region defined as a rectangle having opposite corners at the icons) to identify a text region of the sign that the SPoT headgear device is to capture an image of, interpret by an optical character recognition application, and provide to a user via an I/O device (e.g., a user interface, such as a display or an earphone). The text of the sign can be written in plain language and serve people who are able to read it. As depicted in FIG. 74, the icons 7402 on each sign are the same, such as the same shape, the same size, the same color, etc. However, a particular sign may include two or more different icons (e.g., two or more different sign detection icons). For example, a first sign detection icon and a second sign detection icon may be different shapes, different sizes, different colors, or a combination thereof, as illustrative, non-limiting examples. To illustrate, the first sign detection icon may be a first shape and the second sign detection icon may be a second shape. The first sign detection icon having the first shape may indicate a top left corner of an area that includes text and the second sign detection icon having the second shape may indicate a bottom right corner of the area that includes the text.

The SPoT headgear device may also provide the text to a user that is visually impaired or cannot read or understand the language of the sign. Additionally and/or alternatively, when the sign includes the one or more icons and alerts of danger or posts a legal message, the SPoT headgear device may interpret the sign (e.g., in a local language) and readout the sign to the user in the user's native language. For example, when the sign is a danger sign or a legal notification sign (e.g., as indicated by icon colors, as described below), the SPoT headgear device may provide a read out of the sign to the user without first receiving a user request to read the sign. Alternatively or additionally, the user may request the SPoT headgear device to read a sign and provide a read out to the user, such a request from the user to read a menu or a street name. The text may be provided to the user in a same language as the text of the particular sign or may be provided as a translation of the language of the text.

Upon detection of one or more of icons, such as detection of a first instance of a first sign detection icon and detection of a second instance of a second sign detection icon, the device executing the SPoT application may initiate one or more prompts to call attention of the sign to the user of the SPoT headgear device. For example, the one or more prompts may direct the user to move (e.g., raise, lower, tilt, turn, rotate, etc.) the user's head toward the sign, may direct the user to position the sign in a center of a field of view of the user (e.g., a center of the field of view of a camera of the SPoT headgear device), may indicate an angular size of the sign, a distance to the sign, a content of the sign, request on or more actions of the user to enhance detection of content of the sign, or a combination thereof. Alternatively or additionally, the SPoT headgear device may provide an indication of (e.g., a read out) the text of the sign to the user via a speaker, via an ear phone, via a display, and/or via an electronic device physically or communicatively coupled to the SPoT headgear device.

The one or more icons may have different characteristics depending upon the sign to which the one or more icons are attached. The different characteristics, such as a color of the one or more icons, may designate a classification of the particular sign. The user of the SPoT headgear device can elect to detect and/or disregard certain classifications of signs based on the one or more icons. For example, a first icon corresponding to a warning and/or regulatory sign may have a frame color (e.g., a border color) of red and a fill color of yellow. A second icon corresponding to an advertising sign may have a frame color of blue and a fill color of orange. A third icon corresponding to a navigation sign and/or a mapping sign may have a frame color of black and a fill color of red. A fourth icon corresponding to an information sign (e.g., a store hours signs) may have a frame color of blue and a fill color of yellow.

Alternatively or additionally, the one or more icons may include a reflector. The SPoT headgear device may identify a particular sign including the reflector by detecting light emitted from a beacon of a SPoT headgear device that is reflected by the reflector. For example, the SPoT headgear device may filter the field of view of a camera of the SPoT headgear device with a filter that is configured to filter a wavelength band (e.g., a frequency band) based on a light color of the beacon.

A particular sign that includes the one or more icons may also include a barcode or a QR code with content associated with the particular sign. When the user has positioned the barcode or the QR code within a field of view of a camera of the SPoT headgear device, the SPoT headgear device may cause the camera to zoom into the barcode or the QR code. If the size of the barcode or the QR code is too small for reading, the SPoT headgear device may instruct the user to approach the particular sign. Once the size of the barcode or the QR code becomes readable, the SPoT headgear device may convert at least a portion of the content into speech and audibly deliver the content to the user. If the SPoT headgear device detects that a particular sign, a particular barcode, and/or a particular QR code has recently been read the SPoT headgear device and/or presented to the user of the SPoT headgear device, the SPoT headgear device may disregard the particular sign, the particular barcode, and/or the particular QR code in order to avoid unnecessarily repeating reading of the sign.

Alternatively or additionally, the SPoT headgear device can initiate optical character recognition (OCR) on an area of the sign. OCR of the area may be useful and effective for simple and short text, such as street names and building numbers.

By detecting signs based on one or more icons included in the signs, the SPoT headgear device may make signs more accessible to a visually impaired person and may thus improve a quality of life of the visually impaired person.

Although FIG. 74 has been described in terms of operations and processes at the SPoT headgear device, such as the SPoT headgear device 7200 of FIG. 72, in other implementations some or all of the operations and processes may instead be performed on the data after the data has been transferred to another device. For example, the data may be downloaded to an electronic device, such as the electronic device 7300 of FIG. 73, and the electronic device may perform some of or all of the operations and processes on the downloaded data as described with reference to FIG. 74.

In accordance with one or more of the above-described embodiments and methods, an apparatus may include a body that is configured to support a camera while the body is worn on a head of a user. The apparatus may also include a controller coupled to the body and configured to process video data generated by the camera to detect a first instance of a first sign detection icon and to detect a second instance of a second sign detection icon. The first sign detection icon and the second sign detection icon may be included in a frame of video data. The first sign detection icon and the second sign detection icon may define an area of the frame. The controller may be configured to capture text located in the area, to perform an optical character recognition operation on the text, and to provide an output based on a result of the optical character recognition operation.

As an illustrative example, a method may be performed at a device including a camera, where a body is configured to support the camera while the body is worn on the head of a user. The method may include receiving, during a video capture operation of the camera, an indicator associated with detection of a sign detection icon of a sign included in a frame of video data recorded by the camera.

As another illustrative example, a method may be performed at a device including a camera, where a body is configured to support the camera while the body is worn on the head of a user. The method may include detecting, during a video capture operation of the camera, a first instance of a first sign detection icon and a second instance of a second sign detection icon. The first sign detection icon and the second sign detection icon may be included in a frame of video data captured by the camera. The first sign detection icon and the second sign detection icon may define an area of the frame. The method may further include capturing text located in the area, performing an optical character recognition operation on the text, and providing an output based on a result of the optical character recognition operation As a non-limiting example, the apparatus may correspond to, and the methods may be performed by, one or more components of a SPoT headgear device, such as the SPoT headgear device 7200 of FIG. 72.

In accordance with one or more of the above-described embodiments and methods, an apparatus may include a receiver configured to receive video data from a headgear device. The headgear device may include a camera attached to a body that is configured to be worn on a user's head. The apparatus may further include a processor configured to process the received video data to detect a first instance of a first sign detection icon and to detect a second instance of a second sign detection icon. The first sign detection icon and the second sign detection icon may be included in a frame of the video data captured by the camera. The first sign detection icon and the second sign detection icon may define an area of the frame. The processor may be configured to capture text located in the area, to perform an optical character recognition operation on the text, and to provide an output based on a result of the optical character recognition operation.

As an illustrative example, a method may be performed at a device including a memory. The method may include receiving video data from a headgear device that includes at least one camera attached to a body that is configured to be worn on a user's head. The method may further include processing the received video data to detect a sign detection icon of a sign included in a frame of the video data and generating an indicator that is based on the detected sign detection icon.

As another illustrative example, a method may be performed at a device including a memory. The method may include receiving video data from a headgear device that includes at least one camera attached to a body that is configured to be worn on a user's head. The method may further include processing the received video data to detect a first instance of a first sign detection icon and to detect a second instance of a second sign detection icon. The first sign detection icon and the second sign detection icon may be included in a frame of the video data captured by the camera. The first sign detection icon and the second sign detection icon may define an area of the frame. The method may further include capturing text located in the area, performing an optical character recognition operation on the text, and providing an output based on a result of the optical character recognition operation.

As a non-limiting example, the apparatus may correspond to, and the methods may be performed by, a computer configured to operate in a manner such as described with respect to the electronic device 7300 of FIG. 73.

A method of creating a sign may include providing a first sign detection icon and a second sign detection icon on the sign. The first sign detection icon and the second sign detection icon may be detectable by a device including a camera, where a body is configured to support the camera while the body is worn on the head of a user. Locations of the first sign detection icon and the second sign detection icon may define a border of an area of the sign that includes text. The text may be identifiable by the device based on the text being located within the area defined by the two attached sign detection icons.

Figure 75:
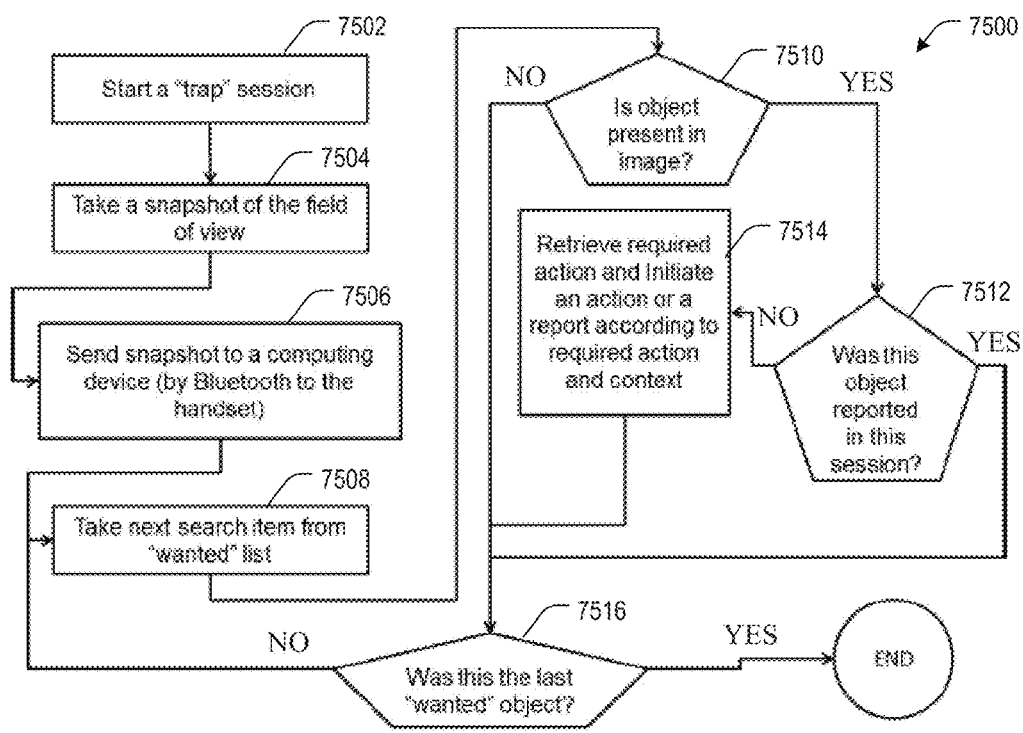
FIG. 75 is an illustration of a particular embodiment of a flowchart of a method of detecting an object selected by a user of a head-mountable camera apparatus.

FIG. 75 illustrates an example of a method 7500 of detecting an object selected by the user of the SPoT headgear device. For example, the method 7500 may be executed by a SPoT headgear device, an electronic device, or a combination thereof, as described herein.

When a user selection is received of an object for the SPoT headgear device to detect, the object may be included in a "wanted" list stored at a device of the SPoT system, such as the SPoT headgear device. During operation of the SPoT headgear device, a "trap" session may be implemented, such as by the SPoT headgear device or the electronic device, to identify whether the object is in image data recorded by the SPoT headgear device.

The SPoT headgear device may aid the user to identify a particular object. The SPoT headgear device may associate a message, such as an alert, with detection of the particular object. For example, the user may request the SPoT headgear device to notify the user the next time the SPoT headgear device detects the particular object. As an illustrative, non-limiting example, the particular object may be an individual's face, an automatic teller machine (ATM), or any other object. Additionally, the user may set the SPoT headgear device to provide a particular notification, such as "Next time an ATM machine is identified, tell me 'Draw money.'" Accordingly, the SPoT headgear device may enable an "associative reminder service" that combines functions of recognition and memory.

The SPoT headgear device may support real time object recognition capabilities (including face recognition). The SPoT headgear device may include a camera, image communication to a processor programmed to perform pattern recognition for identification of selected objects, to perform database management, to archive one or more images of potentially interesting objects, or a combination thereof.

The method 7500 may include starting a "trap" session, at 7502, and taking a snapshot (e.g., an image) of a field of view, at 7504. For example, the user may start a "trap" session when there are objects the user wants to trap and get an alert on. Each object can be represented in a database by multiple images—showing the object from different angles and in different postures and settings—in order to make the pattern recognition easier and more reliable. As an illustrative, non-limiting example, the user may select a specific person for trapping and the SPoT system may alert the user when the specific person is detected in the snapshot.

The snapshot may be sent to a computing device, at 7506. The computing device may include the SPoT headgear device or the electronic device. The method 7500 may include selecting a search item (e.g., an object) from a "wanted" list, at 7508. The method 7500 may include determining whether the object is present in the image, at 7510. If the object is not present, the method 7500 may include determining whether the search item selected is the last "wanted" object, at 7516.

If the object is present, the method 7500 may include determining whether the object has already been reported during the trap session, at 7512. The system does not need to alert the user each time the object is recognized. Therefore, upon recognition of the object, the SPoT headgear device may check whether the object has already been reported during the trap session. If the object has already been reported, the method 7500 may include determining whether the search item selected is the last "wanted" object, at 7516. If the object was not reported, an action may be retrieved and initiated or a report may be initiated according to the action and the context, at 7514. For example, the report to the user (if a real-time report is required) can be an audio message, a vibration message, an audible beep, one or more other signals, or a combination thereof. A reaction to the detection of the object is not necessarily a real-time alert. The reaction can be a generation of a record into a history file that is stored at a memory associated with the SPoT headgear device, an update of a "last seen" field in a database, etc. For example, the SPoT headgear device may be instructed by the user to "always keep record of the last ATM machine that was passed and, when an ATM machine is desired, a request will be made as to where the last ATM machine was seen."

At 7516, if the selected item is not the last "wanted" object, processing may advance to 7508 where a next search item is selected from the "wanted" list. If the selected item is the last "wanted" object, the processing may end the trap session.

As an illustrative, non-limiting example, the method 7500 may be modified to identify a particular object positioned within a field of view of the SPoT headgear device. As another illustrative, non-limiting example, the method 7500 may enable the SPoT headgear device to detect one or more objects that are within the field of view of the camera but are not within a field of view of the user. Further, the SPoT headgear device may assist the user in responding to unpredictable appearances of objects and people. Although FIG. 75 has been described in terms of operations and processes at the SPoT headgear device, such as the SPoT headgear device 7200 of FIG. 72, in other implementations some or all of the operations and processes may instead be performed on the data after the data has been transferred to another device. For example, the data may be downloaded to an electronic device, such as the electronic device 7300 of FIG. 73, and the electronic device may perform some of or all of the operations and processes on the downloaded data as described with reference to FIG. 75.

In accordance with one or more of the above-described embodiments and methods, an apparatus may include at least one camera that is configured to generate video data. The apparatus may further include a body that is configured to support the at least one camera while the body is worn on a head of a user. The apparatus may also include a controller coupled to the at least one camera and configured to receive a selection of an object from the user, to detect the object in the video data, and initiate a notification to be provided to the user based on detection of the object.

A method may be performed at a device including a camera, where a body is configured to support the camera while the body is worn on the head of a user. The method may include receiving, during a video recording operation of the camera, a selection of an object from the user and detecting the object in the video data generated by the camera. The method further includes initiating a notification to be provided to the user based on detection of the object.

As a non-limiting example, the apparatus may correspond to, and the method may be performed by, one or more components of a SPoT headgear device, such as the SPoT headgear device 7200 of FIG. 72.

In accordance with one or more of the above-described embodiments and methods, an apparatus may include a receiver configured to receive video data from a headgear device. The headgear device includes at least one camera attached to a body that is configured to be worn on a user's head. The apparatus may further include a processor configured to receive a user selection of an object, to detect the object in the video data, and initiate a notification to be provided to the user based on detection of the object.

A method may be performed at a device including a memory. The method may include receiving a user selection of an object. The method may include receiving video data from a headgear device that includes at least one camera attached to a body that is configured to be worn on a user's head. The method may further include processing the received video data to detect the object in the video data and generating an indicator that is based on the detected object.

As a non-limiting example, the apparatus may correspond to, and the method may be performed by, a computer configured to operate in a manner such as described with respect to the electronic device 7300 of FIG. 73.

Figure 76:
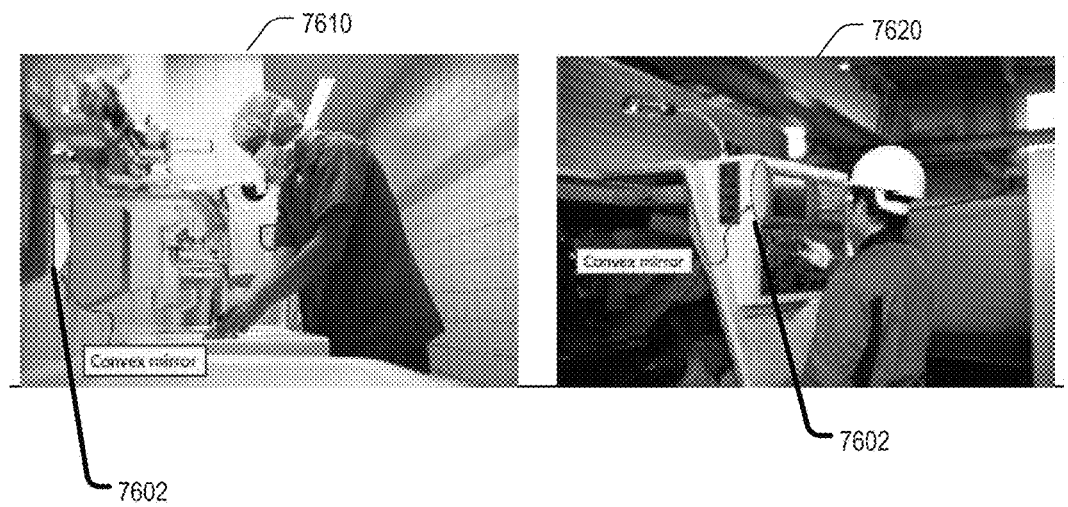
FIG. 76 is an illustration of particular embodiments of a head-mounted camera apparatus configured to detect a reflection, in a mirror, of a face of a user that is wearing the head-mountable camera apparatus.

FIG. 76 illustrates examples of pictures 7610 and 7620 showing how SPoT headgear device captured images including a reflection of a face may be used to detect whether a particular user is wearing the SPoT headgear device. For example, the SPoT headgear device may include the headgear 102 of FIG. 1 or the SPoT headgear device 7200 of FIG. 72. The reflection of the face of the user or any other identifiable item or feature of the user may be detected by a device of the SPoT system, such as the SPoT headgear device or an electronic device, such as the electronic device 7300 of FIG. 73.

In conventional video face recognition, a video system of a user may be configured to identify other people's faces and not the face of the user (e.g., a video system using a security camera or a smart phone camera). The SPoT headgear device may confirm that a face on a reflective surface, such as a mirror (e.g., a reflection in the mirror), is the face of the user of the SPoT headgear device and not another individual. To illustrate, the SPoT headgear device may be configured to perform a one-to-one match between stored data corresponding to the face of the user and faces detected by the SPoT headgear device, rather than performing one-to-many detection and identification as may be performed by conventional video face recognition systems. For example, the reflective surface may be a convex mirror to promote the SPoT headgear device being able to detect (e.g., within a field of view of a camera of the SPoT headgear device) and identify a reflection of the face of the user or any other identifiable item or feature of the user. Accordingly, the SPoT headgear device may be used in a variety of situations, such as job compliance and security access control.

The SPoT system may be used to monitor compliance of an individual to one or more policies, such as an employee of a company whose job it is to perform one or more daily tasks. The individual (e.g., the user) may wear the SPoT headgear device that monitors a field of view associated with the user. When the SPoT headgear device is configured to record one or more images corresponding to the field of view of the user, an identity of the user may be unknown.

To monitor the user's compliance of the one or more policies, the SPoT system may be designed to detect the reflection of the face of the user or any other identifiable item or feature of the user that is wearing the SPoT headgear device. To assist the SPoT system in detecting the reflection, one or more mirrors (e.g., a convex, reflective surface) may be positioned at or near positions where compliance of one or more policies is desired to be monitored. The one or more mirrors may be positioned to face the user of the SPoT headgear device, such that the one or more mirrors will be visible to a camera of the SPoT headgear device and a reflection of the user is visible in the one or more mirrors.

The face of the user may be visible in the one or more mirrors that are captured in an image by the camera and the face may become a part of documentation of compliance action. After the image is recorded, the image may be processed, such as by off-line software, to detect the monitored events in the video stream and to recognize the user (e.g., by recognition of the face of the user) in the one or more mirrors. A record of a compliance event (e.g., identification of the user performing a particular monitored event) may be created and stored in a memory associated with the SPoT headgear device.

As an illustrative, non-limiting example, hand washing may be required by employees of hospitals, restaurants, etc. Accordingly, referring to the picture 7610, a first convex mirror 7602 is positioned near a hand washing station in a hospital. As another illustrative, non-limiting example, safety checks may be performed on industrial machines or at security checkpoints. Accordingly, referring to the picture 7620, a second convex mirror is positioned near or at a piece of industrial machinery.

Recognition of the reflection of the face of the user or any other identifiable item or feature of the user of the SPoT headgear device may also be used in security access control. An organization may have one or more secure areas that require an access code or an access key to enter the one or more secure areas. For example, each secure area of the one more secure areas may require a different access code or a different access key. The organization may grant access to authorized individuals, but may not want to distribute expensive and vulnerable electronic equipment among the authorized individuals and/or among each of the one or more secure areas.

The organization may use the SPoT headgear device to enable an individual to gain access to a particular secure area. The particular secure area may include a locking/unlocking device that may be opened (e.g., unlocked) in response to receiving an unlocking signal or an unlocking code, such as an unlocking signal received from the SPoT headgear device. For example, the locking/unlocking device may include a user interface to receive the unlocking code or a wireless transceiver to receive the unlocking signal. A reflective surface, such as a convex mirror, may be positioned proximate to an access point (e.g., a door or a gate) of the particular secure area to enable the individual to view his or her reflection.

The SPoT headgear device may be assigned to the individual. Assigning the SPoT headgear device to the individual may include providing the SPoT headgear device with an image of the face of the individual and configuring the SPoT headgear to identify a reflection of the face of the individual. Based on identification of the reflection as the face of the individual, the SPoT headgear device may identify (e.g., determine) that the individual is an authorized user, such as an authorized user of the SPoT headgear device and/or an authorized user that may access the particular secure area.

The SPoT headgear device may be configured to provide the unlocking code or the unlocking signal. For example, the SPoT headgear device may transmit the unlocking signal via a communication interface, such as the communication interface 7214 of FIG. 72, may provide the unlocking code via an I/O device, such as the I/O device 7206 (e.g., an earphone) of FIG. 72, or may provide the unlocking code via an electronic device that corresponds to the individual and/or the SPoT headgear device, such as the electronic device 7300 of FIG. 73.

During operation, the individual may wear the SPoT headgear device assigned to the individual. The individual may wish to access a particular secure area that is accessible via a door (e.g., a gate) that is locked. The individual may locate a reflective surface proximate to the door and position himself or herself in front of the reflective surface. The SPoT headgear device may capture an image that includes the reflective surface and may identify the reflection of the individual in the image. The SPoT headgear device may determine that the reflection includes the face of the individual. For example, software of the SPoT headgear device may perform a one-to-one test between an image of the face of the user programmed into the SPoT headgear device and a particular face (e.g., a reflection of the particular face) detected by the SPoT headgear device. Based on the SPoT headgear device determining that the reflection includes the face of the individual, the SPoT headgear may send an unlock signal to unlock the door, may transmit an identifying code corresponding to the individual, or may provide an unlock code to the individual, such as via an ear phone or an electronic device corresponding to the individual and/or the SPoT headgear device.

By detecting a reflection of the face of the user or any other identifiable item of the user of the SPoT headgear device, the SPoT headgear device may monitor compliance of the user performing one or more functions while wearing the SPoT headgear device. Although the face of the user may be partially hidden by a helmet or by a surgical mask, the SPoT headgear device may still be able to detect enough details, such as around the eyes and the forehead of the user, a badge or nametag of the user, or a combination thereof, to identify the user. Although FIG. 76 has been described in terms of operations and processes at the SPoT headgear device, such as the SPoT headgear device 7200 of FIG. 72, in other implementations some or all of the operations and processes may instead be performed on the data after the data has been transferred to another device. For example, the data may be downloaded to an electronic device, such as the electronic device 7300 of FIG. 73, and the electronic device may perform some of or all of the operations and processes on the downloaded data as described with reference to FIG. 76.

In accordance with one or more of the above-described embodiments and methods, an apparatus may include a body that is configured to support a camera while the body is worn on a head of a user. The camera may be configured to generate video data. The apparatus may also include a controller coupled to the body and configured to detect, in the video data, a reflection of a face (or other identifiable item or feature) of a person and to identify the face (or the other identifiable item or feature) as belonging to the user that is wearing the body.

A method may be performed at a device including a first camera, where a body is configured to support a camera while the body is worn on the head of a user. The camera may be configured to generate video data. The method may include detecting, in the video data, a reflection of a face (or other identifiable item or feature) of a person. The method may also include identifying the face (or the other identifiable item or feature) as belonging to the user that is wearing the body.

As a non-limiting example, the apparatus may correspond to, and the method may be performed by, one or more components of a SPoT headgear device, such as the SPoT headgear device 7200 of FIG. 72.

In accordance with one or more of the above-described embodiments and methods, an apparatus may include a receiver configured to receive video data from a headgear device. The headgear device includes a camera attached to a body that is configured to be worn on a user's head. The camera may be configured to generate video data. The apparatus may further include a processor configured to process the received video data to detect a reflection of a face (or other identifiable item or feature) of a person and to identify the face (or the other identifiable item or feature) as belonging to the user that is wearing the body.

A method may be performed at a device including a memory. The method may include receiving video data generated at a headgear device that includes a camera attached to a body that is configured to be worn on a user's head. The method may further include processing the received video data to detect a reflection of a face (or other identifiable item or feature) of a person. The method may further include identifying the face (or the other identifiable item or feature) as belonging to the user that is wearing the body.

As a non-limiting example, the apparatus may correspond to, and the method may be performed by, a computer configured to operate in a manner such as described with respect to the electronic device 7300 of FIG. 73. For example, the apparatus may be the electronic device 7330 configured to detect, using the processing engine 7326, a reflection of the user's face in the mirror 7602 of FIG. 76.

Figure 77:
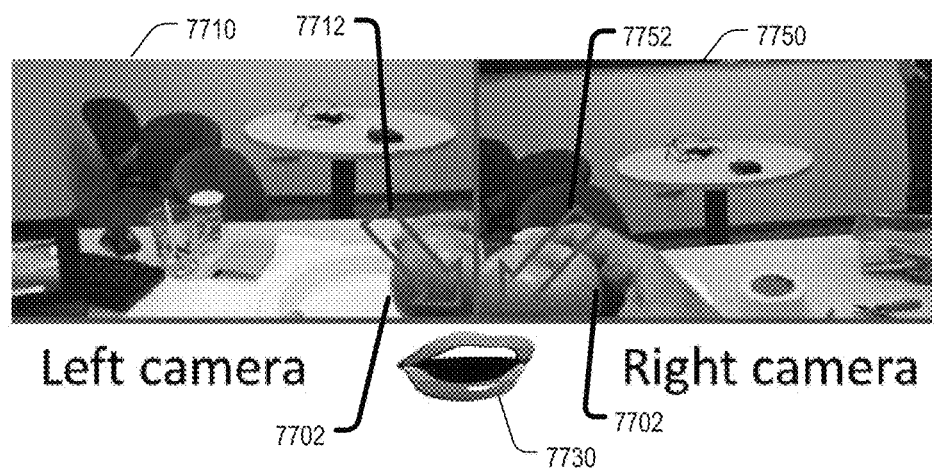
FIG. 77 is an illustration of particular embodiments of images used to detect an object provided towards a mouth of a user that is wearing a head-mountable camera apparatus.

FIG. 77 illustrates examples of images used to detect an object provided towards a face of the user wearing the SPoT headgear device. For example, the object may be provided towards a middle of the face of the user, such as towards a mouth or a nose of the user. The object may be detected by the SPoT headgear device or by an electronic device using data collected by the SPoT headgear device.

The user of the SPoT headgear device, or a health professional of the user (e.g., a doctor, a dietitian, or a trainer of the user) may want to monitor or regulate routine related actions of the user, such as taking medication, drinking water, avoiding certain foods, etc. For example, alarm clocks or other means may be used to remind the user to perform an action (e.g., drink water or take a pill) to prevent a health hazard. As another example, a video surveillance system may be used monitor the user in a particular area or location, such as when the user is in a health facility (e.g., a hospital). Conventionally, such actions are hard to monitor when the user is moving throughout the day and is not limited to a particular area.

The SPoT headgear device may include two cameras that are configurable to operate according to a stereo recording mode. For example, a first camera (e.g., a left camera) may record a first image 7710 and a second camera (e.g., a right camera) may record a second image 7750. The first image 7710 and the second image 7750 may include image data and/or video data. As depicted in FIG. 77, the first image 7710 and the second image 7750 are presented side-by-side to illustrate a field of view captured by the SPoT headgear device. An illustrative mouth 7730 of the user is depicted below and centered between the first image 7710 and the second image 7750 to provide a reference of the field of view of the SPoT headgear device with respect to the user that is wearing the SPoT headgear device.

When the user wears the SPoT headgear device, objects may be brought towards the mouth 7730 of the user. For example, eating and drinking operations may involve bringing a hand, a utensil, and/or a cup into a vicinity of the mouth 7730 and may fall within the field of view of each of the cameras. The stereo effect of the two cameras can help identify the movement of the food into the direction of the mouth 7730. Additionally, a jaw sensor that is included in the SPoT headgear device may be configured to monitor a correlation between opening of the mouth 7730 and the motion of the food towards the mouth 7730. Additionally or alternatively, the SPoT headgear device may monitor audio sounds of eating and/or a motion of the user's head (based on the static background) to further detect when the user is eating. The jaw sensor and/or the monitored audio sounds may also be used to identify objects brought towards the user's nose.

As depicted in FIG. 77, a non-ambiguous path of travel of food, such as a path of an apple 7702, into the mouth 7730 is depicted. A first arrow 7712 indicates a first direction of travel of the apple 7702 in the first image 7710, as monitored by the first camera. A second arrow 7752 indicates a second direction of travel of the apple 7702 as monitored by the second camera. A different path of the apple 7702, such as a path of motion that is not toward the mouth 7730, may have a same direction of motion in both cameras (e.g., both cameras observe motion to the left or both cameras detect motion to the right) and not indicate motion toward the mouth 7730 of the user. For example, if the apple 7702 were thrown in front of the user from the user's left to the user's right, the first camera and the second camera would each detect a motion of travel of the apple 7702 from the user's left to the user's right. However, when the apple 7702 is brought toward the user's face, the left camera may detect a first motion of travel (e.g., down and to the right) towards the user's mouth 7730 and the right camera may detect a second motion of travel (e.g., down and to the left) towards the user's mouth 7730.

The SPoT headgear device may detect (e.g., determine) whether trajectories of the first direction of travel and the second direction of travel are substantially symmetric about a centerline between the first camera and the second camera. To illustrate, the SPoT headgear device may trace the trajectories of the first direction of travel and the second direction of travel. To reduce detection errors, a size of the object should increase in the video data produced by the first camera and the second camera as the object is brought towards the face of the user. An increase of the size of the object should coincide with the first direction of travel and/or the second direction of travel towards the face of the user and may be detected to verify trajectory results.

The SPoT headgear device may detect one or more instances of objects being brought towards the mouth 7730 of the user and may capture one or more images or frames that may be processed to determine what the user is eating. The SPoT headgear device may use the detected instances to generate a report, such as a list of objects consumed or a net "food chain" (e.g., one or more video clips or images) to be viewed by the user or by a healthcare profession of the user.

During operation of the SPoT headgear device, a controller of the SPoT headgear device may be configured to detect an object in one of two stereoscopic head cameras. The controller may further be configured to detect the same object in the other of the two stereoscopic head cameras. The controller may also be configured to trace a motion of the object in the fields of view of both of the two stereoscopic head cameras and to detect that a motion of trajectory of the object in both of the two stereoscopic head cameras are substantially symmetric around a center line between the two stereoscopic head cameras.

Although FIG. 77 has been described in terms of operations and processes at the SPoT headgear device, such as the SPoT headgear device 7200 of FIG. 72, in other implementations some or all of the operations and processes may instead be performed on the data after the data has been transferred to another device. For example, the data may be downloaded to an electronic device, such as the electronic device 7300 of FIG. 73, and the electronic device may perform some of or all of the operations and processes on the downloaded data as described with reference to FIG. 77.

In accordance with one or more of the above-described embodiments and methods, an apparatus may include two cameras that are configured to generate video data. The apparatus may further include a body that is configured to support the two cameras while the body is worn on a head of a user. The apparatus may also include a controller coupled to the two cameras and configured to detect, based on the video data, an object brought toward a mouth of the user wearing the body.

As an illustrative example, a method may be performed at a device including two cameras, where a body is configured to support the two cameras while the body is worn on the head of a user. The method may include receiving, during a video recording operation of the two cameras camera, an indicator associated with detection of an object brought toward a mouth of the user wearing the body. The object may be detected based on the video data.

As another illustrative example, a method for detecting intake of an object into a mouth or nose of a user may include detecting an object in first video data produced by a first camera of two cameras operating in a stereoscopic mode. The two cameras may be supported by a body that is configured to be worn on a head of a user. The method may include detecting the object in second video data produced by a second camera of the two cameras. The method may include tracing a first motion of the object in the first video data and tracing a second motion of the object in the second video data. The method may further include detecting whether the first motion of the object and the second motion of the object are directed toward a centerline between the first camera and the second camera.

As a non-limiting example, the apparatus may correspond to, and the methods may be performed by, one or more components of a SPoT headgear device, such as the SPoT headgear device 7200 of FIG. 72.

In accordance with one or more of the above-described embodiments and methods, an apparatus may include a receiver configured to receive video data from a headgear device. The headgear device includes two cameras attached to a body that is configured to be worn on a user's head. The apparatus may further include a processor configured to process the received video data to detect an object brought toward a mouth of the user wearing the body. The object may be detected based on the video data. The processor may be configured to generate an indicator that is based on the detected object.

As an illustrative example, a method may be performed at a device including a memory. The method may include receiving video data generated at a headgear device that includes two cameras attached to a body that is configured to be worn on a user's head. The method may further include processing the received video data from the two cameras to detect an object brought toward a mouth of the user wearing the body. The object may be detected based on the video data. The method further includes generating an indicator that is based on the detected object.

As another illustrative example, a method for detecting intake of an object into a mouth or nose of a user may be performed at a device including a memory. The method may include receiving video data generated at a headgear device that includes two cameras attached to a body that is configured to be worn on a user's head. The method may include detecting an object in first video data produced by a first camera of the two cameras operating in a stereoscopic mode. The method may include detecting the object in second video data produced by a second camera of the two cameras. The method may include tracing a first motion of the object in the first video data and tracing a second motion of the object in the second video data. The method may further include detecting whether the first motion of the object and the second motion of the object are directed toward a centerline between the first camera and the second camera.

As a non-limiting example, the apparatus may correspond to, and the methods may be performed by, a computer configured to operate in a manner such as described with respect to the electronic device 7300 of FIG. 73.

Figure 78A:
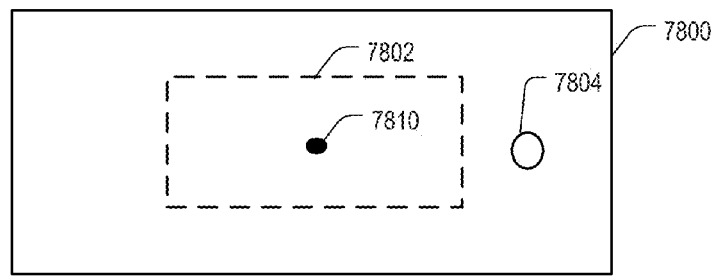
FIG. 78A is an illustration of a particular embodiment of an image that that is processed to selectively activate or deactivate a laser of a head-mountable camera apparatus.

FIG. 78A illustrates an example of selectively activating or deactivating a laser of the SPoT headgear device. For example, a laser pointer may include a light sensor that is configured to block a laser beam (e.g., a light beam) from the laser pointer if an amount of light received by the light sensor does not meet one or more criteria, as described further herein and with reference to FIG. 78B. The light sensor may include a camera and/or a photodiode, as illustrative, non-limiting examples. For example, the light sensor may include the photodiode that detects whether an area pointed to by the laser pointer is illuminated or is not illuminated (e.g., an area such as a screen in an auditorium). As another example, the light sensor may include the camera that may capture an image to be processed to determine whether or not an eye of an individual is present in the direction of the laser beam of the laser pointer.

The use of laser pointers by careless users may cause stress and/or eye damage to people standing in a path of light emitted by a laser pointer. The potential damage from a laser pointer may act as a deterrent to incorporating laser pointers into certain applications. To limit potential eye damage, limits on a power level of the laser pointers and clear user guidelines may be implemented. However, such solutions do little to prohibit careless use.

The SPoT headgear device may include a laser pointer that is positioned to project a light beam at or near a center of a field of view of one or more cameras of the SPoT headgear device. For example, an image 7800 generated by the one or more cameras may include a light spot 7810 produced by the laser pointer of the SPoT headgear device.

The laser pointer may be selectively activated or deactivated based on detection of an object 7804, such as a person or an animal, within a portion of the image 7800. For example, the laser pointer may be selectively deactivated (e.g., turned off) when the object 7804 is detected within a threshold distance, as indicated by a threshold area 7802, of the center of the field of view. Alternatively or additionally, when the object 7804 is detected within the threshold distance, the laser pointer may be prevented from being activated (e.g., prevented from being turned on). Detection of the object 7804 at or near the center of the field of view may occur in real-time or near real-time based on video image processing. The video image processing may be performed at the SPoT headgear device or at an electronic device that is communicatively coupled to the SPoT headgear device.

In some situations, such as when the user of the SPoT headgear device moves the SPoT headgear device quickly, the video image processing may not be performed quickly enough to detect the object 7804 and to deactivate the laser pointer. To protect one or more persons or animals from damage in such a situation, the SPoT headgear device may deactivate (e.g., turn off) the laser pointer based on data from one or more input/output (I/O) devices, such as an accelerometer, a compass, an inclinometer, an optical sensor, or a combination thereof, as illustrative, non-limiting examples. For example, when the SPoT headgear device or the electronic device detects, based on the accelerometer and/or the inclinometer, that the SPoT headgear device is being moved rapidly, the SPoT headgear device may deactivate the laser pointer. The laser pointer may not be activated until a determination is made that there are no people and/or animals within the threshold distance of the center of the field of view (FOV), that the SPoT headgear device is either static or moving slowly enough to detect a change in a location of the object 7804 as compared to the threshold area 7802 with sufficient time to detect the laser pointer prior to the laser pointer illuminating the object 7804, or a combination thereof.

The laser pointer may also be selectively activated and/or deactivated for a user during a presentation when the user of the SPoT headgear device uses the laser pointer in conjunction with an illuminated screen. For example, the SPoT headgear device may include a sensor (e.g., a light sensor), such as a lens, a photodiode, a camera, and/or a photocell, to determine when the center of the FOV of the camera of the SPoT headgear device points at the illuminated screen. The laser pointer may be enabled to be activated based on a determination that the center of the FOV is pointed at the illuminated screen. Alternatively or additionally, the laser pointer may be deactivated when the center of the FOV moves away from the illuminated screen. Although the laser pointer has been described in conjunction with the SPoT headgear device, the laser pointer may be used independent of the SPoT headgear device, as described with reference to FIG. 87B.

Figure 78B:
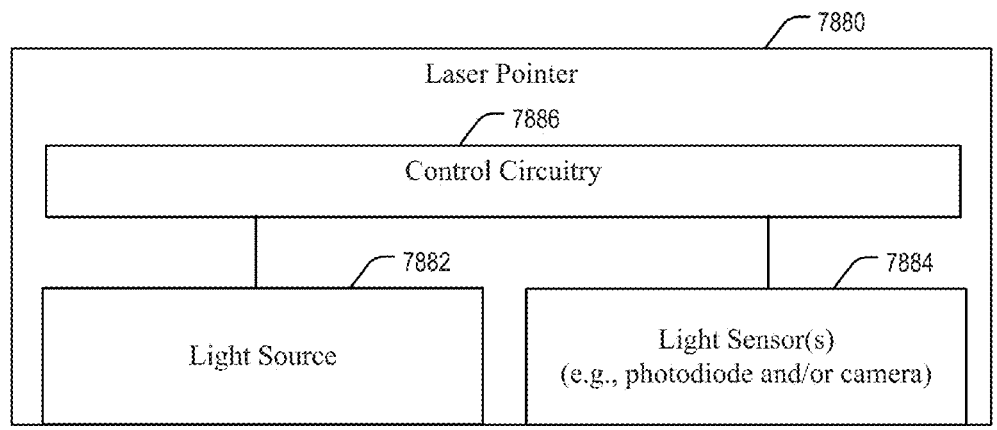
FIG. 78B is an illustration of a particular embodiment of a laser pointer.

Referring to FIG. 78B, an illustrative example of a laser pointer 7880 is depicted. As an illustrative, non-limiting example, the laser pointer 7880 may be incorporated into one or more devices that include a closed loop control system, such as the SPoT headgear device 7200 of FIG. 72 or the electronic device 7300 of FIG. 73.

The laser pointer 7880 may include a light source 7882, a light sensor 7884, and control circuitry 7886. Although the control circuitry 7886 and the light sensor 7884 are illustrated as two separate components, the control circuitry 7886 may include or be included in the light sensor 7884.

The control circuitry 7886 may be configured to determine whether to enable or disable the light source 7882 based one or more signals received from the light sensor 7884. The light source 7882 may be configured to project a beam of light. The light sensor 7884 may be configured to receive an amount of light, such as ambient light or light associated with a projection screen. For example, the light sensor 7884 may include one or more sensors, such as a photodiode, a camera, or a combination thereof, as illustrative, non-limiting examples. The light sensor 7884 may be positioned and aligned to detect light emanating from a similar direction or a same direction that the light source 7882 is configured to project the beam of light. The light source 7882 may be enabled to project the beam of light when an amount of light detected by the light sensor 7884 satisfies a threshold amount of light. The light source 7882 may be disabled (e.g., prohibited) from protecting the beam of light when the amount of light detected by the light sensor 7884 does not satisfy the threshold amount of light. For example, the threshold amount of light may be associated with or correspond to an amount of light associated with an illuminated screen. A value of the threshold amount of light may be saved in a memory (not shown) that is accessible to the control circuitry 7886. Accordingly, when the laser pointer 7880 is pointed at an illuminated screen, the light source 7882 may be enabled.

When the light sensor 7884 includes a camera, the camera may process an image captured by the camera and determine whether anyone's eyes are positioned within a direction that the beam of light may be projected, e.g., by detecting one or more eyes, a head, or a face, in the field of view of the camera. When no eyes are positioned in the direction that the beam of light may be projected, the light source 7882 may be enabled. When at least one eye is detected as being positioned in the direction that the beam of light may be projected, the light source 7884 may be disabled. The control circuitry 7886 may receive one or more signals from the light sensor 7884, such as a photodiode, a camera, or a combination thereof. The control circuitry 7886 may include hardware, software (e.g., executed by a processor), or a combination of hardware and software that is able to determine whether to enable or disable the light source 7882 based on the one or more signals received from the light sensor 7884. For example, the control circuitry 7886 may include the controller 7208 of FIG. 72 or the processor 7326 of FIG. 73, as illustrative, non-limiting examples.

The detection of presence of individuals and/or animals in the field of view can be performed by any of the following simple algorithms, or by their combination, as illustrative, non-limiting examples:

1. Frame-to-frame changes that indicate relative motion of objects in the FOV. False positives due to detection of small objects (e.g., moving leaves or ventilators) are not significant.

2. Temperature non-uniformity in the FOV. False positives due to lamps, open refrigerators or cooking soup pots are not significant.

3. Moving objects in the field of view. Static objects that seem to be moving due to the rotation of the header are not significant, as the laser pointer can turn on once the user has settled on the target and ceased the coarse motion.

By selectively activating and/or deactivating the laser pointer of the SPoT headgear device, damage to one or more persons or animals may be prevented. The laser pointer may therefore be used as a precise pointing tool for the user of the SPoT headgear device while protecting the eyes of people and animals. Although FIG. 78A has been described in terms of operations and processes at the SPoT headgear device, such as the SPoT headgear device 7200 of FIG. 72, in other implementations some or all of the operations and processes may instead be performed on the data after the data has been transferred to another device. For example, the data may be downloaded to an electronic device, such as the electronic device 7300 of FIG. 73, and the electronic device may perform some of or all of the operations and processes on the downloaded data as described with reference to FIG. 78A.

In accordance with one or more of the above-described embodiments and methods, an apparatus may include at least one camera that is configured to generate video data. The apparatus may further include a body that is configured to support the at least one camera while the body is worn on a head of a user. The apparatus may also include a controller coupled to the at least one camera and configured to selectively activate or deactivate a laser pointer based on an analysis of the video data.

A method may be performed at a device including a first camera, where a body is configured to support the first camera while the body is worn on the head of a user. The method may include selectively activating or deactivating a laser pointer based on an analysis of the video data.

As a non-limiting example, the apparatus may correspond to, and the method may be performed by, one or more components of a SPoT headgear device, such as the SPoT headgear device 7200 of FIG. 72. For example, at least a portion of the method may be performed by the SPoT headgear device 7200 of FIG. 72.

In accordance with one or more of the above-described embodiments and methods, an apparatus may include a receiver configured to receive video data from a headgear device. The headgear device includes at least one camera attached to a body that is configured to be worn on a user's head. The apparatus may further include a processor configured to process the received video data and to selectively activate or deactivate a laser pointer based on an analysis of the video data.

A method may be performed at a device including a memory. The method may include receiving video data generated at a headgear device that includes at least one camera attached to a body that is configured to be worn on a user's head. The method may further include processing the received video data and selectively activating or deactivating a laser pointer based on the processed video data.

As a non-limiting example, the apparatus may correspond to, and the method may be performed by, a computer configured to operate in a manner such as described with respect to the electronic device 7300 of FIG. 73. For example, at least a portion of the method may be performed by the electronic device 7300 of FIG. 73.

In accordance with one or more of the above-described embodiments and methods, a laser pointer may include a light source configured to generate a light beam in a direction. The laser pointer may further include a light sensor to determine an amount of light associated with the direction. The laser pointer may also include control circuitry configured to selectively enable or disable the light source based on the amount of light.

A method may be performed at a laser pointer including a light source and control circuitry. The method may include determining an amount of light in a direction associated with a direction a light beam from the light source. The method may also include selectively enabling or disabling the light source based on the amount of light.

As a non-limiting example, the apparatus may correspond to, and the method may be performed by, one or more components of a SPoT headgear device, such as the SPoT headgear device 7200 of FIG. 72, a computer configured to operate in a manner such as described with respect to the electronic device 7300 of FIG. 73 or one or more laser pointer devices such as the laser pointer 7880 of FIG. 78B. For example, at least a portion of the method may be performed by the SPoT headgear device 7200 of FIG. 72 or by the electronic device 7300 of FIG. 73.

Figure 79:
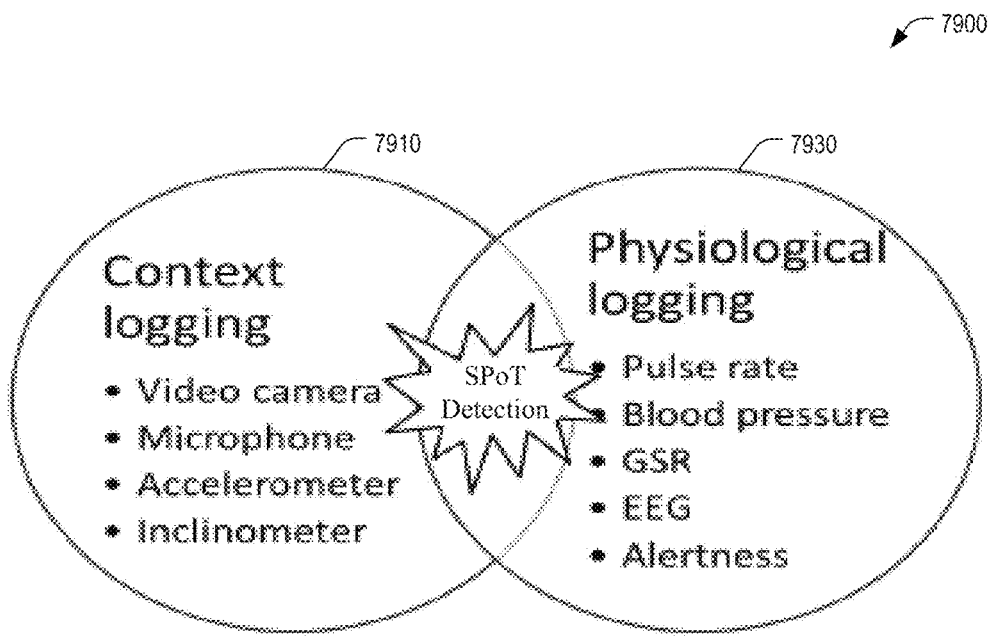
FIG. 79 is an illustration of a particular embodiment of sensors of a head-mountable camera apparatus and physiological monitoring that may be performed by the head-mountable camera apparatus.

FIG. 79 illustrates an example logging 7900 that may be performed by the SPoT headgear device used for ambulatory care monitoring. For example, the SPoT headgear device may be used to monitor one or more physiological signals in conjunction with environmental data acquired from the perspective of the user of the SPoT headgear device. Additionally or alternatively, the logging 7900 may be performed by an electronic device, such as the electronic device 7300 of FIG. 73, using data collected by the SPoT headgear device.

The SPoT device may support interpretation of a log of the one or more physiological signals to support medical diagnosis of the user by integrating the one or more physiological signals with the environmental data (e.g., video data and/or audio data). For example, the SPoT device may provide statistical data (e.g., physiological data and/or environmental data) that may be used for detection of one or more causal relationships between a trigger and a physiological reaction, such as a relationship between an environmental condition and a physiological reaction (e.g., a physiological response).

Conventional medical monitoring systems may involve the use of a private and intimate device that includes multiple sensors, wires, and patches to collect data. These medical monitoring systems may cause a user of a particular medical monitoring system a sense of embarrassment and may express to others an indication that the user has a medical condition. Often times, the users will agree to use the particular medical monitoring system in a private setting, such as in a hospital, in a clinic, or at home, but not out in public, such as at work, school, a coffee shop, a zoo, a train, etc.

The SPoT headgear device may resolve one or more problems associated with conventional medical monitoring systems while also improving such medical monitoring systems by capturing a variety of environmental data (e.g., video data and/or audio data) associated with the user of the SPoT headgear device. For example, the logging 7900 may include context logging 7910 and physiological logging 7930. The context logging 7910 and the physiological logging 7930 may be detected by the SPoT headgear device as opposed to conventional devices (e.g., a smart phone) that may perform context logging 7910 and another device (e.g., a medical sensing device) that may perform the physiological logging 7930. The combination of the context logging 7910 and the physiological logging 7930 may provide information representative of one or more medical conditions (e.g., syndromes) and/or one or more medical triggers associated with the user of the SPoT headgear device. The context logging 7910 and/or the physiological logging 7930 may be performed by the SPoT headgear device in real time or near real time.

The SPoT headgear device may include one or more input/output (I/O) devices (e.g., one or more medical sensors). The one or more sensors may be discretely incorporated into the SPoT headgear devices, such as being installed on the inner side of the SPoT headgear device. For example, one or more sensors may include a dry electroencephalogram (EEG), temple pulse sensors, temple galvanic skin response (GSR) sensors, or a combination thereof. By installing the one or more sensors on the inner side of the SPoT headgear device, the "medical SPoT headgear device" may look very similar to a "non-medical" SPoT headgear device. Accordingly, the user of the SPoT headgear device does not need to feel embarrassed and can wear the SPoT headgear device as instructed by a medical provider to properly and accurately monitor the user. The functionality of the SPoT headgear device enables logging of the physiological signals combined with logging of environmental signals to generate a unique contextual medical monitoring system.

The SPoT headgear device may be configured to monitor and generate signals associated with a pulse rate (e.g., on the superficial temporal artery), blood pressure (e.g., pulse delay between superficial temporal artery and occipital artery), GSR (e.g., resistivity changes between temples), brain wave activity (e.g., detected at a head sensor), a respiration rate (e.g., by monitoring cycling of a distinct object in the field of view), palpitations, arrhythmia, hiccups, or a combination thereof, as illustrative, non-limiting examples. Medical conditions (e.g., syndromes) that may be associated with or determined by these signals may include post-traumatic stress disorder (PTSD), generalized anxiety disorders, obsessive compulsive disorder (OCD), panic disorder, social anxiety, phobias, or a combination thereof, as illustrative, non-limiting examples.

To enable analysis, detection, and diagnosis of one or more medical conditions, the SPoT headgear device may be configured to be worn for extended periods of time, such that a user acclimates to wearing the SPoT headgear device and the medical signals are not contaminated by "noise" due to user embarrassment or stress, to provide evidence of audial triggers, visual trigger, and mechanical triggers associated with symptoms of one or more disorders, or a combination thereof. The SPoT system may be configured to detect a broad variety of stress symptoms, to screen and compile a short extract of long term monitoring using SPoT off-line software, or a combination thereof.

Data recorded by the SPoT headgear device, such as data generated based on the context logging 7910 and the physiological logging 7930, may be provided to an electronic device, such as the electronic device 7300 of FIG. 73. The electronic device may apply statistical tools, such as data mining techniques, to trace correlations between "causes" and "effects." For example, the electronic device may detect a cause and effect relationship between environmental data (e.g., data generated based on the context logging 7910) and physiological data (e.g., data generated based on the physiological logging 7930). To illustrate, the electronic device may apply data mining and/or statistical deductions to the data received from the SPoT headgear device to determine the cause and effect relationships. The electronic device may apply, off-line, the data mining and/or the statistical deductions to the data, such as not in real time or near real time as the data is acquired and/or generated by the SPoT headgear device.

As an illustrative example, the user may wear the SPoT headgear device that records data, such as physiological signals in conjunction with environmental data (e.g., audio data and/or video data), acquired from the perspective of the user. The recorded data may be stored (e.g., logged) at a device of the SPoT headgear device configured to process the recorded data. The device may accumulate recorded data over a period of time, such as hours, days, weeks, or months, and may apply data mining symptoms to detect clusters. The device may compile an analysis summary of clusters that may be indicative of one or more medical conditions or medical triggers. Although FIG. 79 has been described in terms of operations and processes at the SPoT headgear device, such as the SPoT headgear device 7200 of FIG. 72, in other implementations some or all of the operations and processes may instead be performed on the data after the data has been transferred to another device. For example, the data may be downloaded to an electronic device, such as the electronic device 7300 of FIG. 73, and the electronic device may perform some of or all of the operations and processes on the downloaded data as described with reference to FIG. 79.

In accordance with one or more of the above-described embodiments and methods, an apparatus may include at least one camera that is configured to generate video data and at least one sensor configured to generate physiological data. The apparatus may further include a chassis that is configured to support the at least one camera while the chassis is worn on a head of a user. The apparatus may also include a controller coupled to the at least one camera and configured to detect one or more conditions based on the video data and the physiological data.

A method may be performed at a device including a camera and coupled to a physiological sensor configured to generate sensor data, where a body of the device is configured to support the camera while the body is worn on the head of a user. The method may include receiving, during a video recording operation of the camera, an indicator associated with detection of one or more conditions based on the physiological data and based on video data recorded by the first camera.

As a non-limiting example, the apparatus may correspond to, and the method may be performed by, one or more components of a SPoT headgear device, such as the SPoT headgear device 7200 of FIG. 72.

In accordance with one or more of the above-described embodiments and methods, an apparatus may include a receiver configured to receive video data and physiological data from a headgear device. The headgear device includes at least one camera attached to a body that is configured to be worn on a user's head. The apparatus may further include a processor configured to process the video data and the physiological data to detect one or more conditions and to generate an indicator that is based on the one or more conditions.

A method may be performed at a device including a memory. The method may include receiving video data and physiological data generated at a headgear device that includes a camera attached to a body that is configured to be worn on a user's head. The method may further include processing the video data and the physiological data to detect one or more conditions and generating an indicator based on the detected one or more conditions.

As a non-limiting example, the apparatus may correspond to, and the method may be performed by, a computer configured to operate in a manner such as described with respect to the electronic device 7300 of FIG. 73.

Figure 80:
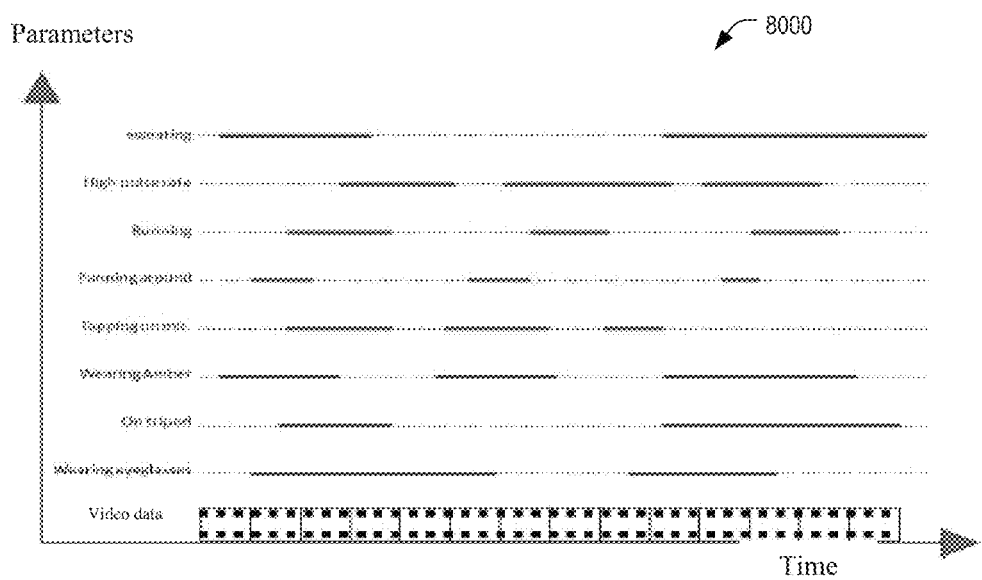
FIG. 80 is an illustration of a particular embodiment of data stored by the head-mountable camera apparatus that is indexed using physiological parameters.

FIG. 80 illustrates an example of data stored by the SPoT headgear device that is indexed using physiological parameters. The data indexed using physiological parameters is illustrated as a chart 8000. Additionally or alternatively, the data may be indexed, using the physiological parameters, and/or stored by an electronic device, such as the electronic device 7300 of FIG. 73, using data collected by the SPoT headgear device.

The SPoT headgear device may collect image data and/or video data associated with the user wearing the SPoT headgear device. The SPoT headgear device may also gather information (e.g., data) associated with the user, such as environmental data, biometric data, physiological data, and physical data. For example, one or more biometric sensors of the SPoT headgear device may measure various human conditions (e.g., tiredness, high fever, etc.). As another example, one or more physical sensors may measure physical attributes or characteristics of the user, such as movement of the head and/or the face of the user (e.g., can detect a smile). The data associated with the user may be included in metadata that accompanies a video stream (e.g., video data) generated by the SPoT headgear device. The data included in the metadata may be searchable to identify a portion of the video stream based on the data. For example, the data (e.g., sensor data) included in the metadata may be derived from a physiological sensor (indicating a physiological state of the user, such as running, sweating, coughing, a high pulse rate, etc.).

Some of the measurements recorded by the SPoT headgear device do not need any further processing (e.g. a body temperature). Other measurements may need to be analyzed (e.g., attributing head nodding to tiredness as opposed to nodding from car movement or intentional nodding by the user). The measurements recorded by the SPoT headgear device may be stored and/or processed at the SPoT headgear device or another electronic device associated with the SPoT headgear device. The data recorded by the SPoT headgear device may be aligned or synchronized based on time of measurement as in the chart 8000. The chart 8000 illustrates time along the horizontal axis and different recorded parameters along the vertical axis. For each parameter, a solid line indicates a detection of a condition (e.g., detection of sweating) during a time period for that particular parameter. Because the one or more parameters are time synchronized, each parameter may be used to index or identify data associated with the other parameters. As an illustrative, non-limiting example, the one or more parameters may be stored as part of metadata of the video data recorded by the SPoT headgear device.

For example, as depicted in FIG. 80, the video data is indicated as being recorded by multiple blocks. The SPoT headgear device may index the video data based on the other parameters, such as physiological parameters including sweating, high pulse rate, running, panning around of the SPoT headgear device, tapping on a microphone, wearing amber, being on a tripod, wearing eyeglasses, or a combination thereof. Indexing the video data may enable the user to enter search criteria that specifically relates to a user condition and/or a user mood (e.g., "show me what I was watching when my pulse rate increased and I started sweating", "find the parts in the video where I smiled", "show me the parts in the video when I was driving over 60 MPH"). When searching for video data (e.g., video content) in an archive, the user of the SPoT system may use physiological parameters as search parameters to identify portions of the video data. Accordingly, the user can use deep metadata (physiological data) as a search criteria for archived data (e.g., stored data).

Although FIG. 80 has been described in terms of operations and processes at the SPoT headgear device, such as the SPoT headgear device 7200 of FIG. 72, in other implementations some or all of the operations and processes may instead be performed on the data after the data has been transferred to another device. For example, the data may be downloaded to an electronic device, such as the electronic device 7300 of FIG. 73, and the electronic device may perform some of or all of the operations and processes on the downloaded data as described with reference to FIG. 80.

In accordance with one or more of the above-described embodiments and methods, an apparatus may include a body that is configured to support a camera while the body is worn on a head of a user. The camera may be configured to generate video data. The apparatus may also include a controller coupled to the body and configured to receive sensor data from a physiological sensor coupled to the body and determine a physiological state of the user based on the sensor data. The controller may also be configured to include searchable data, based on the physiological state, in metadata corresponding to a portion of the video data.

As an illustrative example, a method may be performed at a device including a camera and a physiological sensor configured to generate physiological data. A body is configured to support the camera while the body is worn on the head of a user. The method may include receiving, during a video recording operation of the camera, an indicator based on the physiological data and to attaching a tag to the video data based on the indicator. The tag is operable to index the video data.

As another illustrative example, a method may be performed at a device including a camera and coupled to a physiological sensor configured to generate sensor data, where a body of the device is configured to support the camera while the body is worn on the head of a user. The method may include receiving, during a video recording operation of the camera, the sensor data from the physiological sensor and determining a physiological state of the user based on the sensor data. Searchable data may also be included, based on the physiological state, in metadata corresponding to a portion of the video data.

As a non-limiting example, the apparatus may correspond to, and the methods may be performed by, one or more components of a SPoT headgear device, such as the SPoT headgear device 7200 of FIG. 72.

In accordance with one or more of the above-described embodiments and methods, an apparatus may include a receiver configured to receive video data and physiological data from a headgear device. The headgear device includes at least one camera attached to a body that is configured to be worn on a user's head. The apparatus may further include a processor configured to receive sensor data from a physiological sensor coupled to the body and to determine a physiological state of the user based on the physiological data. The processor may also be configured to include searchable data, based on the physiological state, in metadata corresponding to a portion of the video data.

As an illustrative example, a method may be performed at a device including a memory. The method may include receiving video data and physiological data generated at a headgear device that includes at least one camera attached to a body that is configured to be worn on a user's head. The method may further include receiving an indicator based on the physiological data and attaching a tag to the video data based on the indicator. The tag is operable to index the video data.

As another illustrative example, a method may be performed at a device including a memory. The method may include receiving video data and physiological data generated at a headgear device that includes a camera attached to a body that is configured to be worn on a user's head. The method may further include determining a physiological state of the user based on the physiological data and including searchable data, based on the physiological state, in metadata corresponding to a portion of the video data.

As a non-limiting example, the apparatus may correspond to, and the methods may be performed by, a computer configured to operate in a manner such as described with respect to the electronic device 7300 of FIG. 73.

Figure 81:
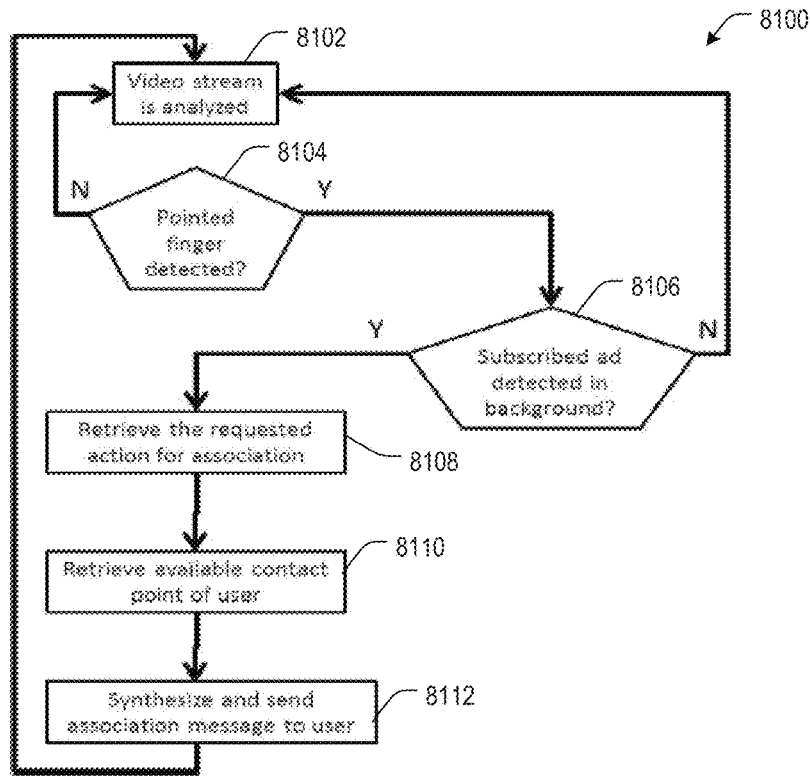
FIG. 81 is an illustration of a particular embodiment of a flowchart of a method of detecting a pointer.

FIG. 81 illustrates an example of a method 8100 of detecting a pointer. For example, the method 8100 may be executed by a SPoT headgear device, by an electronic device, or a combination thereof, as described herein. The method 8100 also includes detecting an objected pointed to by the pointer and performing one or more actions based on the object. For example, detection of an object pointed to by the pointer may include detecting a gesture of a user that indicates the user's interest in an object, such as an advertisement. The user's interest in the advertisement may be reported to the user, to a vendor associated with the advertisement, or a combination thereof. The manner in which the user's interest is reported may be determined based on preference of the user, such as a parameter set by the user.

The method 8100 may enable an automatic association between a commercial message and the user by detecting a body part in an image. The body part of the user may be visually and intentionally linked to the object that is associated with the commercial message. For example, an advertisement may be placed on a sign (e.g., a billboard), by a highway or by a rail road, advertising a good or a service, such as a movie, a car, a vacation, or an insurance policy. The user of the SPoT headgear device may pass the billboard, either as a car driver, as a train passenger, or as a bicycle rider, and may notice the sign. The user may be unwilling or unable to stop a motion of travel to take a note of the message. For example, the user may not want to be distracted from a route the user is traveling for more than a fraction of a second.

Figure 82:
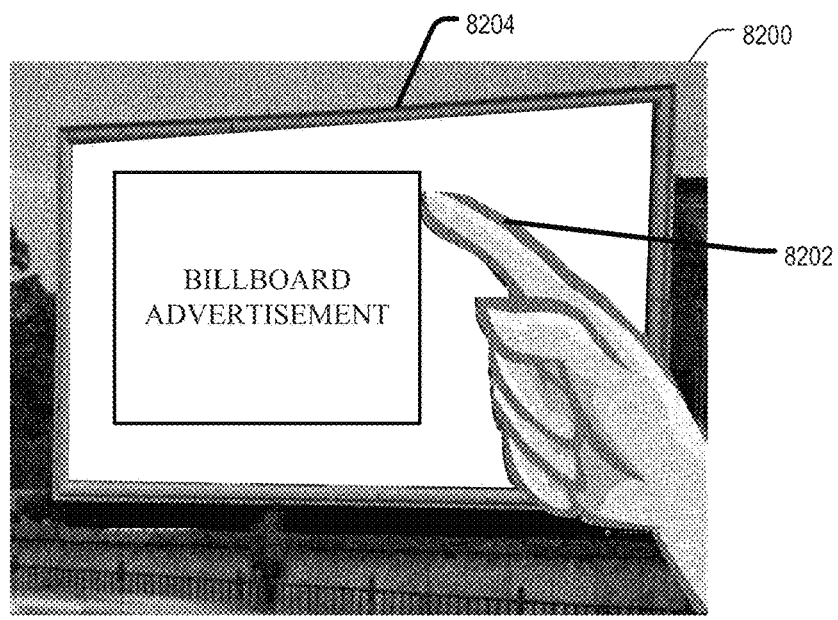
FIG. 82 is an illustration of a particular embodiment of an image including a billboard and a pointer recognizable by a head-mountable camera system as an indicator for the billboard.

The user of the SPoT headgear device may express an interest in the sign by making a pointing gesture with the user's hand. A camera of the SPoT headgear device may capture, in a video data stream of a field of view of the camera, the pointing finger of the user and the advertisement, as illustrated in FIG. 82. For example, the user may simply point 8202 at a billboard 8204 and the SPoT headgear device may capture an image 8200.

Upon off-line processing of the video data stream, the SPoT headgear device may detect the pointer 8202 and process the object pointed at to identify the advertisement. The SPoT headgear device may retrieve content based on the advertisement and may provide the content to the user of the SPoT headgear device. As an illustrative example, the advertisement may be included in a set of "subscribed" objects (e.g., registered advertisements) stored at a server associated with the SPoT headgear device. To assist the SPoT headgear device to detect the advertisement, an advertiser may include an easily detectable barcode, QR code, or an icon in the advertisement. Based on detection of the advertisement, a message may be automatically created that corresponds to the advertisement and that is linked to contact information of the user. Alternatively or additionally, the message may be provided to a party responsible for the advertisement, such as sending the message to a server associated with the advertisement. At the server, a pre-defined action may be taken, such as emailing the user a message that includes a link to the web site or more information about the subject matter of the advertisement. For example, when the advertisement is for a movie, the message may include a link to a website of the movie, a name of the nearest theater to where the user lives that screens the film, reviews of the movie, or a combination thereof.

As an illustrative example, the user of the SPoT headgear device may desire to take note of the object, such as the advertisement, that the user sees. However, the user may not be in a position to have enough time to observe the object because the user is otherwise preoccupied, such as driving, or in a hurry. For example, the user may be interested in a product or service that is offered on the billboard, such as a highway advertisement, but may not be able to text a message while driving, write a note while driving, memorize the offering and the contact details, or stop a car on the highway and take a careful note. The user may simply point 8202 at the billboard 8204 and the SPoT headgear device may capture the image 8200, as illustrated in FIG. 82.

The method 8100 of FIG. 81 may include analyzing a video data stream, at 8102. The video data stream may be been generated by the SPoT headgear device, such as the headgear 102 of FIG. 1 or the SPoT headgear device 7200 of FIG. 72. The video data stream may be analyzed by the SPoT headgear device or one or more other devices included in a SPoT system, such as an electronic device such as a phone, a computer, or a server associated with the SPoT headgear device.

The method 8100 may include determining whether a pointer, such as a pointed finger, is detected in the video data stream, at 8104. If no pointer is detected, processing may return to 8102. If the pointer is detected, the method 8100 may include determining whether an object, such as a subscribed advertisement, is detected in the background of the video data stream, at 8106. If no advertisement is detected, processing may return to 8102. If an advertisement is detected, the method 8100 may include retrieving a requested action for association. The method 8100 may retrieve an available contact point of the user, at 8110, and synthesizing and sending an association message to the user, at 8112.

Referring to FIG. 82, an example of detecting a gesture of a user that indicates the user's interest in an advertisement may include detecting an appearance of a pointing object, such as the pointer 8202 (e.g., a finger or an arm), in a field of view. For example, the gesture may be detected by a SPoT headgear device, by an electronic device, or a combination thereof, as described herein. The field of view may be generated by a camera, such as a camera of the SPoT headgear device. At least one pointed object that pointed to by the pointing object may be detected in the field of view. A determination may be made whether the at least one pointed object is included in a list of solicited objects. To illustrate, the list of solicited objects may include advertisements associated with vendors who paid for capturing instances of interest. When the at least one pointed object is included in the list of solicited objects, a record of the instance of the user's interest may be created. The record may indicate a connection between the user and the pointed object that is included in the list of solicited objects. The record may also include time and place indications associated with the user's interest, as illustrative, non-limiting examples. The record can be delivered to the user, to the vendor, or a combination thereof, depending on one or more preferences set by the user and/or the vendor.

By enabling the user of the SPoT headgear device to request and obtain more information about the object, such as the advertisement, in response to the user's pointing, the user may express an intention by a casual pointing at stationary object without requiring the user to stop what the user is doing. Accordingly, information is provided to the user with reduced user distraction as compared to conventional information gathering methods.

Although FIGS. 81 and 82 has been described in terms of operations and processes at the SPoT headgear device, such as the SPoT headgear device 7200 of FIG. 72, in other implementations some or all of the operations and processes may instead be performed on the data after the data has been transferred to another device. For example, the data may be downloaded to an electronic device, such as the electronic device 7300 of FIG. 73, and the electronic device may perform some of or all of the operations and processes on the downloaded data as described with reference to FIGS. 81 and 82.

In accordance with one or more of the above-described embodiments and methods, an apparatus may include at least one camera that is configured to generate video data. The apparatus may further include a body that is configured to support the at least one camera while the body is worn on a head of a user. The apparatus may also include a controller coupled to the at least one camera and configured to detect an advertisement based on a pointer included in an image and to generate a message based on the user associated with the camera used to capture the image.

As another illustrative example, an apparatus may include a camera that is configured to generate video data. The apparatus may further include a body that is configured to support the camera while the body is worn on a head of a user. The apparatus may also include a controller coupled to the camera. The controller may be configured to detect a pointer in the received video data (e.g., the received video data corresponding to a field of view associated with the camera). The controller may also be configured to detect, in the field of view, at least one object pointed to by the pointer. The controller may further be configured to determine whether a plurality of solicitation objects includes the detected object and, when the plurality of solicitation objects includes the detected object, to create a record associated with detection of the object. The record may indicate an association between the user and the object.

As another illustrative example, a method may be performed at a device including a camera, where a body is configured to support the camera while the body is worn on the head of a user. The method may include receiving, during a video recording operation of the camera, an indicator associated with detection of an advertisement based on a pointer included in an image and generating a message based on the user associated with the camera used to capture the image.

As another illustrative example, a method may be performed at a device including a camera, where a body is configured to support the camera while the body is worn on the head of a user. The method may include detecting a pointer in received video data corresponding to a field of view associated with the camera. The method may further include detecting, in the field of view, at least one object pointed to by the pointer. The method may also include determining whether a plurality of solicitation objects includes the detected object. The method may further include, when the plurality of solicitation objects includes the detected object, creating a record associated with detection of the object. The record may indicate an association between the user and the object.

As a non-limiting example, the apparatuses may correspond to, and the methods may be performed by, one or more components of a SPoT headgear device, such as the SPoT headgear device 7200 of FIG. 72.

In accordance with one or more of the above-described embodiments and methods, an apparatus may include a receiver configured to receive video data from a headgear device. The headgear device includes at least one camera attached to a body that is configured to be worn on a user's head. The apparatus may further include a processor configured to process the received video data to detect an advertisement based on a pointer included in the video data and to generate a message based on the user associated with the camera used to capture the video data.

As another illustrative example, an apparatus may include a receiver configured to receive video data associated with a field of view of a camera (e.g., a receiver to receive video data from a SPoT headgear device, the video data captured by a camera of the SPoT headgear device, for off-line processing). The apparatus may further include a processor configured to process the received video data to detect a pointer in the received video data. The controller may also be configured to detect, in the field of view, at least one object pointed to by the pointer. The controller may further be configured to determine whether a plurality of solicitation objects includes the detected object and, when the plurality of solicitation objects includes the detected object, to create a record associated with detection of the object. The record may indicate an association between the user and the object.

As another illustrative example, a method may be performed at a device including a memory. The method may include receiving video data generated at a headgear device that includes at least one camera attached to a body that is configured to be worn on a user's head. The method may further include processing the received video data to detect an advertisement based on a pointer included in the video data and generating a message based on the user.

As another illustrative example, a method may be performed at a device including a memory. The method may include receiving video data having a field of view generated by a camera. The method may include detecting a pointer in the received video data. The method may further include detecting, in the field of view, at least one object pointed to by the pointer. The method may also include determining whether a plurality of solicitation objects includes the detected object. The method may further include, when the plurality of solicitation objects includes the detected object, creating a record associated with detection of the object. The record may indicate an association between the user and the object.

As a non-limiting example, the apparatuses may correspond to, and the methods may be performed by, a computer configured to operate in a manner such as described with respect to the electronic device 7300 of FIG. 73.

Figure 83:
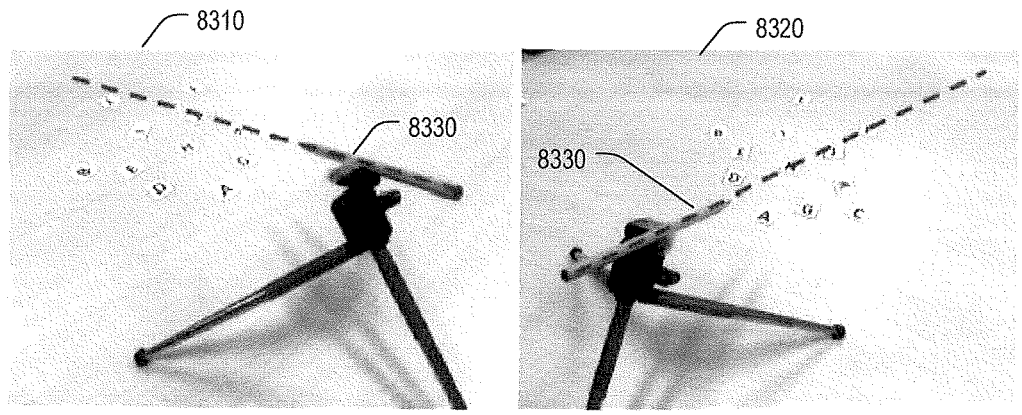
FIG. 83 is an illustration of a particular embodiment of stereoscopic images that each include an object pointed to by a pointer.

FIG. 83 illustrates an example of images, such as stereoscopic images, that each include an object pointed to by a pointer. The SPoT headgear device may process the images to detect the object based on the pointer included in first video data and in the second video data. Additionally or alternatively, the images may be processed by an electronic device, such as the electronic device 7300 of FIG. 73, using data collected by the SPoT headgear device.

When the user of the SPoT headgear device points to an object in a field of view of the user, the SPoT headgear device may process image data and/or video data to identify the object the user is pointing to. Accurately identifying which object is being pointed to is complicated by the fact that a line extending from a pointer (e.g., a finger of a hand) from the perspective of the user and a line extending from the pointer as captured in an image by a camera of the SPoT headgear device may not be co-linear (e.g., the lines do not emerge from eyes/lens). When a single camera is used, there may not be enough information available from an image produced by the single camera (or a field of view of the single camera) to deduce which object is pointed to unless the pointer is positioned on the object (e.g., unless a tip of the pointing object (e.g., the pointer) is positioned on top of the pointed object). Additionally, when the single camera is used, an ambiguity may exist as the pointer defines a straight line in space and the straight line may cross several objects when extrapolated. Since the point of view of the single camera is different than the point of view of a user's eye, deducing what the pointer is pointing at may be difficult. Accordingly, the SPoT headgear device, such as SPoT software configured to process image data and/or video data, may be configured to identify the object pointed to by the pointer with reduced (or removed) ambiguity. For example, the SPoT headgear device may process multiple images, such as stereoscopic images 8310, 8320, to accurately identify the object.

Stereoscopic images may be processed to identify an object pointed to with reduced and/or eliminated ambiguity as compared to processing a single image to identify the object. In conventional systems, software configured to process stereoscopic images may be configured to calculate a three dimensional position in space (e.g., a three dimensional data structure or model) of the pointer and of every object in the stereoscopic images. The software may extrapolate, from the images, a pointing direction of the pointer and determine an object pointed to by the pointer in the three dimensional space. Calculating the object pointed to the by pointer in the three dimensional space may be calculation intensive and require a great deal of processing power. By identifying objects based on two-dimensional analysis, the SPoT software associated with the SPoT headgear device may process the stereoscopic images without building a three dimensional model using reduced computation and power as compared to systems that build a three dimensional model.

The stereoscopic images may include a first image 8310 and a second image 8320 that are acquired using the SPoT headgear device. The first image 8310 may be recorded by a first camera of the SPoT headgear device and the second image 8320 may be recorded by a second camera of the SPoT headgear device. The first image 8310 and the second image 8320 may be captured concurrently, such as during a same time period, or simultaneously. The first camera and the second camera may be configurable to operate according to a stereo recording mode.

In the images 8310, 8320, a pointer 8330 (e.g., representative of a user's hand or extended finger) points to an object, such as one of the letters strewn randomly on a surface of a table. The pointed to object is on, or very near, a straight line (a dashed line superimposed on both images 8310, 8320 for explanation purposes) through the pointer 8330, in both cameras.

Referring to the first image 8310, the straight line from the pointer 8330 extends through or near letters C, K, J and L. Accordingly, the first image 8310 is processed as a two dimensional image to determine a first set of objects (e.g., a first list of objects) that may be pointed to by the pointer 8330. Based on the first image 8310 alone, there is not enough information for the SPoT headgear device to accurately determine which letter the pointer 8330 is pointing to.

Referring to the second image 8320, the straight line from the pointer 8330 extends through or near letters D, H, J or F. Accordingly, the second image 8320 is processed as a two dimensional image to determine a second set of objects (e.g., a second list of objects) that may be pointed to by the pointer 8330. Based on the second image 8320 alone, there is not enough information for the SPoT headgear device to accurately determine which letter the pointer 8330 is pointing to.

The first set of objects and the second set of objects may be compared to identify a particular object that is common to both sets. For example, a comparison may be performed between one or more candidate objects in the first set of objects and one or more candidate objects in the second set of objects. The only object that meets the straight line in both the first image 8310 and the second image 8320 is the letter J. Accordingly, the object pointed to by the pointer, e.g., the letter J, is identified as being a candidate object that is in the first set of objects and that is in the second set of objects. Therefore, the SPoT headgear device may determine that the pointer 8330 is pointing to the letter J. The determination that the pointer 8330 is pointing to the letter J is by performing two different two dimensional analyses instead of a three dimensional analysis.

Figure 84:
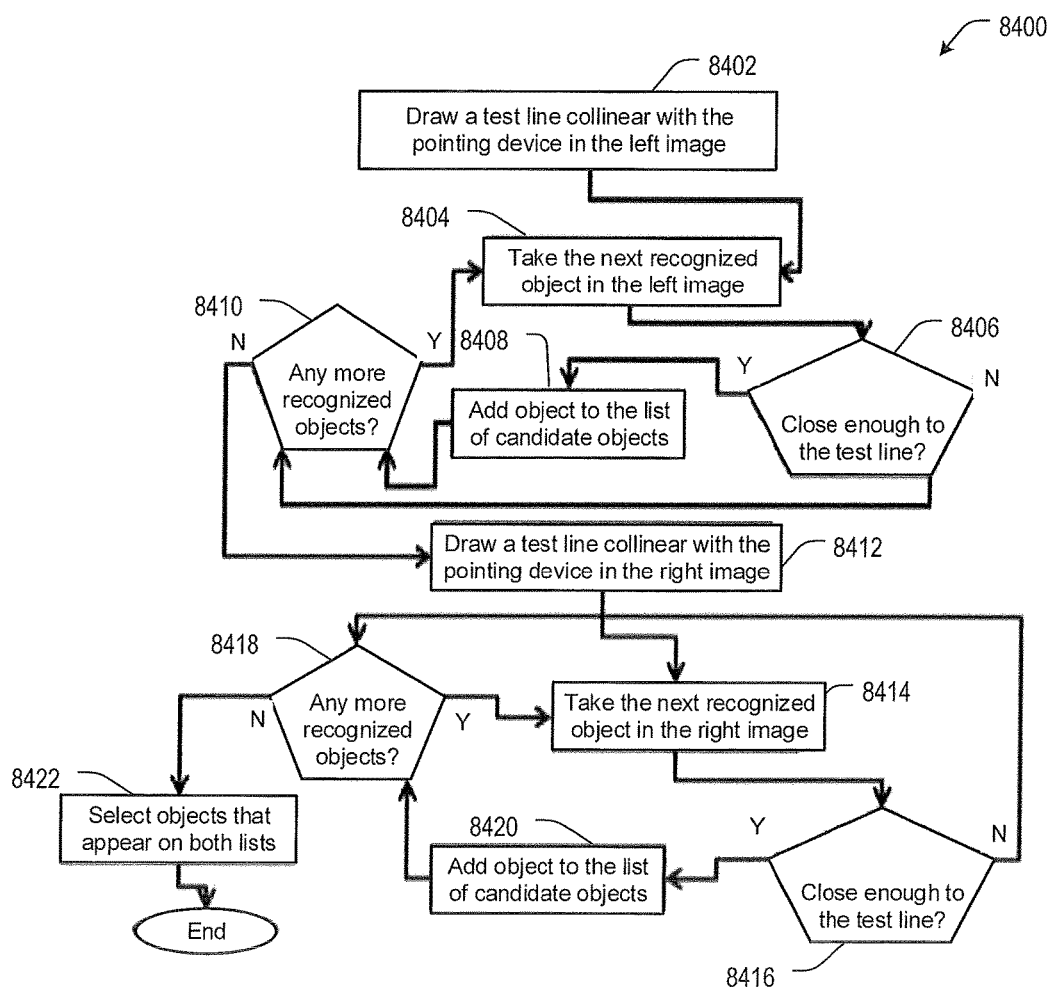
FIG. 84 is an illustration of a particular embodiment of a flowchart of a method of detecting an object using multiple images or multiple video streams.

Referring to FIG. 84, a method 8400 to detect an object using multiple images or multiple video streams is described. The method 8400 may be implemented by a device of the SPoT system, such as the SPoT headgear device, an electronic device, such as a phone or computer, or a server associated with the SPoT system. The multiple images or the multiple video streams may be stereoscopic image or stereoscopic video streams.

The method 8400 may include drawing a first line collinear with a pointer device in a left image generated by a SPoT headgear device, at 8402, and selecting an object in the left image at 8404. At 8406, the method 8400 may include determining whether the object is close to the first line. For example a distance between the object and the first line may be measured or estimated, and the distance may be compared to a first threshold distance. If the object is not close to the first line, processing advances to 8410. If the object is close enough to the first line, the method 8400 may include adding the object to a first list of candidate objects, at 8408, and processing may advance to 8410. The method 8400 may include determining whether any more objects may be recognized in the left image, at 8410. If more objects may be recognized, processing advances to 8404. If more objects may not be recognized, processing advances to 8412.

The method 8400 may include drawing a second line collinear with the pointer device in a right image generated by a SPoT headgear device, at 8412, and selecting an object in the right image at 8414. At 8416, the method 8400 may include determining whether the object is close to the second line. For example a distance between the object and the second line may be measured or estimated, and the distance may be compared to a second threshold distance that is the same or different as the first threshold distance. If the object is not close to the second line, processing advances to 8418. If the object is close enough to the second line, the method 8400 may include adding the object to a second list of candidate objects, at 8420, and processing may advance to 8418.

The method 8400 may include determining whether any more objects may be recognized in the right image, at 8418. If more objects may be recognized, processing advances to 8414. If more objects may not be recognized, processing advances to 8422 where the method 8400 may include selecting an object that appears in both the first list of candidate objects and the second list of candidate objects as the object pointed to by the pointer.

By using stereoscopic principles applied by software to the first image (e.g., the left image) and the second image (e.g., the right image), valuable information in a scene being analyzed may be realized. For example, using the two images, three points from each image may be used to identify an object pointed to by the pointer. The three points may include a beginning of a pointing vector, an end of a pointing vector, and a point of an object in the field of view that is close to or intersects the pointing vector.

Although FIGS. 83 and 84 has been described in terms of operations and processes at the SPoT headgear device, such as the SPoT headgear device 7200 of FIG. 72, in other implementations some or all of the operations and processes may instead be performed on the data after the data has been transferred to another device. For example, the data may be downloaded to an electronic device, such as the electronic device 7300 of FIG. 73, and the electronic device may perform some of or all of the operations and processes on the downloaded data as described with reference to FIGS. 83 and 84.

In accordance with one or more of the above-described embodiments and methods, an apparatus may include a first camera configured to generate a first image and a second camera configured to generate a second image. The apparatus may further include a body that is configured to support the first camera and the second camera while the body is worn on a head of a user. The apparatus may also include a controller coupled to the first camera and the second camera and configured to detect a first set of objects pointed to by the pointer in the first image based on a first two dimensional analysis of the first image and to detect a second set of objects pointed to by the pointer in the second image based on a second two dimensional analysis of the second image. The controller may further be configured to perform a comparison of one or more candidate objects in the first set of objects to one or more candidate objects in the second set of objects and to identify the object pointed to by the pointer as being a candidate object that is in the first set and that is in the second set.

A method may be performed at a device including a first camera and a second camera, where a body is configured to support the two cameras while the body is worn on the head of a user. The method may include receiving, during a video recording operation of the first camera and the second camera, a first image generated by the first camera and a second image generated by the second camera. The first image may include a pointer that points to an object and the second image may include the pointer that points to the object. The method may further include detecting a first set of objects pointed to by the pointer in the first image based on a first two dimensional analysis of the first image and detecting a second set of objects pointed to by the pointer in the second image based on a second two dimensional analysis of the second image. The method may further include performing a comparison of one or more candidate objects in the first set of objects to one or more candidate objects in the second set of objects and identifying the object pointed to by the pointer as being a candidate object that is in the first set and that is in the second set.

As a non-limiting example, the apparatus may correspond to, and the method may be performed by, one or more components of a SPoT headgear device, such as the SPoT headgear device 7200 of FIG. 72.

In accordance with one or more of the above-described embodiments and methods, an apparatus may include a receiver configured to receive a first image and a second image from a headgear device. The headgear device may include a first camera to generate the first image and a second camera to generate the second image. The headgear also includes a body having the first camera and the second camera attached thereto. The body may be configured to be worn on a user's head. The apparatus may further include a processor configured to process the first image and the second image to detect a first set of objects pointed to by the pointer in the first image based on a first two dimensional analysis of the first image and to detect a second set of objects pointed to by the pointer in the second image based on a second two dimensional analysis of the second image. The processor may further be configured to perform a comparison of one or more candidate objects in the first set of objects to one or more candidate objects in the second set of objects and to identify the object pointed to by the pointer as being a candidate object that is in the first set and that is in the second set.

A method may be performed at a device including a first camera, a second camera, and a body, where the body is configured to support the first camera and the second camera while the body is worn on a head of a user. The method may include receiving, during a video recording operation of the first camera and the second camera, a first image generated by the first camera and a second image generated by the second camera. The first image may include a pointer that points to an object and the second image may include the pointer that points to the object. The method may further include detecting a first set of objects pointed to by the pointer in the first image based on a first two dimensional analysis of the first image and detecting a second set of objects pointed to by the pointer in the second image based on a second two dimensional analysis of the second image. The method may further include performing a comparison of one or more candidate objects in the first set of objects to one or more candidate objects in the second set of objects and identifying the object pointed to by the pointer as being a candidate object that is in the first set and that is in the second set.

As a non-limiting example, the apparatus may correspond to, and the method may be performed by, a computer configured to operate in a manner such as described with respect to the electronic device 7300 of FIG. 73.

Figure 85:
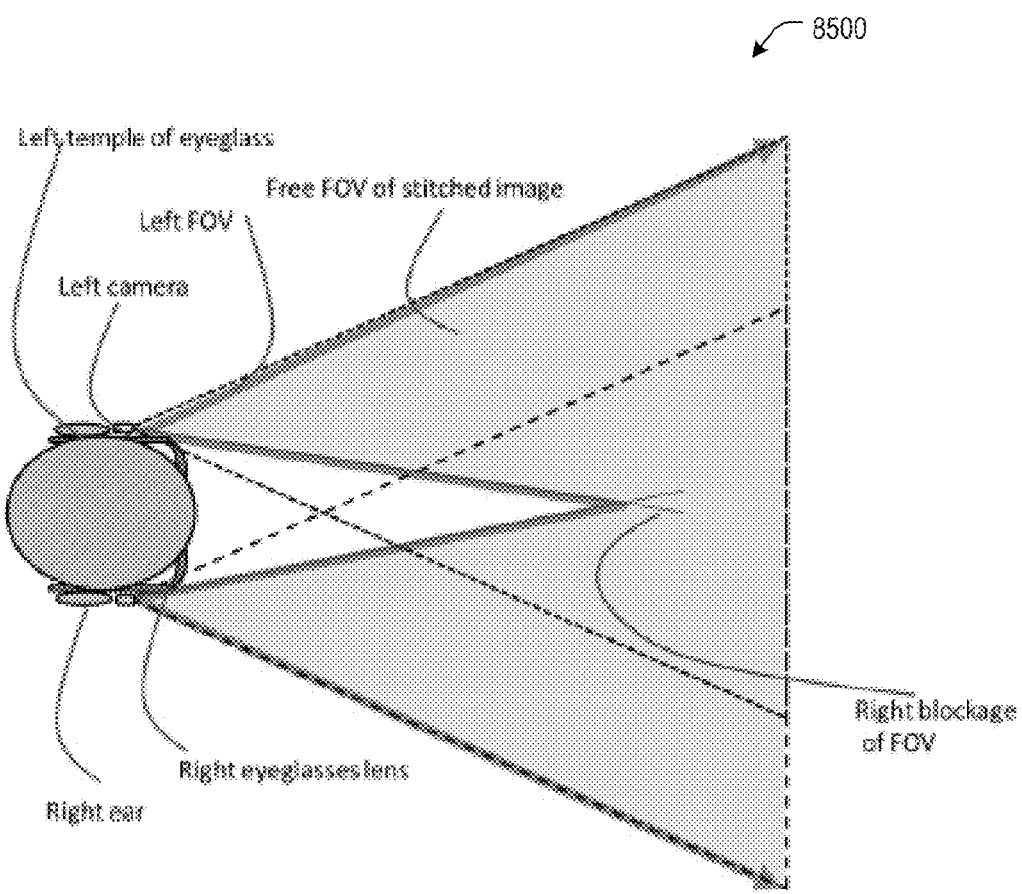
FIG. 85 is an illustration of a particular embodiment of a user wearing a head-mountable camera apparatus.

FIG. 85 illustrates an example 8500 of the user wearing a SPoT headgear device. One or more cameras of the SPoT headgear device may be positioned so that a field of view of each camera is not blocked, such as by a portion of a user's head or by a pair of spectacles worn by the user. However, as the cameras are typically behind a face plane of the user, such blockages may occur and may be unavoidable.

In FIG. 85, the blockage situation is described in the context of a field of view of one or more cameras of the SPoT headgear device being at least partially blocked by glasses worn by the user.

The unblocked field of view of the cameras of the SPoT headgear device is illustrated using dashed lines. The blocked field of view of the cameras resulting from the blockage is represented as solid lines. In some implementations, the near-central area that is out of the field of view resulting from the blockage extends to a few centimeters in front of the nose and may be relatively small. To account for the blockage resulting from the glasses of the user, the SPoT headgear device may combine the images from the cameras of the SPoT headgear device so as to remove the blockage, as described with reference to FIGS. 86A-B.

Figure 86A:
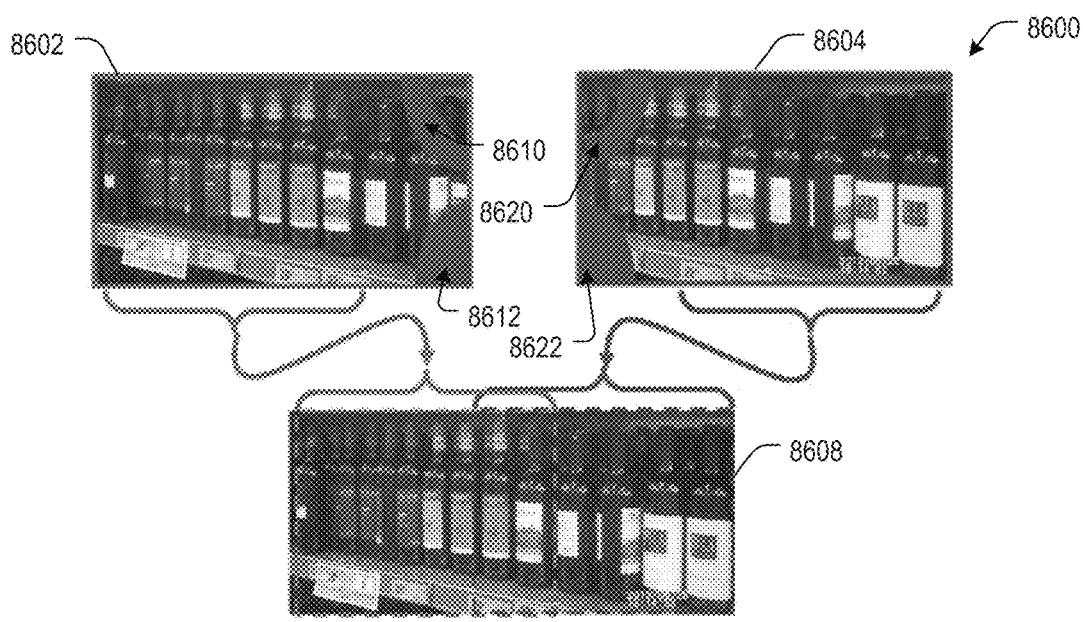
FIGS. 86A-B are illustrations of particular embodiments of cropping stereoscopic images to generate a combined image.

Referring to FIG. 86A, an illustrative example of cropping stereoscopic images to generate a combined image is depicted and generally designated 8600. The stereoscopic images may be cropped by the SPoT headgear device and/or by an electronic device using data collected by the SPoT headgear device, as described further herein. A first image 8602 may be generated by a left camera of the SPoT headgear device and a second image 8604 may be generated by a right camera of the SPoT headgear device. The left camera and the right camera may operate in a stereo recording mode.

The first image 8602 may include a first blockage 8610 and a second blockage 8612 and the second image 8604 may include a third blockage 8620 and a fourth blockage 8622. For example, the first blockage 8610 and the third blockage 8620 may correspond to the glasses worn by the user, as depicted in FIG. 85. As another example, the second blockage 8612 and the fourth blockage 8622 may correspond to a nose of the user.

The SPoT headgear device or off-line computer processing (e.g., an off-line processor, such as the processor 7308 of the electronic device 7300 of FIG. 73) the video from a recording may stitch a first part of the first image 8602 to a second part of the second image 8604 to generate a combined image 8608 that does not include the blockages 8610, 8620 and represents a combined field of view of the first camera and the second camera. For example, the SPoT headgear device or the off-line processor may crop the first image 8602 to eliminate (e.g., remove) the first blockage 8610 and the second blockage 8612 and may crop the second image 8604 to eliminate the third blockage 8620 and the fourth blockage 8622. After the first image 8602 and the second image 8604 have been cropped, the SPoT headgear device or the off-line processor may generate the combined image 8608 by combining the first cropped image and the second cropped image.

Figure 86B:
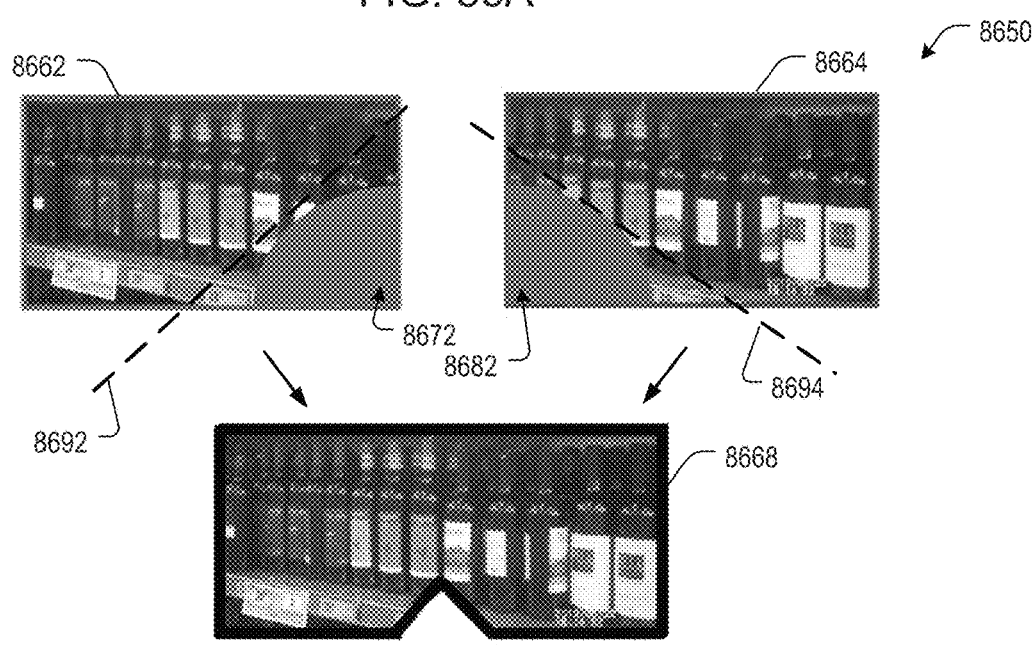

Referring to FIG. 86B, another illustrative example of cropping stereoscopic images to generate a combined image is depicted and generally designated 8650. The stereoscopic images may be cropped by the SPoT headgear device and/or by an electronic device using data collected by the SPoT headgear device, as described further herein. A first image 8662 may be generated by a left camera of the SPoT headgear device and a second image 8664 may be generated by a right camera of the SPoT headgear device. The left camera and the right camera may operate in a stereo recording mode. An outline of the combined image may resemble an outline of a pair of glasses or a pair of safety goggles.

The first image 8662 may include a first blockage 8672 and the second image 8664 may include a second blockage 8682. For example, the first blockage 8672 and the second blockage 8682 may correspond to a nose of the user. The SPoT headgear device or the off-line processor may stitch a first part of the first image 8662 to a second part of the second image 8664 to generate a combined image 8668 that does not include the blockages 8672, 8682 and represents a combined field of view of the first camera and the second camera. For example, the SPoT headgear device or the off-line processor may crop the first image 8662 to eliminate (e.g., remove) the first blockage 8672 and may crop the second image 8664 to eliminate the second blockage 8682. To illustrate, the first image 8662 may be cropped along a first cropping line 8692 and the second image 8664 may be cropped along a second cropping line 8694.

After the first image 8662 and the second image 8664 have been cropped, each of the first image 8662 and the second image 8664 may have more than four sides. As an illustrative, non-limiting example, one of the first image 8662 or the second image 8664 may be cropped to have at least five sides. After the first image 8662 and the second image 8664 have been cropped, the SPoT headgear device or the off-line processor may generate the combined image 8668 by combining the first cropped image and the second cropped image. The combined image 8668 may not include portions of the first image 8662 and the second image 8664 that correspond to the first blockage 8672 and the second blockage 8682 (e.g., the nose of the user), such as the lower center part of the combined image 8668. For example, the combined image 8668 may have more than four sides. Accordingly, the combined image 8668 may not be rectangular and may have more than four sides. As an illustrative, non-limiting example, the combined image 8668 may have at least seven sides. As illustrated in FIG. 86B, the combined image 8668 is generally rectangular with a lower center portion missing (e.g., the lower center portion that would include the blockages 8672, 8682).

As an illustrative, non-limiting example, the first image 8662 may have a first rectangular border. The first image 8662 may be cropped to produce a first border of a first cropped image having more than four sides (e.g., cropping the first image 8662 may result in a border of a first cropped image having more than four sides). To illustrate, the first image 8662 may be cropped to remove a bottom right corner of the first image 8662. The second image 8664 may have a second rectangular border. The second image 8664 may be cropped to produce a first border of a first cropped image having more than four sides (e.g., cropping the second image 8664 may result in a border of a second cropped image having more than four sides). To illustrate, the second image 8664 may be cropped to remove a bottom left corner of the second image 8664. The first cropped image and the second cropped image may be combined to form the combined image 8668. The combined image 8668 may have a third border that includes more than four sides. To illustrate, the first cropped image and the second cropped image may be combined such that a bottom center portion of the combined image 8668 is missing (e.g., the combined image 8668 is generally rectangular except for the bottom center portion which is missing).

Although FIG. 86B illustrates the first image 8662 and the second image 8664 being cropped to remove the blockages 8672, 8682 prior to creating the combined image 8668, the first image 8662 and the second image 8664 may be combined into a single image that includes the first blockage 8672 and/or the second image 8682. The single image may be edited to remove the first blockage 8672 and/or the second image 8682, resulting in the combined image 8668. Additionally, although FIG. 86B illustrates the first blockage 8672 in the first image 8662 and illustrates the second blockage 8682 in the second image 8664, in some implementations only one of the first image 8662 or the second image 8664 may have a blockage. Accordingly, in such implementations a single image may be cropped to remove the blockage while the other image remains uncropped. The cropped image and the uncropped image may be combined to form the combined image.

As illustrated in FIGS. 86A-B, the segmentation (e.g., cropping) of the right image and the left image may be adaptive and may therefore allow the user to wear the SPoT headgear device freely, without concern for whether a field of view of one or more cameras is partially obstructed. By cropping multiple images, such as the first image 8602 and the second image 8604 of FIG. 86A or the first image 8662 and the second image 8664 of FIG. 86B, the SPoT headgear device or the off-line processor may advantageously generate a single image that corresponds to a combined field of view of multiple cameras that does not include any blockages. By being able to account for blockages experienced by one or more cameras of the SPoT headgear device, ergonomic designs and aesthetics of the SPoT headgear device need not be designed to accommodate or otherwise be adapted to a particular shape of the user's head or whether or not the user wears glasses.

Although FIGS. 85 and 86A-B has been described in terms of operations and processes at the SPoT headgear device, such as the SPoT headgear device 7200 of FIG. 72, in other implementations some or all of the operations and processes may instead be performed on the data after the data has been transferred to another device. For example, the data may be downloaded to an electronic device, such as the electronic device 7300 of FIG. 73, and the electronic device may perform some of or all of the operations and processes on the downloaded data as described with reference to FIGS. 85 and 86.

In accordance with one or more of the above-described embodiments and methods, an apparatus may include a first camera configured to generate a first image and a second camera configured to generate a second image. The apparatus may further include a body that is configured to support the first camera and the second camera while the body is worn on a head of a user. The apparatus may also include a controller coupled to the first camera and the second camera and configured to detect a first blocking object in the first image and to detect a second blocking object in the second image. The controller may further be configured to crop the first blocking object from the first image by removing a first corner of the first image and to crop the second blocking object from the second image by removing a second corner from the second image. The controller may also be configured to combine the first image and the second image, after cropping the first image and the second image, to create a combined image that excludes the first blocking object and the second blocking object.

A method may be performed at a device including a first camera and a second camera, where a body is configured to support the first camera and the second camera while the body is worn on the head of a user. The method may include receiving, during a video recording operation of the first camera and the second camera, first video data from the first camera and second video data from the second video camera. The method may further include detecting a first blocking object in the first video data and detecting a second blocking object in the second video data. The method also including cropping the first blocking object from the first video by removing a first corner of a first field of view associated with the first video data and cropping the second blocking object from the second video data by removing a second corner of a second field of view associated with the second video data. The method may further include combining the first video data and the second video data, after cropping the first video data and the second video data, to create a combined image that excludes the first blocking object and the second blocking object.

As a non-limiting example, the apparatus may correspond to, and the method may be performed by, one or more components of a SPoT headgear device, such as the SPoT headgear device 7200 of FIG. 72.

In accordance with one or more of the above-described embodiments and methods, an apparatus may include a receiver configured to receive a first image and a second image from a headgear device. The headgear device includes a first camera to generate the first image and a second camera to generate the second image. The headgear also includes a body having the first camera and the second camera attached. The body configured to be worn on a user's head. The apparatus may further include a processor configured to process the first video data and the second video data to detect a first blocking object in the first image and to detect a second blocking object in the second image. The processor may further be configured to crop the first blocking object from the first image by removing a first corner of the first image and to crop the second blocking object from the second image by removing a second corner from the second image. The processor may also be configured to combine the first image and the second image, after cropping the first image and the second image, to create a combined image that excludes the first blocking object and the second blocking object.

A method may be performed at a device including a memory. The method may include receiving, from a headgear, a first image generated by a first camera of the headgear and a second image generated by a second camera of the headgear. The headgear includes the first camera and the second camera attached to a body that is configured to be worn on a user's head. The method may further include processing the first image to detect a first blocking object in the first image and processing the second image to detect a second blocking object in the second image. The method also including cropping the first blocking object from the first image by removing a first corner of a first field of view associated with the first image and cropping the second blocking object from the second image by removing a second corner of a second field of view associated with the second image. The method may further include combining the first image and the second image, after cropping the first image and the second image, to create a combined image that excludes the first blocking object and the second blocking object.

As a non-limiting example, the apparatus may correspond to, and the method may be performed by, a computer configured to operate in a manner such as described with respect to the electronic device 7300 of FIG. 73.

Figure 87:
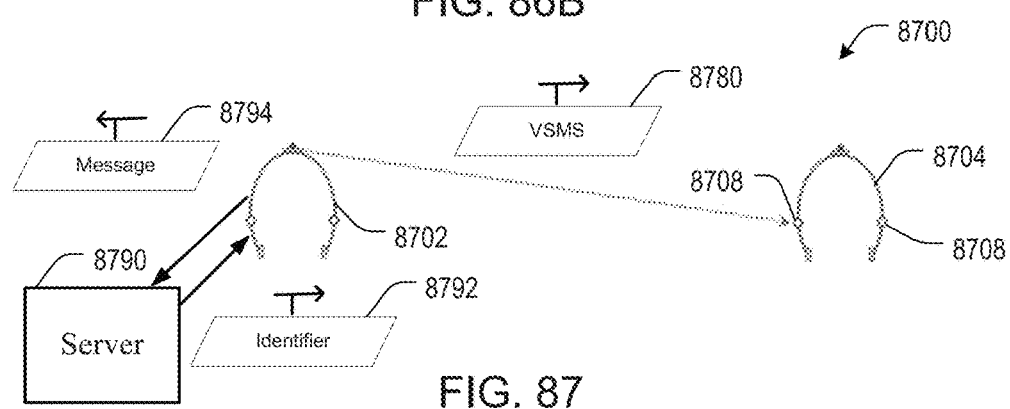
FIG. 87 is an illustration of a particular embodiment of a visual short message service message (VSMS) message exchange.

Referring to FIG. 87, an illustrative example of a visual short message service message (VSMS) message exchange is depicted and generally designated 8700.

A visual short message service (VSMS) message 8780 (or a visual texting (Vtext) message) may be sent from a first SPoT headgear device 8702 of a first user to a second SPoT headgear device 8704 of a second user. Although the first SPoT headgear device 8702 and the second SPoT headgear device 8704 are illustrated as being an "over the head" or a "vertical" configuration (e.g., as illustrated in FIG. 31), in other implementations the first SPoT headgear device 8702 and the second SPoT headgear device 8704 may have an "around the head" or "horizontal" configuration (e.g., as illustrated in FIG. 92). The VSMS message 8780 may be a direct VSMS or an indirect VSMS. For both the direct VSMS and the indirect VSMS, the first SPoT headgear device 8702 may broadcast an emitted light to optically transmit information that the first user wishes to share with one or more other SPoT system users, such as the second user of the second SPoT headgear device 8704.

The second SPoT headgear device 8704 may include a controller and one or more optical sensors 8708, such as a camera and/or a photodiode. The second SPoT headgear device 8704 may receive and decode the VSMS message 8780 to access content of the VSMS message 8780. For example, the VSMS message 8780 may be received by the second SPoT headgear device 8704 via the one or more optical sensors 8708 and the one or more optical sensors 8708 may generate signals based on the received VSMS message 8780. The signals may be provided to the controller which is configured to identify whether the VSMS message 8780 (e.g., a beacon signal from a beacon emitter of the first SPoT headgear device 8702) is received via the optical sensor. As an illustrative, non-limiting example, when the one or more optical sensors 8708 include a camera, the signals may include video data. Because the VSMS message 8780 is broadcast by the first SPoT headgear device 8702 of the first user, any other user of a corresponding SPoT headgear device, in addition to the intended second SPoT headgear device 8704 of the second user, may be able to receive the VSMS message 8780 and determine the content of the VSMS message 8780. Accordingly, privacy may be a concern when sending one or more VSMS messages 8780.

The VSMS message 8780, such as a VSMS message and/or an indirect VSMS message, may be transmitted from the first SPoT headgear device 8702 of the first user and may be intended to be received by the second SPoT headgear device 8704 of the second user. The VSMS message 8780 may be a protected message so that the second SPoT headgear device 8704 can access and receive the content of the VSMS message 8780, but other SPoT system users may not access the content of the VSMS message 8780.

For direct VSMS, the transmitter of the first user's SPoT headgear device may transmit an encrypted version of content, such as text information that is encrypted using an encryption key. The encryption key may be made available to a designated community of one or more recipients that include the second user of the second SPoT headgear device 8704. Only the designated recipients may have a decryption key that can be used to decrypt the VSMS message 8780 to access the content.

For indirect VSMS, where the VSMS message 8780 (or the Vtext message) is a URL and the content to be transferred is stored in association with that URL on a server 8790 associated with the SPoT system, the privacy may be kept by limiting access rights to the server 8790. For example, a particular SPoT system user that wishes to access the URL on the server 8790 may have to enter a key, such as a password, to authorize the particular SPoT system user to access the server 8790 and/or the content of the URL. As an illustrative, non-limiting example, only users that have been given access to the first user's server may have access to the content associated with the VSMS message 8780.

As an illustrative, non-limiting example, the VSMS message 8780, such as the direct VSMS or the indirect VSMS, may include two bytes of data or less. The VSMS message 8780 that includes two bytes of data or less may include a temporary identifier 8792 associated with a transmitting SPoT headgear device. The temporary identifier 8792 included in or represented by the VSMS message 8780 may be received by a receiving SPoT headgear device and the receiving SPoT headgear device may use the temporary identifier 8792 to access a message 8794 from the transmitting SPoT headgear device that is stored at the server 8790. To illustrate, a beacon emitter of the SPoT headgear device may optically transmit a narrow band message (e.g., the VSMS message 8780) that represents the temporary identifier 8792.

For example, during operation of the SPoT headgear device, the user of the SPoT headgear device, such as the first SPoT headgear device 8702, may request a temporary identifier 8792 from a server 8790 associated with the SPoT headgear device. For example, the SPoT headgear device or an electronic device may send a request to the server 8790 for the temporary identifier 8792. The server 8790 may generate and store (e.g., at a memory) the temporary identifier 8792 and associate the temporary identifier 8792 with the user, the SPoT headgear device of the user, the electronic device associated with the user, or a combination thereof. The server 8790 may also store a time associated with the request and a location associated with the user, such as a location of the SPoT headgear device and/or the electronic device associated with the user. To illustrate, the request received by the server 8790 may include the time and the location. The server 8790 may store the temporary identifier 8792 at a memory or at a database included in or coupled to the server 8790. The server 8790 may send the temporary identifier 8792 to the SPoT headgear device of the user, such as sending the temporary identifier 8792 to the SPoT headgear device via the electronic device associated with the user.

In addition to requesting the temporary identifier 8792, the user may send a message 8794 to the server 8790. A size of the message 8794 may be any size, such as greater than two bytes of data. The server 8790 may receive the message 8794 from the user and associate the message 8794 with the temporary identifier 8792 that corresponds to the user, the SPoT headgear device of the user, the electronic device associated with the user, or a combination thereof. Once the message 8794 is stored by the server 8790, the message 8794 may be accessible based on the temporary identifier 8792.

When the user of the SPoT headgear device wants to make the message 8794 accessible to another user of another SPoT headgear device, the SPoT headgear device of the user may transmit the temporary identifier 8792, such as via a beacon signal emitted by the SPoT headgear device. The other SPoT headgear device of the other user may receive the beacon signal and determine the temporary identifier 8792 represented by the beacon signal. The other user may send the temporary identifier 8792 to the server 8790. For example, the other SPoT headgear device or another electronic device associated with the other user may send a request that includes the temporary identifier 8792 to the server 8790 to access (e.g., receive) the message 8794. The request from the other user may include a time associated with the request from the other user and/or a location associated with the other user.

The server 8790 may access the message 8794 based on the temporary identifier 8792 and provide the message 8794 to the other user, such as to the other SPoT headgear device or the other electronic device associated with the other user. When the temporary identifier 8792 is associated with a time and a location associated with the user, the server 8790 may compare the time and/or the location associated with the user to the time and/or location associated with the other user. The server 8790 may provide the message 8794 to the other user when the time and/or the location associated with the user are proximate to the time and/or the location associated with the other user. For example, the server 8790 may compare a threshold amount of time to a difference (e.g., a duration) between the time associated with the user and the time associated with the other user. The server 8790 may send the message 8794 when the threshold amount of time is greater than the difference. As another example, the server 8790 may compare a threshold distance to a difference (e.g., a distance) between the location associated with the user and the location associated with the other user. The server may send the message 8794 when the threshold distance is greater than the difference.

Alternatively and/or additionally, the user of the SPoT headgear device may set criteria to be satisfied before the user may receive the message 8794. The criteria may include a password, a passcode, a characteristic of the other user (e.g., an age, a date of birth, a height, etc.), a security clearance, etc. The server 8790 may have access to stored information associated with the other user or may need to request information from the other user. For example, the server 8790 may request the other user to provide information so that the server 8790 may determine whether or not the other user satisfies the criteria set by the user. Alternatively and/or additionally, the other user of the other SPoT headgear device may provide criteria to the server 8790 that the user is to satisfy before the server 8790 sends the message 8794 to the other user. The criteria may include a password, a passcode, a characteristic of the other user (e.g., an age, a date of birth, a height, etc.), a security clearance, etc. The server 8790 may have access to stored information associated with the other user or may need to request information from the other user. For example, the server 8790 may request the other user to provide information so that the server 8790 may determine whether or not the other user satisfies the criteria provided by the user.

By enabling the first user of the first SPoT headgear device 8702 to decide if the VSMS message 8780 that is broadcast is for everybody or for only selective recipients, the first SPoT headgear device 8702 may be able to broadcast the VSMS message 8780 while maintaining privacy of content of the VSMS message 8780. Although FIG. 87 has been described in terms of operations and processes at the SPoT headgear device, such as the SPoT headgear device 7200 of FIG. 72, in other implementations some or all of the operations and processes may instead be performed on the data after the data has been transferred to another device. For example, the data may be downloaded to an electronic device, such as the electronic device 7300 of FIG. 73, and the electronic device may perform some of or all of the operations and processes on the downloaded data as described with reference to FIG. 87.

In accordance with one or more of the above-described embodiments and methods, an apparatus may include a body configured to be worn on a head of a user and a beacon emitter attached to the body. The apparatus may further include a controller configured to process signals from an optical sensor to identify whether a beacon signal of another beacon emitter is received via the optical sensor. The beacon signal includes an encoded message or includes a link to content. The content is accessible via the link based on the received signals.

A method may be performed at a device including an optical sensor, where a body is configured to support the optical sensor while the body is worn on the head of a user. The method may include processing signals from the optical sensor to identify whether a beacon signal of another beacon emitter is received via the optical sensor. The beacon signal includes an encoded message or includes a link to content that is accessible based on a key.

As an illustrative example, a method may be performed at a device including a beacon emitter, where a body is configured to support the beacon emitter while the body is worn on the head of a user. The method may include sending a request, to a server associated with the device, for a temporary identifier. The request may include a time associated with the request, a location associated with the device, or a combination thereof. The method may further include receiving the temporary identifier from the server and sending, to the server, a message associated with the temporary identifier. The method may also include transmitting the temporary identifier via the beacon emitter.

As another illustrative example, a method may be performed at a device including an optical sensor, where a body is configured to support the optical sensor while the body is worn on the head of a user. The method may include processing signals from the optical sensor to identify whether a beacon signal of another beacon emitter is received via the optical sensor. The method may further include determining a temporary identifier based on the beacon signal. The method also includes sending a request, to a server associated with the device, for a message. The request may include the temporary identifier and the temporary identifier may enable the server to identify the message.

As a non-limiting example, the apparatus may correspond to, and the methods may be performed by, one or more components of a SPoT headgear device, such as the SPoT headgear device 7200 of FIG. 72.

In accordance with one or more of the above-described embodiments and methods, an apparatus may include a receiver configured to receive signals from a headgear device. The headgear device includes at least one optical sensor attached to a body that is configured to be worn on a user's head. The apparatus may further include a processor configured to process the signals from the at least one optical sensor to identify whether a beacon signal of a beacon emitter is received via the at least one optical sensor. The beacon signal includes an encoded message or includes a link to content that is accessible based on a key.

As an illustrative example, a method may be performed at a device including a memory. The method may include receiving signals from a headgear device that includes at least one optical sensor attached to a body that is configured to be worn on a user's head. The method may further include processing the signals from the optical sensor to identify whether a beacon signal of a beacon emitter is received via the optical sensor. The beacon signal includes an encoded message or includes a link to content that is accessible based on a key.

As another illustrative example, a method may be performed at a device including a memory. The method may include receiving a request for a temporary identifier from a first device. The method may include generating the temporary identifier and storing the temporary identifier at the memory. A time associated with the temporary identifier, a location associated with the first device, or a combination thereof, may be stored in conjunction with the temporary identifier. The method may include sending the temporary identifier to the first device. The method may further include receiving a message from the first device and storing the message at the memory. The message may be associated with the temporary identifier. The method may also include receiving the temporary identifier from a second device and determining a time associated with reception of the temporary identifier from the second device, a location associated with the second device, or a combination thereof. The method further includes performing a comparison between the time associated with the temporary identifier and the time associated with the reception or between the location associated with the first device and the location associated with the second device. The method also includes selectively sending the message to the second device in response to a result of the comparison.

As a non-limiting example, the apparatus may correspond to, and the methods may be performed by, a computer configured to operate in a manner such as described with respect to the electronic device 7300 of FIG. 73.

Figure 88:
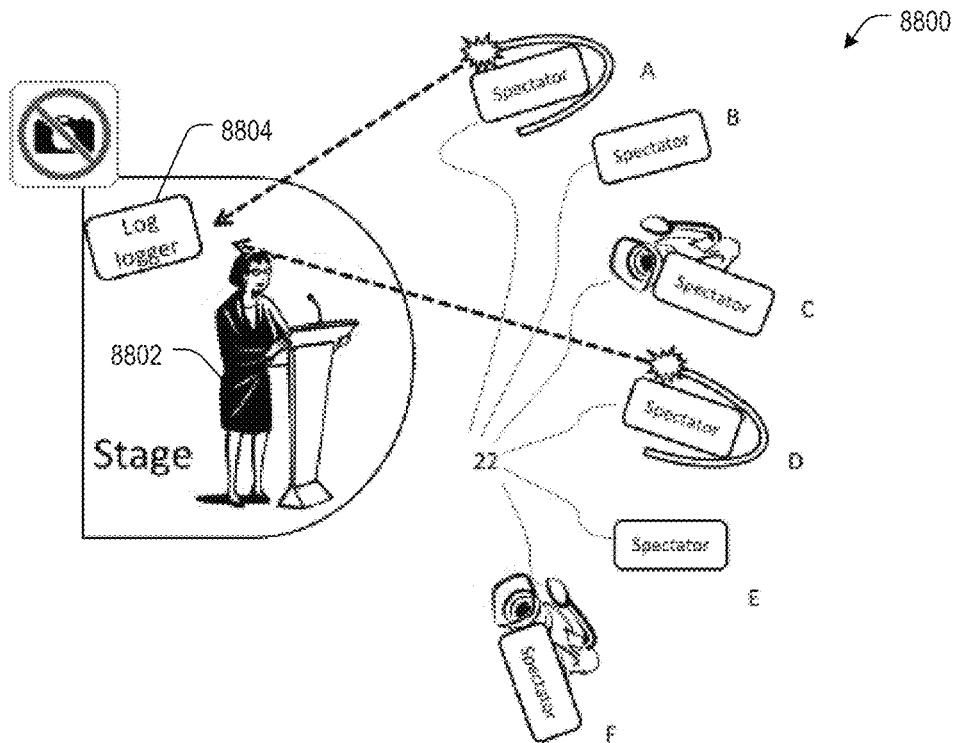
FIG. 88 is an illustration of a particular embodiment of a system including a logging video camera configured to detect and log signals in a field of view of the logging video camera.

Referring to FIG. 88, an illustrative example of a system including a logging video camera is depicted and generally designated 8800. The logging video camera may be coupled to a SPoT system configured to assist in preserving a copyright of creative work of performers, such as lecturers, stage artists, street musicians, teachers in universities, performers in pubs and theaters, etc., when a spectator (e.g., a SPoT user) wants to record a performance on video using the SPoT headgear device.

To address copyright issues, some performers may use conventional techniques, such as:

1. Implement strict banning of photography by the audience during the performance;
2. Allow the audience to shoot video and hope that the official recording will offer better quality and have better distribution channels; and/or
3. Perform, selectively, only a limited amount of content and reserve additional content for paying channels.

With use of the SPoT system, a performer may be able to merchandise a performance using the SPoT system. For example, using the SPoT system, the performer may merchandise the right to photograph the performance, so that spectators can automatically purchase the right to photograph parts of the performance and be billed automatically according to the amount of recording and a price list of the performer.

Referring to FIG. 88, a performer 8802, such as a lecturer, may make a presentation to an audience including one or more spectators, such as spectators A-F. One or more of the spectators A-F may be wearing a corresponding SPoT headgear device, such as spectators A and D. Other spectators may have recording devices other than a SPoT headgear device, such as spectators C and F. The performer 8802 may indicate that no photography or recording of the presentation is permitted unless a spectator uses a SPoT headgear device. For example, the performer 8802 may notify the audience that photography in the place is allowed only to camera devices (e.g., recording devices) with a subscriber identity beacon, such as a subscriber identity beacon broadcast from a beacon emitter of a SPoT headgear device. The performer 8802 may also notify the audience about the recording fee (e.g., a billing rate), such as $0.20 per minute, or $1 for the first 10 minutes and then $0.10 per minute after, $3 for any recording that extends beyond 1 minute, etc.

Spectators with a SPoT headgear device that wish to record the presentation may send out, via a blinking lamp of the SPoT headgear device, a modulated light signal with an encoded identity of the user. A logging video camera 8804 installed on or near the performer 8802 or as part of a headgear (e.g., a SPoT headgear device) of the performer, may capture one or more blinking lamp signals from cameras among the audience. As a particular illustrative example, the logging video camera 8804 may be part of a SPoT headgear device worn by the performer 8802. A billing system may extract video data from the logging video camera 8804 (e.g., a "Logging Logger") and, based on video data recorded by the logging video camera 8804 during the performance, may generate a bill for each identified user based on a billing rate of the performer 8802. For example, the billing system may detect a particular user's subscriber identity beacon, such as a particular subscriber identity beacon of the spectator A, and bill the spectator A in response to detection of the particular subscriber identity beacon. For the particular user, the billing rate may be applied to a time period that the billing system determines the particular user was recording based on detection of the particular user's subscriber identity beacon in the recorded video data. Accordingly, the particular user may be free to switch the recording feature of the user's SPoT headgear device on or off and/or to leave the performance and the particular user may be billed only on the particular user's net time of recording.

Alternatively or additionally, the logging video camera 8804 may be configured to detect a blinking light (e.g., a subscriber identity beacon) in a field of view associated with the logging video camera 8804. The logging video camera 8804 (and/or a billing system) may process the video data (e.g., in real time, near real time, or off-line) to extract a user identifier from the blinking light. The logging video camera 8804 may generate a record based on the user identifier (e.g., the subscriber identity beacon). The record may indicate when the user identifier was detected (e.g., when a corresponding recording device began recording) and/or when the user identifier stopped being detected (e.g., when the corresponding recording device stopped recording). The record may be provided from the logging video camera 8804 to the billing system. Alternatively or additionally, the billing system may analyze the video data and generate the record.

A server operated by a billing service provider that is associated with the SPoT system can manage the subscriptions of users who are able to use a SPoT headgear device and wish to "buy" a license to record performers, so that one or more performers do not need to know the name and address of the purchasers (e.g., one or more spectators that use a corresponding SPoT headgear device).

As an illustrative, non-limiting example, the performer 8802 may be at a podium in a conference room or at a location on a side-walk in a city. The performer 8802 may be an academic professor, a musical band, or a side-walk violinist. The audience including the spectators A-F may be viewing the performance. The performance may be free and there may be no need and no physical way to prevent the audience from enjoying the performance. Spectator E may be taking no video and is welcome to watch. A "no photography" icon may be posted clearly behind the performer 8802 and may indicate that the performer 8802 does not wish to be photographed in video. Spectator C may have an ordinary video camera, may respect the performer's request, and may not take video of the performance. Spectator F may have a recording device, may not respect the posted sign, and may make a recording of the performance. Spectators A and D may each use a corresponding SPoT headgear device to make an authorized recording of the performance because the performer 8802 is using the logging video camera 8804 associated with the SPoT system. A beacon emitter of the SPoT headgear device of the spectator A may be activated when the SPoT headgear device is recording. The beacon emitter may be modulated by the subscriber identity of the spectator A.

The logging video camera 8804 may be a wide-angle video camera positioned on the stage and looking at the audience, and may record a video stream of the audience. After the performance, the video data recorded by the logging video camera 8804 may be analyzed by image processing software. One or more beacons that were active in the audience may be detected in the recorded video data and subscriber identities associated with each beacon may be decoded. The processing software may then issue a billing list, where each user who has taken video of the performance is billed according to the net time of recording and the fee announced by the performer 8802.

A particular subscriber identity transmitted by a particular SPoT headgear device may be generated (e.g., emitted) by the particular SPoT headgear device so that the logging video camera 8804 may accurately record the particular subscriber identity. For example, when the particular subscriber identity is transmitted from the particular SPoT headgear device as a modulated light source that corresponds to the particular subscriber identity, the light source may be modulated based on a recording rate of the logging video camera 8804.

When a particular user of the particular SPoT headgear device wants make an authorized recording of a performance, the particular user may request to receive the particular subscriber identity that is compatible with the logging video camera 8804 used in conjunction with the performance. For example, the particular user may request that a server and/or an application associated with the logging video camera 8804 issue, to the user, the particular subscriber identity. As an illustrative example, the server may be associated with the billing service provider.

Figure 89:
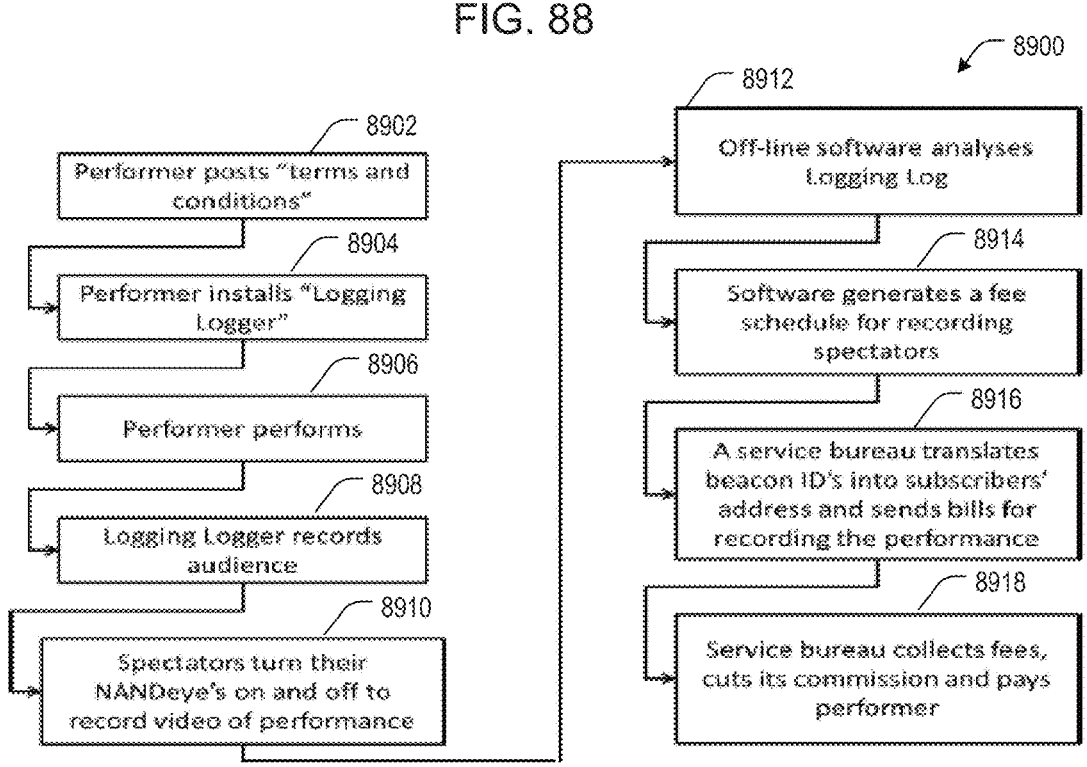
FIG. 89 is an illustration of a particular embodiment of a flowchart of a method of a billing process associated with a logging video camera system.

FIG. 89 illustrates an example of a method 8900 of a billing process that may be associated with a logging system, such as the logging video camera 8804 of FIG. 88.

The method 8900 may include a performer posting terms and conditions associated with a performance, at 8902, and the performer installing a logging video camera, at 8904. The performer may perform, at 8906, and the logging video camera may record the audience, at 8908. One or more spectators in the audience may turn on (and/or turn off) a corresponding SPoT headgear device as desired to record one or more portions of the performance, at 8910.

Off-line software may analyze video data recorded by the logging video camera, at 8912, and the off-line software may generate a fee schedule for one or more spectators that recorded at least a portion of the performance, at 8914. A service bureau (e.g., a billing service provider) may translate one or more beacons detected in the video data to determine an identity of the one or more spectators and send a bill corresponding to each of the one or more spectators, at 8916. The detected beacons may each correspond to an identifier of a different spectator. The service bureau may collect fees from the one or more spectators and may pay the performer, such as after subtracting a commission for the service bureau, at 8918.

In accordance with one or more of the above-described embodiments and methods, an apparatus may include a body configured to be worn on a head of a user, a camera attached to the body, and a beacon emitter attached to the body. The apparatus may further include a controller coupled to the camera and configured to receive an identifier via communication interface and to initiate the beacon emitter to transmit a beacon signal based on the identifier.

A method may be performed at a device including a camera and a beacon emitter, where a body is configured to support the camera and the beacon emitter while the body is worn on the head of a user. The method may include receiving an identifier via a communication interface and initiating transmitting of a beacon signal, via the beacon emitter, based on the identifier.

As a non-limiting example, the apparatus may correspond to, and the method may be performed by, one or more components of a SPoT headgear device, such as the SPoT headgear device 7200 of FIG. 72.

In accordance with one or more of the above-described embodiments and methods, an apparatus may include a receiver configured to receive a request for an identifier from a headgear device. The headgear device includes at least one camera and a beacon emitter attached to a body that is configured to be worn on a user's head. The apparatus may further include a processor configured to generate the identifier and to initiate transmission of the identifier to the headgear device. The processor may further be configured to process video data from a recording device and to detect a beacon signal in the video data. The beacon signal may be received from the headgear device and may be based on the identifier.

As an illustrative example, a method may be performed at a device including a memory. The method may include receiving a request for an identifier from a headgear device. The headgear device includes at least one camera and a beacon emitter attached to a body that is configured to be worn on a user's head. The method may further include generating the identifier and initiating transmission of the identifier to the headgear device. The method also includes processing video data from a recording device and detecting a beacon signal in the video data. The beacon signal may be received from the headgear device and may be based on the identifier.

As another illustrative example, a method may be performed at a device including a memory. The method may include detecting a blinking light in a field of view of video data. The blinking light may be associated with a recording device. The method may further include determining a user identifier based on the blinking light. The method may also include generating, at the memory, a record based on the user identifier. The record may indicate that the recording device generated recorded data.

As a non-limiting example, the apparatus may correspond to, and the methods may be performed by, a computer configured to operate in a manner such as described with respect to the electronic device 7300 of FIG. 73.

Figure 90:
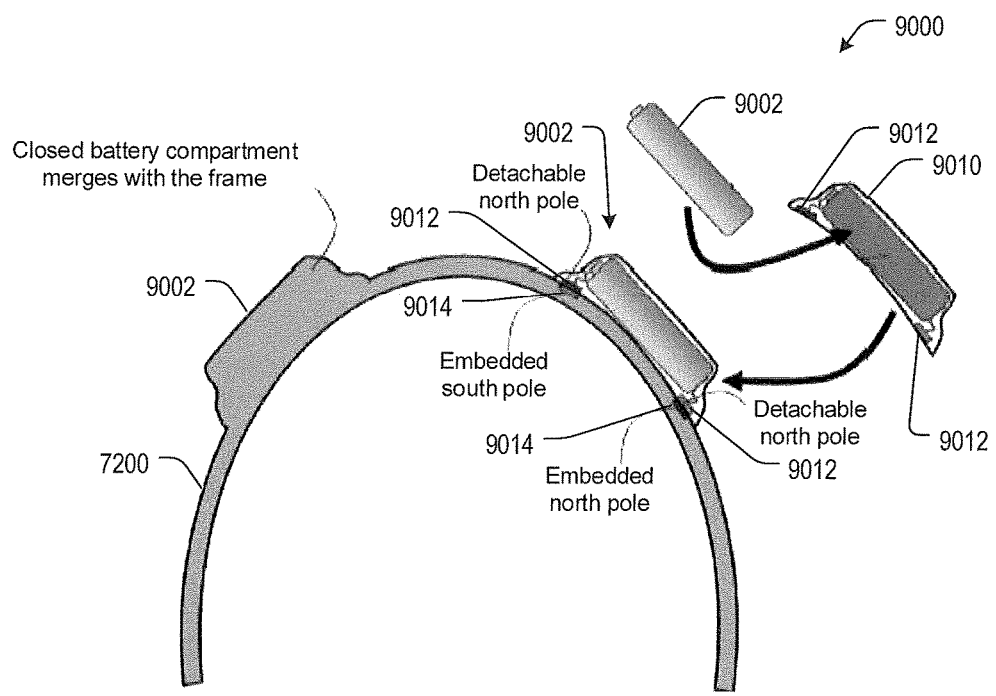
FIG. 90 is an illustration of a particular embodiment of a head-mountable camera apparatus that includes one or more power sources using magnetic coupling.

Referring to FIG. 90, an example of a SPoT headgear device, such as the SPoT headgear device 7200, that includes one or more power sources is depicted and generally designated 9000. The power sources 9002 may include the power source 7220 of FIG. 72.

The power source 9002 may include a battery that has two terminals (e.g., a positive and a negative) and a permanent magnet corresponding to each terminal. For example, a first terminal may be electrically coupled to a first magnet and a second terminal may be electrically coupled to a second magnet. The first magnet and the second magnet may be configured to electrically couple the two terminals of the battery to a load, such as enabling current flow to the load though the first magnet and a return current flow from the load through the second magnet, as described further herein.

The power sources 9002 may be configured to be connected to and disconnected from the SPoT headgear device without interrupting the SPoT headgear device from being in an on state. The ability to provided uninterrupted power may provide an enhanced user experience as compared to other electronic devices that include a single battery, that include high capacity, big, heavy and expensive batteries, or that require periodically connecting the device to a power charging source.

The SPoT headgear device may be configured to be connected to at least two power sources 9002. Each of the at least two power sources 9002 may include two terminals, such as a positive terminal and a negative terminal. When the SPoT headgear device is configured to support multiple power sources 9002, the SPoT headgear device may be configured to be operated using a single power source 9002. Accordingly, when a first power source 9002 is powering the SPoT headgear device, a second power source 9002 that may be at least partially discharged may be swapped out with a third power source 9002 that is charged. The power sources 9002 may be configured to be electrically connected and disconnected from a load of the SPoT headgear device, such as one or more electrical components or circuits. The SPoT headgear device may run on a single running battery (e.g., a single power source 9002) that may, under some circumstances, be unable to provide sufficient power for a full day of SPoT headgear use, such as a full day of video logging.

The SPoT headgear device may monitor a power level of each power source 9002 and provide an indication of a charge level of a particular power source 9002 that is used to power the SPoT headgear device. For example, when the particular power source 9002 falls below a threshold value, such as predefined charge level of ten percent of a fully charged level, the user of the SPoT headgear device may be altered to perform a hot swap to couple a charged power source 9002 to the SPoT headgear device.

Each power source 9002 may include or be inserted into a holder 9010 that may include one or more magnets 9012, such as one or more permanent magnets. Each of the one or more magnets 9012 may operate as a connector (e.g., an interface) of the power source 9002. An example implementation of the power source 9002 included in the holder 9010 is illustrated with reference to FIG. 91. When the one or more magnets 9012 include two magnets, the two magnets may be configured to be coupled to another device and may have different polarities exposed, such as a first magnet having a polarity of North (e.g., a North pole oriented in a particular direction) and a second magnet having a polarity of South (e.g., a South pole oriented in the same direction).

The SPoT headgear device may include one or more power interfaces, such as the power interface 7212 of FIG. 72, to couple the SPoT headgear to the one or more power sources 9002. The one or more power interfaces may include one or more magnets 9014 that operate as a connector(s) to receive electrical power from the power sources 9002. The one or more magnets 9014 may correspond to the one or more magnets 9012 associated with the power sources 9002. For example, the magnets 9012, 9014 may include rare-earth conductive magnets that hold the power source 9002 in place and enable electricity to be exchanged between the SPoT headgear device and the power source 9002. When the one or more magnets 9012 includes two magnets, each magnet may have a different pole orientation relative to the holder 9010 and the one or more magnets 9014 may be configured such that the power source 9002 may be coupled with the correct polarity of the power source 9002 provided to the SPoT headgear device.

The power sources 9002 of the SPoT headgear device may be replaced blindly (i.e., without the 9002 being visible to the user as the SPoT headgear device 7200 remains on the user's head), and the user may pull off from the SPoT headgear device 7200 the holder 9010 having a depleted power source 9002. The user may replace the depleted power source with a charged power source 9002. The one or more magnets 9012 associated with the charged power source 9002 may snap into place by a force between the one or more magnets 9012 and the one or more magnets 9014 of the SPoT headgear device. For example, a magnet of a first power source having an exposed North pole may be repelled by a magnet of the SPoT headgear device having an exposed North pole and may be attracted to a magnet of the SPoT headgear device having an exposed South pole. Accordingly, if the user attempts to couple a power source 9002 to the SPoT headgear device, the user may be altered to a possible reverse polarity connection of the power source 9002 to the SPoT headgear device based on the user experiencing (e.g., feeling) the physical effects of the same magnetic poles of the power source 9002 and the SPoT headgear device being repelled from each other. Additionally or alternatively, if the user attempts to couple a power source 9002 to the SPoT headgear device, the user may be prevented (based on repulsion of same magnetic poles) from connecting the power source 9002 in a reverse polarity connection of the power source 9002 to the SPoT device. When the power source 9002 is connected to the SPoT headgear device in the correct polarity, the power source 9002 may provide power (e.g., source current) to a load included in the SPoT headgear.

A particular power source 9002 may be embedded in the holder 9010 or may be configured to be used with multiple holders 9010. By being able to easily exchange one or more power sources 9002, the SPoT headgear device may experience an uninterrupted supply of power without disruption to operation of the SPoT headgear device.

Although FIG. 90 has been described in terms of operations and processes at the SPoT headgear device, such as the SPoT headgear device 7200 of FIG. 72, in other implementations some or all of the operations and processes may instead be performed at another device. For example, the other device may include an electronic device, such as the electronic device 7300 of FIG. 73, and the electronic device may be configured to be coupled to and/or receive power from the power source 9002 as described with reference to FIG. 90.

Figure 91:
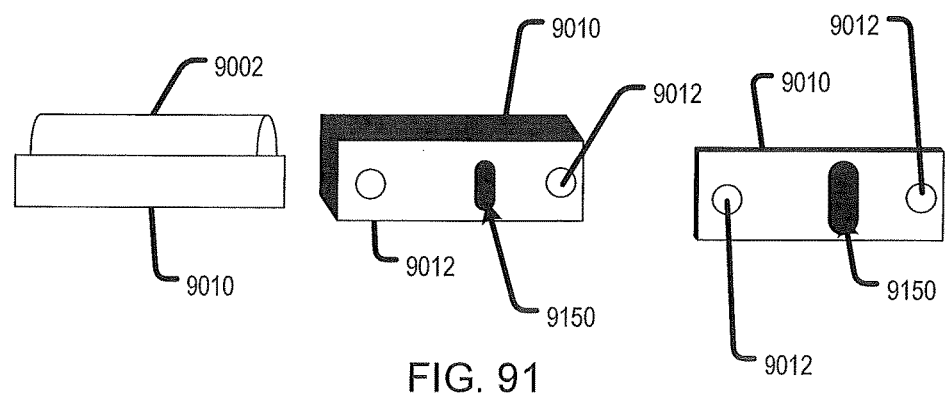
FIG. 91 is an illustration of a particular embodiment of a power source of FIG. 90.

Referring to FIG. 91, the holder 9010 can include a battery holder, such illustrated in FIG. 91, where the positive and negative terminals (e.g., positive and negative leads) are glued, soldered, or otherwise physically and electrically coupled to two permanent magnets. As another example, the holder 9010, such as a frame or structure, can include the power source 9002 embedded in a molded block of plastic where terminals of the power source 9002 are glued or soldered to the two magnets that are also embedded into the block. In implementations where the power source 9002 is removable from the holder 9010, the holder 9010 may include an opening 9150 to enable a user to physically access, such as using a tool, the power source 9002 that is coupled to the holder 9010. By accessing the power source 9002 via the opening 9150, the user may be able to apply a force to the power source 9002 to eject (e.g., decouple) the power source 9002 from the holder 9010.

In an illustrative, non-limiting example, a power supply may include the power source 9002, such as a battery. The power source 9002 may include a first terminal and a second terminal. The power supply may be produced by electrically coupling the first terminal to a first magnet and coupling the second terminal to a second magnet. A first exposed portion of the first magnet (e.g., having a first magnetic polarity) and a second exposed portion of the second magnet (e.g., having a second magnetic polarity) may each have different polarities. For example the first magnetic polarity may be an opposite polarity of the second magnetic polarity. When the power supply is coupled to a load, the first magnet and the second magnet may be configured to enable power to be provided from the power source 9002 to the load via the first magnet and the second magnet.

In accordance with one or more of the above-described embodiments and methods, an apparatus may include a body configured to be worn on a head of a user. The apparatus may further include a camera attached to the body. The apparatus may further include a holder. The holder may include a magnet configured to couple a power source to the body and to conduct power from the power source. The apparatus may further include a controller coupled to the camera and configured to receive power via the power input and to process video data from the camera.

A method may be performed at a device including a camera, where a body is configured to support the first camera while the body is worn on the head of a user. The method may include receiving a holder including a magnet. The magnet may be configured to couple a power source to the body and to conduct power from the power source. The method may further include providing power from the power source via the power terminal to the camera.

As a non-limiting example, the apparatus may correspond to, and the method may be performed by, one or more components of a SPoT headgear device, such as the SPoT headgear device 7200 of FIG. 72.

In accordance with one or more of the above-described embodiments and methods, as an illustrative example, an apparatus may include power source and a holder coupled to the power source. The holder may include a magnet configured to conduct power from the power source to a headgear device. The headgear device may include at least one camera attached to a body that is configured to be worn on a user's head. The holder is further configured to be physically coupled to the headgear using the magnet.

As another illustrative example, an apparatus may include power source and a holder. The power source may include a first terminal and a second terminal. The holder may include a first magnet that is electrically coupled to the first terminal and a second magnet that is electrically coupled to the second terminal. The holder may be further configured to be physically coupled and electrically coupled to a load. Current flows via at least one of the first magnet or the second magnet when the holder is coupled to the load.

As another illustrative example, an apparatus may include a power source including a first terminal and a second terminal. The apparatus may further include a holder coupled to the power source. The holder may include a first conductive magnet that is electrically coupled to the first terminal and a second conductive magnet that is electrically coupled to the second terminal. The holder may be further configured to be physically coupled and electrically coupled to a load. Current flows via at least one of the first magnet or the second magnet when the holder is coupled to the load.

As an illustrative example, a method may be performed produce a power supply. The method may include coupling a first terminal of a power source to a first magnet and coupling a second terminal of the power source to a second magnet. The first magnet and the second magnet may be configured to electrically and physically couple the power source to a device that includes a load. When the power supply is electrically coupled to a load, the first magnet and the second magnet may be configured to enable power to be provided from the power source to the load via at least one of the first magnet or the second magnet.

As another illustrative example, a method may be performed at a power source including a holder. The holder may include a first magnet electrically coupled to a first terminal of the power source and a second magnet electrically coupled to a second terminal of the power source. The method may include coupling, by the first magnet, the second magnet, or a combination thereof, the power source to a device having a load. The method may further include providing power, via the first magnet, the second magnet, or a combination thereof, from the power source to the load.

As another illustrative example, a method may be performed at a power source including a holder, the holder may include a magnet to conduct power from the power source. The method may include coupling, by the magnet, the power source to a headgear device. The headgear device may include a body configured to be worn on a head of a user. The method may further include providing power, via the magnet, from the power source to the headgear device.

As a non-limiting example, the apparatus may correspond to, and the method may be performed by, a computer configured to operate in a manner such as described with respect to the power supply 7220 of FIG. 72.

FIG. 92 illustrates examples of SPoT headgear devices. The SPoT headgear devices may include or correspond to the headgear 102 of FIG. 1 or the SPoT headgear device 7200 of FIG. 72, as illustrative, non-limiting examples.

The SPoT headgear devices depicted in a first example 9202, a second example 9204, and a third example 9206 may include a headband that is configured to be worn in an at least partially horizontal orientation on a user's head with one or more cameras positioned (e.g., or otherwise supported by the headband) near an ear or ears of the user. For example, the one or more cameras may be positioned at or near one or more tips of the SPoT headgear devices. The designs of the SPoT headgear devices may provide for stability when worn by the user without obscuring the user's field of view and without extending out of the user's skull contour in order not to disturb a hat or a scarf, and may have minimal invasion into the general look of the user, possibly enhancing the user's appearance as a fashionable accessory worn by the user.

The SPoT headgear devices may include a horizontal bow that is configured to wrap around a user's head, such as wrapping around approximately at eye level. The SPoT headgear devices may include at least one video camera that is positioned forward of a user's ear, such as adjacent to the user's temple or proximate to the user's eye, when the user is wearing a particular SPoT headgear device. The at least one video camera may be positioned at an end of the SPoT headgear device and may be aligned to point in a direction in front of the user. Alternatively or additionally, the SPoT headgear devices may include two symmetrical cameras. The horizontal structure of the SPoT headgear device, when worn by the user, may not only provide support for the one or more cameras and other peripheral devices, such as I/O devices, but may also follow the "equator" of the head and pass over areas where physiological signals can be measured. Accordingly, the SPoT headgear device having the horizontal structure can span around a user's head proximate to both of the ears, the eyes, and the temples, and may provide audio data, video data, and physiological data.

The SPoT headgear device may include at least one microphone (e.g., positioned at a side of the user's face), one or more earphones, one or more physiological sensors, one or more mechanical sensors, a power source, a communication module, at least one light emitting diode (LED) or a combination thereof, as illustrative, non-limiting examples.

The one or more physiological sensors may monitor a GSR, a temperature, an EEG, a pulse rate, a blood pressure, or a combination thereof, as illustrative, non-limiting examples. The one or more mechanical sensors may monitor azimuth (e.g., a compass), a roll, a pitch, and/or a yaw (e.g., an inclinometer), acceleration (e.g., an accelerometer), position (e.g., a GPS), or a combination thereof, as illustrative, non-limiting examples. Alternatively or additionally, the SPoT headgear device may include multiple LEDs that may be visible from the front and/or the back of the SPoT headgear device, multiple microphones, multiple earphones, or a combination thereof, as illustrative, non-limiting examples.

The SPoT headgear device having the horizontal structure may place the "logistical" components, such as batteries, electronics, and memory cards, that do not need to be in "prime space" in the natural recess of the back of the skull, where they do not intervene with the contour of the skull and do not interfere with wearables, such as hat, scarf or bandana. For example, one or more components described with respect to a cockpit in a vertical structure implementation (e.g., the control and communication unit, battery compartment 3114, GPS module 3110, inclinometer 3102, compass 3104 of FIG. 31) may be located proximate to the back of the user's skull rather than on top of the user's head in a horizontal structure implementation. The SPoT headgear device having the horizontal structure may sit very stably on the head, and can serve as a pedestal for eyeglasses and sunglasses that can snap on the SPoT headgear device and do not need to wrap around the skull or ears of the user (e.g., a magnetic eyeglasses frame that snaps onto the SPoT headgear device).

In accordance with one or more of the above-described embodiments and methods, an apparatus may include at least two cameras. The apparatus may further include a mounting structure attached to the at least two cameras. The mounting structure configured to, while the mounting structure is on a user's head, at least partially wrap around a rear of the user's head, and to position the at least two cameras to be substantially or entirely at approximately an eye level of the user.

A method may be performed at a headgear device including at least two cameras. The apparatus may further include a mounting structure attached to the at least two cameras. The mounting structure may be configured to, while the mounting structure is on a user's head, at least partially wrap around a rear of the user's head, and to position the at least two cameras to be substantially or entirely at approximately an eye level of the user. The method may include maintaining a position of the headgear device on the user's head and recording video data using the at least two cameras.

As a non-limiting example, the apparatus may correspond to, and the method may be performed by, a computer configured to operate in a manner such as described with respect to one or more of FIGS. 72-91.

Although various components depicted herein may be illustrated as block components and described in general terms, such components may include one or more microprocessors, state machines, or other circuits configured to enable the various components of FIG. 1 to perform the respective described operations. For example, the processor of the SPoT of FIG. 30 may represent physical components, such as hardware controllers, state machines, logic circuits, or other structures, to enable the headgear 102 to control operation of one or more cameras, beacons, wireless transceivers, laser pointers, etc., according to one or more received inputs such as from one or more cameras, GPS sensors, accelerometers, inclinometers, microphones, cheek sensors, stress detectors, etc.

The headgear 102 of FIG. 1 and/or the SPoT headgear device 7200 of FIG. 72 may be implemented using a microprocessor or microcontroller programmed to control operation of one or more cameras, beacons, wireless transceivers, laser pointers, etc., according to one or more received inputs such as from one or more cameras, GPS sensors, accelerometers, inclinometers, microphones, cheek sensors, stress detectors, etc. In a particular embodiment, the headgear 102 and/or the SPoT headgear device 7200 includes a processor executing instructions that are stored at a non-volatile memory. Alternatively, or in addition, executable instructions that are executed by the processor may be stored at a separate memory location that is not part of the non-volatile memory, such as at a read-only memory (ROM).

In a particular embodiment, the SPoT may use a non-volatile memory, such as a three-dimensional (3D) memory, a flash memory (e.g., NAND, NOR, Multi-Level Cell (MLC), a Divided bit-line NOR (DINOR) memory, an AND memory, a high capacitive coupling ratio (HiCR), asymmetrical contactless transistor (ACT), or other flash memories), an erasable programmable read-only memory (EPROM), an electrically-erasable programmable read-only memory (EEPROM), a read-only memory (ROM), a one-time programmable memory (OTP), or any other type of memory.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. An apparatus comprising:
   a plurality of cameras;
   a mounting structure attached to the plurality of cameras, wherein the mounting structure, while the mounting structure is on a user's head, is configured to at least partially wrap around a rear of the user's head and remain substantially or entirely outside of a field of vision of the user, the mounting structure including:
      a first portion configured to rigidly extend from a recess of the back of the user's head and above a first ear of the user to terminate at a first tip, the first tip including a first camera of the plurality of cameras; and
      a second portion configured to rigidly extend from the recess and above a second ear of the user to terminate at a second tip,
      wherein the first portion is further configured to position the first camera to be approximately an eye level of a user while the mounting structure is worn with the first portion and the second portion supported by the user's ears and with the mounting structure contacting and supported against the recess;
a detector coupled to the mounting structure and configured to detect motion of the user's jaw while the mounting structure is worn on the user's head; and
a processor coupled to the plurality of cameras, the detector, and a device having a three-dimensional (3D) memory configured to store data from the plurality of cameras, the mounting structure further configured to position the device at the recess.

2. The apparatus of claim 1, wherein the processor is configured to process information from at least one of the plurality of cameras and the detector, and wherein the mounting structure is further configured to be supported on the user's head by resting the first portion and the second portion on the user's ears.

3. The apparatus of claim 1, wherein:
the device includes a non-volatile memory,
the data includes one or both of image data and video data, and
the processor is associated with operation of memory cells of the non-volatile memory.

4. The apparatus of claim 1, wherein the second portion, while the mounting structure is on the user's head, is further configured to position a second camera of the plurality of cameras at the second tip to be at approximately the eye level of the user wearing the mounting structure.

5. The apparatus of claim 4, wherein the mounting structure is further configured to position the first camera and a second camera of the plurality of cameras at the temples of the user with fields of view of the first camera and the second camera approximately aligned with the user's field of vision.

6. An apparatus comprising:
first means for image capture;
second means for image capture;
means for at least partially wrapping around a rear of a user's head and remaining substantially or entirely outside of a field of vision of the user, the means for at least partially wrapping including:
first means for rigidly extending from a recess of the back of the user's head and above a first ear of the user to terminate at a first tip, the first tip including the first means for image capture; and
second means for rigidly extending from the recess and above a second ear of the user to terminate at a second tip, the second tip including the second means for image capture,
wherein the first means for rigidly extending is configured to position the first means for image capture at a first temple of the user, the second means for rigidly extending is configured to position the second means for image capture at a second temple of the user, and the means for at least partially wrapping is configured to contact and be supported against the recess;
means for detecting motion of the user's jaw while the means for at least partially wrapping is worn on the user's head; and
means for processing coupled to the first means for image capture, the second means for image capture, the means for detecting, and means for storing data received from the first means for image capture and the second means for image capture, the means for storing coupled to the means for at least partially wrapping and having a three-dimensional (3D) memory configuration, the means for at least partially wrapping further configured to position the means for storing at the recess.

7. The apparatus of claim 6, wherein the means for at least partially wrapping is further configured to rest on the ears of the user.

8. An apparatus comprising:
a plurality of cameras;
a mounting structure attached to the plurality of cameras, wherein the mounting structure, while the mounting structure is on a user's head, is configured to at least partially wrap around a rear of the user's head and remain substantially or entirely outside of a field of vision of the user, the mounting structure including:
a first portion configured to rigidly extend from a recess of the back of the user's head and above a first ear of the user to terminate at a first tip, the first tip including a first camera of the plurality of cameras; and
a second portion configured to rigidly extend from the recess and above a second ear of the user to terminate at a second tip, the second tip including a second camera of the plurality of cameras,
wherein the first portion and the second portion are further configured to position the plurality of cameras to be at approximately an eye level of the user wearing the mounting structure with the mounting structure contacting and supported against the recess;
a storage device attached to the mounting structure, the storage device including a non-volatile memory, having a three-dimensional (3D) memory configuration, and configured to store data received from the plurality of cameras, the data including one or both of image data and video data;
a detector coupled to the mounting structure and configured to detect motion of the user's jaw while the mounting structure is worn on the user's head; and
a processor coupled to the plurality of cameras, the detector, and the storage device, the mounting structure further configured to position the storage device at the recess.

9. The apparatus of claim 8, wherein the processor is configured to process information from at least one of the plurality of cameras and the detector, and wherein the mounting structure is further configured to be supported on the user's head by resting on the ears of the user.

10. The apparatus of claim 8, wherein the mounting structure, while the mounting structure is on the user's head, is further configured to at least partially wrap around a rear of the user's head and to position the first camera at a first temple of the user.

11. The apparatus of claim 10, wherein the mounting structure is further configured to position the second camera of the plurality of cameras at the second tip to be at approximately the eye level of the user wearing the mounting structure.

12. The apparatus of claim 11, wherein the mounting structure is further configured to position the first camera and second camera at the temples of the user.

13. The apparatus of claim 8, wherein the processor is associated with operation of memory cells of the non-volatile memory.

14. The apparatus of claim 8, wherein the mounting structure is further configured to position the plurality of cameras, the storage device, and the processor to be constrained along a contour of the user's head without extending outward from the contour of the user's head.

15. An apparatus comprising:
first means for image capture;
second means for image capture;
means for at least partially wrapping around a rear of a user's head and remaining substantially or entirely outside of a field of vision of the user, the means for at least partially wrapping including:
- first means for rigidly extending from a recess of the back of the user's head and above a first ear of the user to terminate at a first tip, the first tip including the first means for image capture; and
- second means for rigidly extending from the recess and above a second ear of the user to terminate at a second tip, the second tip including the second means for image capture,
- wherein the first means for rigidly extending is configured to position the first means for image capture at approximately an eye level of the user and wherein the means for at least partially wrapping is configured to contact and be supported against the recess;

means for storing video data received from the first means for image capture and from the second means for image capture, the means for storing coupled to the means for at least partially wrapping and having a three-dimensional (3D) memory configuration;
means for detecting motion of the user's jaw while the means for at least partially wrapping is worn on the user's head; and
means for processing coupled to the first means for image capture, the second means for image capture, the means for detecting, and the means for storing, wherein the means for at least partially wrapping is further configured to position the means for storing at the recess.

16. The apparatus of claim 15, wherein the means for processing is configured to process information from the first means for image capture, the second means for image capture, and the means for detecting, and wherein the means for at least partially wrapping is further configured to rest on the ears of the user.

* * * * *